United States Patent
Sasaki et al.

(10) Patent No.: US 9,634,852 B2
(45) Date of Patent: *Apr. 25, 2017

(54) CONTROL METHOD FOR INFORMATION APPARATUS AND COMPUTER-READABLE RECORDING MEDIUM

(71) Applicant: PANASONIC CORPORATION, Osaka (JP)

(72) Inventors: Takamitsu Sasaki, Osaka (JP); Kohei Tahara, Osaka (JP); Tomoyuki Hirota, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 464 days.

This patent is subject to a terminal disclaimer.

(21) Appl. No.: 14/165,737

(22) Filed: Jan. 28, 2014

(65) Prior Publication Data

US 2014/0236327 A1    Aug. 21, 2014

Related U.S. Application Data

(63) Continuation of application No. PCT/JP2013/002203, filed on Mar. 29, 2013.
(Continued)

(51) Int. Cl.
*G06F 17/00* (2006.01)
*G05B 21/00* (2006.01)
(Continued)

(52) U.S. Cl.
CPC ...... *H04L 12/2803* (2013.01); *G06F 3/04817* (2013.01); *G06F 3/04886* (2013.01);
(Continued)

(58) Field of Classification Search
CPC .................................................. H04N 5/4403
See application file for complete search history.

(56) References Cited

U.S. PATENT DOCUMENTS 6,756,998 B1 *  6/2004  Bilger ................. H04L 12/2803
                                                          715/734
7,730,223 B1    6/2010  Bavor et al.
(Continued)

FOREIGN PATENT DOCUMENTS

CN    101990334    3/2011
CN    102752910    10/2012
(Continued)

OTHER PUBLICATIONS

Search report from International Search Report in PCT/JP2013/002203, mail date is Jul. 2, 2013.
(Continued)

*Primary Examiner* — Mohammad Ali
*Assistant Examiner* — Md Azad
(74) *Attorney, Agent, or Firm* — Greenblum & Bernstein, P.L.C.

(57) ABSTRACT

A control method of the present disclosure causes a computer of the information apparatus to: switch between display of a first display screen and a second display screen displayed on the display, when selection of a region corresponding to a staircase on a floor plan for a first floor or a second floor is sensed; and output to the network a first control command, when selection of an illumination icon representing an illumination device among the one or more target devices in a region corresponding to the staircase included in the first display screen, or an illumination icon representing the illumination device in a region corresponding to the staircase included in the second display screen is sensed, and when selection of the region corresponding to the staircase is sensed, the first control command controlling
(Continued)

on/off of power for the illumination device associated with the region corresponding to the staircase.

20 Claims, 106 Drawing Sheets

Related U.S. Application Data

(60) Provisional application No. 61/766,873, filed on Feb. 20, 2013.

(51) Int. Cl.
    *G05D 23/00*     (2006.01)
    *G06F 3/048*     (2013.01)
    *G01R 31/08*     (2006.01)
    *H04L 12/28*     (2006.01)
    *G06F 3/0481*     (2013.01)
    *G06F 3/0488*     (2013.01)
    *H04L 12/10*     (2006.01)

(52) U.S. Cl.
    CPC ............ *H04L 12/10* (2013.01); *H04L 12/282* (2013.01); *H04L 12/2809* (2013.01)

(56) References Cited

U.S. PATENT DOCUMENTS

| | | | |
|---|---|---|---|
| 2006/0028212 A1* | 2/2006 | Steiner | H05B 37/029 324/527 |
| 2007/0080940 A1 | 4/2007 | Aoki et al. | |
| 2008/0316730 A1 | 12/2008 | Diederiks et al. | |
| 2011/0126144 A1* | 5/2011 | Sakaguchi | F24F 11/0086 715/771 |
| 2012/0268365 A1 | 10/2012 | Lee et al. | |
| 2013/0179826 A1* | 7/2013 | Wang | G06Q 90/205 715/781 |
| 2014/0089859 A1* | 3/2014 | Ishizaka | G06F 3/044 715/836 |

FOREIGN PATENT DOCUMENTS

| | | |
|---|---|---|
| JP | 5-83764 | 4/1993 |
| JP | 09-65453 | 3/1997 |
| JP | 11-251072 | 9/1999 |
| JP | 2000-138979 | 5/2000 |
| JP | 2002-318843 | 10/2002 |
| JP | 2005-302017 | 10/2005 |
| JP | 2007-104567 | 4/2007 |
| JP | 2009-177743 | 8/2009 |
| JP | 2009-213107 | 9/2009 |
| JP | 2009-266654 | 11/2009 |
| JP | 2011-204656 | 10/2011 |
| JP | 5128489 | 11/2012 |
| WO | 2007/072315 | 6/2007 |

OTHER PUBLICATIONS

Extended European Search Report, mail date is Jan. 26, 2015.
Japan Office action, mail date is Feb. 17, 2015.

\* cited by examiner

| ROOM ID | ROOM TYPE | ROOM COORDINATE |
|---------|-----------|-----------------|
| A | LIVING ROOM | (F,G,H,I,L,O,N) |
| B | BEDROOM | (J,K,M,L,I) |
| C | BATH | (A,B,G,F) |
| D | STAIRCASE | (H,I,R,Q) |
| ... | | |

FIG.34

| DEVICE ID 4701 | DEVICE TYPE 4702 | MODEL NUMBER 4703 | ARRANGEMENT 4704 | CAPABILITY INFORMATION 4705 | CONTROL COMMAND TRANSMISSION DESTINATION 4706 |
|---|---|---|---|---|---|
| A | AIR CONDITIONER | CS-X403C | (X10,Y100,Z1) | TEMPERATURE CONTROL, AIR FLOW DIRECTION CONTROL, AND AIR FLOW AMOUNT CONTROL | DEVICE |
| B | ILLUMINATION | HH-LC710A | (X30,Y150,Z1) | ON/OFF CONTROL AND DIMMER CONTROL | DEVICE |
| C | REFRIGERATOR | NR-F557XV | (X50,Y200,Z1) | POWER CONSUMPTION STATE MANAGEMENT | SERVER |
| ... | | | | | |

| DEVICE ID 3101 | DEVICE TYPE 3102 | MODEL NUMBER 3103 | ARRANGEMENT 3104 | CAPABILITY INFORMATION 3105 | CONTROL COMMAND TRANSMISSION DESTINATION 3106 | IP ADDRESS 3107 |
|---|---|---|---|---|---|---|
| A | AIR CONDITIONER | CS-X403C | (X10,Y100,Z1) | TEMPERATURE CONTROL, AIR FLOW DIRECTION CONTROL, AND AIR FLOW AMOUNT CONTROL | DEVICE | 192.168.0.5 |
| B | ILLUMINATION | HH-LC710A | (X30,Y150,Z1) | ON/OFF CONTROL AND DIMMER CONTROL | DEVICE | 192.168.0.6 |
| C | REFRIGERATOR | NR-F557XV | (X50,Y200,Z1) | POWER CONSUMPTION STATE MANAGEMENT | SERVER | 192.168.0.7 |
| ... | | | | | | |

3100

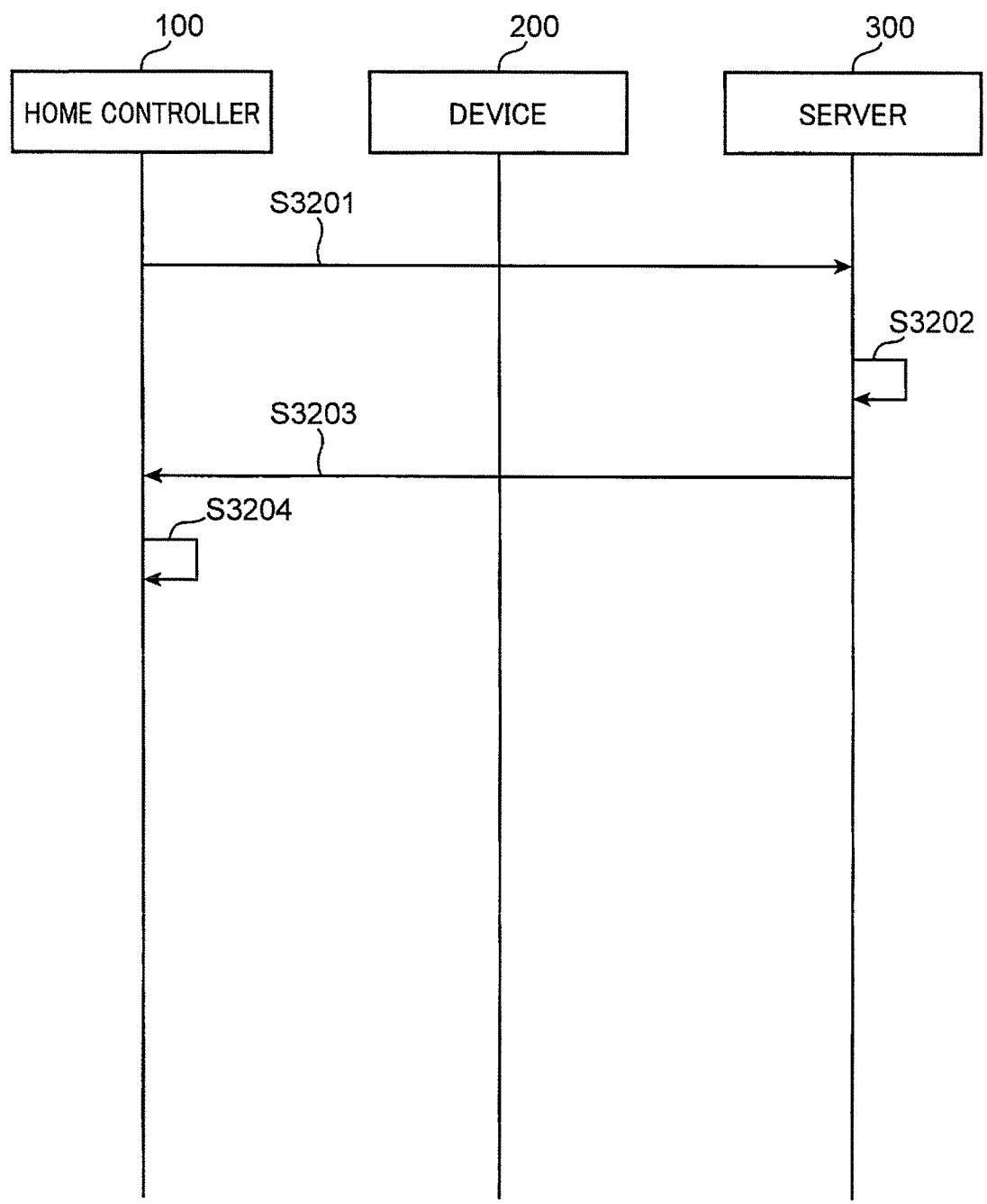

| ROOM ID | ROOM TYPE | FLOOR LEVEL | DISPLAY POSITION |
|---|---|---|---|
| A | LIVING ROOM | FIRST FLOOR | FIRST CELL ON FIRST FLOOR |
| B | BEDROOM | SECOND FLOOR | FIRST CELL ON SECOND FLOOR |
| C | BATH | FIRST FLOOR | FOURTH CELL ON FIRST FLOOR |
| D | STAIRCASE | FIRST FLOOR<br>SECOND FLOOR | SEVENTH CELL ON FIRST FLOOR<br>SECOND CELL ON SECOND FLOOR |
| ... | | | |

| DEVICE ID 4701 | DEVICE TYPE 4702 | MODEL NUMBER 4703 | ARRANGEMENT 4704 | CAPABILITY INFORMATION 4705 | CONTROL COMMAND TRANSMISSION DESTINATION 4706 |
|---|---|---|---|---|---|
| A | AIR CONDITIONER | CS-X403C | LIVING ROOM | TEMPERATURE CONTROL, AIR FLOW DIRECTION CONTROL, AND AIR FLOW AMOUNT CONTROL | DEVICE |
| B | ILLUMINATION | HH-LC710A | LIVING ROOM | ON/OFF CONTROL AND DIMMER CONTROL | DEVICE |
| C | REFRIGERATOR | NR-F557XV | KITCHEN | POWER CONSUMPTION STATE MANAGEMENT | SERVER |
| ... | | | | | |

FIG.71

| 3100 | | | | | | |
|---|---|---|---|---|---|---|
| DEVICE ID 3101 | DEVICE TYPE 3102 | MODEL NUMBER 3103 | ARRANGEMENT 3104 | CAPABILITY INFORMATION 3105 | CONTROL COMMAND TRANSMISSION DESTINATION 3106 | IP ADDRESS 3107 |
| A | AIR CONDITIONER | CS-X403C | LIVING ROOM | TEMPERATURE CONTROL, AIR FLOW DIRECTION CONTROL, AND AIR FLOW AMOUNT CONTROL | DEVICE | 192.168.0.5 |
| B | ILLUMINATION | HH-LC710A | LIVING ROOM | ON/OFF CONTROL AND DIMMER CONTROL | DEVICE | 192.168.0.6 |
| C | REFRIGERATOR | NR-F557XV | KITCHEN | POWER CONSUMPTION STATE MANAGEMENT | SERVER | 192.168.0.7 |
| ... | | | | | | |

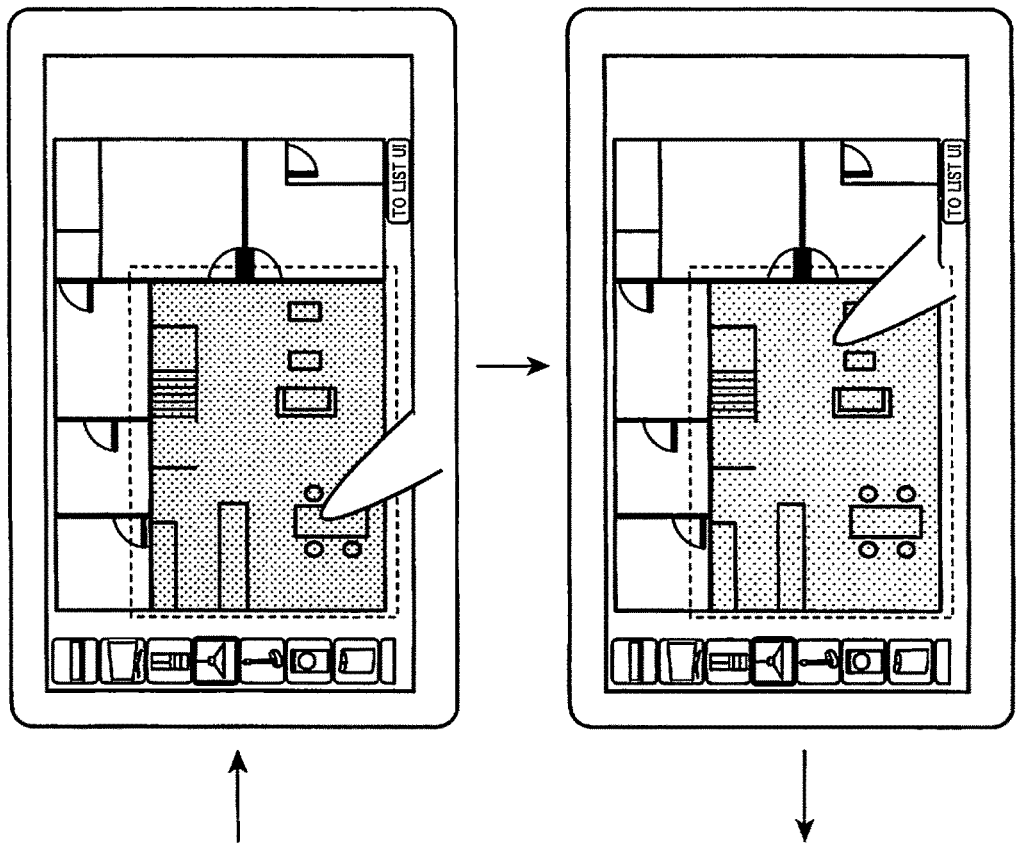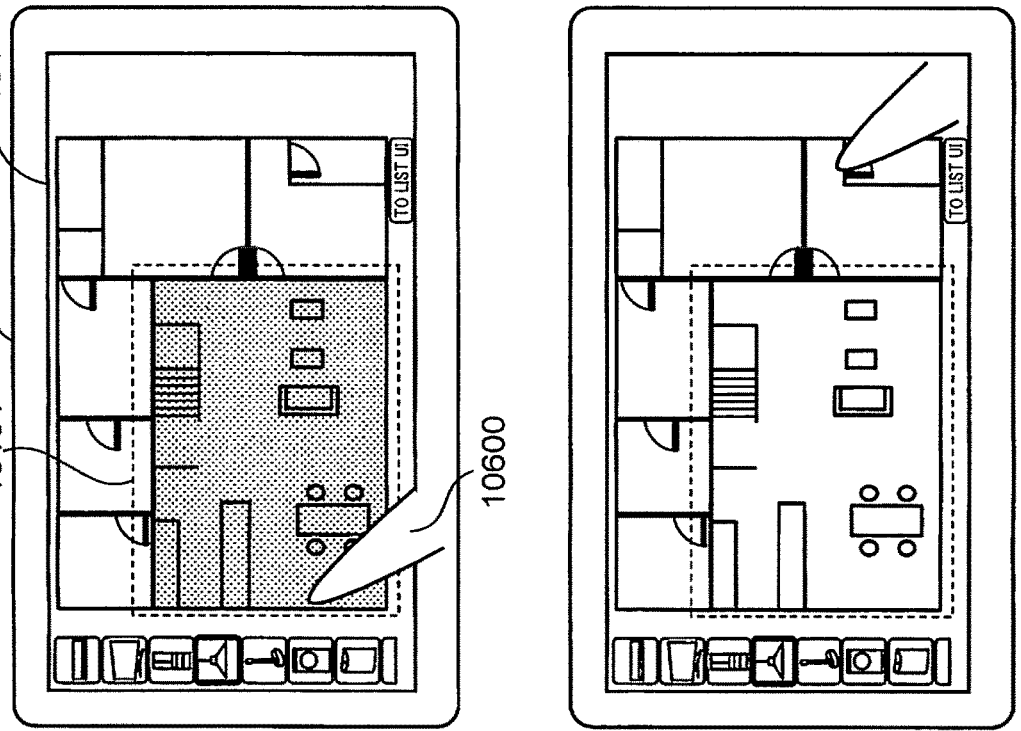
FIG.78

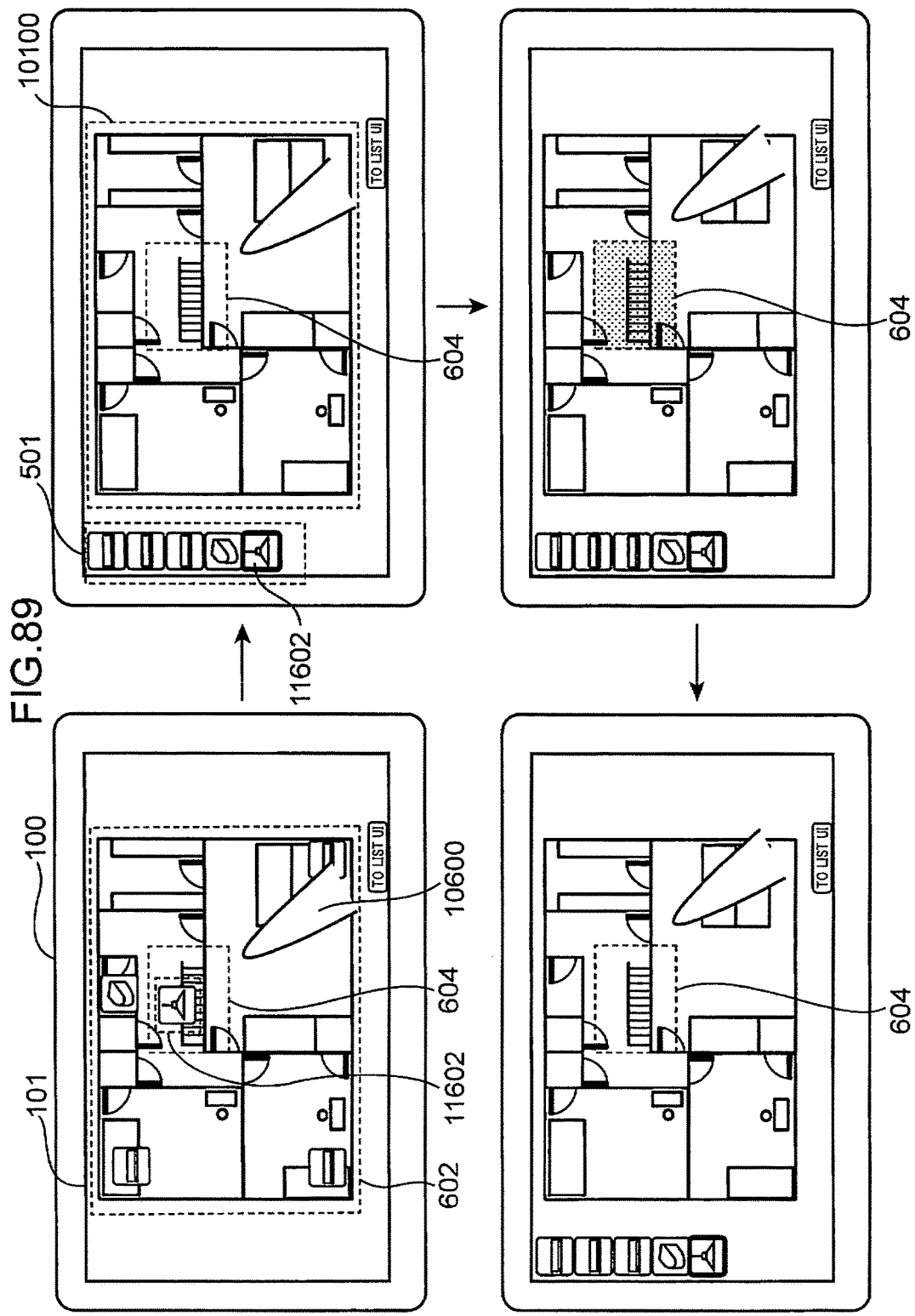

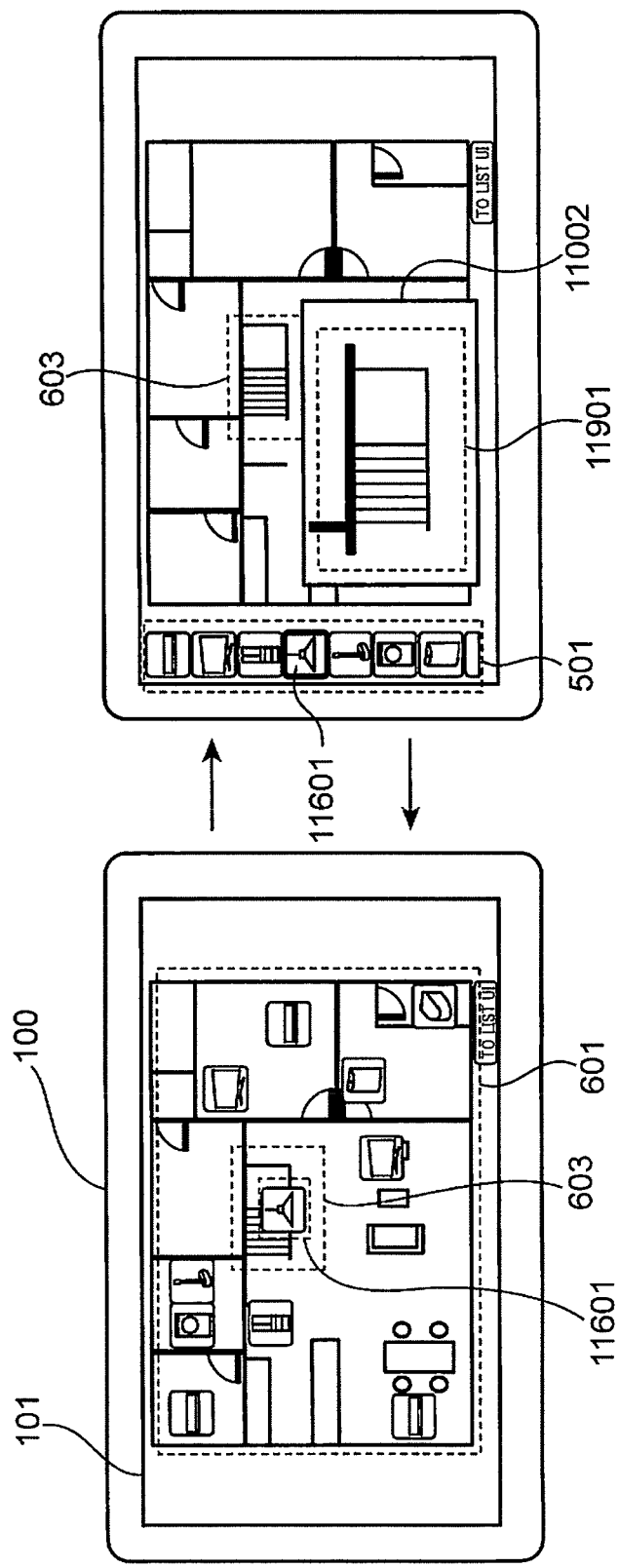

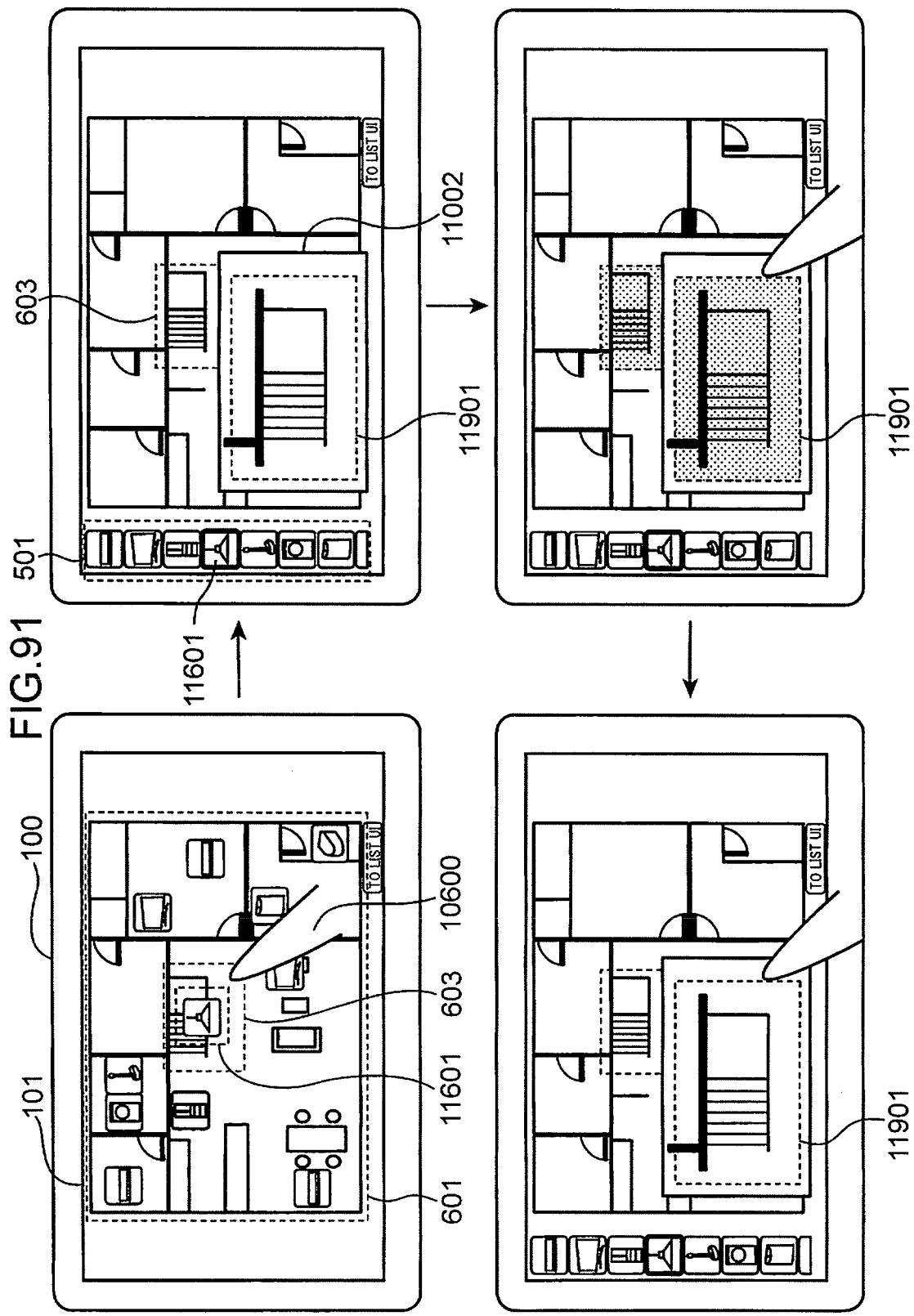

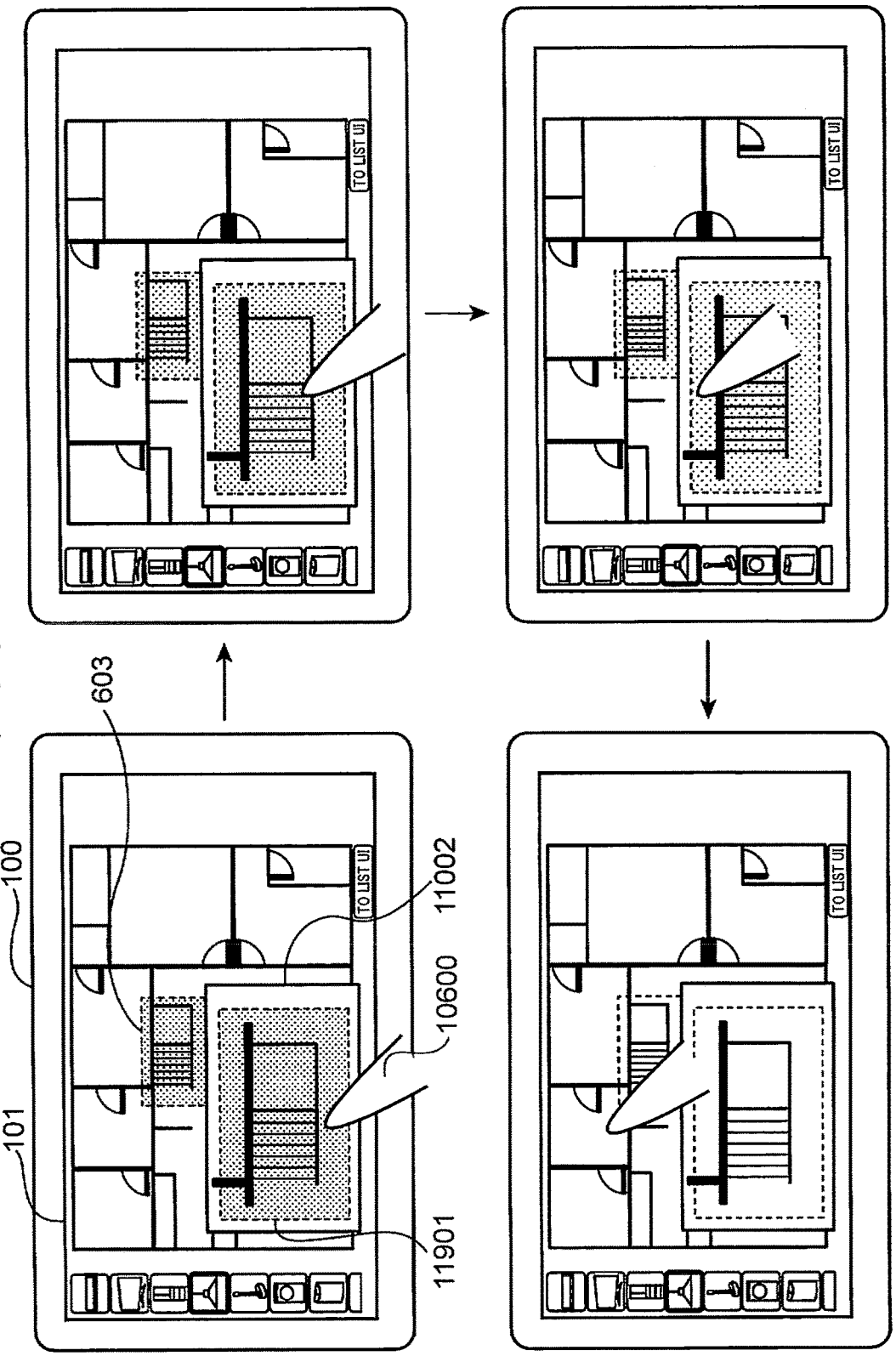

CONTROL METHOD FOR INFORMATION APPARATUS AND COMPUTER-READABLE RECORDING MEDIUM

RELATED APPLICATIONS

This application is a continuation application of International Application No. PCT/JP2013/002203, filed Mar. 29, 2013, and claims the benefit of U.S. Provisional application No. 61/766,873, filed Feb. 20, 2013, the disclosures of which are incorporated by reference herein in their entireties.

TECHNICAL FIELD

The present disclosure relates to a control method for an information apparatus and a computer-readable recording medium.

BACKGROUND ART

Technologies for remotely monitoring or remotely controlling one or more target devices using one remote controller are proposed.

Patent Document 1 discloses a technology for remotely operating one or more target devices from a monitor of a television set. Specifically, icons for the one or more target devices are displayed on the right side of a monitor screen. When a desired one of the icons is selected (i), a floor plan is displayed on the left side of the monitor screen (ii). When a pointer is moved to the location of installation of a target device desired to be operated in the floor plan (iii), an operation screen for the target device selected by moving the pointer is displayed on the monitor screen (iv) (paragraphs [0138] to [0140] and FIGS. 25A and 25B).

Patent Document 2 discloses a technology for controlling one or more target devices using a single remote controller. Specifically, a floor plan of each room and the condition within the room are displayed on a liquid crystal monitor of the remote controller. For example, the liquid crystal monitor displays a illumination mark displayed in the case where an illumination device of a certain room is turned on, a room temperature mark that indicates the current temperature of a certain room, a lock mark in the shape of a hatched window displayed in the case where a window of a certain room is locked, a device/facility mark that indicates the status or the like of a control target object, a mark that indicates the amount of hot water in the case where the control target is a bath, and so forth (paragraphs [0037] to [0041] and FIG. 6).

Patent Document 3 relates to a technology for remotely controlling and remotely monitoring open/close operation and the state of an electric building material (such as a hallway door or a skylight). Specifically, a monitor screen of a personal computer displays floor plans for first and second floors of a property, a picture of the electric building material (such as a hallway door or a skylight) and a state display icon that indicates the open/close state of the electric building material are displayed at the corresponding position on the floor plans. When the state display icon is selected, an operation screen for the selected electric building material is displayed in another window. The operation screen includes an open operation button, a close operation button, an operation monitor screen, and a button for hiding the operation screen (paragraph [0025] and FIGS. 4, 5, and 6).

Patent Document 4 discloses a user interface including a floor plan and an icon. Examples of the icon include an icon representing a receptacle, an icon representing a digital image frame, and an icon representing an illumination device (FIGS. 7 and 8B).

Patent Document 5 discloses a user interface of an illumination system. When an icon associated with a certain light source is dragged into a target region on a screen and moved toward the center of the target region, the intensity of light from the corresponding light source is increased.

However, Patent Documents 1 to 5 described above need a further improvement.

Patent Document 1: Japanese Patent Application Laid-open No. 2007-104567
Patent Document 2: Japanese Patent Application Laid-open No. 2000-138979
Patent Document 3: Japanese Patent Application Laid-open No. 2009-213107
Patent Document 4: U.S. Pat. No. 7,730,223
Patent Document 5: Japanese Patent No. 5128489

SUMMARY OF THE INVENTION

In one general aspect, the techniques disclosed here feature a control method for an information apparatus having a display and being connected to a network, over which one or more target devices being controlled over the network, the control method causing a computer of the information apparatus to:

display a first display screen representing a floor plan for a first floor of a building on the display when the first display screen is selected, device icons representing the one or more target devices being displayed on the first display screen representing the floor plan for the first floor, and the floor plan for the first floor including a staircase;

display a second display screen representing a floor plan for a second floor of the building different from the first floor on the display when the second display screen is selected, device icons representing the one or more target devices being displayed on the second display screen representing the floor plan for the second floor, and the floor plan for the second floor including the common staircase as the staircase included in the first floor;

switch between display of the first display screen and display of the second display screen displayed on the display, when selection of a region corresponding to the staircase on the floor plan for the first floor or the floor plan for the second floor is sensed; and output to the network a first control command, when selection of an illumination icon representing an illumination device among the one or more target devices in a region corresponding to the staircase included in the first display screen is sensed, or when selection of an illumination icon representing the illumination device in a region corresponding to the staircase included in the second display screen is sensed, and when selection of the region corresponding to the staircase is sensed, the first control command controlling on/off of power for the illumination device that is associated with the region corresponding to the staircase.

According to the aspect described above, it is possible to embody a further improvement. These general and specific aspects may be implemented using a system, a method, and a computer program, and any combination of systems, methods, and computer programs.

BRIEF DESCRIPTION OF THE DRAWINGS

FIG. 32 is a diagram showing the configuration of room information according to the present disclosure.

FIG. 34 is a diagram showing the configuration of a device list managed by the server according to the present disclosure.

FIG. 35 is a diagram showing the configuration of a device list managed by the home controller according to the present disclosure.

FIG. 36 is a sequence diagram showing the flow of a process for the home controller to acquire the home information from the server according to the present disclosure.

FIG. 68 is a diagram showing the configuration of room information shown in FIG. 67.

FIG. 70 is a diagram showing the configuration of a device list managed by the server for a case where the floor plan shown in FIG. 52 is adopted.

FIG. 71 is a diagram showing the configuration of a device list managed by the home controller for a case where the floor plan shown in FIG. 52 is adopted.

FIG. 78 is a diagram showing transition of the display screen on the display in another example of the light quantity increase control for the illumination device according to the embodiment of the present disclosure.

FIG. 89 is a diagram showing an example of transition of the display screen on the display of the home controller made through on/off control for the illumination device performed using the device icon for the illumination device in a staircase region on the second floor according to the embodiment of the present disclosure.

FIG. 90 is a diagram showing an example of transition of the display screen on the display of the home controller between the display state of the first floor of the basic screen and the display state of the control screen for the illumination device on the first floor according to the embodiment of the present disclosure.

FIG. 91 is a diagram showing an example of transition of the display screen on the display of the home controller made through on/off control for the illumination device performed using an enlarged control screen for the illumination device according to the embodiment of the present disclosure.

FIG. 92 is a diagram showing an example of transition of the display screen on the display of the home controller made through light quantity control for the illumination device performed using an enlarged control screen for the illumination device according to the embodiment of the present disclosure.

Figure 1:
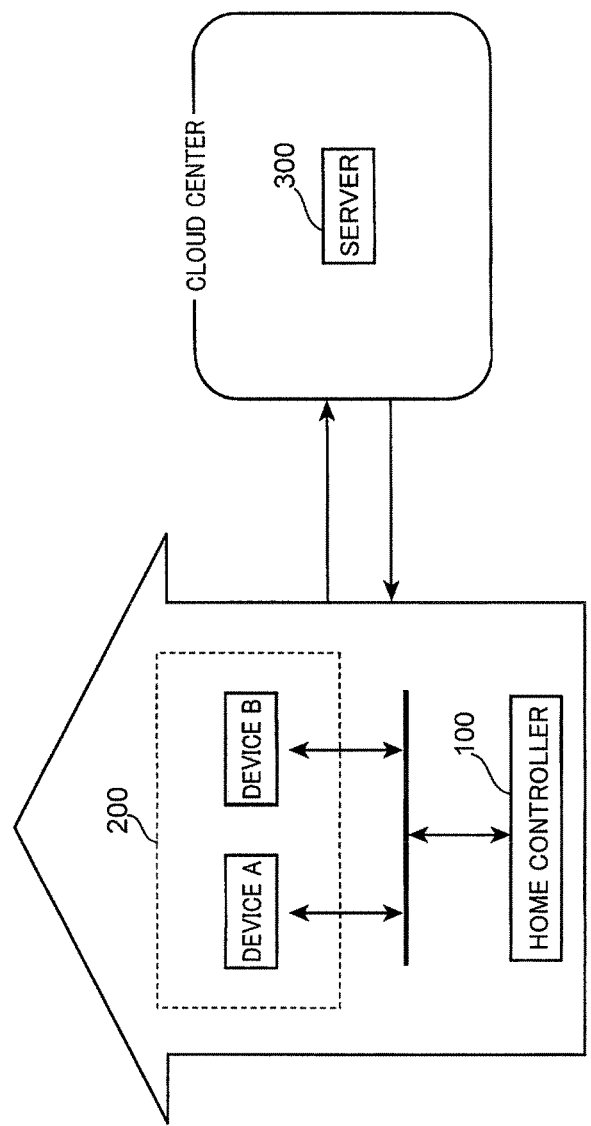
FIG. 1 is a diagram showing an overall configuration of a home control system to which a home controller according to the present disclosure is applied.

DETAILED DESCRIPTION (Story Before Inventing Aspect According to Present Disclosure)

First, the point of view of an aspect according to the present disclosure will be described.

In Patent Document 1 described above, icons for one or more target devices are displayed on the right side of a monitor screen, and a floor plan is displayed on the left side of the monitor screen. That is, the icons for the one or more target devices and the floor plan are displayed separately from each other, and the icons for the one or more target devices are not movable. Therefore, the location of installation of a target device desired to be operated in the floor plan is designated by moving a pointer. Then, an operation screen is displayed.

In Patent Document 1 described above, because of the configuration described above, the number of operation steps to be taken to operate a desired target device is large, from (i) to (iv) described above. Therefore, when one or more target devices are remotely monitored or remotely controlled using one remote controller, the operation steps (i) to (iv) described above are required to operate each target device, which complicates operation. This requires a larger number of process steps to be taken by a portable information terminal before a desired target device among the one or more target devices is operated simply because remote controllers for the one or more target devices are integrated into one, which requires a larger number of process operations to be performed by a user.

Patent Document 2 described above describes only displaying the state of each target device, and does not describe at all remotely controlling operation of each target device. Therefore, although the one or more target devices can be remotely monitored using one remote controller, the one or more target devices cannot be controlled.

In Patent Document 3 described above, open/close operation and the state of an electric building material (such as a hallway door or a skylight) are remotely controlled and remotely monitored using a personal computer. Also in Patent Document 3 described above, however, an operation is performed with an operation screen displayed. Thus, the number of steps to be taken to operate a desired target device is accordingly increased. Therefore, in remotely monitoring or remotely controlling one or more target devices using one remote controller, a larger number of process steps are required to be taken by a portable information terminal before the desired target device is operated, compared to a case where individual remote controllers are used for the one or more target devices, because remote controllers for the one or more target devices are integrated into one, which requires a larger number of process operations to be performed by a user.

In Patent Document 4 described above, as in Patent Document 3 described above, an operation screen for operating and confirming the state of an illumination device is separately provided (FIG. 8B). Thus, the number of steps to be taken to operate a desired target device is increased because of operations for causing the operation screen to display and performing an operation on the operation screen. Therefore, in remotely monitoring or remotely controlling one or more target devices using one remote controller, a larger number of process steps are required to be taken by a portable information terminal before the desired target device is operated, compared to a case where individual remote controllers are used for the one or more target devices, because remote controllers for the one or more target devices are integrated into one, which requires a larger number of process operations to be performed by a user.

Patent Document 5 described above only considers controlling an illumination device for each room such as a bedroom, and does not consider controlling illumination devices used on one floor including two or more rooms. For example, an illumination device in a room corresponding to a first target region may be turned on by moving an icon from the outside of the first target region to the inside of the first target region. However, when an icon is moved from the first target region to a second target region that is adjacent to the first target region, the icon is moved into the second target region. Therefore, although an illumination device in a room corresponding to the second target region is turned on, an illumination device in a room corresponding to the first target region is turned off since the icon is moved out of the first target region, which is a problem. In Patent Document 5 described above, in addition, the icon is initially positioned outside the target region, and moved into the target region to dim the illumination device. This makes it difficult to discriminate to which room the icon corresponds in the case where Patent Document 5 is applied to a display screen representing a floor plan for one floor including two or more rooms. This also complicates an operation of moving the icon itself into each of the two or more target regions. The operation is particularly complicated in the case where two rooms for which it is desired to turn on the illumination device are not adjacent to but away from each other.

Based on the considerations described above, the inventors have conceived various aspects of the present disclosure to be described below.

An aspect of the present disclosure provides a control method for an information apparatus having a display and being connected to a network, one or more target devices being controlled over the network, the control method causing a computer of the information apparatus to:

display a first display screen representing a floor plan for a first floor of a building on the display when the first display screen is selected, device icons representing the one or more target devices being displayed on the first display screen representing the floor plan for the first floor, and the floor plan for the first floor including a staircase;

display a second display screen representing a floor plan for a second floor of the building different from the first floor on the display when the second display screen is selected, device icons representing the one or more target devices being displayed on the second display screen representing the floor plan for the second floor, and the floor plan for the second floor including the common staircase as the staircase included in the first floor;

switch between display of the first display screen and display of the second display screen displayed on the display, when selection of a region corresponding to the staircase on the floor plan for the first floor or the floor plan for the second floor is sensed; and output to the network a first control command, when selection of an illumination icon representing an illumination device among the one or more target devices in a region corresponding to the staircase included in the first display screen is sensed, or when selection of an illumination icon representing the illumination device in a region corresponding to the staircase included in the second display screen is sensed, and when selection of the region corresponding to the staircase is sensed, the first control command controlling on/off of power for the illumination device that is associated with the region corresponding to the staircase.

For example, it is desirable that the illumination device provided in the staircase connecting between the first floor and the second floor should be turned on and off from both the first floor and the second floor.

According to the aspect described above, on/off of power for the illumination device corresponding to the region corresponding to the staircase can be controlled both in the case where selection of the illumination icon is sensed in the region corresponding to the staircase included in the first display screen and in the case where selection of the illumination icon is sensed in the region corresponding to the staircase included in the second display screen.

This allows on/off of power for the illumination device provided in the region corresponding to the staircase included in the first display screen or the second display screen to be controlled, whether the first display screen or the second display screen is displayed, without switching display on the display to the first display screen in the case where the second display screen is displayed as in Patent Document 4 described above.

When selection of the region corresponding to the staircase is sensed, the floor plan being displayed already is used, rather than a separate operation screen is provided, as an operation screen for operating on/off of the illumination device corresponding to the region corresponding to the staircase. Therefore, on/off of the illumination device corresponding to the region corresponding to the staircase can be controlled without displaying an operation screen for operating on/off of the illumination device corresponding to the region corresponding to the staircase.

This reduces one or more steps to be taken to display the operation screen separately from the floor plan as in Patent Document 1, Patent Document 3, and Patent Document 4 described above, and decreases the number of process steps to be performed within the portable information terminal or the number of operations to be performed by the user. As a result, it is possible to reduce both the number of processes to be performed within the portable information terminal and the number of operations to be performed by the user when remote controllers for the one or more target devices are integrated into one, and to reduce the time until the user operates a desired illumination device.

As described above, on/off of the illumination device provided in the region corresponding to the staircase is operated using the floor plan itself as an operation screen. This allows display of the floor plan to be not only used to simply display the state of operation of the illumination device as in Patent Document 2 described above, but also utilized to remotely operate the illumination device.

When selection of the illumination icon is sensed in the region corresponding to the staircase included in the first display screen, or when selection of the illumination icon is sensed in the region corresponding to the staircase included in the second display screen, it is recognized that the illumination device corresponding to the region corresponding to the staircase is the control target. Subsequently, when selection of the region corresponding to the staircase included in the floor plan is sensed, on/off of power for the corresponding illumination device is controlled. This eliminates the need for a complicated and troublesome operation of moving an icon from a location outside each target region to a location inside each target region as in Patent Document 5 described above. Instead, on/off of power for the corresponding illumination device can be easily controlled by only a simple operation of selecting the region serving as the control target. Further, on/off of the illumination device is not controlled by moving an icon from a location outside each target region to a location inside each target region as in Patent Document 5 described above. This resolves the inconvenience that each time the icon is moved from a certain region to the next region that is adjacent to the certain region, the illumination device in the certain region is turned off against the intention of the user although the illumination device in the next region is turned on.

In the aspect described above, for example, when power for the illumination device is turned on, a region corresponding to the staircase on the display screen may be displayed brightly with not less than a specific brightness, and when power for the illumination device is turned off, the region corresponding to the staircase on the display screen may be displayed darkly with less than the specific brightness.

In this case, the floor plan itself is also used as a screen for displaying the state of operation of the illumination device. Therefore, a separate display screen is not used as the screen for displaying the state of operation of the illumination device. This reduces one or more steps to be taken to display the state display screen separately from the floor plan as in Patent Document 1, Patent Document 3, and Patent Document 4 described above, and decreases the number of process steps to be performed within the portable information terminal or the number of operations to be performed by the user.

A region on the display screen corresponding to the staircase is displayed brightly and/or darkly. This indicates in which region the illumination device as the control target is located using the floor plan being displayed already. As a result, the user can be prevented from erroneously operating an illumination device at a different location in the case where the illumination icon is used in common in one or more regions.

Not only on/off of the illumination device corresponding to the region corresponding to the staircase is operated, but also the state of operation of the illumination device is displayed, using the floor plan itself. Therefore, the same region being displayed already can be used not only to remotely operate the illumination device but also to confirm the state of operation of the illumination device. As a result, a screen for remotely operating the illumination device and a screen for confirming the state of operation of the illumination device can be provided by effectively exploiting the display resource.

In the aspect described above, for example, an on control command may be output to the network, when selection of the region corresponding to the staircase is sensed with the region corresponding to the staircase on the display screen displayed darkly with less than the specific brightness, the on control command turning on power for the illumination device being associated with the region corresponding to the staircase.

In the aspect described above, for example, an off control command may be output to the network, when selection of the region corresponding to the staircase is sensed with the region corresponding to the staircase on the display screen displayed brightly with not less than the specific brightness, the off control command turning off power for the illumination device being associated with the region corresponding to the staircase.

In the aspect described above, for example, when selection of the illumination icon is sensed, the device icons representing the one or more target devices may be moved out of a display region of the display screen representing the floor plan.

In this case, the device icons representing the one or more target devices are no longer displayed in the region corresponding to the staircase included in the floor plan. Therefore, a desired region can be selected freely, and any region within the desired region can be selected freely, without being hindered by the presence of display of the device icons representing the one or more target devices. As a result, on/off control for the illumination device is prevented from being hindered by the presence of device icons for controlling other target devices even in the case where remote controllers for the one or more target devices are integrated into one.

In addition, it can be indicated that some control is performed on some region of the display screen representing the floor plan through display control in which the device icons representing the one or more target devices are moved, while effectively exploiting the display resource being displayed already without displaying other display screens.

In the aspect described above, for example, the display may be a touch panel display, and sensing of the selection of the illumination icon, or sensing of the selection of any region within the room in which selection of the illumination icon is sensed, may be performed by sensing a contact with the touch panel display.

In the aspect described above, for example, sensing of the selection of the illumination icon, or sensing of the selection of any region within the room in which selection of the illumination icon is sensed, may be performed by sensing a click with a mouse pointer.

In the aspect described above, for example, the display may be a touch panel display, in a case where an adjustment screen for adjusting a light quantity of the illumination device associated with the region corresponding to the staircase is displayed, a second control command may be output to the network, when movement of a contact with the display on the adjustment screen is sensed, the second control command varying the light quantity of the illumination device in accordance with an amount of the movement.

In the aspect described above, for example, the second control command may cause the light quantity of the illumination device to increase as the amount of the movement is larger.

In the aspect described above, for example, the region corresponding to the staircase may be displayed brightly or darkly in accordance with a variation in the light quantity of the illumination device.

In this case, display of the region corresponding to the staircase included in the floor plan is varied in accordance with an operation on the adjustment screen. This facilitates judging whether or not the result of the operation is reflected.

In the aspect described above, for example, the adjustment screen may have a display size larger than a display size of the region corresponding to the staircase.

In this case, a sufficient amount of movement can be secured even if the display size of the region corresponding to the staircase is small, for example. This allows the light quantity of the illumination device to be varied suitably irrespective of the display size of the region corresponding to the staircase.

In the aspect described above, for example, the display may be a touch panel display, in a case where an adjustment screen for adjusting a light quantity of the illumination device associated with the region corresponding to the staircase is displayed, a second control command may be output to the network, when movement of a contact with the display on the adjustment screen is sensed, the second control command varying the light quantity of the illumination device in accordance with a direction of the movement.

In the aspect described above, for example, the second control command may cause the light quantity of the illumination device to increase, when the direction of the movement is upward on the display screen.

In the aspect described above, for example, the second control command may cause the light quantity of the illumination device to decrease, when the direction of the movement is downward on the display screen.

In the aspect described above, for example, the region corresponding to the staircase may be displayed brightly or darkly in accordance with a variation in the light quantity of the illumination device.

In this case, display of the region corresponding to the staircase included in the floor plan is varied in accordance with an operation on the adjustment screen. This facilitates judging whether or not the result of the operation is reflected.

In the aspect described above, for example, the adjustment screen may have a display size larger than a display size of the region corresponding to the staircase.

In this case, the direction of movement can be detected reliably even if the display size of the region corresponding to the staircase is small, for example. This allows the light quantity of the illumination device to be varied suitably irrespective of the display size of the region corresponding to the staircase.

In the aspect described above, for example, a control screen may be displayed on the display screen representing the floor plan, when selection of a device icon representing a target device other than the illumination device among the one or more target devices is sensed, the control screen being for operating, or confirming a state of, the target device corresponding to the selected device icon.

(The Present Disclosure)

The present disclosure will be described below with reference to the drawings. In the drawings, the same symbols are used for the same constituent elements.

In the present disclosure, a home controller which can singly control one or more devices will be described.

(Overall Configuration)

FIG. 1 is a diagram showing an overall configuration of a home control system to which a home controller according to the present disclosure is applied. As shown in FIG. 1, the home control system includes a home controller 100, a device 200 (an example of a target device), and a server 300.

The home controller 100 and one or more devices 200 (for example, a device A 200 and a device B 200) are disposed in a house. The server 300 is disposed in a cloud center. The home controller 100, the device 200, and the server 300 communicate with each other via a wired or wireless network. For example, the device 200 and the home controller 100 are communicably connected to each other via a wireless or wired in-home network, and the home controller 100, the device 200, and the server 300 are communicably connected to each other via an external network such as the Internet.

The home controller 100 is not necessarily disposed in the house, and may be disposed outside the house. In this case, a user controls the one or more devices 200 from a location away from the home.

A portable information terminal such as a smartphone or a tablet terminal may be adopted as the home controller 100. It should be noted, however, that the smartphone and the tablet terminal are merely exemplary, and a portable information terminal of a button type such as a cellular phone may be adopted as the home controller 100.

Figure 2:
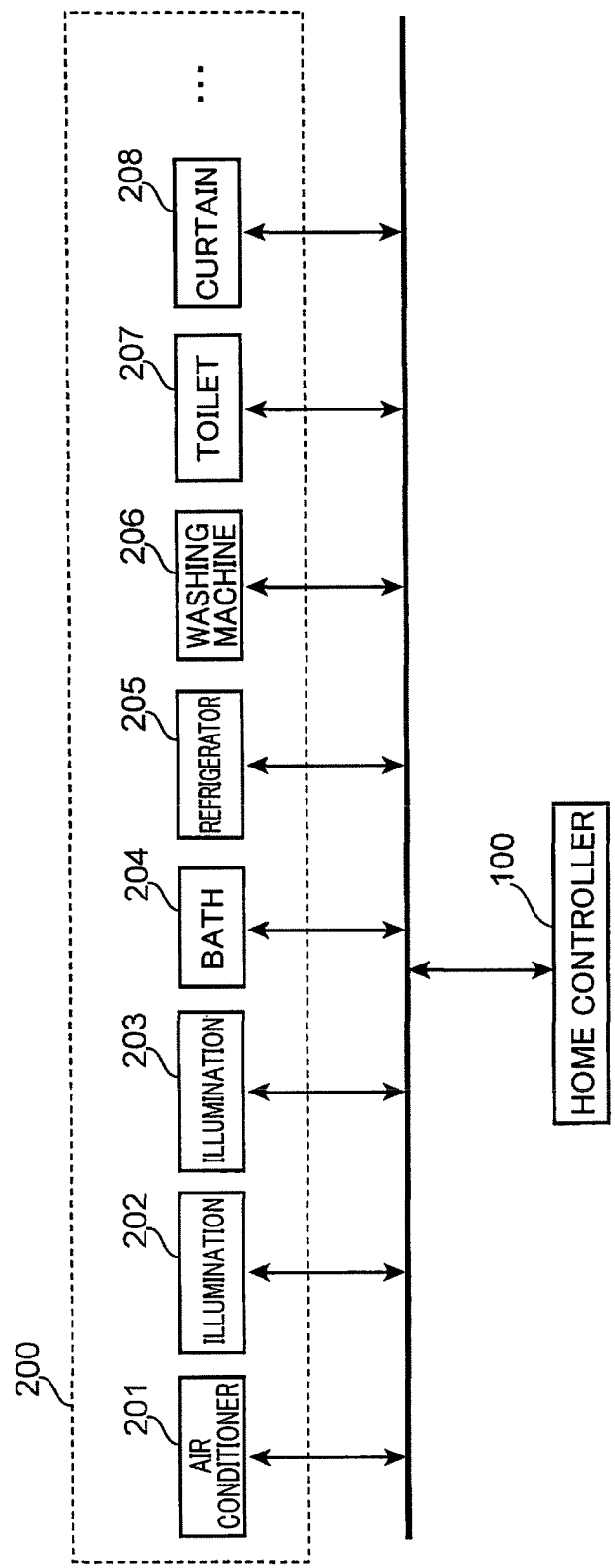
FIG. 2 is a diagram showing main devices to be controlled by the home controller according to the present disclosure.

FIG. 2 is a diagram showing the main devices 200 to be controlled by the home controller 100. The home controller 100 controls the devices 200 such as an air conditioner 201, illumination devices 202 and 203, a bath 204, a refrigerator 205, a washing machine 206, a toilet 207, and a curtain 208. The devices 200 to be controlled by the home controller 100 may include a plurality of devices 200 of the same type such as the illumination devices 202 and 203.

The devices 200 such as the air conditioner 201 shown in FIG. 2 are merely exemplary, and a television set, a Blu-ray recorder, an audio device, and so forth may be adopted as the devices 200. That is, any electrical device that functions to communicate with the home controller 100 may be adopted as the device 200. In FIG. 2, electrical devices for use in ordinary households are shown as the devices 200. However, the present disclosure is not limited thereto, and office devices for use in offices or the like may be adopted as the devices 200. Examples of the office devices include a printer, a personal computer, a scanner, and a copy machine.

Figure 3:
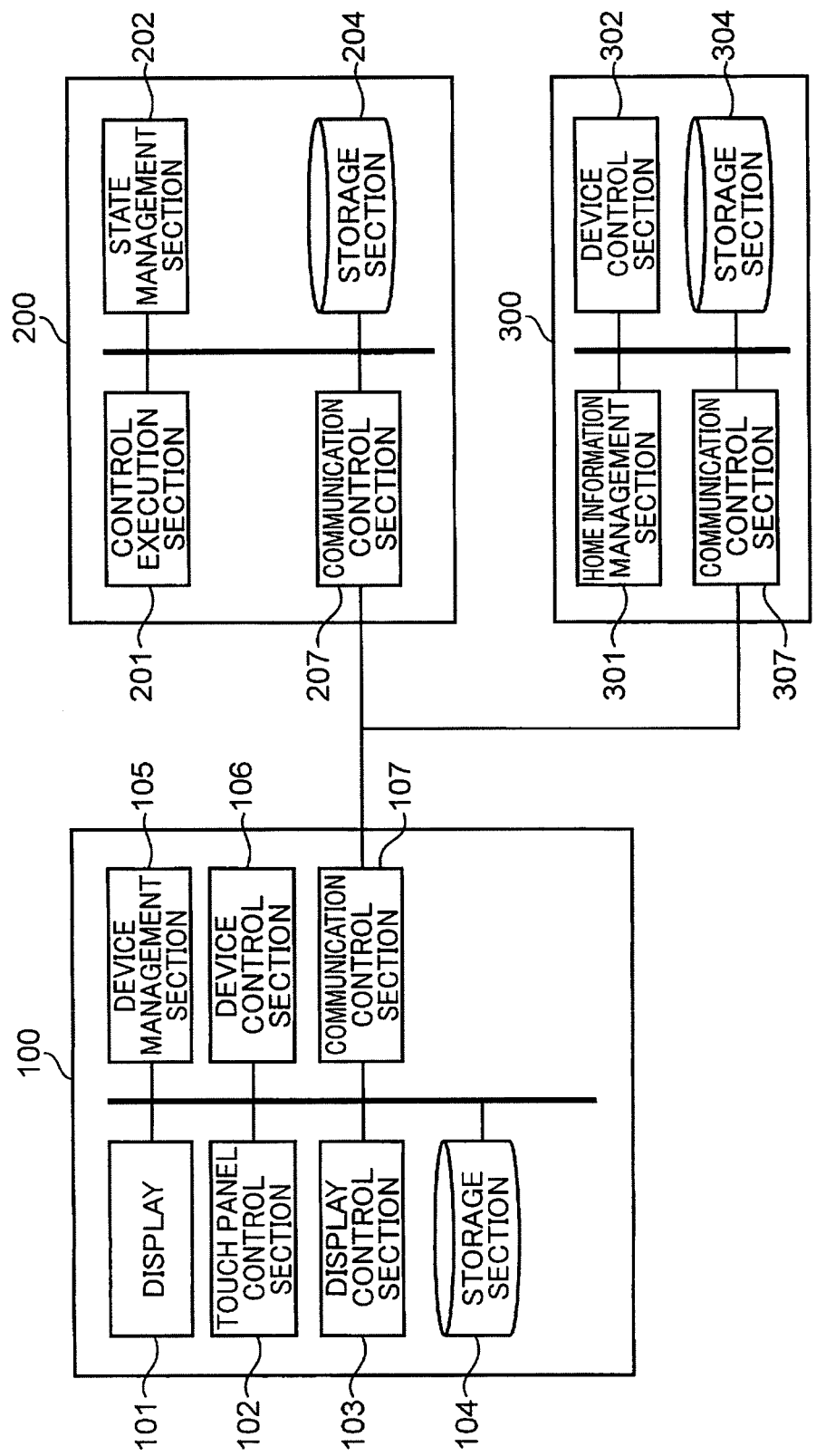
FIG. 3 is a block diagram showing the configuration of the home controller, a device, and a server according to the present disclosure.

FIG. 3 is a block diagram showing the configuration of the home controller 100, the device 200, and the server 300. As shown in FIG. 3, the home controller 100 includes a display 101, a touch panel control section 102, a display control section 103, a storage section 104, a device management section 105, a device control section 106, and a communication control section 107.

The display 101 is formed from a touch panel display, for example, and displays a user interface that allows the user to operate the home controller 100. The user can input various operations to the home controller 100 by contacting the display 101.

The touch panel control section 102 recognizes an operation performed on the display 101 by the user, interprets the content of the operation, and notifies the other constituent elements of the content of the operation. For example, if an object is displayed at a position on the display 101 tapped on by the user, the touch panel control section 102 determines that the object is selected by the user. A variety of GUI parts that receive a user operation such as buttons are adopted as the object.

The display control section 103 generates a GUI (Graphical User Interface) of the home controller 100, and causes the display 101 to display the GUI. The storage section 104 stores information that is necessary for operation of the home controller 100 such as a device list managed by the device management section 105.

The device management section 105 manages the control target devices 200 using the device list stored in the storage section 104. In addition, the device management section 105 detects a device 200 when the device 200 is connected to the in-home network. Further, the device management section 105 acquires home information 2700 to be discussed later from the server 300, stores the acquired home information 2700 in the storage section 104, and manages the home information 2700. The device control section 106 issues a control command for the devices 200. The communication control section 107 controls communication between the home controller 100 and the devices 200 and communication between the home controller 100 and the server 300. In addition, the communication control section 107 transmits a variety of data to the devices 200 or the server 300 upon receiving a request to transmit such data from other blocks, and receives data transmitted from the devices 200 or the server 300 to deliver the data to the relevant block.

The display 101 may be a normal display rather than a touch panel display. In this case, the user may use an external input device such as a mouse (not shown) to input an instruction to select an object by moving a pointer displayed on the display 101 and clicking on a desired object. That is, in the present disclosure, a series of operations performed by the user by contacting the display 101 may be replaced with operations of moving a pointer and clicking using an external input device such as a mouse.

As shown in FIG. 3, the device 200 includes a control execution section 201, a state management section 202, a storage section 204, and a communication control section 207. The control execution section 201 receives a control command from the home controller 100 or the server 300, and controls the device 200 in accordance with the received control command. The content of control of the device 200 performed by the control execution section 201 differs in accordance with the type of the device 200. For example, if the device 200 is an illumination device, the control execution section 201 turns on and off the illumination device. In addition, the control execution section 201 transmits the result of execution of the control command and the state of the device 200 to the home controller 100 or the server 300.

The state management section 202 manages the state of the device 200. The content of management of the device 200 performed by the state management section 202 differs in accordance with the type of the device 200. For example, if the device 200 is an illumination device, the state management section 202 manages whether the illumination device is currently turned on or turned off. The storage section 204 stores information related to the state of the device 200 managed by the state management section 202. The communication control section 207 controls communication between the device 200 and the home controller 100 and communication between the device 200 and the server 300. In addition, the communication control section 207 transmits a variety of data to the home controller 100 or the server 300 upon receiving a request to transmit such data from other blocks, and receives data transmitted from the home controller 100 or the server 300 to deliver the data to the relevant block.

As shown in FIG. 3, the server 300 includes a home information management section 301, a device control section 302, a storage section 304, and a communication control section 307. The home information management section 301 manages the home information 2700 to be discussed later for each house or each user account. In addition, the home information management section 301 transmits the home information 2700 to the home controller 100 in response to a request from the home controller 100. Further, the home information management section 301 acquires log information related to the use history of the device 200 and information related to the state of the device 200 from the device 200, stores the acquired information in the storage section 304, and manages the information.

The device control section 302 transmits a control command to the device 200 in response to a request from the home controller 100. The storage section 304 stores information that is necessary for operation of the server 300 such as the home information 2700 and the information related to the state of the device 200 managed by the home information management section 301. The communication control section 307 controls communication between the server 300 and the home controller 100 and communication between the server 300 and the device 200 as with the communication control section 107. In addition, the communication control section 307 transmits a variety of data to the home controller 100 or the device 200 upon receiving a request to transmit such data from other blocks, and receives data transmitted from the home controller 100 or the device 200 to deliver the data to the relevant block.

Figure 4:
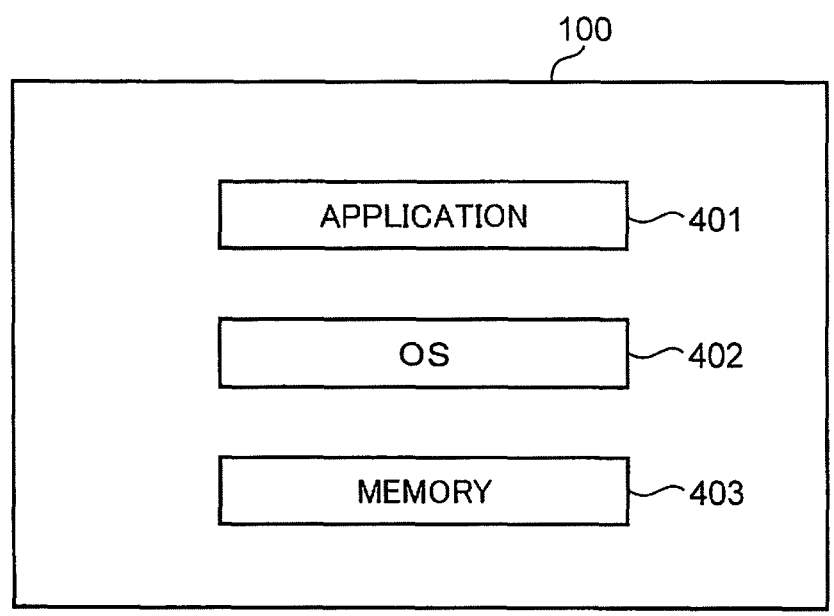
FIG. 4 is a diagram showing a configuration example of the form of implementation of the home controller according to the present disclosure.

FIG. 4 is a diagram showing a configuration example of the form of implementation of the home controller 100. As shown in FIG. 4, the home controller 100 includes an application 401, an OS (Operating System) 402, a memory 403, and other hardware (not shown).

The application 401 is application software for causing the portable information terminal to function as the home controller 100, and is executed by a processor of the home controller 100. The home controller 100 may read the application 401 from a computer readable recording medium to implement the application 401, or may download the application 401 from a network to implement the application 401. The OS 402 is basic software of the portable information terminal, and is executed by the processor of the home controller 100. The memory 403 is formed from a storage device such as a RAM and a ROM of the home controller 100, and stores a group of data included in the application 401. The processor of the home controller 100 executes the application 401 to embody the functions of the touch panel control section 102, the display control section 103, the storage section 104, the device management section 105, the device control section 106, and the communication control section 107 shown in FIG. 3. In addition, the processor of the home controller 100 executes the application 401 to cause the memory 403 to function as the storage section 104.

It should be noted, however, that in the present disclosure, the home controller 100 may be implemented by the application 401 alone, may be implemented by the application 401 and the OS 402, may be implemented by the application 401, the OS 402, and the memory 403, or may be implemented by the application 401, the OS 402, the memory 403, and other hardware (not shown). In any present disclosure, the home controller 100 according to the present disclosure can be embodied. In the present disclosure, the processor and the storage device forming the portable information terminal, for example, form a computer. One of a CPU, an FPGA, and an ASIC or a combination of two or more of these may be adopted as the processor. One of a ROM, a RAM, and a hard disk or a combination of two or more of these may be adopted as the storage device.

Figure 5:
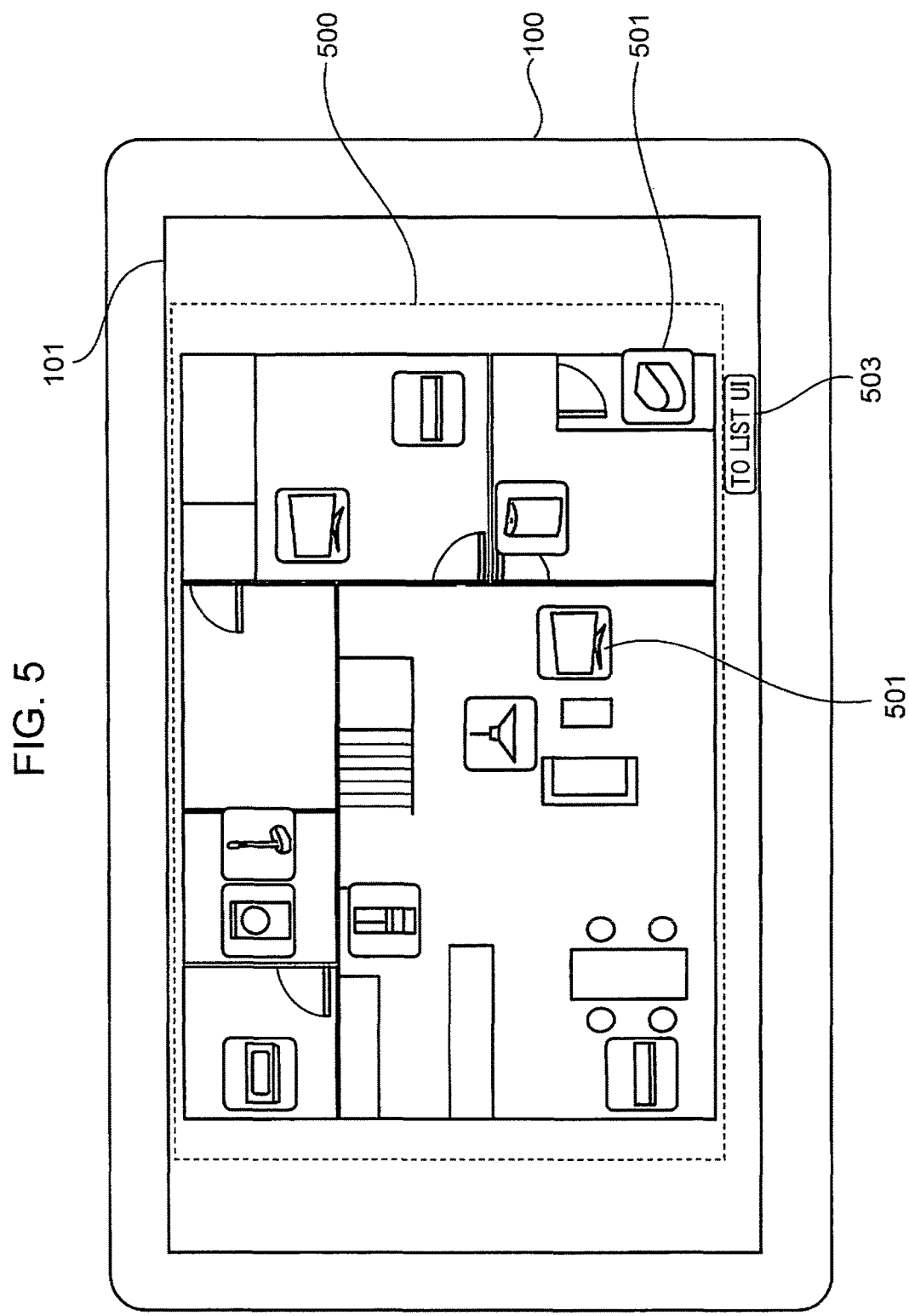
FIG. 5 is a diagram showing the configuration of a basic screen of the home controller according to the present disclosure.
Figure 6:
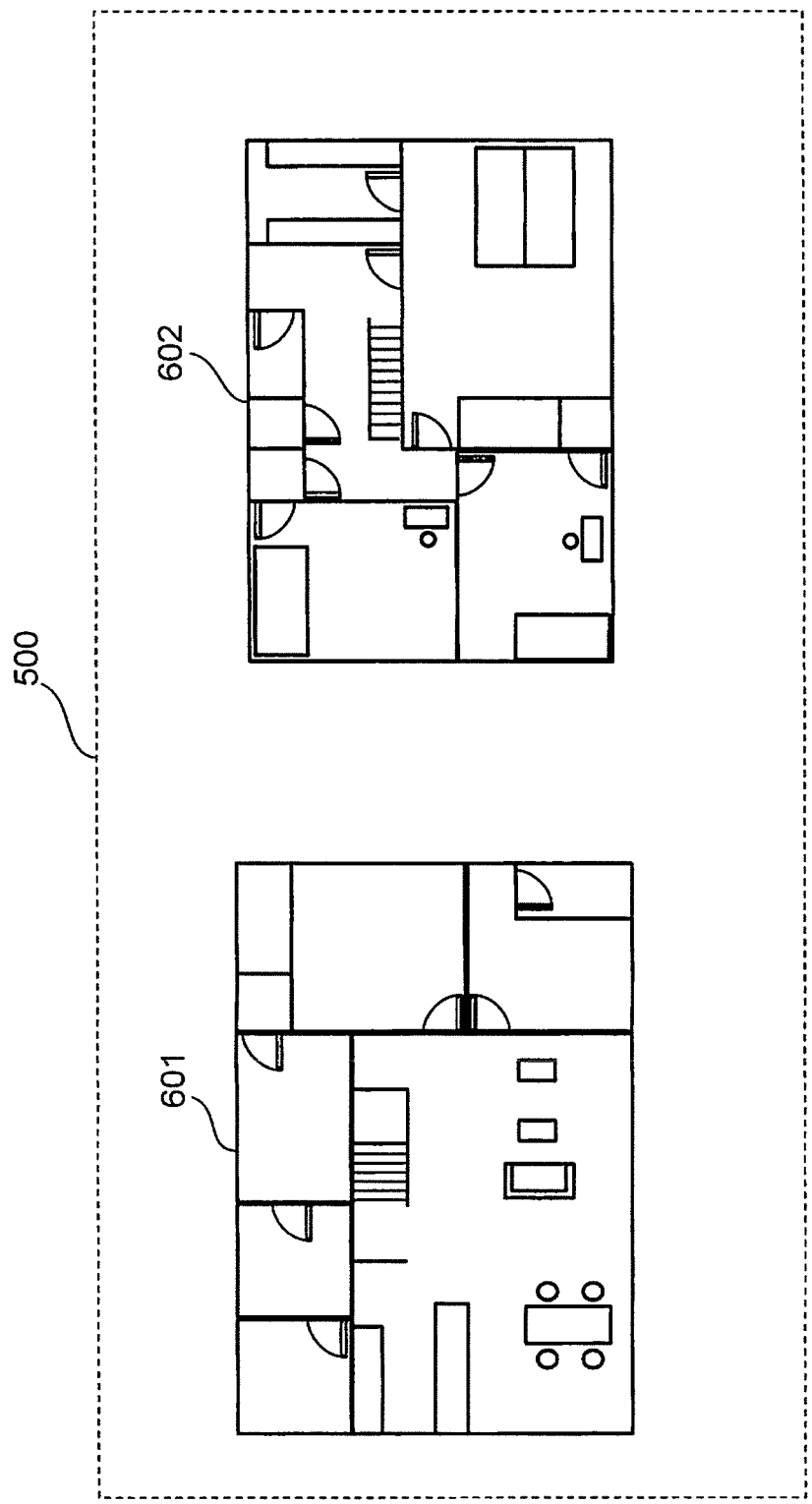
FIG. 6 is a diagram showing an example of a floor plan according to the present disclosure.

FIG. 5 is a diagram showing the configuration of a basic screen of the home controller 100. As shown in FIG. 5, the basic screen of the home controller 100 displayed on the display 101 include a floor plan 500, device icons 501, and a device list display change button 503. The floor plan 500 is a plan view that planarly represents the arrangement and the shape of one or more rooms forming each floor of a house. In the case where the house has one or more floors, the floor plan 500 is prepared for each floor. For example, in the case where the house has two floors, two floor plans 500, namely a floor plan 601 for the first floor and a floor plan 602 for the second floor, are displayed on the display 101 as shown in FIG. 6.

The device icon 501 is an icon displayed as overlapped on the floor plan 500 and representing the device 200. When the touch panel control section 102 senses a tap on the device icon 501 performed by the user, the display control section 103 causes the display 101 to display a device control screen 502 to be discussed later. This allows the user to control the device 200 by operating the device control screen 502.

The device icon 501 is prepared for each device 200. The display control section 103 disposes the device icon 501 on the floor plan 500 on the basis of the actual arrangement of the device 200 within the house. Information as to at what position on the floor plan 500 the device icon 501 is to be disposed is registered in an arrangement 3104 of a device list 3100 to be discussed later. Here, a position on the floor plan 500 corresponding to the actual arrangement position of the device 200 is registered in the arrangement 3104. Thus, the display control section 103 can dispose the device icon 501 at a position on the floor plan 500 corresponding to the actual arrangement position of the device 200 by disposing the device icon 501 at the position registered in the arrangement 3104 of the device list 3100.

In the floor plan 500 shown in FIG. 5, one floor is partitioned into a plurality of rooms by partition lines that indicate partitions between the rooms. This allows the user to recognize what device 200 is disposed in what room at a glance.

In the example of FIG. 5, in addition, schematic images of furniture pieces are displayed at positions on the floor plan 500 corresponding to the actual arrangement positions of the furniture pieces. An image that indicates the movable range of a door is displayed at a position on the floor plan 500 corresponding to the actual arrangement position of the door. An image of a staircase is displayed at a position on the floor plan 500 corresponding to the actual arrangement position of the staircase. This allows the user to recognize the positions of the furniture pieces disposed in each room and the positions of the staircase and the doors on the floor.

The button with a text "TO LIST UI" displayed at the lower right of the basic screen is the device list display change button 503, which is a button for switching the screen display from the basic screen to a device list display screen to be discussed later (see FIG. 24). When the touch panel control section 102 senses a tap on the device list display change button 503 performed by the user, the display control section 103 switches the screen display on the display 101 from the basic screen to the device list display screen. It should be noted, however, that the display control section 103 may hide the device list display change button 503 in the case where a registration is made in the home controller 100 in advance that the device list display screen is not utilized.

In the foregoing description, one device icon 501 is correlated with one device 200. However, the present disclosure is not limited thereto, and one device icon 501 may be correlated with a plurality of devices 200 so that the one device icon 501 may be used in common to the plurality of devices 200. For example, in the case where there are two illumination devices in a living room, the two illumination devices may be represented by one device icon 501.

In this case, when the device icon 501 representing the two illumination devices is tapped on by the user, the display control section 103 causes the display 101 to display a device control screen 502 that allows simultaneous control of the two illumination devices. This allows the user to control the two illumination devices at the same time. A plurality of illumination devices are often disposed in a large room such as the living room. In the case where the user turns on or off the illumination devices in the living room, the user often turns on or off all the illumination devices disposed in the living room, rather than turning on or off some of the illumination devices. In this case, if it is possible to collectively turn on or off all the illumination devices, the number of operations to be performed by the user can be reduced. Thus, one device icon 501 may be correlated with a plurality of devices 200 that are highly likely to be operated by the user at the same time to cause one device control screen 502 to be displayed.

In the case where the device icon 501 represents a plurality of devices 200, the display control section 103 may display the device icon 501 at a position on the floor plan 500 corresponding to the actual arrangement position of one of the devices 200. Alternatively, the display control section 103 may display the device icon 501 representing the plurality of devices 200 at a predetermined location of a room in which the plurality of devices 200 are disposed.

In order to dispose the device icon 501 on the floor plan 500 on the basis of the actual arrangement of the device 200 within the house, the user moves the device icon 501 to an appropriate position on the floor plan 500. The user can move the device icon 501 to a desired position by dragging the device icon 501 while holding down the device icon 501. These operations are executed at the timing when the device icon 501 is added such as when the home controller 100 is initially utilized and when a new device 200 is purchased.

Specifically, when the touch panel control section 102 senses a drag on the device icon 501, the device management section 105 registers the position on the floor plan 500 of the device icon 501 after the movement in the arrangement 3104 of the device list 3100 to be discussed later. This allows a position on the floor plan 500 corresponding to the actual arrangement position of the device 200 to be registered in the arrangement 3104.

The initial display position of the device icon 501 may be determined in advance by the system, and may be a predetermined position outside the display region of the floor plan 500 or a predetermined position within a predetermined room on the floor plan 500, for example. The method of disposing the device icon 501 on the floor plan 500 on the basis of the actual arrangement of the device 200 within the house is not limited thereto, and the method described below may be used.

Figure 7:
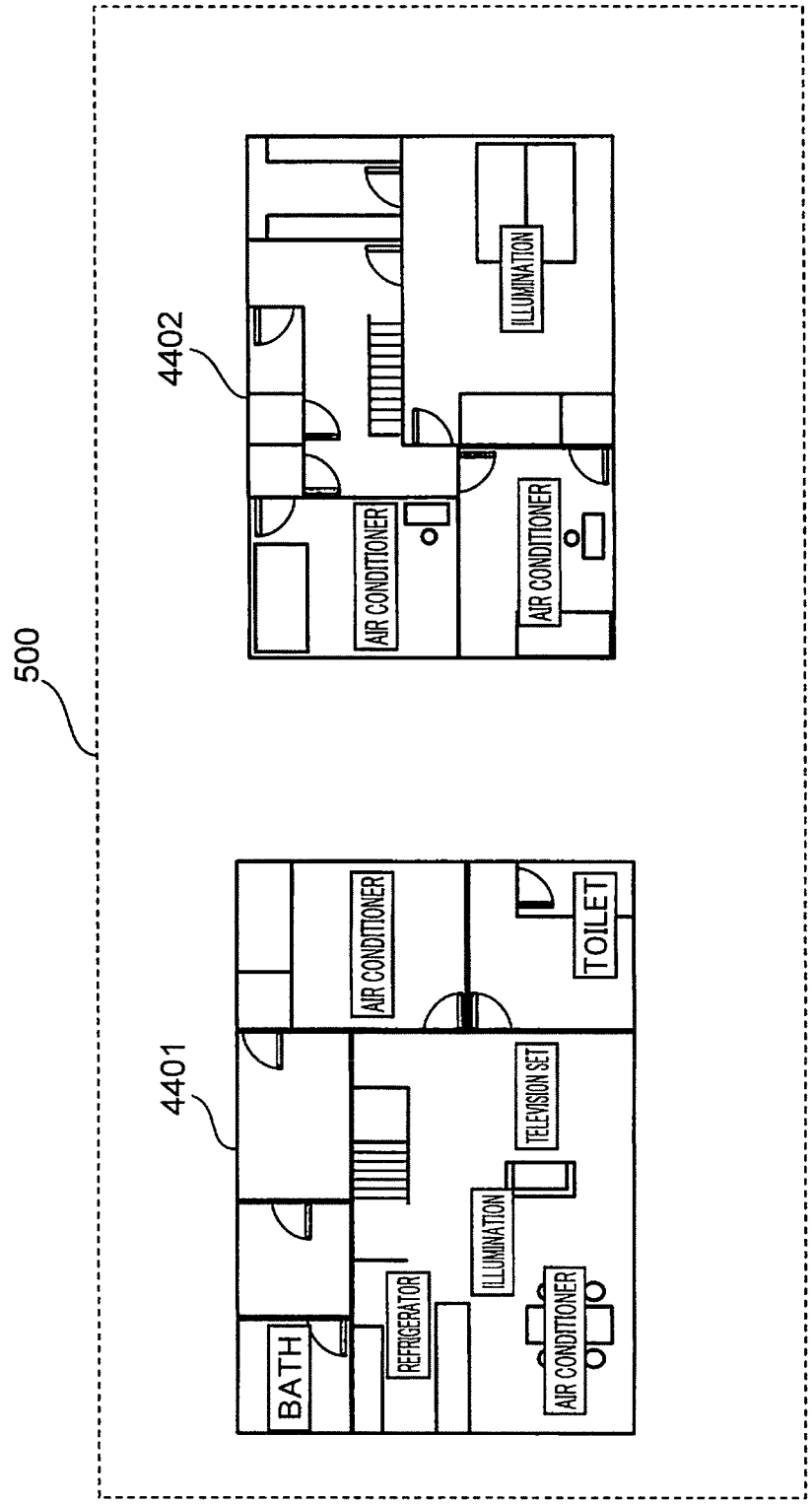
FIG. 7 is a diagram showing an example of the floor plan including arrangement information for device icons as texts according to the present disclosure.
Figure 8:
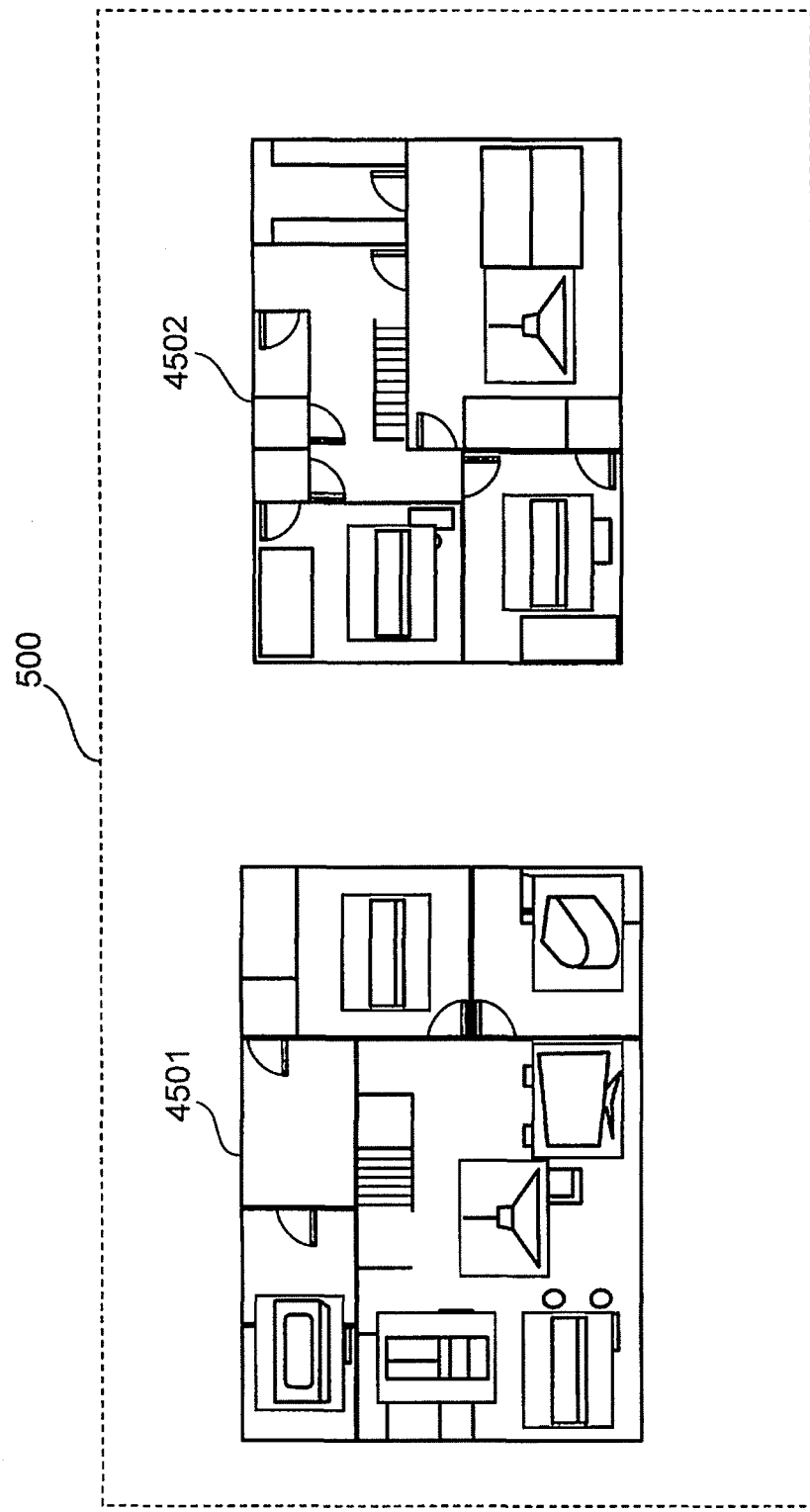
FIG. 8 is a diagram showing an example of the floor plan including arrangement information for device icons as images according to the present disclosure.
Figure 9:
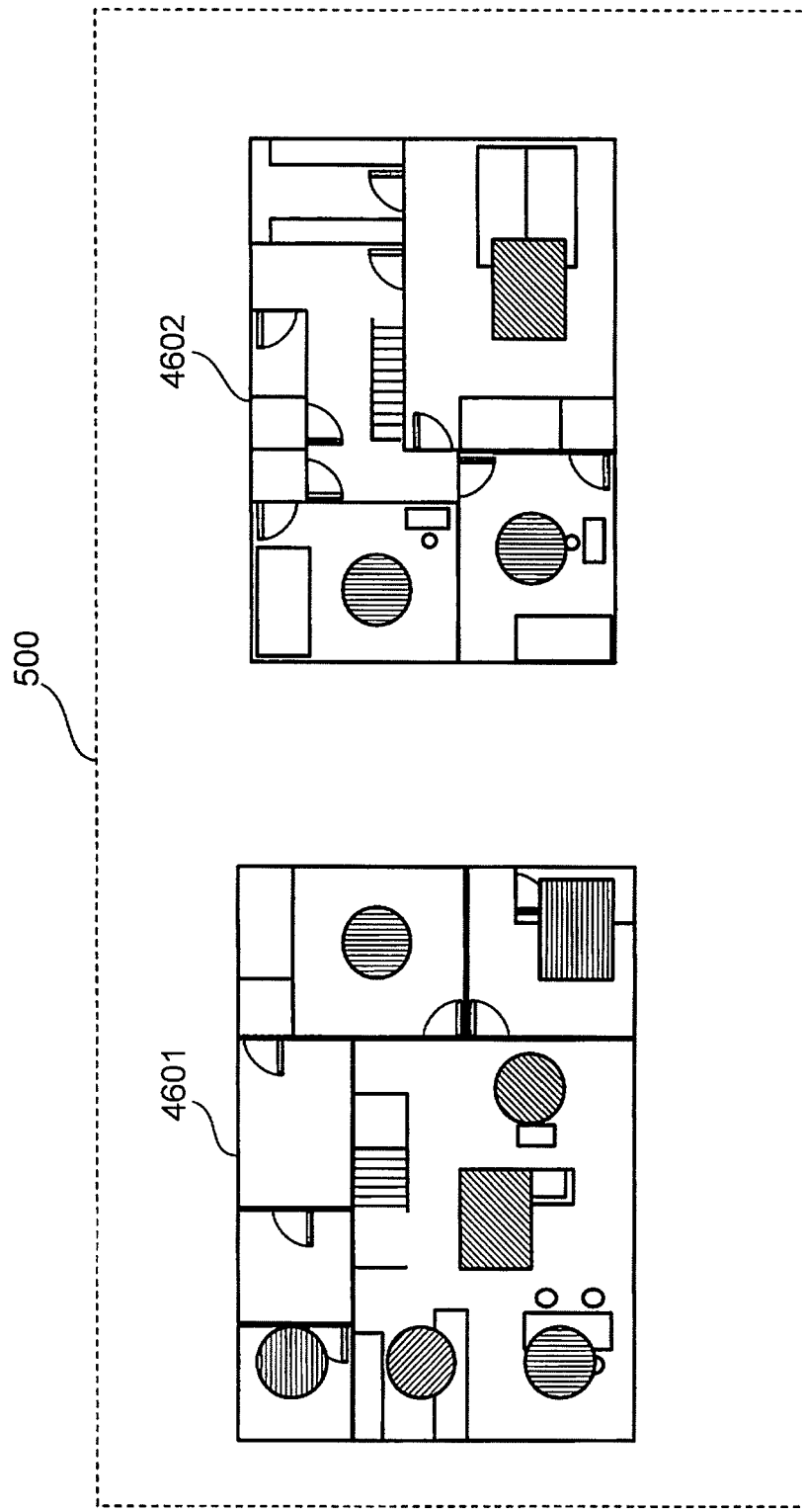
FIG. 9 is a diagram showing an example of the floor plan including arrangement information for device icons as images according to the present disclosure.

As shown in FIGS. 7, 8, and 9, some floor plans 500 include arrangement information for the device icons 501. For example, in the example of the floor plan 500 of FIG. 7, texts that indicate the type of the devices 200 represented by the device icons 501 to be disposed are provided at positions at which the device icons 501 are to be disposed. In the example of the floor plan 500 of FIG. 8, images that indicate the type of the devices 200 represented by the device icons 501 to be disposed are provided at positions at which the device icons 501 are to be disposed. In the example of the floor plan 500 of FIG. 9, simplified images such as circles and rectangles that indicate the type of the devices 200 represented by the device icons 501 to be disposed are provided at positions at which the device icons 501 are to be disposed.

Consequently, in the case where the floor plan 500 includes arrangement information for the device icons 501, the display control section 103 may generate the basic screen of FIG. 5 by automatically disposing the device icons 501 on the floor plan 500 on the basis of the arrangement information included in the floor plan 500. In this case, it is not necessary for the user to perform an operation of moving the device icons 501 to appropriate positions on the floor plan 500.

For example, in an exemplary floor plan 4401 for the first floor of FIG. 7, the display control section 103 detects a position provided with a text "TELEVISION SET", automatically disposes the device icon 501 for the television set at the detected position, and registers the detected position in the arrangement 3104 of the device list 3100.

In an exemplary floor plan 4501 for the first floor of FIG. 8, the display control section 103 detects a position provided with an image for the "television set", automatically disposes the device icon 501 for the television set at the detected position, and registers the detected position in the arrangement 3104 of the device list 3100. In an exemplary floor plan 4601 for the first floor of FIG. 9, the display control section 103 detects a position provided with an image in the shape of a "circle filled with oblique lines", automatically disposes the device icon 501 for the television set at the detected position, and registers the detected position in the arrangement 3104 of the device list 3100.

The display control section 103 may detect the display position of arrangement information by recognizing the arrangement information included in the floor plan 500 using a text recognition technology or an image recognition technology commonly utilized.

Figure 10:
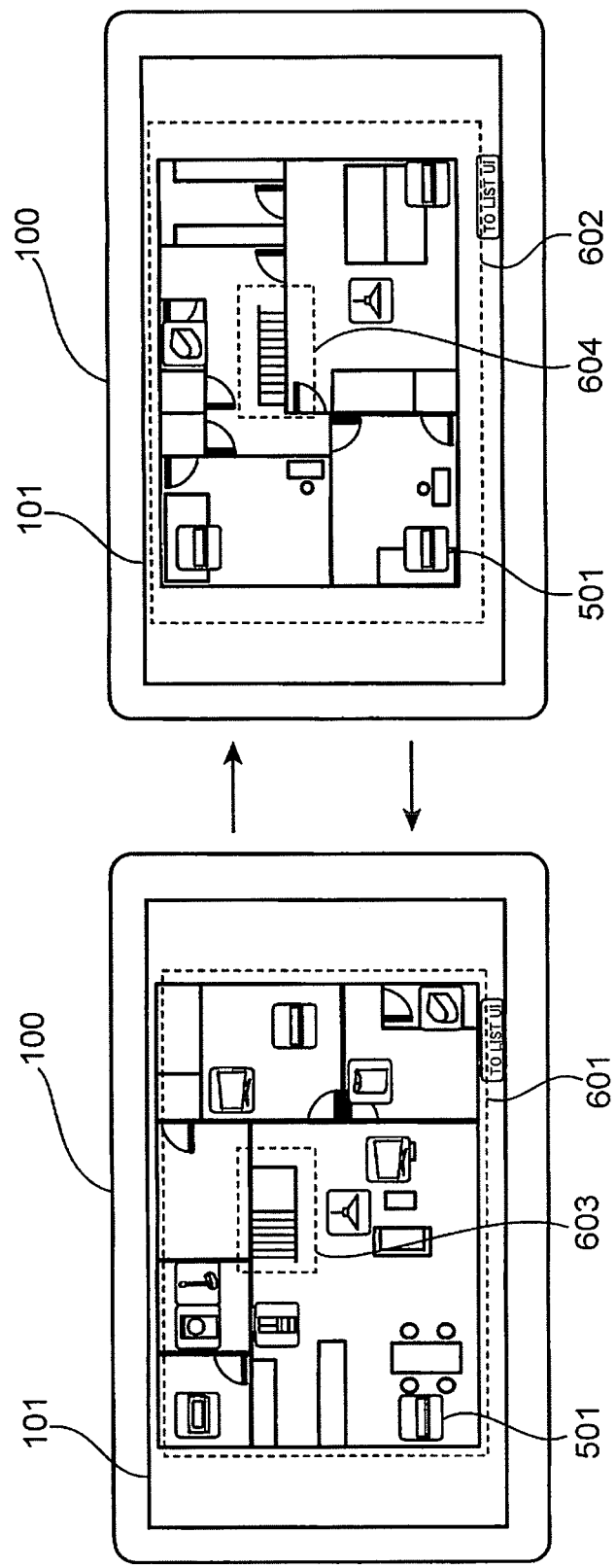
FIG. 10 is a diagram showing an example of transition between a first floor display state and a second floor display state of the basic screen of the home controller according to the present disclosure.

FIG. 10 is a diagram illustrating a method of switching the floor display on the basic screen of the home controller 100. FIG. 10 illustrates a case where the house has two floors, namely the first floor and the second floor. With a floor plan 601 for the first floor displayed on the basic screen of the home controller 100, the touch panel control section 102 senses a tap on a staircase region 603 on the first floor performed by the user. Then, the display control section 103 switches the floor display on the basic screen from the first floor to the second floor. Similarly, with a floor plan 602 for the second floor displayed on the basic screen of the home controller 100, the touch panel control section 102 senses a tap on a staircase region 604 on the second floor performed by the user. Then, the display control section 103 switches the floor display on the basic screen from the second floor to the first floor.

Here, the touch panel control section 102 may judge that the staircase region 603 is tapped on if the position tapped on by the user is positioned within a region surrounded by four vertexes of a staircase registered in a room type 2902 of room information 2900 (see FIG. 32).

Further, the floor display may be switched by not only tapping on the staircase region 603 but also a swipe operation on the display 101. With the floor plan 601 for the first floor displayed on the basic screen of the home controller 100, the touch panel control section 102 senses a swipe operation performed from the right to the left on the display 101 by the user. Then, the display control section 103 switches the floor display on the basic screen from the first floor to the second floor. Similarly, with the floor plan 602 for the second floor displayed on the basic screen of the home controller 100, the touch panel control section 102 senses a swipe operation performed from the left to the right on the display 101 by the user. Then, the display control section 103 switches the floor display on the basic screen from the second floor to the first floor. The floor display may be switched by a swipe operation in the vertical direction.

Figure 11:
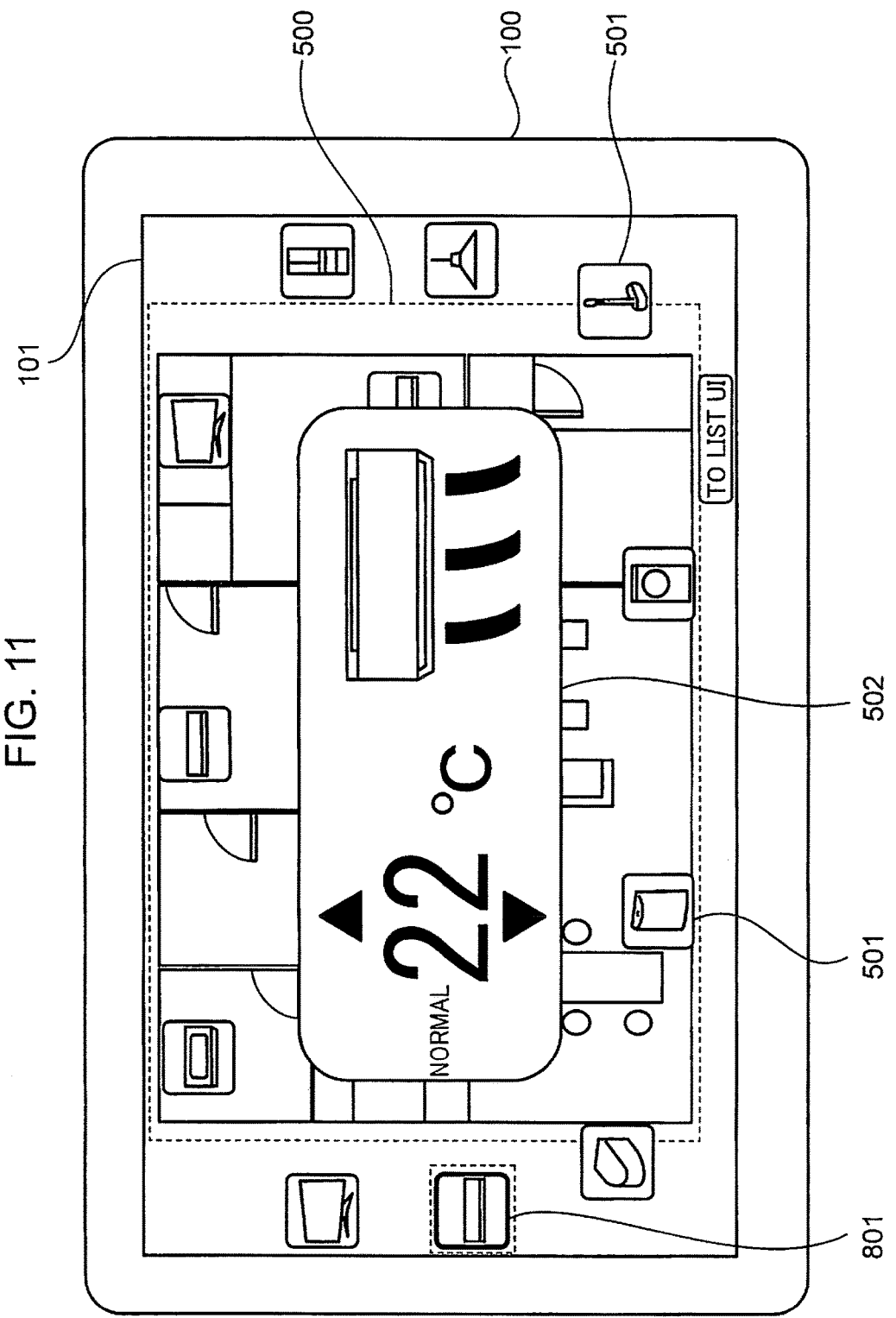
FIG. 11 is a diagram showing the configuration of the display state of a device control screen of the home controller according to the present disclosure.

FIG. 11 is a diagram showing the configuration of the display state of the device control screen 502 of the home controller 100. In the basic screen shown in FIG. 5, when the touch panel control section 102 senses that the user selects the device icon 501, the display control section 103 causes the display 101 to display the device control screen 502 corresponding to the selected device icon 501. The device control screen 502 is a control screen that is specific to each device 200 and that allows control or confirmation of the state of the device 200. For example, in FIG. 11, a device icon 801 for the air conditioner is selected by the user, and the temperature setting and the air flow direction are controlled using the device control screen 502 for the air conditioner.

An image of the air conditioner is displayed in the device control screen 502 to allow the user to immediately recognize that the device control screen 502 corresponds to the air conditioner. This prevents an erroneous operation. An image that indicates the air flow direction is displayed on the lower side of the image of the air conditioner to allow the user to select a desired air flow direction by repeatedly tapping on the image, for example. A numeral displayed within the device control screen 502 indicates the current set temperature of the air conditioner. A button in the shape of a triangle that points upward in the device control screen 502 is a temperature increase button. A button in the shape of a triangle that points downward is a temperature decrease button. Pressing the temperature increase button once increases the set temperature of the air conditioner by a predetermined temperature (for example, 0.5 degrees). Pressing the temperature decrease button once decreases the set temperature of the air conditioner by a predetermined temperature (for example, 0.5 degrees).

Examples of the method of disposing the device icons 501 in the display state of the device control screen 502 include the following methods.

A first method is to dispose the device icons 501 outside the display region of the device control screen 502 as shown in FIG. 11. When the touch panel control section 102 senses that a certain device icon 501 is tapped on by the user, the display control section 103 disposes all the device icons 501 at locations outside the display region of the device control screen 502 and inside the display region of the display 101 irrespective of whether or not the locations are inside the display region of the floor plan 500. In the example of FIG. 11, the device icons 501 are disposed in an elliptical arrangement so as to surround the device control screen 502. That is, when a certain device icon 501 is selected by the user and the device control screen 502 for the device 200 corresponding to the device icon 501 is displayed, the display control section 103 retracts all the device icons 501 out of the display region of the device control screen 502.

This prevents the device icons 501 from being hidden by the device control screen 502. Therefore, in the case where the device control screen 502 for a device 200 is currently displayed and the user attempts to cause the device control screen 502 for another device 200 to be displayed, it is not necessary for the user to temporarily erase the currently displayed device control screen 502 and search for the device icon 501 for the relevant device 200.

Here, the display control section 103 may decide the arrangement position of each device icon 501 on the outer periphery of an ellipse having a shape determined in advance in accordance with the size of the device control screen 502, and dispose the device icon 501 at the decided position, for example. Examples of the method of deciding the arrangement position include a method of arranging all the device icons 501 as display targets at equal intervals on the outer periphery of an ellipse, and a method of disposing the device icons 501 such that the angles formed by lines connecting between adjacent device icons 501 and the center of an ellipse are equal to each other. Alternatively, the display control section 103 may divide the outer periphery of an ellipse into four sections corresponding to the upper, lower, left, and right portions of the device control screen 502, and dispose the device icons 501 such that the number of device icons 501 in each section is the same and the device icons 501 in each section are arranged at equal intervals. The device icon 501 disposed at the closest position on the floor plan 500 may be disposed at the decided arrangement position.

In the foregoing description, the device icons 501 are arranged in an elliptical arrangement. However, the present disclosure is not limited thereto, and the device icons 501 may be arranged in a circular arrangement. Also in this case, the arrangement position of the device icons 501 may be decided using the same method as in the case where the device icons 501 are arranged in an elliptical arrangement. Other examples of the shape of arrangement of the device icons 501 used when the device icons 501 are retracted out of the display region of the device control screen 502 include polygonal arrangements such as triangular, rectangular, and pentagonal arrangements.

Figure 13:
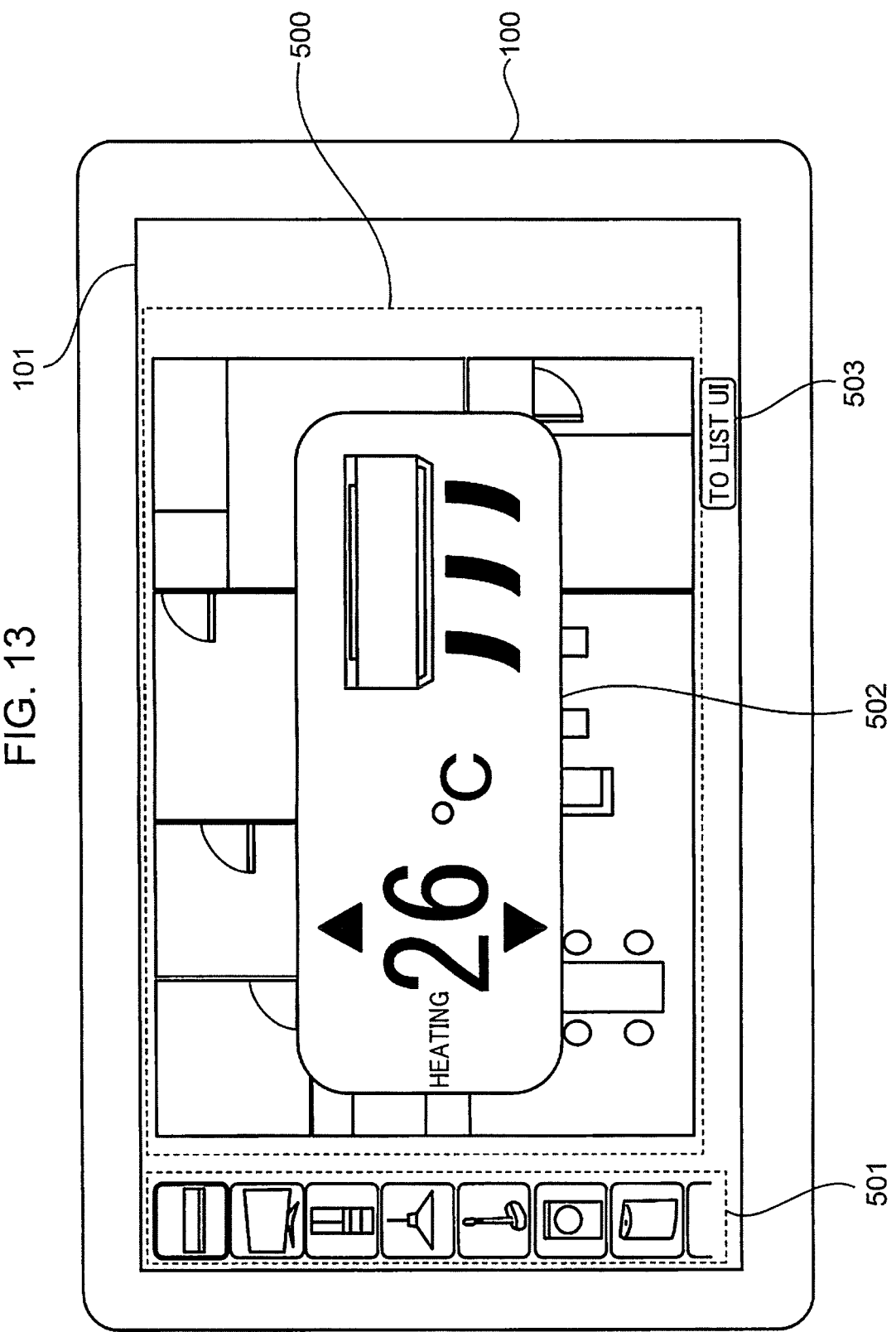
FIG. 13 is a diagram showing the configuration of the display state of a device control screen of the home controller according to the present disclosure.

A second method is to dispose the device icons 501 in one line outside the display region of the device control screen 502 and the floor plan 500 and inside the display region of the display 101 as shown in FIG. 13. When the touch panel control section 102 senses that a certain device icon 501 is tapped on by the user, the display control section 103 disposes all the device icons 501 in one vertical line on the left side of the display region of the floor plan 500. That is, the display control section 103 retracts all the device icons 501 to a vacant space outside the display region of the floor plan 500 and inside the display region of the display 101.

In FIG. 13, the device icons 501 are disposed on the left side of the floor plan 502. However, the present disclosure is not limited thereto, and the device icons 501 may be disposed in one vertical line on the right side of the floor plan 502, or may be disposed in one horizontal line on the upper or lower side of the floor plan 500.

In the case where all the device icons 501 cannot be disposed on the left side of the floor plan 500, the display control section 103 may scroll the device icons 501 upward or downward in accordance with a swipe operation performed upward or downward on the device icons 501 disposed in one vertical line on the left side to cause the device icons 501, which have been hidden, to be displayed within the display 101.

This allows the device icons 501, which have been hidden, to be displayed within the display 101 to allow the user to select the device icons 501. In the case where the device icons 501 are displayed in one horizontal line and all the device icons 501 may not displayed, the display control section 103 may scroll the device icons 501 leftward or rightward in accordance with a swipe operation performed leftward or rightward on the device icons 501 disposed in one horizontal line to cause the device icons 501, which have been hidden, to be displayed within the display 101.

In the display state of the device control screen 502, the display control section 103 may display the device icon 501 selected by the user in a display mode that is different from that for the unselected device icons 501. This allows the user to easily recognize the selected device icon 501.

For example, as shown in FIG. 11, the display control section 103 may display the selected device icon 801 in a color that is different from that of the other unselected device icons 501. Specifically, the display control section 103 may display a background portion of the selected device icon 501 in a color that is different from that of background portions of the unselected device icons 501. It should be noted, however, that such a display mode is merely exemplary, and the display control section 103 may make the selected device icon 501 brighter than the unselected device icons 501, may make the selected device icon 501 denser than the unselected device icons 501, or may cause the selected device icon 501 to flash on and off at a constant cycle.

In the display state of the device control screen 502, the device icon 501 selected by the user may be disposed as distinguished from the unselected device icons 501. This allows the user to easily recognize the selected device icon 501.

Figure 12:
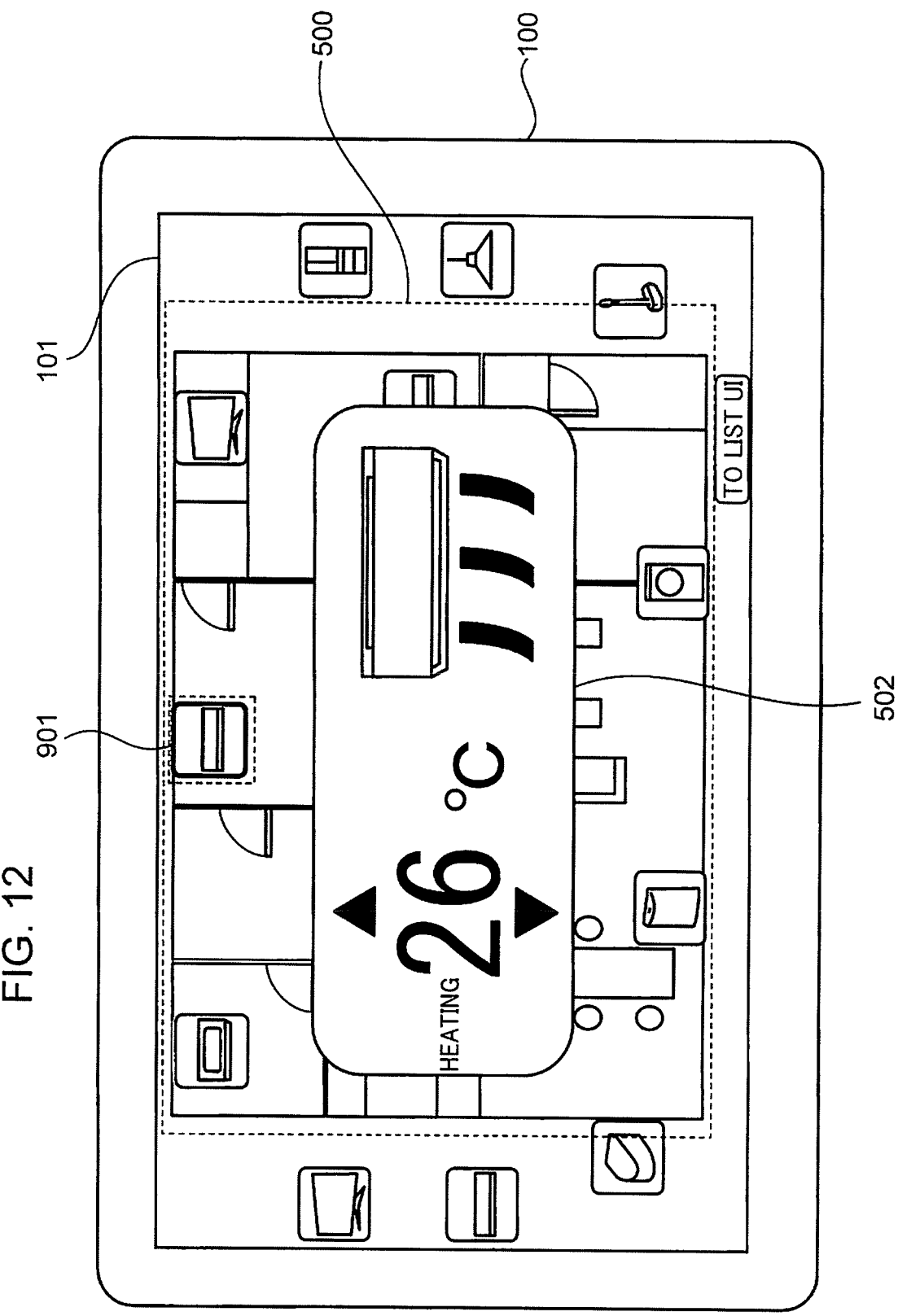
FIG. 12 is a diagram showing a device icon arrangement example of the display state of the device control screen of the home controller according to the present disclosure.

For example, as shown in FIG. 12, the display control section 103 may dispose a selected device icon 901 at the uppermost position on the outer periphery of an ellipse. Besides, for example, the display control section 103 may dispose the selected device icon 501 at a particular position (for example, the lowermost position, the rightmost position, or the leftmost position) on the outer periphery of an ellipse. In any event, the display control section 103 may dispose the device icon 501 selected by the user at a particular location that is easily recognizable by the user.

Figure 14:
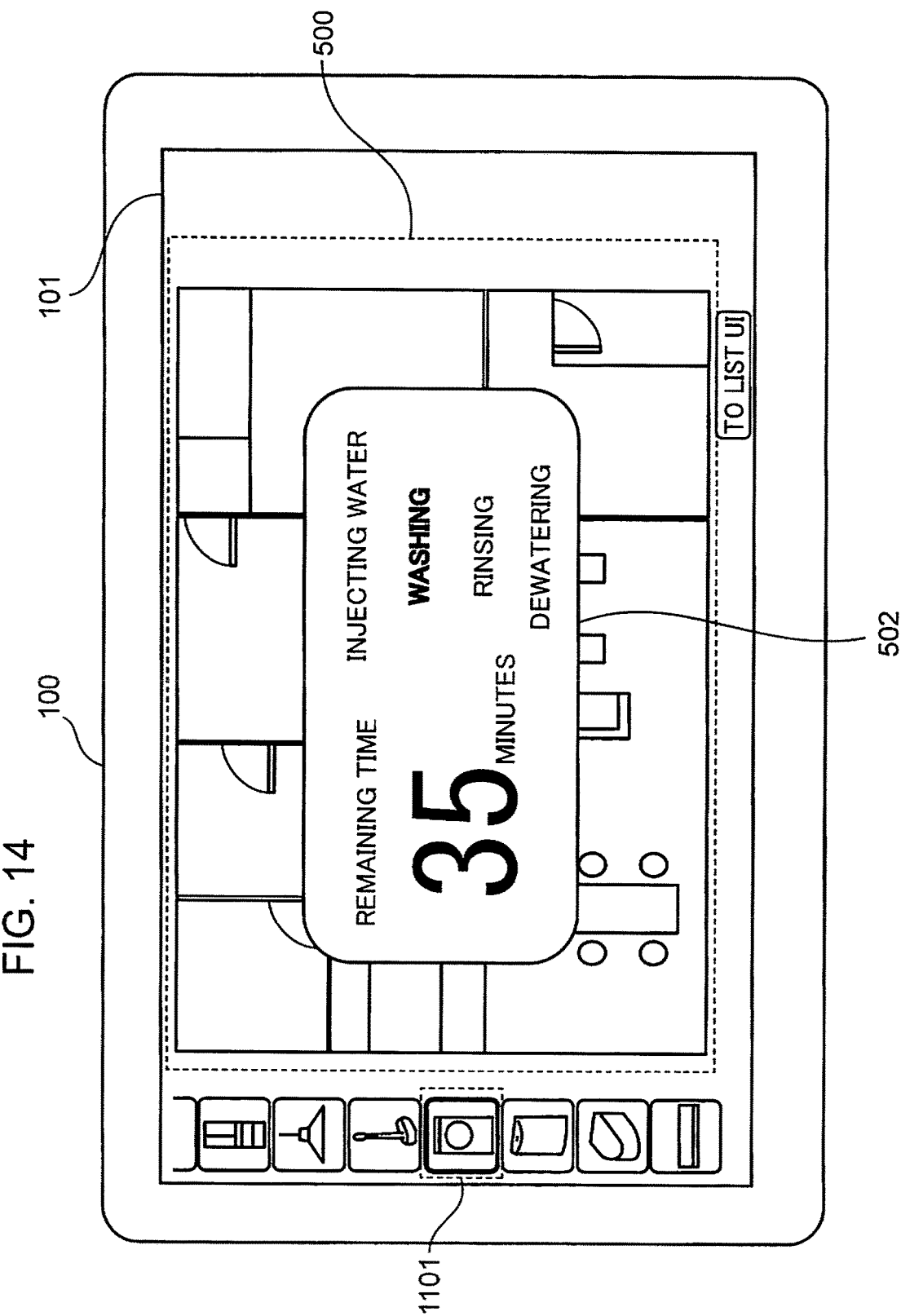
FIG. 14 is a diagram showing a device icon arrangement example of the display state of the device control screen of the home controller according to the present disclosure.

Besides, for example, as shown in FIG. 14, the display control section 103 may scroll an array of the device icons 501 such that a selected device icon 1101 is disposed within the display region of the display 101. In the example of FIG. 14, the device icons 501 are scrolled such that the selected device icon 1101 is disposed at the center of a line of icons displayed in one vertical line on the left side of the floor plan 500. This allows the user to easily recognize the selected device icon 501. Although the device icon 1101 is disposed at the center of the line of icons in FIG. 14, the device icon 1101 may be disposed at any other conspicuous position. For example, the device icon 1101 may be disposed at the top or bottom position of the line of icons.

The order of arrangement of the device icons 501 taken when the device icons 501 are retracted out of the display region of the floor plan 500 may be determined such that devices 200 that are closer in position of arrangement on the floor plan 500 to the device icon 501 selected by the user are disposed to be closer in order of arrangement to the selected device icon 501. Alternatively, the order of arrangement of the device icons 501 may be determined such that the device icons 501 for devices 200 that are more likely to be used together with the device 200 selected by the user are disposed to be closer in order of arrangement to the device icon 501 for the device 200 selected by the user. For example, the television set and the Blu-ray recorder are highly likely to be used together by the user. Therefore, when the device icon 501 for the television set is selected by the user, the device icon 501 for the Blu-ray recorder may be displayed next to the device icon 501 for the television set. In order to embody such a configuration, a table that indicates combinations of devices 200 that are highly likely to be used together may be stored in advance in the storage section 104, and the arrangement of the device icons 501 may be decided in accordance with the table.

In any of the methods of disposing the device icons 501 taken when the device control screen 502 is displayed described above, in addition, the display control section 103 may dispose the device icons 501 as grouped under particular conditions.

Figure 15:
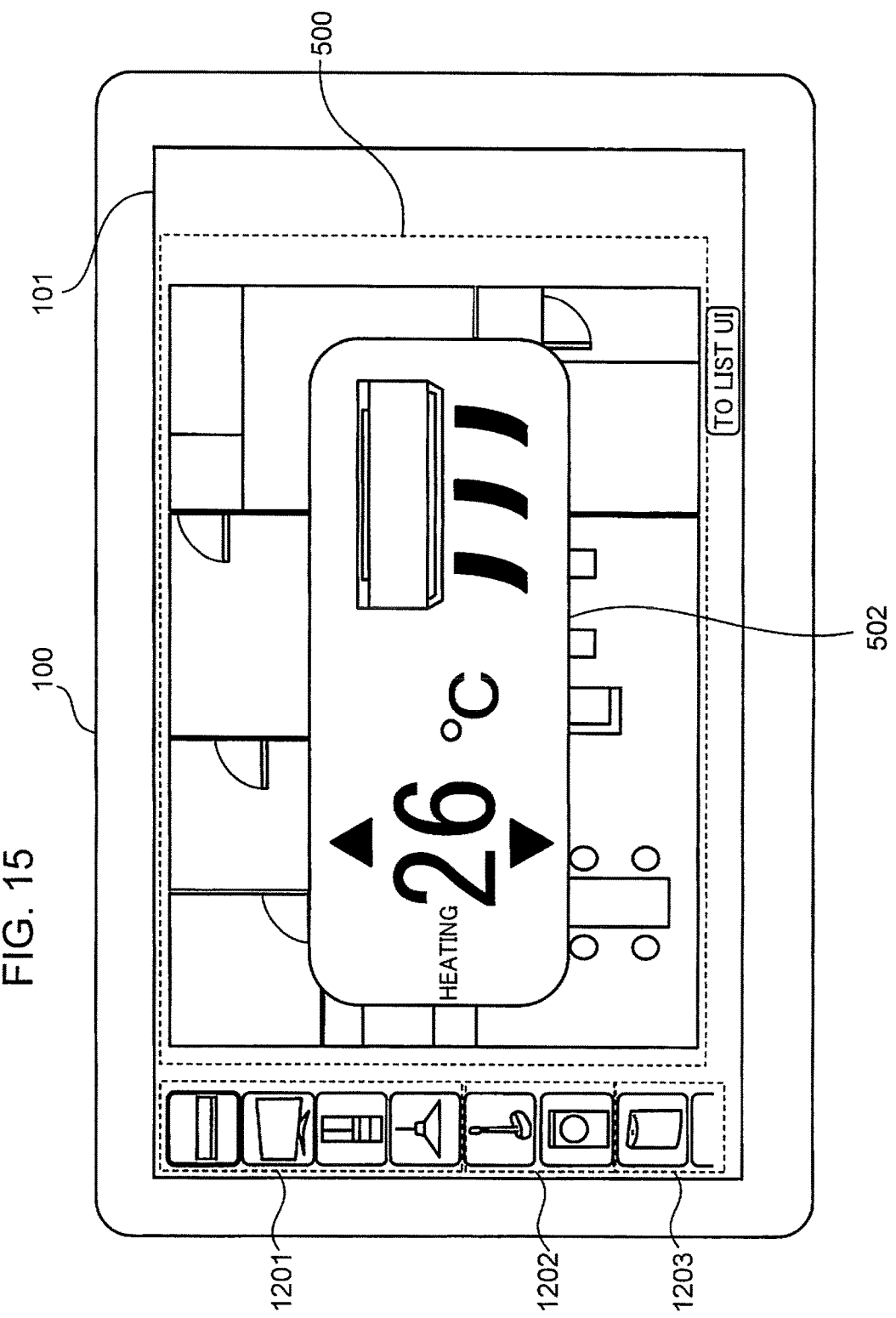
FIG. 15 is a diagram showing a device icon arrangement example of the display state of the device control screen of the home controller according to the present disclosure.

For example, in FIG. 15, the device icons 501 are grouped in accordance with the location at which the devices 200 are disposed. The devices 200 disposed in the living room are grouped as device icons 1201. The devices 200 disposed in a lavatory are grouped as device icons 1202. The devices 200 disposed in a bedroom are grouped as device icons 1203. Then, the display order is set to each group, and the grouped device icons 501 are disposed in one vertical line on the left side of the floor plan 500 in accordance with the display order. The display order of the groups may be determined such that groups that are positioned closer to the room in which the device 200 selected by the user is disposed are closer in display order to the group for the room in which the device 200 selected by the user is disposed.

Besides, the display control section 103 may dispose the device icons 501 as grouped in accordance with the type of the devices 200. For example, in FIG. 16, two device icons 501 for the television set are disposed on the left side of the floor plan 500 as grouped as device icons 2301, and two device icons 501 for the air conditioner are disposed on the left side of the floor plan 500 as grouped as device icons 2302 for the air conditioner. Consequently, the display control section 103 may group the device icons 501 in accordance with the device type by disposing the device icons 501 for the devices 200 of the same type to be continuous.

The display control section 103 may discriminate the type of the devices 200 in accordance with the content registered in a device type 3102 of the device list 3100 (see FIG. 35).

Although the device icons 501 for the devices 200 of the same type are grouped into one group in the foregoing description, the present disclosure is not limited thereto. For example, the display control section 103 may classify the devices 200 into categories matching the device type, group the device icons 501 in accordance with the category, and dispose the device icons 501 on the left side of the floor plan 500 in groups.

Figure 16:
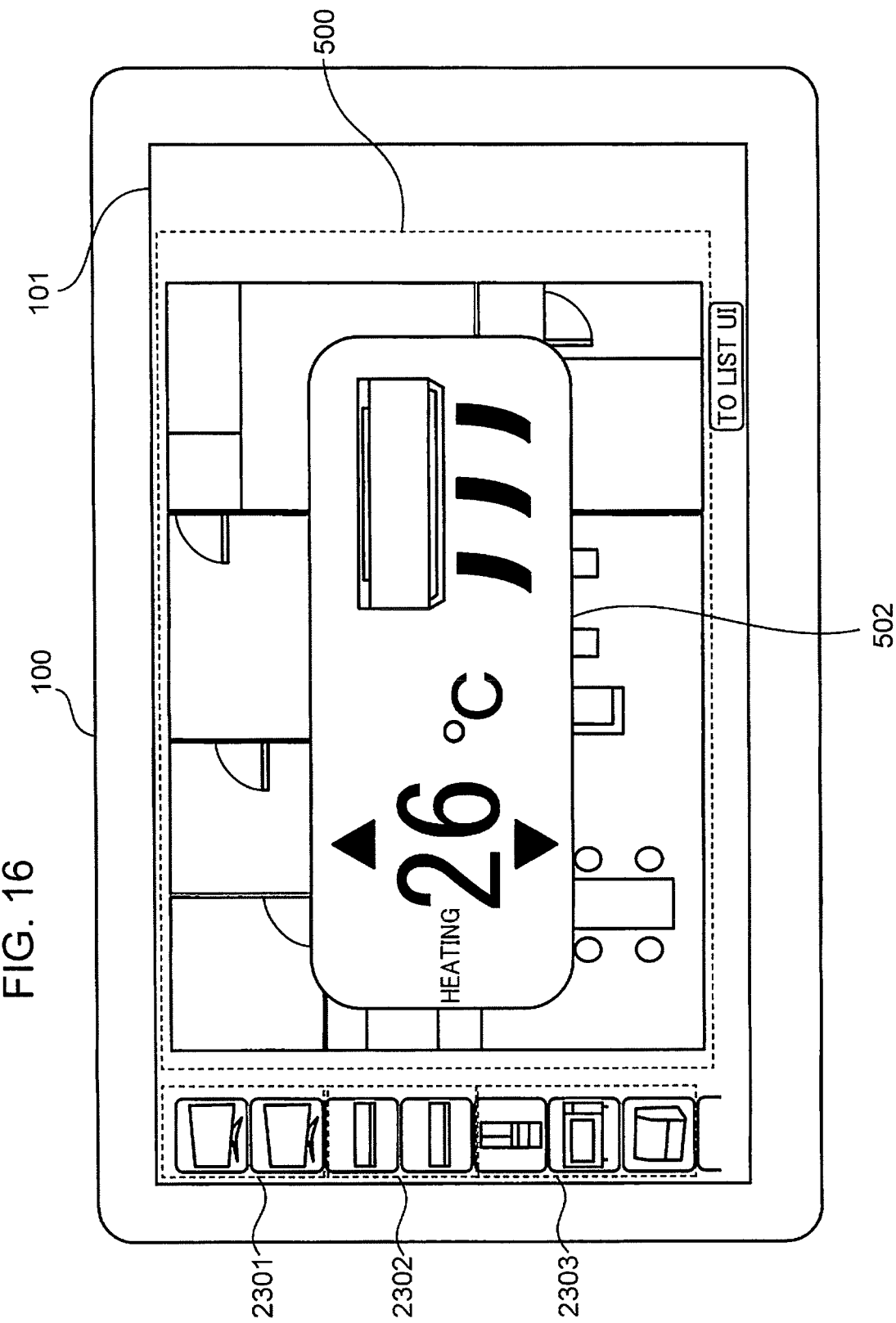
FIG. 16 is a diagram showing a device icon arrangement example of the display state of the device control screen of the home controller according to the present disclosure.

For example, as shown in the lower left of FIG. 16, three device icons 501 for the refrigerator, a microwave oven, and a dish washing/drying machine are classified into a cooking device category, and therefore the three device icons are grouped as device icons 2303 for the cooking devices and disposed on the left side of the floor plan 500.

Examples of the other categories include entertainment devices and air-conditioning devices. The entertainment device category includes devices 200 such as a television set, a recorder, a player, and a home theater system. The air-conditioning device category includes devices 200 such as an air conditioner, an air purifier, a humidifier, a dehumidifier, and a home air circulation system.

For example, if the device icons 501 for the television set, the recorder, the air conditioner, and the air purifier are disposed on the floor plan 500 and the device icon 501 for the television set is selected by the user, the device icons 501 for the television set and the recorder classified into the entertainment device category are grouped into one group and disposed on the left side of the floor plan 500, and the device icons 501 for the air conditioner and the air purifier classified into the air-conditioning device category are grouped into one group and disposed on the left side of the floor plan 500.

The display control section 103 may determine the category of the devices 200 from the content registered in the device type 3102 of the device list 3100. In this case, a classification table for determining the category of the devices 200 from the content registered in the device type 3102 may be stored in advance in the storage section 104, and the display control section 103 may reference the classification table to discriminate the category of the devices 200.

A variety of manners of classifying the devices 200 according to the device type may be adopted besides that described above. For example, as shown in FIG. 24, the devices 200 may be classified into household appliance, air-conditioning, and facility categories.

The method of grouping the device icons 501 on the basis of particular conditions and disposing the device icons 501 as described above may also be applied to the display mode in which the device icons 501 are retracted so as to surround the device control screen 502 as shown in FIG. 11.

Figure 17A:
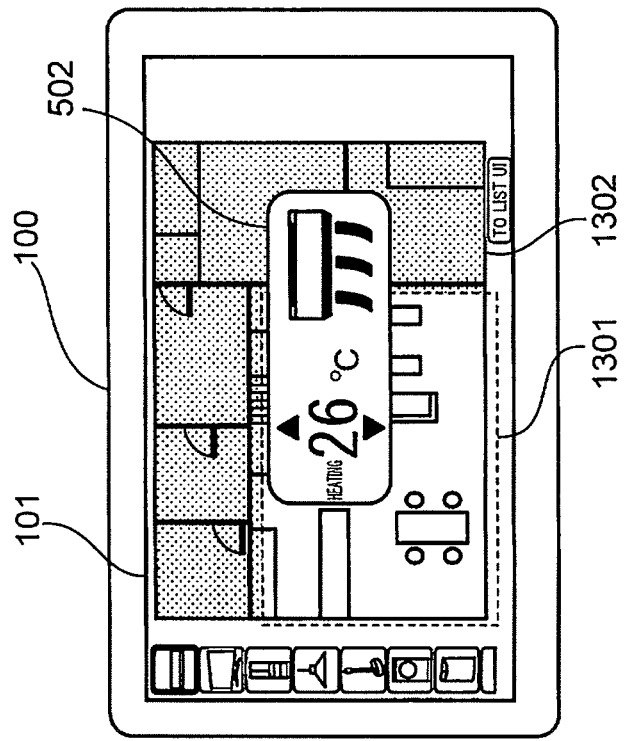
FIGS. 17A and 17B are diagrams showing a configuration example of the display state of the device control screen of the home controller according to the present disclosure.
Figure 17B:
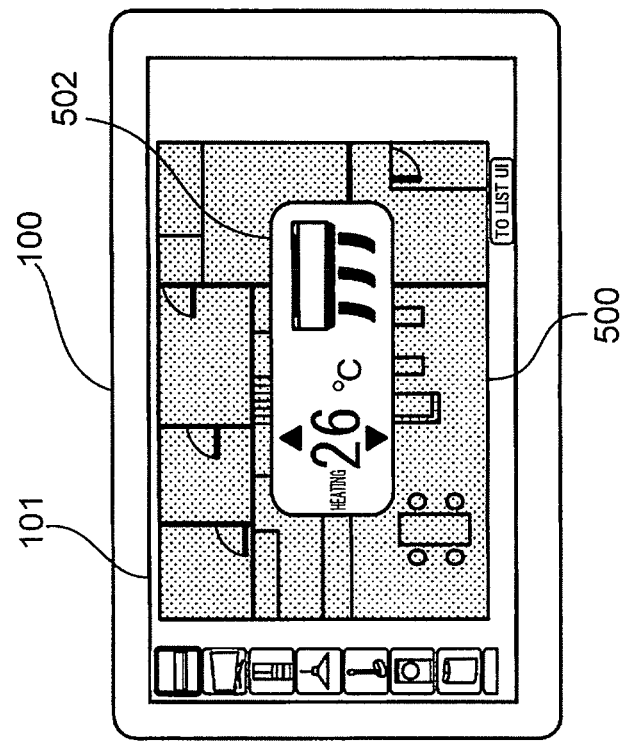

FIGS. 17A and 17B are each a diagram showing a method of displaying the floor plan 500 with the device control screen 502 displayed. As shown in FIGS. 17A and 17B, there are two types of the method of displaying the floor plan 500. In a first display method, as shown in FIG. 17A, the entire floor plan 500 is covered by a translucent gray layer (in the drawing, indicated by dots).

In this case, the background of the device control screen 502 is turned into a gray color to emphasize the device control screen 502, which allows the user to more definitely recognize the device control screen 502. In addition, the gray layer is translucent, and the floor plan 500 is not completely hidden. This allows the device control screen 502 to be operated with presence. The gray layer is image data having a color with low brightness such as gray and set to predetermined transparency.

The display control section 103 may decide the display order of the device control screen 502, the gray layer, and the floor plan 500 such that the device control screen 502 is the uppermost layer and the floor plan 500 is the lowermost layer, and synthesize these images. This prevents the device control screen 502 from being displayed as covered by the gray layer.

In a second display method, as shown in FIG. 17B, a non-control target region 1302 in the floor plan 500 is covered by a translucent gray layer (the region with dots in the drawing), and a control target region 1301 is not covered by the translucent gray layer. This allows the user to operate the device control screen 502 while being conscious of the control target region 1301, which allows operation with presence. Here, the control target region 1301 refers to a region on the floor plan 500 that corresponds to a room in which the device 200 represented by the device icon 501 selected by the user is disposed, and the non-control target region 1302 refers to a region on the floor plan 500 other than the room. For example, in the case where the control target device is the air conditioner installed in the living room, the control target region 1301 is the region on the floor plan 500 corresponding to the living room, and the non-control target region 1302 is the region on the floor plan 500 other than the living room.

For example, it is assumed that the user selects the device icon 501 for the air conditioner with a device ID 3101 of A shown in FIG. 35. In this case, the display control section 103 specifies the position (X10, Y100, Z1) of the air conditioner from the content registered in the arrangement 3104 of the air conditioner. Next, the display control section 103 references the room information 2900 to decide in which room the specified position (X10, Y100, Z1) is positioned. Here, it is assumed that the position (X10, Y100, Z1) is positioned within a region surrounded by vertexes with vertex IDs of F, G, H, I, L, O, and N. Then, the display control section 103 determines that the air conditioner is disposed in the living room with a room ID of A. Then, the display control section 103 generates a gray layer with the region of the living room defined as the control target region 1301 and with the region on the floor plan 500 other than the living room defined as the non-control target region 1302.

Next, transition between the display state of the basic screen and the display state of the device control screen 502 will be described using FIG. 18. In the basic screen shown in the left diagram of FIG. 18, the user selects the device icon 501 for the device 200 (here, the air conditioner) that is desired to be controlled, and the touch panel control section 102 senses the selection. Then, as shown in the right diagram of FIG. 18, the display control section 103 displays the device control screen 502 corresponding to the selected device icon 501 as overlapped on the floor plan 500. This results in transition from the display state of the basic screen to the display state of the device control screen 502.

Figure 18:
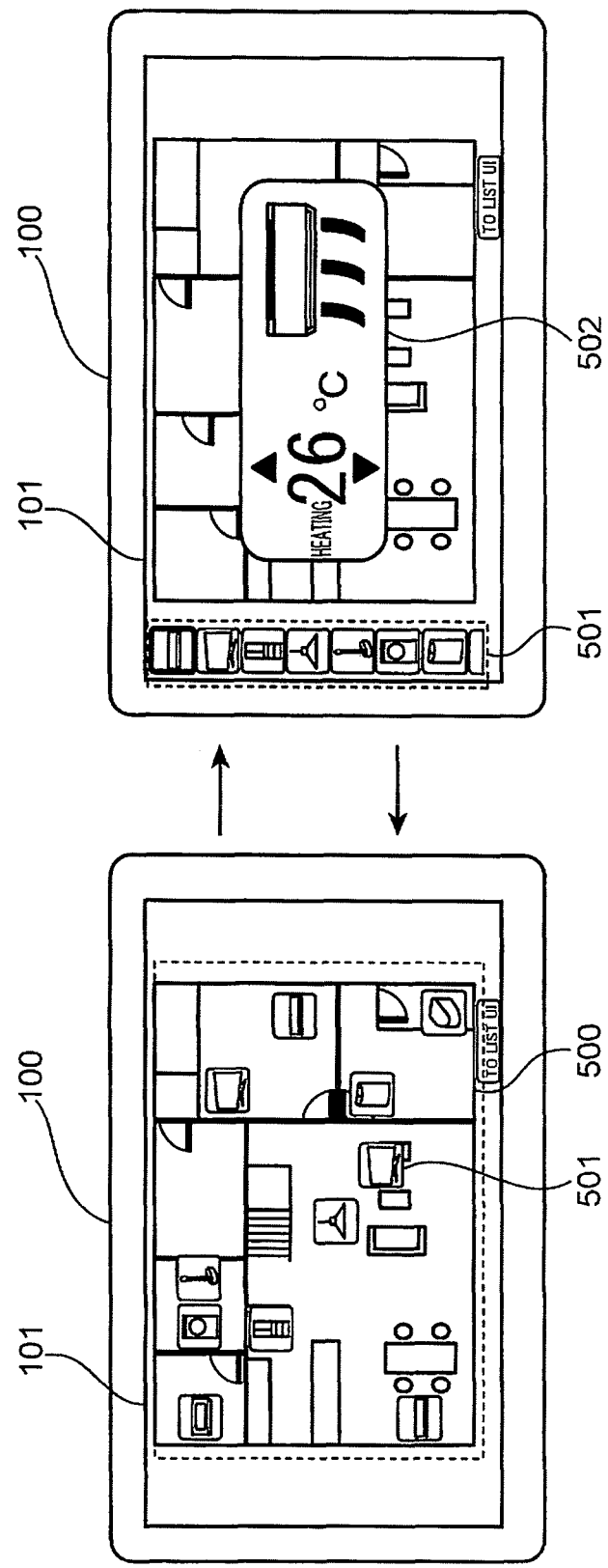
FIG. 18 is a diagram showing an example of transition between the basic screen of the home controller and the display state of the device control screen according to the present disclosure.

On the other hand, as shown in the right diagram of FIG. 18, in the display state of the device control screen 502, the user taps on the device icon 501 for the air conditioner corresponding to the device control screen 502 or a location outside the display region of the device control screen 502 (for example, the display region of the floor plan 500 outside the display region of the device control screen 502), and the touch panel control section 102 senses the tap. Then, as shown in the left diagram of FIG. 18, the display control section 103 erases the device control screen 502, and returns from the display state of the device control screen 502 to the display state of the basic screen. At this time, the display control section 103 returns the device icon 501 to the original arrangement position on the floor plan 500.

The operation described above is the same for the floor plan 500 for any floor displayed in the basic screen. For example, as shown in the left diagram of FIG. 19, in the case where the basic screen displays the floor plan 602 for the second floor, the user taps on the device icon 501 for the device 200 (here, the air conditioner) that is desired to be controlled, and the touch panel control section 102 senses the tap. Then, as shown in the right diagram of FIG. 19, the display control section 103 displays the device control screen 502 corresponding to the selected device icon 501 as overlapped on the floor plan 602 for the second floor.

Figure 19:
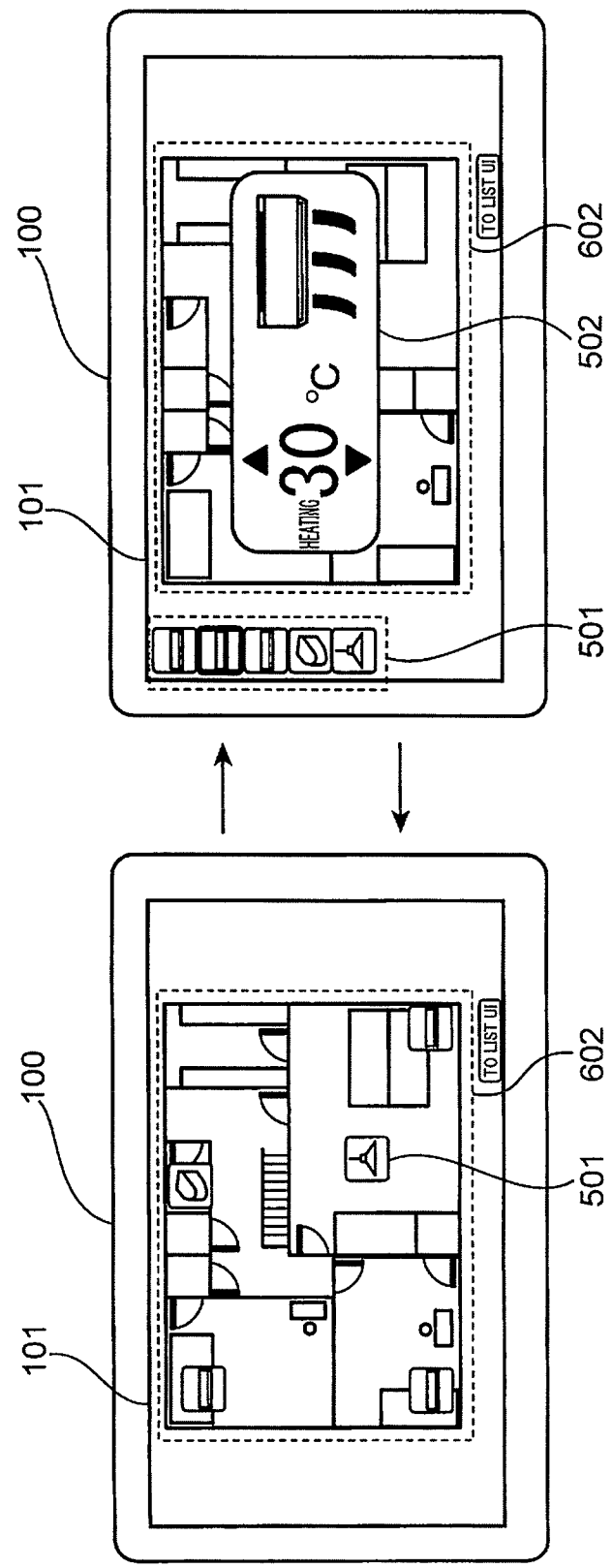
FIG. 19 is a diagram showing an example of transition between the second floor display state of the basic screen of the home controller and the display state of the device control screen for the second floor according to the present disclosure.

On the other hand, as shown in the right diagram of FIG. 19, in the display state of the device control screen 502 for the air conditioner, the user taps on the device icon 501 for the air conditioner corresponding to the device control screen 502 being displayed or a location outside the display region of the device control screen 502 (for example, the display region of the floor plan 500 outside the display region of the device control screen 502), and the touch panel control section 102 senses the tap. Then, as shown in the left diagram of FIG. 19, the display control section 103 erases the device control screen 502, and returns from the display state of the device control screen 502 to the display state of the basic screen in which the floor plan 602 for the second floor is displayed.

Figure 20:
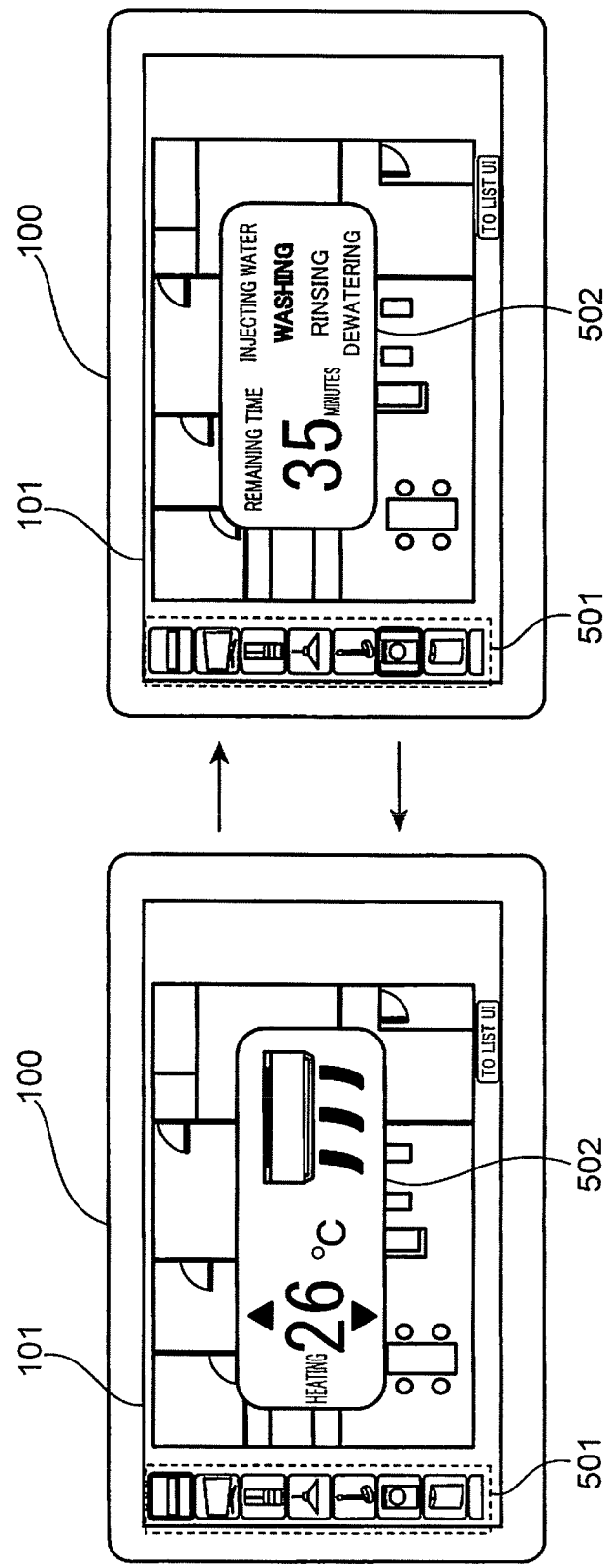
FIG. 20 is a diagram showing an example of transition from the display state of the device control screen of a certain device to the display state of the device control screen of another device according to the present disclosure.

Next, a method of switching from the display state of a certain device control screen 502 to the display state of another device control screen 502 will be described using FIG. 20. As shown in the left diagram of FIG. 20, in the display state of the device control screen 502 for the air conditioner, the user taps on the device icon 501 for the washing machine which is different from the device icon 501 for the air conditioner, and the touch panel control section 102 senses the tap. Then, as shown in the right diagram of FIG. 20, the display control section 103 erases the device control screen 502 which has been displayed, and displays the device control screen 502 corresponding to the device icon 501 for the washing machine as overlapped on the floor plan 500. Switching in the opposite direction is performed in the same manner.

Consequently, when the user successively selects different device icons 501, switching is successively performed between the device control screens 502, which allows the user to successively control different devices 200. That is, in causing another device control screen 502 to be displayed while a certain device control screen 502 is displayed, it is no longer necessary for the user to input an operation of erasing the certain device control screen 502, and switching can be performed between the device control screens 502 with one touch operation.

In the display state of the device control screen 502, in the case where the user taps on the device icon 501 corresponding to the device control screen 502 being displayed, the display control section 103 may only erase the device control screen 502, and may not return to the basic screen. Such screen transition is shown in FIG. 21.

Figure 21:
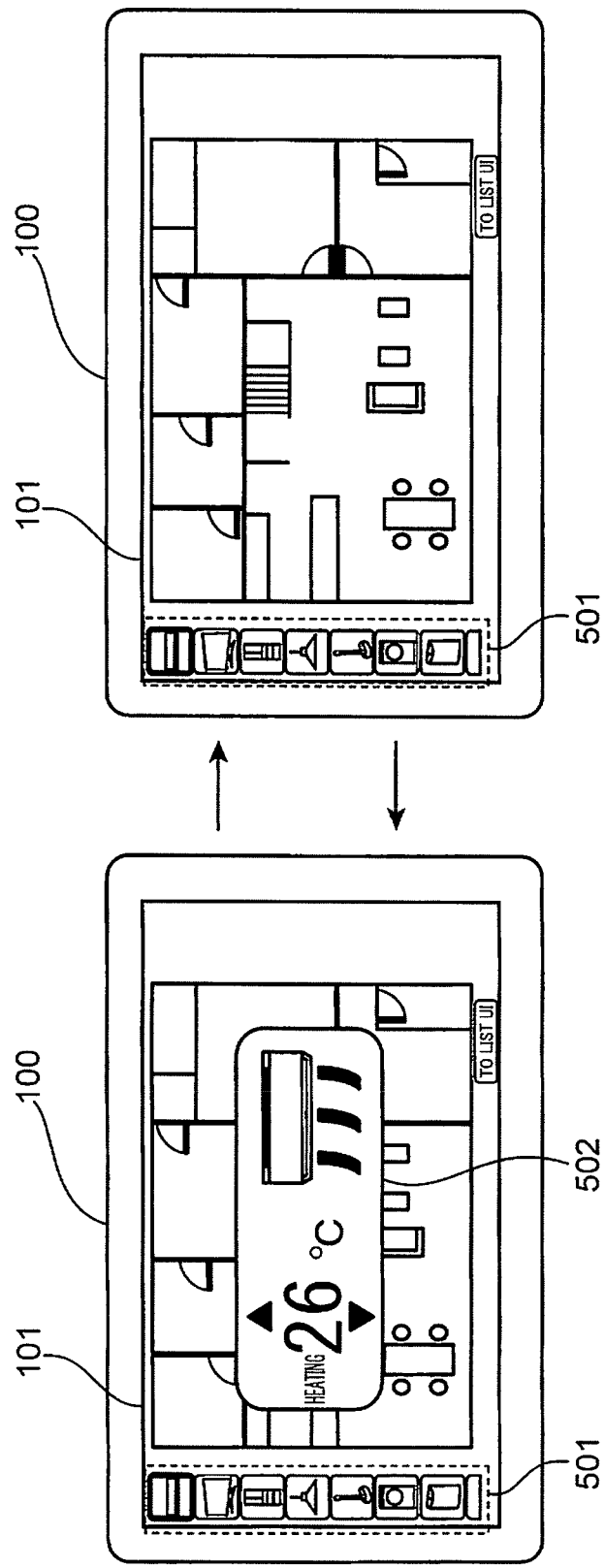
FIG. 21 is a diagram showing an example of transition between the display state and the hidden state of the device control screen of the home controller according to the present disclosure.

In the left diagram of FIG. 21, the device icon 501 for the air conditioner is selected by the user, and therefore the device control screen 502 for the air conditioner is displayed, and all the device icons 501 are displayed in one vertical line on the left side of the floor plan 500. In this state, the user taps on the device icon 501 for the air conditioner, and the touch panel control section 102 senses the tap. Then, as shown in the right diagram of FIG. 21, the display control section 103 erases only the device control screen 502 for the air conditioner with the device icons 501 kept displayed in one vertical line. In this case, the device icons 501 do not move onto the floor plan 500, and therefore a user's desire to cause only the floor plan 500 to be displayed may be met.

On the other hand, in the hidden state of the device control screen 502, the user selects a desired device icon 501, and the touch panel control section 102 senses the selection. Then, the display control section 103 displays the device control screen 502 corresponding to the selected device icon 501. For example, in the right diagram of FIG. 21, when the user selects the device icon 501 for the air conditioner from the device icons 501 disposed in one vertical line on the left side of the floor plan 500, the device control screen 502 for the air conditioner is displayed as shown in the left diagram of FIG. 21.

Figure 22:
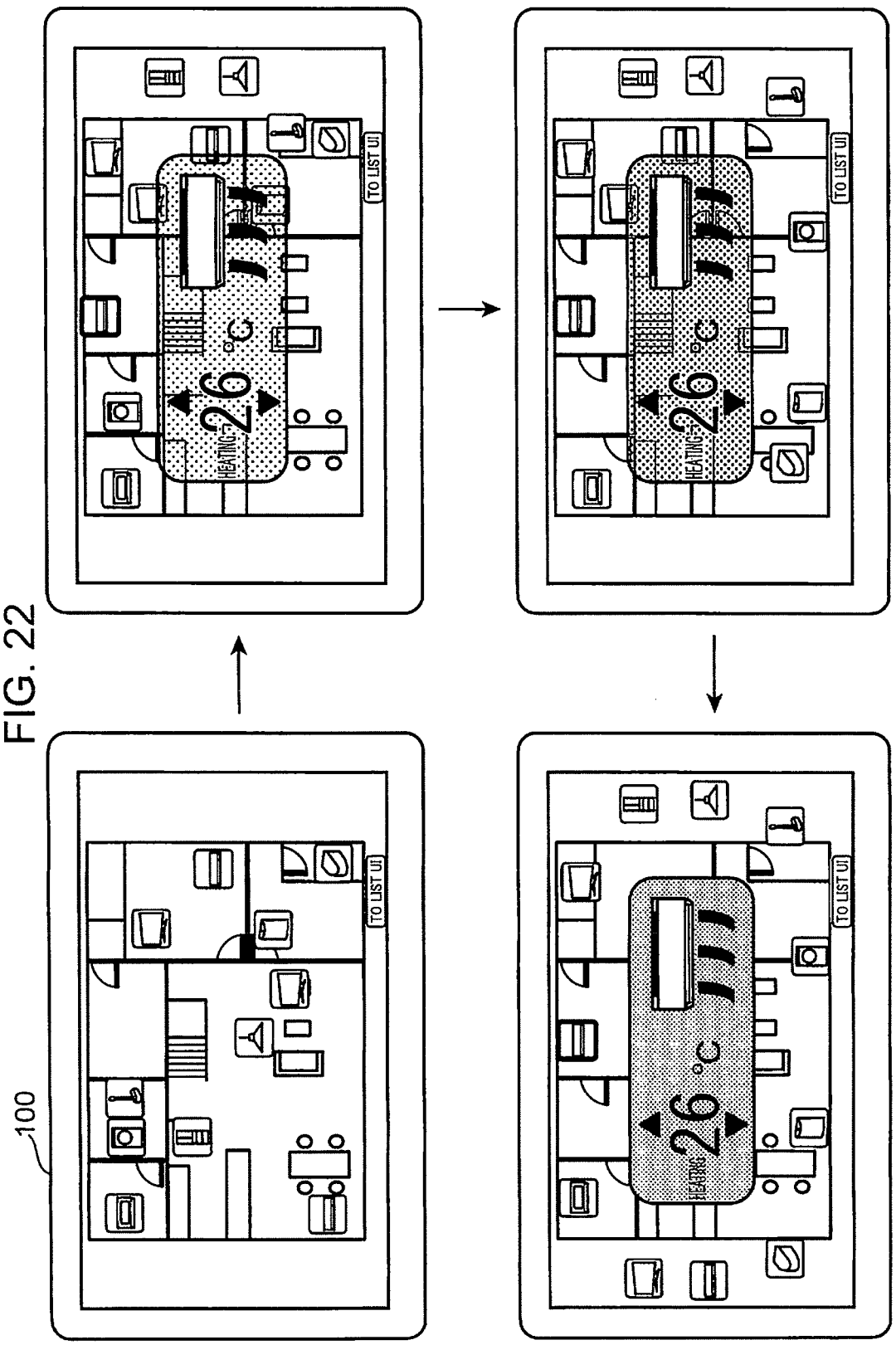
FIG. 22 is a diagram showing an example of an animation for transition from the basic screen of the home controller to the display state of the device control screen according to the present disclosure.

Next, transition from the display state of the basic screen to the display state of the device control screen 502 represented through an animation will be described using FIG. 22. As shown in the upper left diagram of FIG. 22, the user selects the device icon 501 for the air conditioner, for example, in the basic screen. Then, the display control section 103 gradually lowers the transparency of the device control screen 502 for the air conditioner in the order of the upper right diagram, the lower right diagram, and the lower left diagram of FIG. 22 to a final transparency of 0. At the same time, the display control section 103 moves all the device icons 501 onto the outer periphery of an ellipse that surrounds the device control screen 502.

Figure 23:
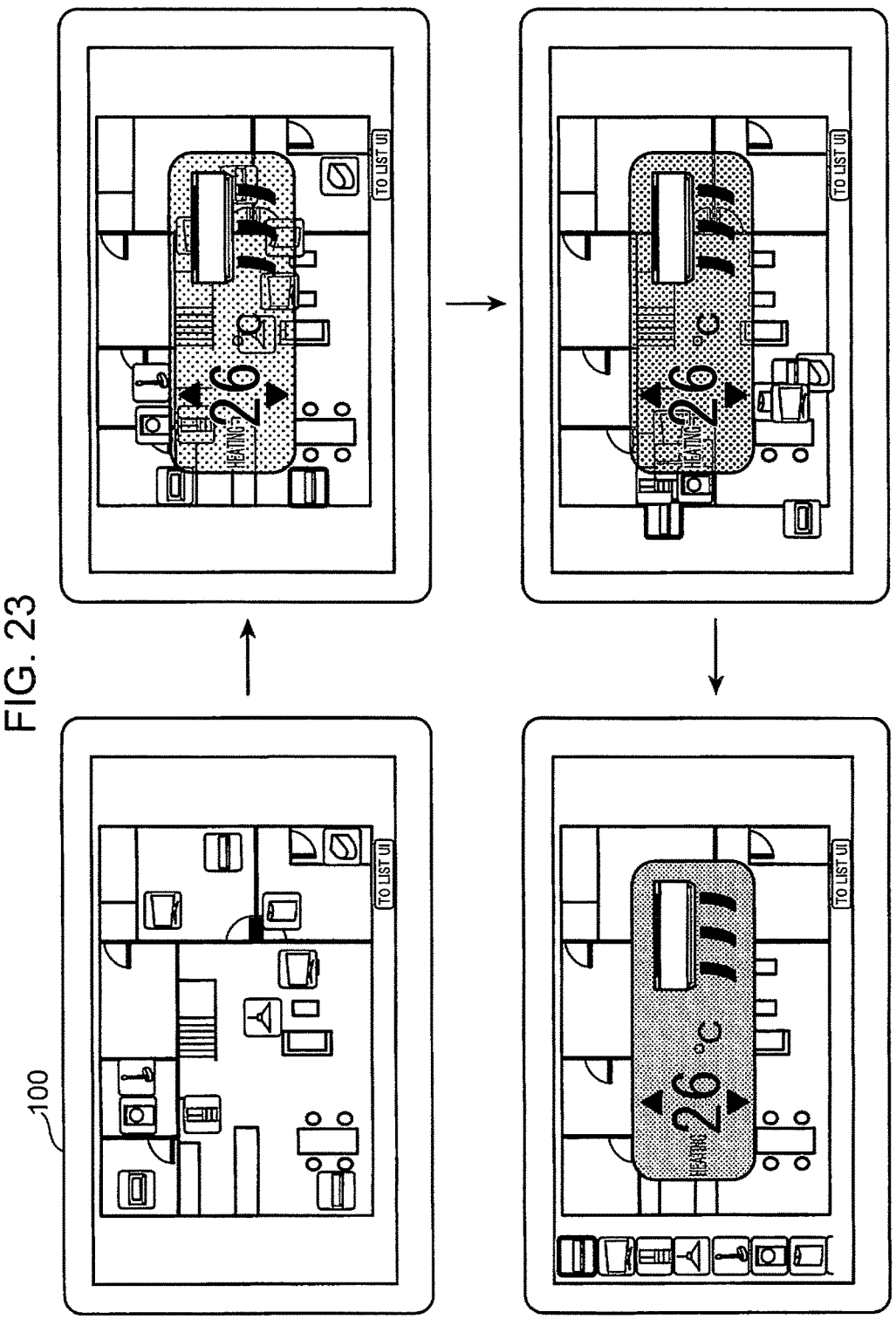
FIG. 23 is a diagram showing an example of an animation for transition from the basic screen of the home controller to the display state of the device control screen according to the present disclosure.

Next, transition from the display state of the basic screen to the display state of the device control screen 502 represented through an animation will be described using FIG. 23. As shown in the upper left diagram of FIG. 23, the user selects the device icon 501 for the device 200 which is the air conditioner, for example, in the basic screen. Then, the display control section 103 gradually decreases the transparency of the device control screen 502 for the air conditioner in the order of the upper right diagram, the lower right diagram, and the lower left diagram of FIG. 23 to a final transparency of 0. At the same time, the display control section 103 moves all the device icons to the left side of the floor plan 500.

Consequently, representing the screen transition through an animation can enhance the interest of the user in operating the device control screen 502 through screen rendering shown since the device icon 501 is selected until the device control screen 502 is displayed.

Figure 24:
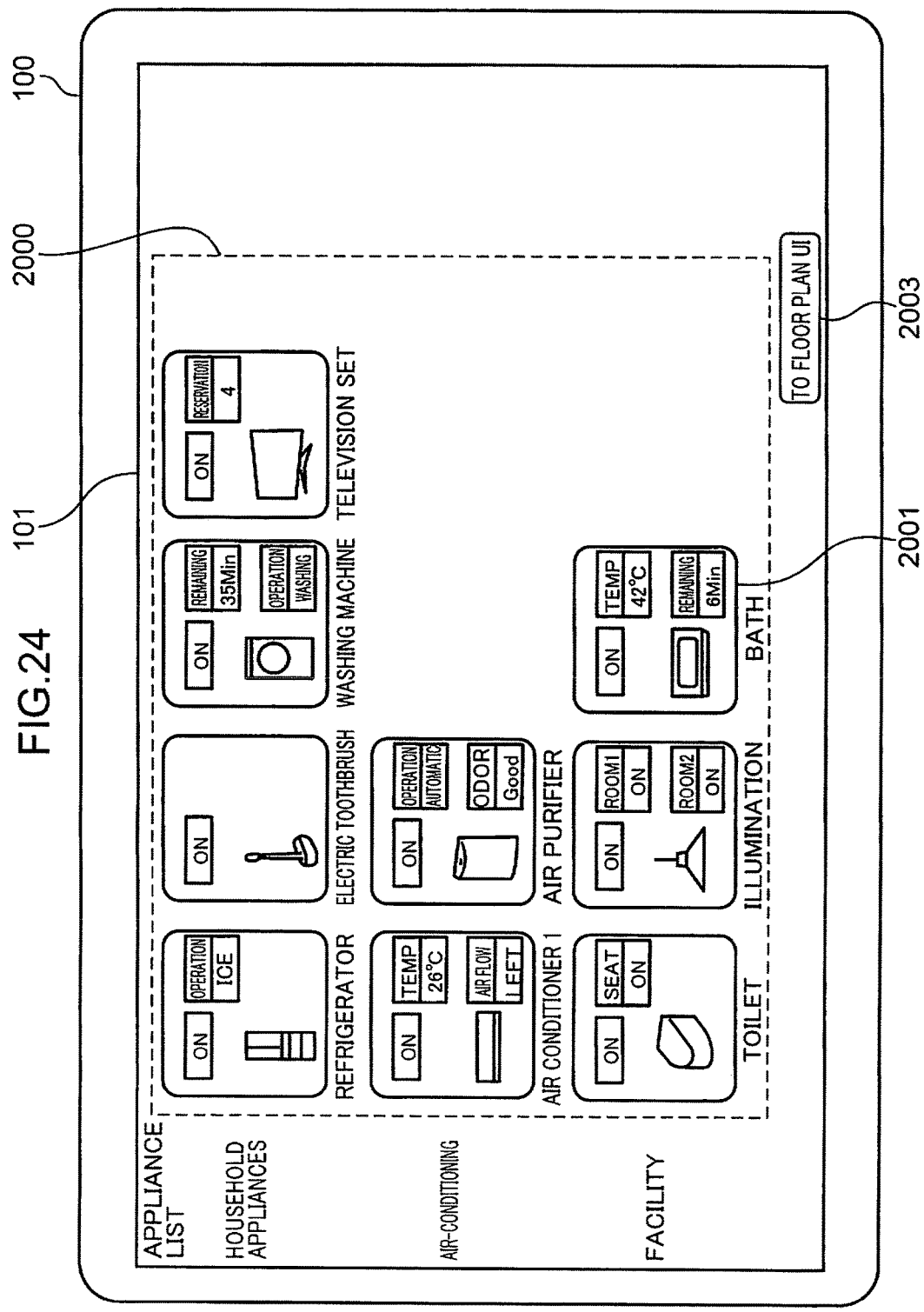
FIG. 24 is a diagram showing the configuration of a device icon list display screen of the home controller according to the present disclosure.

FIG. 24 is a diagram showing the configuration of a device list display screen. The device list display screen is displayed when the user taps on the device list display change button 503 in the basic screen shown in FIG. 5.

As shown in FIG. 24, the device list display screen includes a device list 2000, device details icons 2001, and a basic screen display button 2003.

When the user taps on the device details icon 2001 and the touch panel control section 102 senses the tap, the display control section 103 causes the device control screen 502 to be displayed as overlapped on the device list 2000. This allows the user to cause the device control screen 502 to be displayed and operate the device 200 as in the case where the device icon 501 is tapped on.

The device details icon 2001 is prepared for each device 200. The device details icon 2001 is different from the device icon 501 in representing not only an image representing the device 200 but also the on/off state and the operation state of the device 200. For example, the device details icon 2001 for the refrigerator displayed in the upper left of FIG. 24 displays not only an image of the refrigerator but also "ON", which indicates that the refrigerator is currently turned on, and "OPERATION/ICE", which indicates that the refrigerator is currently making ice.

In the device list 2000, the device details icons 2001 are displayed as classified on the basis of a classification criterion determined in advance. Examples of the classification criterion determined in advance include the type of the device 200, the room in which the device 200 is disposed, and the status of use of the device 200. In FIG. 24, the type of the device 200 is used as the classification criterion, and the device details icons 2001 are classified into three categories, namely the household appliance, air-conditioning, and facility categories.

In the example of FIG. 24, the refrigerator, an electric toothbrush, the washing machine, and the television set are classified into the household appliance category, the air conditioner and the air purifier are classified into the air-conditioning category, and the toilet, the illumination device, and the bath are classified into the facility category. In this case, a classification table that determines into which of the household appliance, air-conditioning, and facility categories each device 200 is classified on the basis of the content registered in the device type 3102 of the device list 3100 (see FIG. 35) is stored in advance in the storage section 104. Then, the display control section 103 may reference the classification table to classify each device into a category.

Returning to FIG. 24, the button with a text "TO FLOOR PLAN UI" displayed at the lower right of the device list 2000 is the basic screen display button 2003. The basic screen display button 2003 is a button for switching the screen from the device list display screen to the basic screen.

Although switching can be made between the basic screen and the device list display screen in the foregoing description, the device list display screen may be utilized as the basic screen in place of the basic screen shown in FIG. 5. In this case, the basic screen display button 2003 may be omitted.

In the foregoing description, one device details icon 2001 is correlated with one device 200. However, the present disclosure is not limited thereto, and one device details icon 2001 may be correlated with a plurality of devices 200 so that the one device details icon 2001 may be used in common to the plurality of devices 200. For example, in the case where there are two illumination devices in a living room, the two illumination devices may be represented by one device details icon 2001.

In this case, when the device details icon 2001 representing the two illumination devices is tapped on by the user, the display control section 103 causes the display 101 to display a device control screen 502 that allows simultaneous control of the two illumination devices. In this case, the same effect as that obtained in the case where one device icon 501 is used in common to a plurality of devices 200 is obtained. In the case where one device details icon 2001 is used in common to a plurality of illumination devices, the device details icon 2001 may display the on/off state and the operation state of each of two illumination devices.

In the basic screen, the device details icon 2001 may be used in place of the device icon 501. In the device list display screen, the device icon 501 may be used in place of the device details icon 2001. In addition, the device control screen 502 displayed in the case where the device details icon 2001 is selected and the device control screen 502 displayed in the case where the device icon 501 is selected may be the same as or different from each other. For example, the device details icon 2001 contains more information than that of the device icon 501, and therefore the device control screen 502 displayed in the case where the device details icon 2001 is selected may include more buttons and states than those of the device control screen 502 displayed in the case where the device icon 501 is selected.

Figure 25:
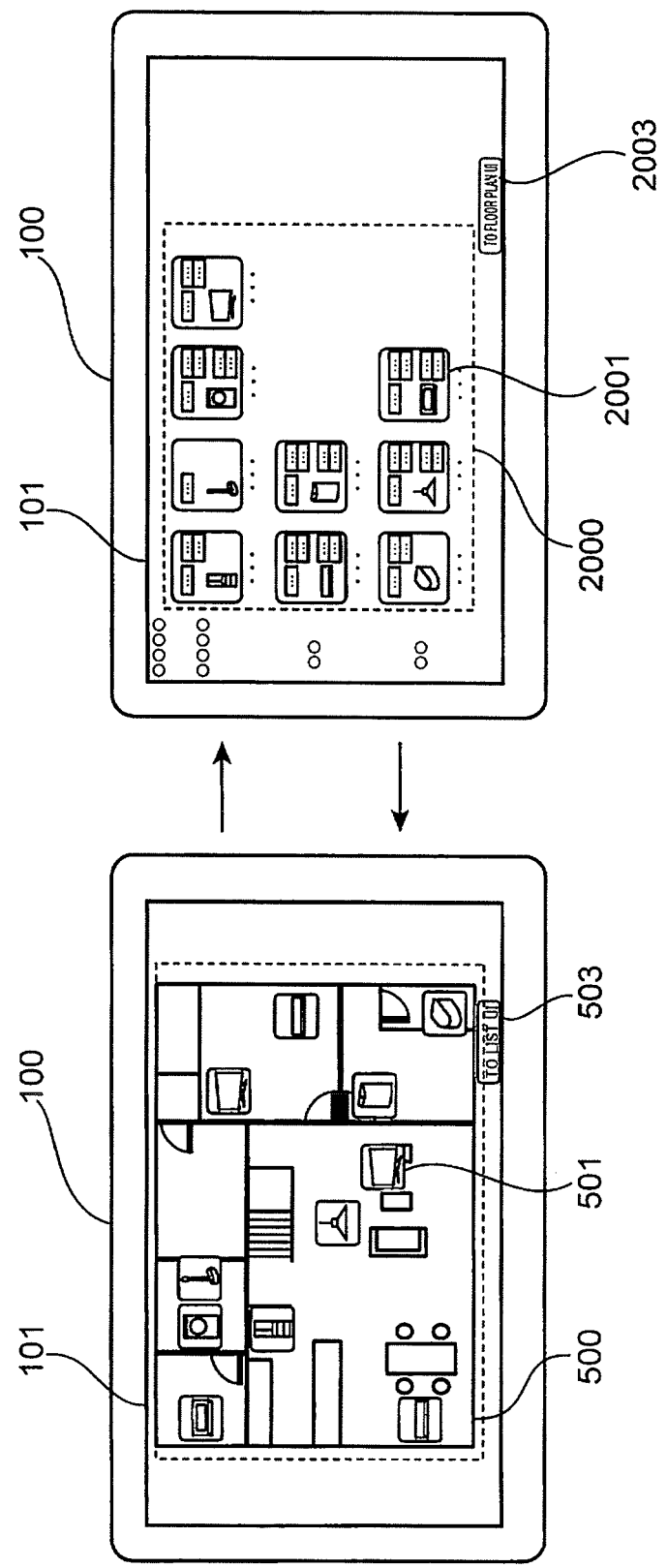
FIG. 25 is a diagram showing an example of transition between the basic screen of the home controller and the device icon list display screen according to the present disclosure.

FIG. 25 is a diagram showing screen transition between the basic screen and the device list display screen. In the basic screen shown in the left diagram of FIG. 25, when the device list display change button 503 is selected by the user, display on the display 101 is switched to the device list display screen shown in the right diagram of FIG. 25. On the other hand, in the device list display screen shown in the right diagram of FIG. 25, when the basic screen display button 2003 is selected by the user, display on the display 101 is switched to the basic screen shown in the left diagram of FIG. 25.

Specifically, when the touch panel control section 102 senses a tap on the basic screen display button 2003, the display control section 103 switches the display screen on the display 101 to the basic screen from the device list display screen. On the other hand, in the display state of the basic screen, when the touch panel control section 102 senses a tap on the device list display change button 503, the display control section 103 switches the display screen on the display 101 from the basic screen to the device list display screen.

For example, in the case where the device list display screen is selected for display, and in the case where the user attempts to operate the television set located in front of the user, the device list display screen includes only one device details icon 2001 for the television set if there is only one television set in the house. This allows the user to directly select the device details icon 2001 for the television set without an erroneous operation, and to cause the device control screen 502 corresponding to the television set to be displayed.

On the other hand, in the case where the device list display screen is selected, the device list display screen focuses on the individual devices 200, and thus the relationship between the device 200 and the location at which the device 200 is disposed is unclear, although it is possible to operate or confirm the state of the individual devices 200. Therefore, for a plurality of devices 200 installed within the same building, such as the air conditioners or the illumination devices, for example, it is unclear the air conditioner or the illumination device in which room is the control target, which may incur an erroneous operation.

Thus, in the present disclosure, the basic screen is provided in addition to the device list display screen to allow selection from the basic screen and the device list display screen.

Consequently, in the case where the basic screen is selected, the relationship between the device 200 and the location at which the device 200 is disposed is made definite. Therefore, also for a plurality of devices 200 of the same type installed in the same building, such as the air conditioners or illumination devices, for example, a discrimination as to the air conditioner or the illumination device in which room is the control target is facilitated. This prevents the air conditioner or the illumination device installed in a room that is different from the desired room from being erroneously operated.

Figure 26:
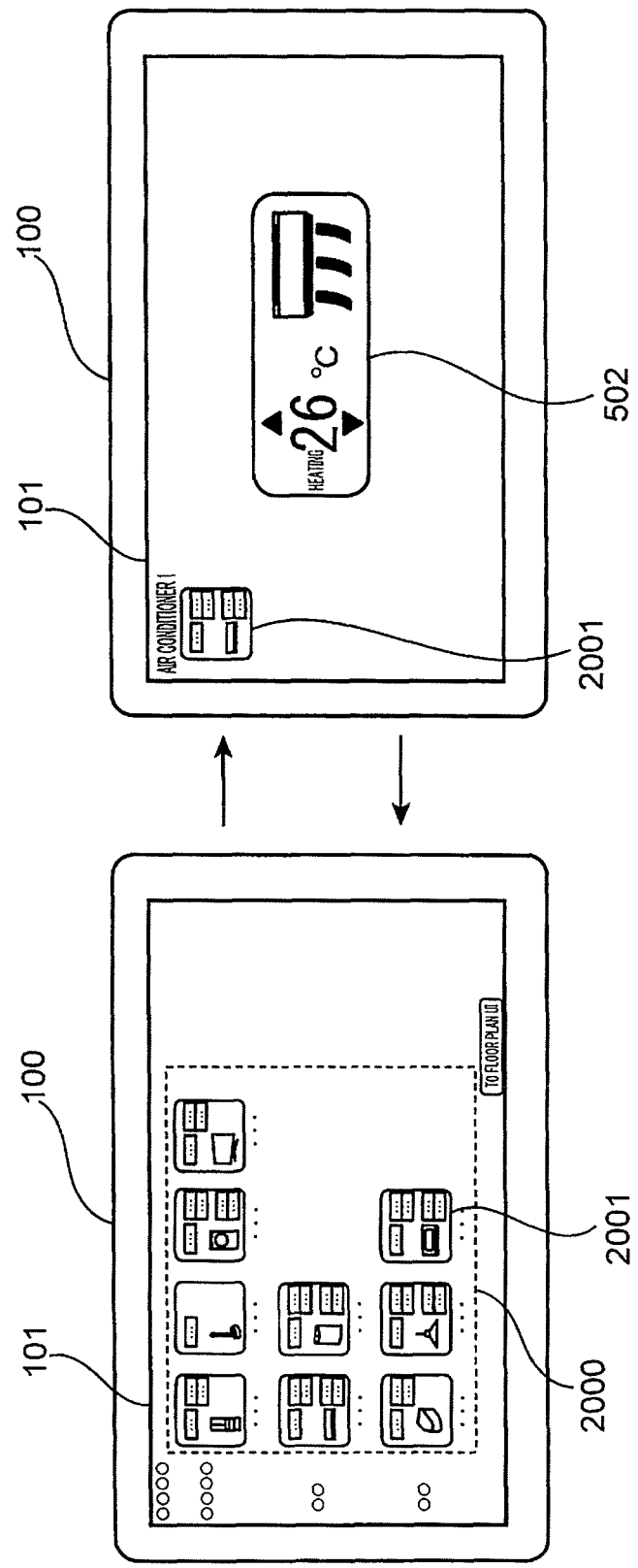
FIG. 26 is a diagram showing an example of transition between the device icon list display screen of the home controller and the display state of the device control screen according to the present disclosure.

FIG. 26 is a diagram showing screen transition between the display state of the device list display screen and the display state of the device control screen 502. In the device list display screen shown in the left diagram of FIG. 26, the user selects the device details icon 2001 for the device 200 (here, the air conditioner) that is desired to be controlled, and the touch panel control section 102 senses the selection. Then, as shown in the right diagram of FIG. 26, the display control section 103 displays the device control screen 502 for the air conditioner corresponding to the selected device details icon 2001 as overlapped on the device list display screen. This results in transition from the display state of the device list display screen to the display state of the device control screen 502.

In the example in the right drawing of FIG. 26, the display control section 103 hides the device details icons 2001 for devices other than the air conditioner selected by the user, and only the device details icon 2001 for the air conditioner is displayed at a position that is different from that in the device control screen 502. This allows the user to definitely recognize the device details icon 2001 that the user himself/herself selected.

On the other hand, as shown in the right diagram of FIG. 26, in the display state of the device control screen 502, the user selects the device details icon 2001 for the air conditioner, and the touch panel control section 102 senses the selection. Then, as shown in the left diagram of FIG. 26, the display control section 103 erases the device control screen 502, and returns from the display state of the device control screen 502 to the display state of the device list display screen.

Although only one device details icon 2001 is displayed in the display state of the device control screen 502 shown in the right diagram of FIG. 26, other device details icons 2001 that are not selected by the user may be displayed in the same manner as in FIG. 13. In this case, the plurality of device details icons 2001 may be displayed in one line at an end of the screen as shown in FIG. 13, or may be displayed so as to surround the device control screen 502 as shown in FIG. 12.

According to the configuration, the user can successively select the device details icons 2001 in the display state of the device control screen 502 to successively display other device control screens 502. Consequently, in causing another device control screen 502 to be displayed while a certain device control screen 502 is displayed, it is no longer necessary for the user to input an operation of erasing the certain device control screen 502, and switching can be performed between the device control screens 502 with one touch operation.

Figure 27:
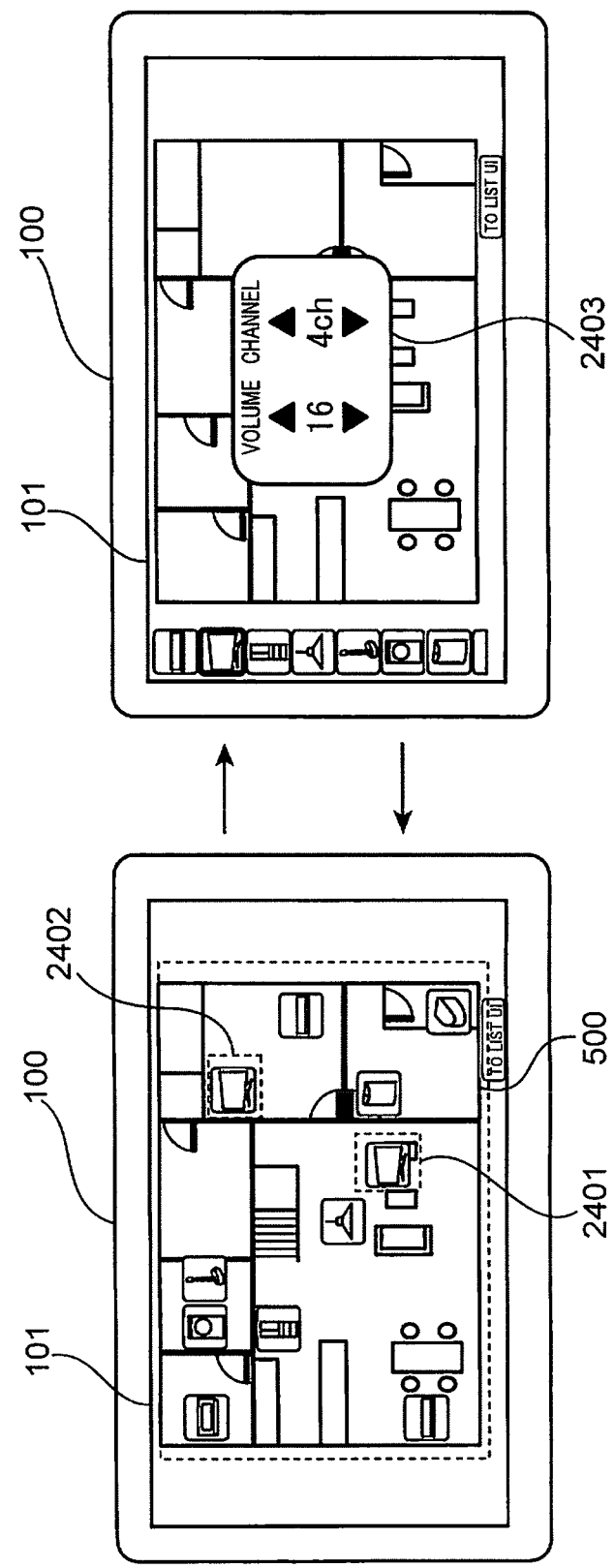
FIG. 27 is a diagram showing an example of transition between the basic screen of the home controller and the display state of the device control screen according to the present disclosure.

FIG. 27 is a diagram showing screen transition between the display state of the basic screen and the display state of the device control screen 502 performed in the case where the basic screen includes a plurality of device icons 501 representing the devices 200 of the same type. As shown in the left diagram of FIG. 27, the basic screen includes two device icons 501 for the television set. Here, the device icon 501 for a television set A is represented as a device icon 2401, and the device icon 501 for a television set B is represented as a device icon 2402. At this time, the user can intuitively select a television set that is desired to be controlled from the floor plan 500, and operate the television set.

For example, in the right diagram of FIG. 27, the device icon 2401 for the television set A is selected, and a device control screen 2403 for the television set A is displayed. Consequently, even if there are a plurality of device icons 501 for the devices 200 of the same type, each device icon 501 is disposed at a position on the floor plan 500 corresponding to the actual installation position. This allows the user to intuitively select the device icon 501 for a device 200 that is desired to be controlled in accordance with the display position on the floor plan 500, which prevents the device control screen 502 for another device 200 from being erroneously displayed.

Figure 28:
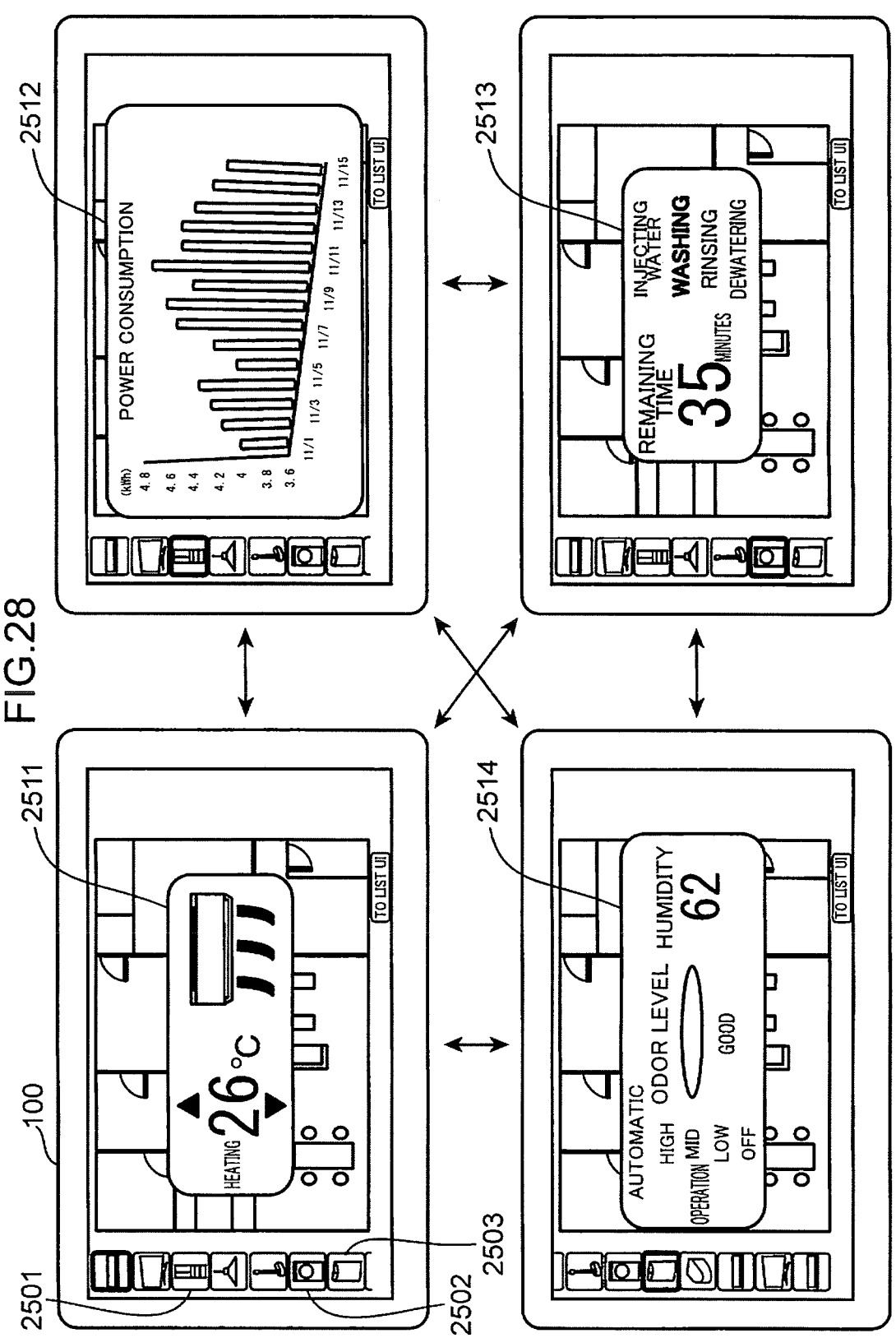
FIG. 28 is a diagram showing how the home controller successively transitions among the display states of the device control screens for different devices according to the present disclosure.

FIG. 28 is a diagram showing screen transition performed in the case where different device icons 501 are successively selected in the display state of the device control screen 502 to successively switch between the device control screens 502. In the upper left diagram, a device control screen 2511 for the air conditioner is displayed. When the device icon 2501 for the refrigerator is selected in this state, a device control screen 2512 for the refrigerator is displayed on the display 101 as shown in the upper right diagram. When the device icon 2502 for the washing machine is selected in the upper left diagram, a device control screen 2513 for the washing machine is displayed as shown in the lower right diagram. When the device icon 2503 for the air purifier is selected in the upper left diagram, a device control screen 2514 for the air purifier is displayed as shown in the lower left diagram. Such screen transition is performed in the same manner in the upper right diagram, the lower right diagram, and the lower left diagram.

Consequently, when the user selects the device icon 501 in the display state of the device control screen 502, the device control screen 502 corresponding to the device icon 501 can be directly displayed. Therefore, in the case where another device control screen 502 is to be displayed while a certain device control screen 502 is displayed, the other device control screen 502 can be displayed with one touch operation without inputting an operation of erasing the device control screen 502 being displayed. This allows the user to smoothly switch between the device control screens 502.

Figure 29:
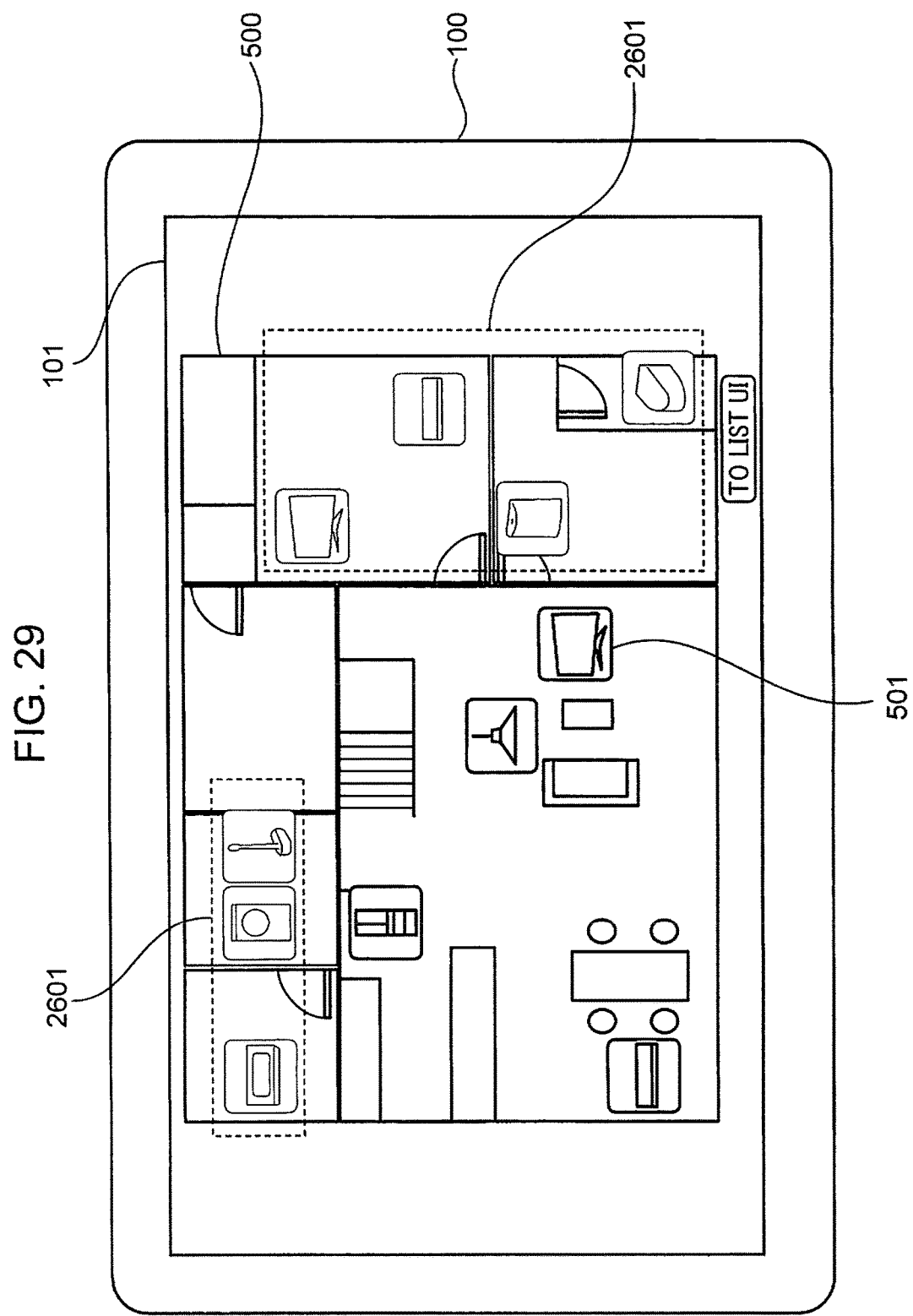
FIG. 29 is a diagram showing an example of display on the basic screen of devices that cannot be detected on a network according to the present disclosure.

FIG. 29 is a diagram showing an example of display on the basic screen of the device icons 501 for incommunicable devices 200 that cannot be detected on the network. The device management section 105 detects a device 200 that cannot be detected on the network and a device 200 that does not respond to a control command even though registered in the device list 3100 as incommunicable devices 200. Then, the display control section 103 displays the device icons 501 for the incommunicable devices 200 in a display mode that is different from that for the device icons 501 for communicable devices 200.

For example, in FIG. 29, the device icons 501 for the incommunicable devices 200 are represented as device icons 2601. The device icons 2601 are displayed translucently. This allows the user to immediately recognize that the devices 200 indicated by the device icons 2601 are currently out of order or cannot be controlled because of occurrence of a communication failure.

Although the device icons 2601 are displayed translucently in FIG. 29, the present disclosure is not limited thereto. For example, the device icons 2601 may be displayed in a fainter color or more darkly than the other device icons 501, or provided with an annotation mark.

Figure 30:
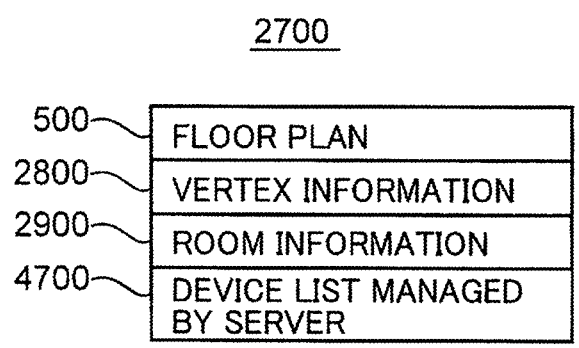
FIG. 30 is a diagram showing the configuration of home information according to the present disclosure.

FIG. 30 is a diagram showing the configuration of home information 2700. The home information 2700 is managed by the server 300 for each house, and the home controller 100 controls display on the basic screen, the device control screen 502, and so forth on the basis of the home information 2700. As shown in FIG. 30, the home information 2700 includes the floor plan 500, vertex information 2800, the room information 2900, and a device list 4700 managed by the server.

As shown in FIG. 6, the floor plan 500 is a plan view that is prepared for each floor of a house and that planarly represents the arrangement and the shape of one or more rooms forming the floor. In the present disclosure, the floor plan 500 includes a plan view formed from image data represented in a bitmap format, for example.

The vertex information 2800 is information for adapting the floor plan 500 to a two-dimensional coordinate-axis space to allow the home controller 100 to interpret the floor plan 500. The room information 2900 is information for deciding the regions of rooms from the vertex information 2800. The vertex information 2800, the room information 2900, and the device list 4700 managed by the server will be described in detail below.

Figure 31:
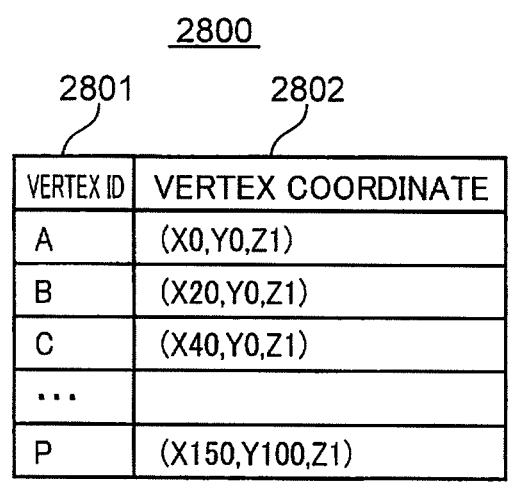
FIG. 31 is a diagram showing the configuration of vertex information according to the present disclosure.

FIG. 31 is a diagram showing the configuration of the vertex information 2800. As shown in FIG. 31, the vertex information 2800 includes a vertex ID 2801 and a vertex coordinate 2802. The vertex ID 2801 is an identifier that identifies a vertex on the floor plan 500. The vertex coordinate 2802 is a coordinate represented in the format of (X coordinate, Y coordinate, floor number), and indicates the position of a vertex of a partition line or the like represented on the floor plan 500. For example, the vertex with a vertex ID of B has a vertex coordinate (X20, Y0, Z1), which represents the position on the first floor (the ground floor) with an X coordinate of 20 and a Y coordinate of 0.

Figure 33:
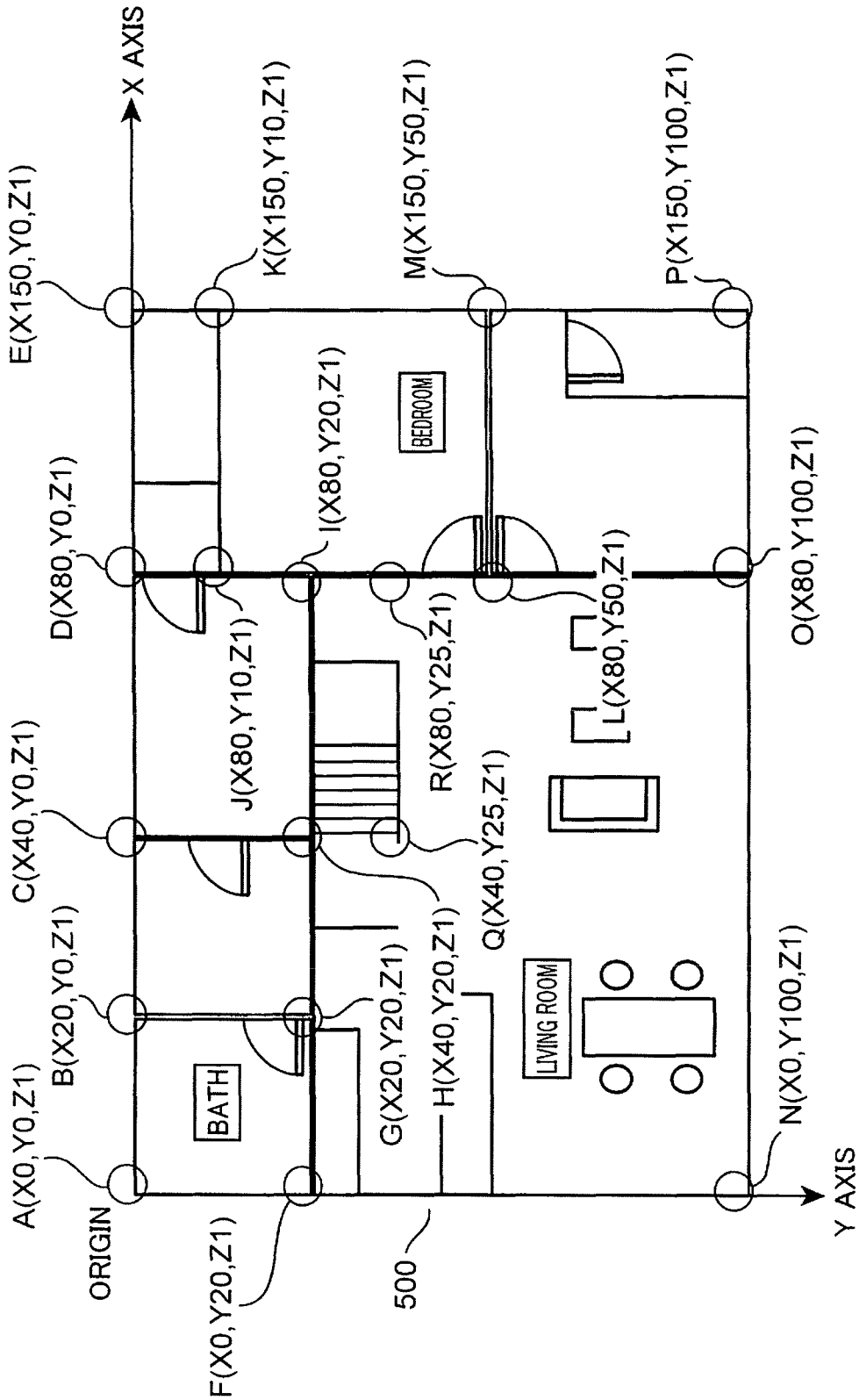
FIG. 33 is a diagram showing an example of the correspondence between the vertex information and the floor plan for the first floor according to the present disclosure.

FIG. 33 is a diagram showing the correlation between each vertex registered in the vertex information 2800 and the floor plan 500. It should be noted, however, that in FIG. 33, the upper left vertex of the floor plan 500 is the origin (with an X coordinate of 0 and a Y coordinate of 0). For example, the vertex with a vertex ID of A has a vertex coordinate (X0, Y0, Z1), and therefore is positioned at the origin. Meanwhile, the vertex with a vertex ID of B has a vertex coordinate (X20, Y0, Z1), and therefore is positioned at the upper right vertex of the bath.

FIG. 32 is a diagram showing the configuration of the room information 2900. As shown in FIG. 32, the room information 2900 includes a room ID 2901, the room type 2902, and a room coordinate 2903. The room ID 2901 is an identifier that identifies a room on the floor plan 500. The room type 2902 indicates the type of the room. The room coordinate 2903 is expressed by a set of the vertex IDs 2801, and decides the region of the room on the floor plan 500. For example, the room with a room ID of C is the bath, and indicates a region formed by connecting the vertexes with vertex IDs of A, B, G, and F sequentially in this order on the floor plan 500. The room information 2900 includes not only information on the rooms but also information on the staircase. The region with a room ID of D formed by connecting the vertexes with vertex IDs of H, I, R, and Q sequentially in this order represents the staircase.

Consequently, with the vertex information 2800 and the room information 2900 provided, the home controller 100 can specify the regions of the rooms represented on the floor plan 500 by plotting the vertexes indicated by the vertex information 2800 on the image data for the floor plan 500 and connecting the vertexes indicated by the room coordinate 2903, and recognize the type of the rooms from the room type 2902.

The vertex information 2800 may be generated by a system administrator by causing the floor plan 500 to be displayed on a display of a personal computer, detecting vertexes from the displayed floor plan, and inputting the vertex ID and the vertex coordinate of the detected vertexes to the personal computer. The vertex information 2900 may also be generated by the system administrator by detecting rooms from the floor plan displayed on a display, and inputting the room ID, the room type, and the room coordinate of the detected rooms to a personal computer. Alternatively, the vertex information 2800 and the room information 2900 may be generated by taking in CAD data which are the original data for the floor plan 500.

FIG. 34 is a diagram showing the configuration of the device list 4700 managed by the server 300. As shown in FIG. 34, the device list 4700 includes a device ID 4701, a device type 4702, a model number 4703, an arrangement 4704, a capability information 4705, and a control command transmission destination 4706.

The device ID 4701 is the identifier of the device 200. The device type 4702 indicates the type of the device 200. The model number 4703 indicates the model number of the device 200. The arrangement 4704 is a coordinate represented in the format of (X coordinate, Y coordinate, floor number) as with the vertex coordinate 2802, and indicates the arrangement of the device icon 501 corresponding to the device 200 on the floor plan 500.

The display control section 103 can dispose the device icon 501 on the floor plan 500 on the basis of the arrangement 4704, and display the basic screen and so forth. The capability information 4705 indicates the content for control of the device 200 and the state that can be acquired from the device 200. For example, the air conditioner with a device ID of A can be controlled for the temperature, the air flow direction, and the air flow amount. The control command transmission destination 4706 indicates the transmission destination of a control command for controlling the device 200. For example, the control command transmission destination 4706 for the air conditioner with a device ID of A is the device, and therefore a control command is directly transmitted from the home controller 100 to the device 200. Meanwhile, the control command transmission destination 4706 for the refrigerator with a device ID of C is the server, and therefore a control command is transmitted from the home controller 100 to the device 200 via the server 300. The control command is a command for operating the device 200 or confirming the state of the device 200.

The current state of the device 200 may be registered in the device list 4700. This allows the server 300 to notify the home controller 100 of the state of the relevant device 200 in the case where a request for confirmation of the state of the device 200 is made from the home controller 100.

As discussed above, in order to dispose the device icon 501 on the floor plan 500 on the basis of the actual arrangement of the device 200 within the house, the user moves the device icon 501 to an appropriate position on the floor plan 500. Thus, for the device icon 501 of which the arrangement on the floor plan 500 is not specified by the user, a value that indicates an unset arrangement such as (0, 0, 0) is set as the value of the arrangement 4704. The display control section 103 displays the device icon 501 with the arrangement 4704 unset at a position on the display 101 determined in advance.

The device list 4700 managed by the server may be omitted from the home information 2700. In this case, the home controller 100 may directly acquire from the device 200 information corresponding to the device type 4702, the model number 4703, and the capability information 4705 provided in the device list 4700 managed by the server.

FIG. 35 is a diagram showing the configuration of the device list 3100 managed by the home controller 100. The home controller 100 disposes the device icons 501 on the floor plan 500 in the basic screen and controls the devices 200 on the basis of information in the device list 3100.

The device list 3100 includes the device ID 3101, the device type 3102, a model number 3103, the arrangement 3104, capability information 3105, a control command transmission destination 3106, and an IP address 3107. The device ID 3101 to the control command transmission destination 3106 are the same in content as those with the same name in FIG. 34.

In the device list 3100, the content of the device type 3102, the model number 3103, the arrangement 3104, the capability information 3105, the control command transmission destination 3106 can be acquired by the device management section 105 by transmitting the device list 4700 from the server 300. The IP address 3107 is acquired from the device 200 by the device management section 105. It should be noted, however, that the device management section 105 may give priority to the content of the device type 3102, the model number 3103, the capability information 3105, and the control command transmission destination 3106 that can be directly acquired from the device 200 in the case where such content is available.

The control command transmission destination 3106 may be determined in advance by the home controller system, may be automatically decided on the basis of the state of the network to which the home controller 100 is connected, or may be set by the user, rather than being acquired from the server 300 or the device 200.

Next, the flow of control performed on the device 200 by the home controller 100 will be described using the drawings.

FIG. 36 is a sequence diagram showing the flow of a process for the home controller 100 to acquire the home information 2700 from the server 300. The home controller 100 acquires the home information 2700 from the server 300 at desired timing such as when the home controller 100 is initially utilized or started, and generates the basic screen shown in FIG. 5 on the basis of the acquired home information 2700.

First, the device management section 105 of the home controller 100 transmits a home information request to the server 300 (S3201). Here, the home information request includes at least a home controller ID that indicates a user or a home that utilizes the home controller 100. The home information management section 301 of the server 300 which receives the home information request searches the storage section 304 for the home information 2700 corresponding to the home controller ID (S3202), and transmits the home information 2700 to the home controller 100 (S3203). The device management section 105 of the home controller 100 stores the home information 2700 received from the server 300 in the storage section 104, and the display control section 103 generates a basic screen on the basis of the home information 2700, and displays the basic screen on the display 101 (S3204).

Next, the flow of a process for the home controller 100 to detect the device 200 on the network after the home controller 100 is connected to the network will be described using FIG. 37.

Figure 37:
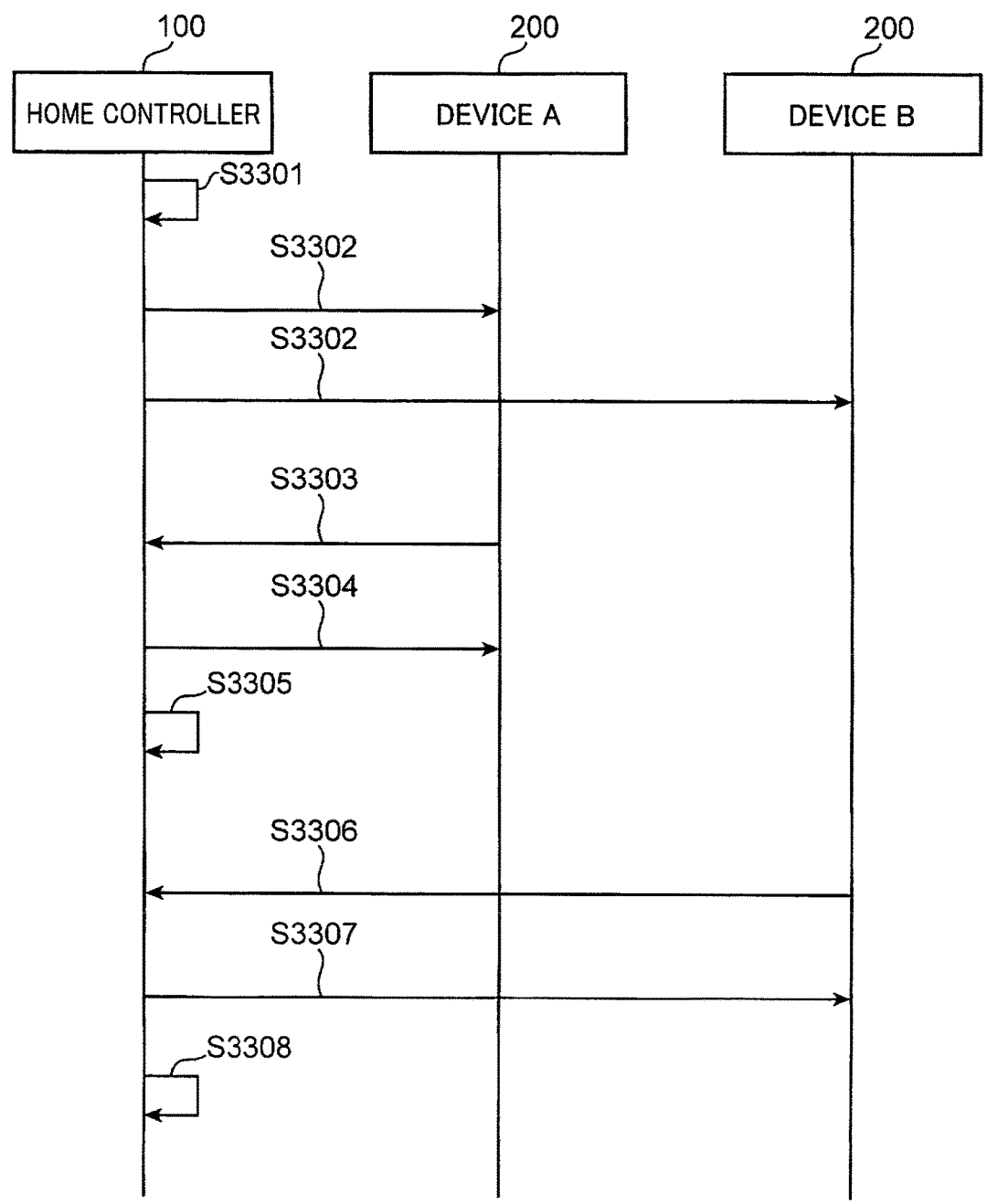
FIG. 37 is a sequence diagram showing the flow of a process for the home controller to detect a device on a network when the home controller is connected to the network according to the present disclosure.

In FIG. 37, a device A 200 with a device ID of A and a device B 200 of a device ID of B shown in FIG. 34 are connected to the network.

When the home controller 100 is connected to the network when the home controller 100 is initially utilized or turned on (S3301), the device management section 105 of the home controller 100 broadcasts a device search request to all the devices 200 on the network (S3302). The device A 200 which receives the device search request returns a device search response to the home controller 100 (S3303). The home controller 100 which receives the device search response acquires device information from the device A 200 (S3304), and updates the display screen (S3305).

Similarly, the device B 200 which receives the device search request returns a device search response to the home controller 100 (S3306). The home controller 100 which receives the device search response acquires device information from the device B 200 (S3307), and updates the display screen (S3308). Here, the device information is information that represents the device type, the model number, the capability information, and so forth of the device 200. The device management section 105 of the home controller 100 generates the device list 3100 (see FIG. 35) on the basis of the device information.

Figure 38:
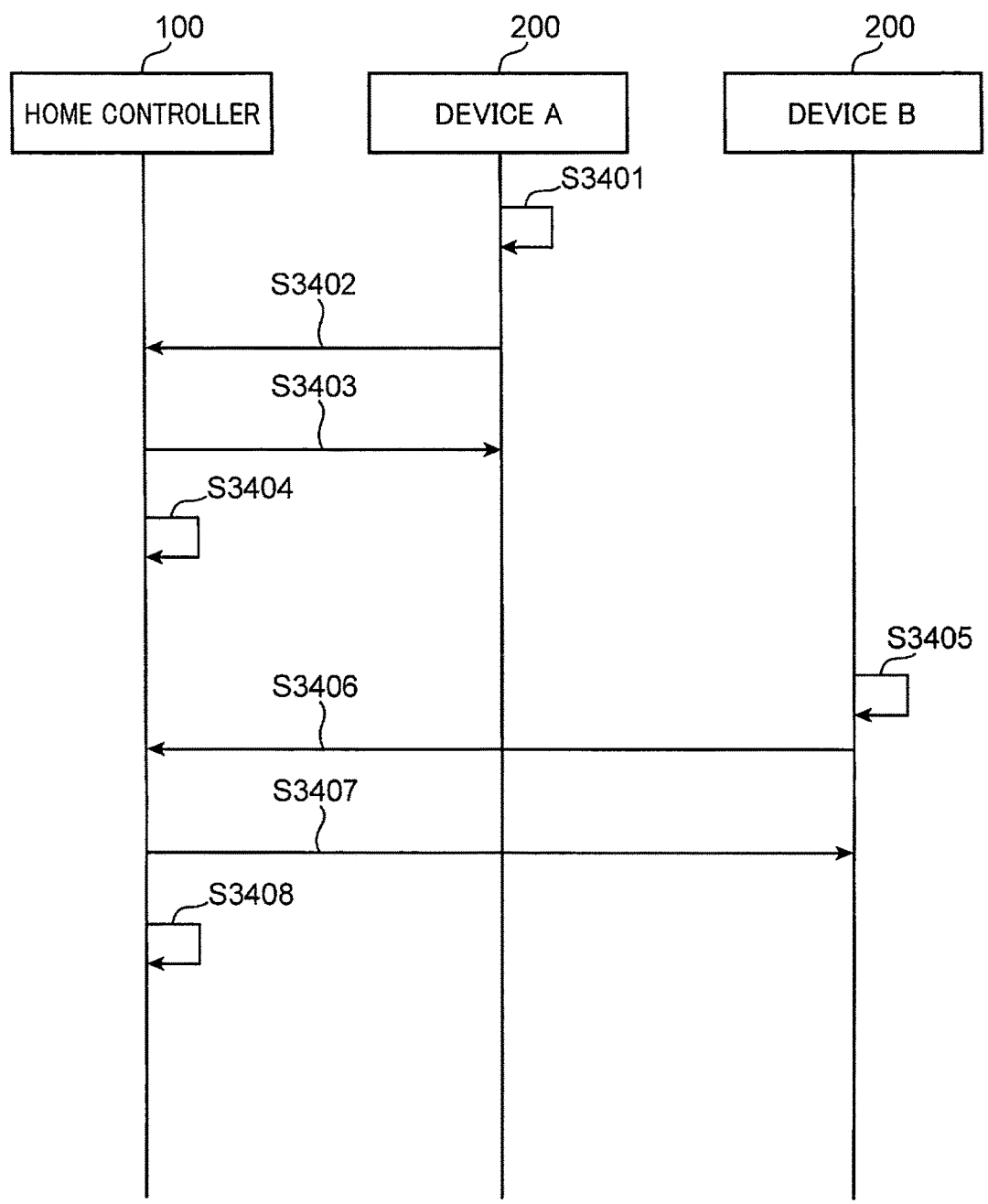
FIG. 38 is a sequence diagram showing the flow of a process for the home controller to detect a device on a network when the device is connected to the network according to the present disclosure.

Next, the flow of a process for the home controller 100 to detect the device 200 on the network when the device 200 is connected to the network will be described using FIG. 38. When the device A 200 is connected to the network when the device A 200 is initially utilized or turned on (S3401), a network connection notification is broadcast to all the home controllers 100 on the network (S3402). In the home controller 100 which receives the network connection notification, the device management section 105 acquires device information from the device A 200 (S3403), and the display control section 103 updates the display screen (S3404). When the device B 200 is connected to the network, the same process as for the device A 200 is performed (S3405 to S3408).

Here, the update of the display screen of the home controller 100 in FIGS. 37 and 38 (S3305, S3308, S3404, and S3408) will be described. The home controller 100 hides the device icon 501 corresponding to the device 200 until the device search response or the network connection notification is received from the device 200, that is, until the device 200 is detected on the network. Then, the home controller 100 which receives the device search response displays the device icon 501 for the corresponding device 200 on the screen. Alternatively, the home controller 100 displays the device icon 501 for the undetected device 200 in a faint color (for example, translucently) compared to the device icon 501 for the detected device 200. Then, the home controller 100 which receives the device search response changes the color of the device icon 501 for the undetected device 200 to the same color as the color of the device icon 501 for the detected device 200.

Figure 39A:
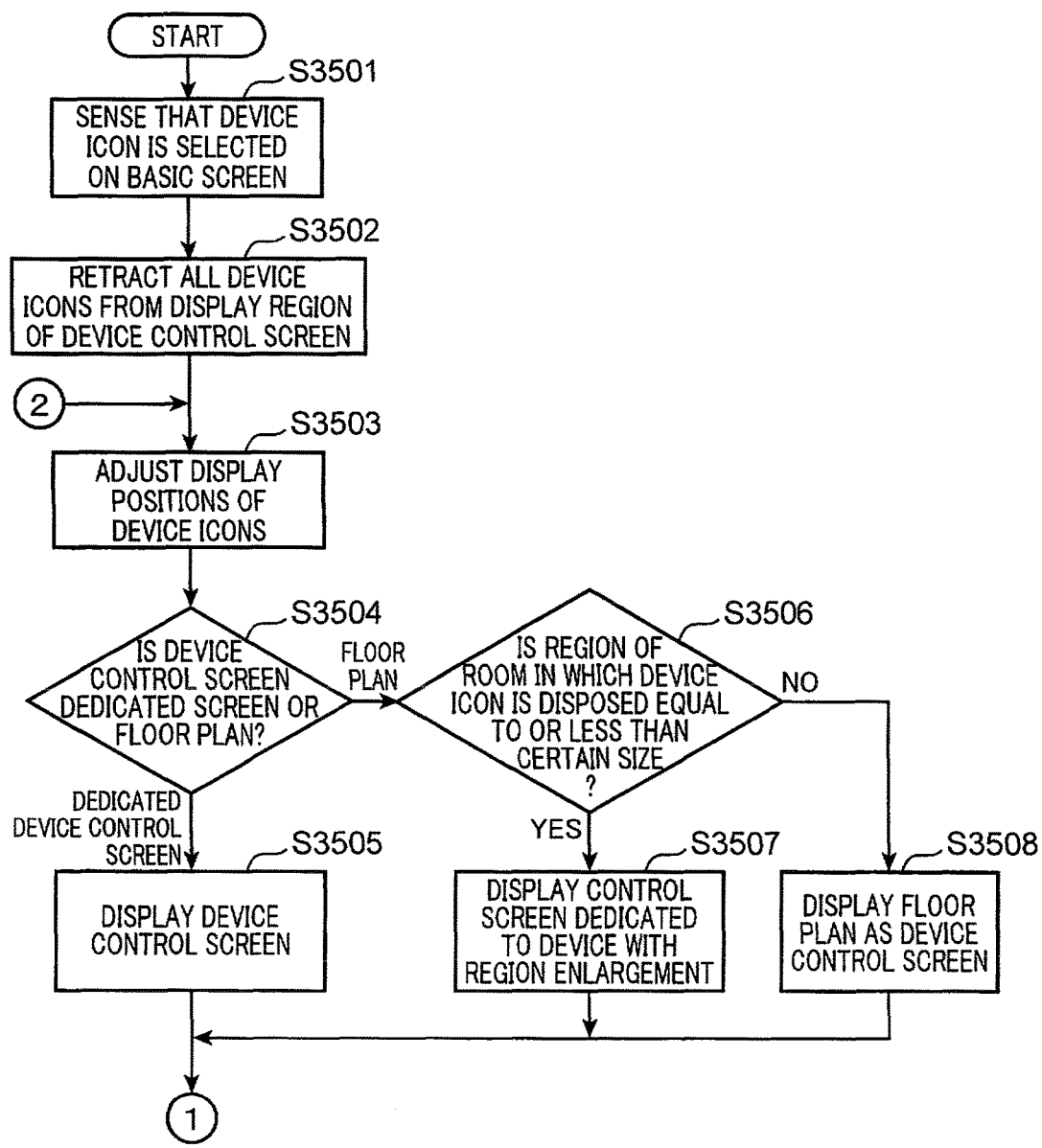
FIG. 39A is a flowchart showing the flow of a process for the home controller to control a device according to the present disclosure.
Figure 39B:
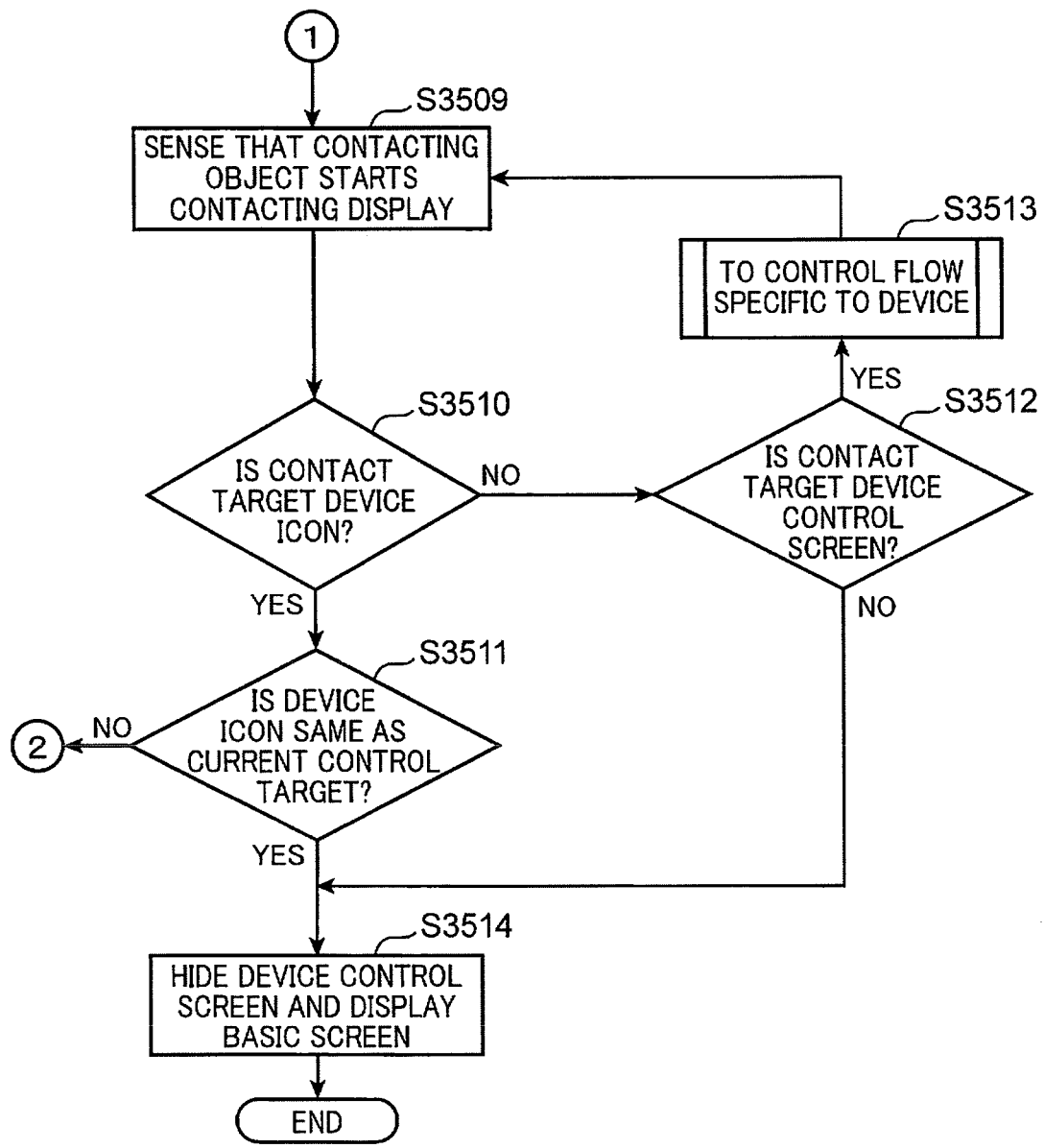
FIG. 39B is a flowchart showing the flow of a process for the home controller to control a device according to the present disclosure.

FIGS. 39A and 39B are each a flowchart showing the flow of a process for the home controller 100 to control the device 200 according to the present disclosure.

First, the touch panel control section 102 senses that the device icon 501 representing a certain device 200 is selected by the user on the basic screen (S3501). Next, the display control section 103 retracts all the device icons 501 out of the display region of the device control screen 502 (S3502). In this case, the device icons 501 are retracted as shown in FIGS. 11 and 13.

Next, the display control section 103 adjusts the display positions of the retracted device icons 501 (S3503). For example, the selected device icons 501 are adjusted so as to be displayed at particular positions as shown in FIGS. 12 and 14.

Next, the display control section 103 judges whether the device control screen 502 corresponding to the device icon 501 selected by the user is a dedicated screen or a floor plan (S3504).

Here, the device control screen 502 which is a dedicated screen refers to the device control screen 502 prepared separately from the floor plan and displayed as overlapped on the floor plan as shown in FIG. 13. On the other hand, the device control screen 502 which is a floor plan refers to the device control screen 502 which is the floor plan itself.

For example, if the illumination device can be turned on and off or adjusted for the brightness by the user by directly tapping on the region of a room on the floor plan in which the illumination device is disposed, the illumination device can be operated with presence. In the case where the user attempts to operate a plurality of illumination devices installed in the living room at the same time, meanwhile, the entire screen is covered by the device control screens 502 dedicated to the illumination devices if the device control screens 502 dedicated to the individual illumination devices are displayed on the floor plan at the same time, which lowers the viewability.

Thus, in the following description, it is assumed that the device control screen 502 for the illumination device is a floor plan. Specifically, when the user selects the device icon 501 for the illumination device installed in a certain room in the basic screen, all the device icons 501 are retracted out of the display region of the floor plan, and the floor plan becomes ready to receive an operation for the illumination device in the room. Then, when the user taps on the region of the room on the floor plan in which the selected illumination device is installed, one or more illumination devices within the room can be operated at the same time.

For example, when the user taps on the region of a room with the illumination devices in the room turned off, one or more illumination devices in the room are turned on at the same time. Next, when the user taps on the region, the one or more illumination devices are turned off at the same time.

In the case where the device control screen 502 is a floor plan in S3504, and if the region of the room in which the device icon 501 is disposed is equal to or less than a certain size (YES in S3506), the display control section 103 causes the device control screen 502 dedicated to the device in which the region of the room is displayed as enlarged to be displayed as overlapped on the floor plan (S3507). Here, for example, a floor plan formed by clipping the floor plan of the relevant room from the floor plan for the entire floor and enlarging the clipped floor plan is displayed as overlapped on the floor plan for the entire floor.

If the region of the room in which the device icon 501 is disposed is not equal to or less than the certain size (NO in S3506), on the other hand, the display control section 103 displays the floor plan as the device control screen 502 (S3508).

Information as to whether a dedicated screen or a floor plan is adopted as the device control screen 502 for each device 200 is stored in advance in the storage section 104. Thus, the display control section 103 may reference the information to determine whether the device control screen 502 is a dedicated screen or a floor plan.

In addition, the display control section 103 may calculate the size of the relevant room by specifying the vertexes of the relevant room from the room information 2900, specifying the coordinates of the specified vertexes from the vertex information 2800, and calculating the area of a region surrounded by the specified coordinates of the vertexes. Then, the result of determination in S3506 may be NO if the size of the room is not equal to or less than the certain size determined in advance, and the result of determination in S3506 may be YES if the size of the room is equal to or less than the certain size.

In the case where the device control screen 502 is a dedicated screen in S3504, on the other hand, the display control section 103 displays the dedicated screen as overlapped on the floor plan (S3505).

In S3509, the touch panel control section 102 senses that a contacting object (here, a finger of the user) starts contacting the display 101.

Next, the touch panel control section 102 determines whether or not the contact target is the device icon 501 (S3510).

If it is determined that the device icon 501 is contacted (YES in S3510), the touch panel control section 102 determines whether or not the contacting object contacts the same device icon 501 as the device icon 501 selected in S3501 (S3511). In the case where it is determined that the contacting object contacts the same device icon 501 as the device icon 501 selected in S3501 (YES in S3511), the display control section 103 hides the device control screen 502 being displayed to display the basic screen (S3514).

In the case where the touch panel control section 102 determines that the device icon 501 is not contacted (NO in S3510), the touch panel control section 102 further determines whether or not the contact target is the device control screen 502 (S3512). In the case where it is determined that the contact target is not the device control screen 502 (NO in S3512), the display control section 103 hides the device control screen 502 being displayed, and the basic screen is displayed (S3514).

If the touch panel control section 102 determines that the contacting object contacts a button or the like within the device control screen 502 (YES in S3512), on the other hand, the process is advanced to S3513, where a control flow that is specific to the device is executed (S3513).

Figure 40:
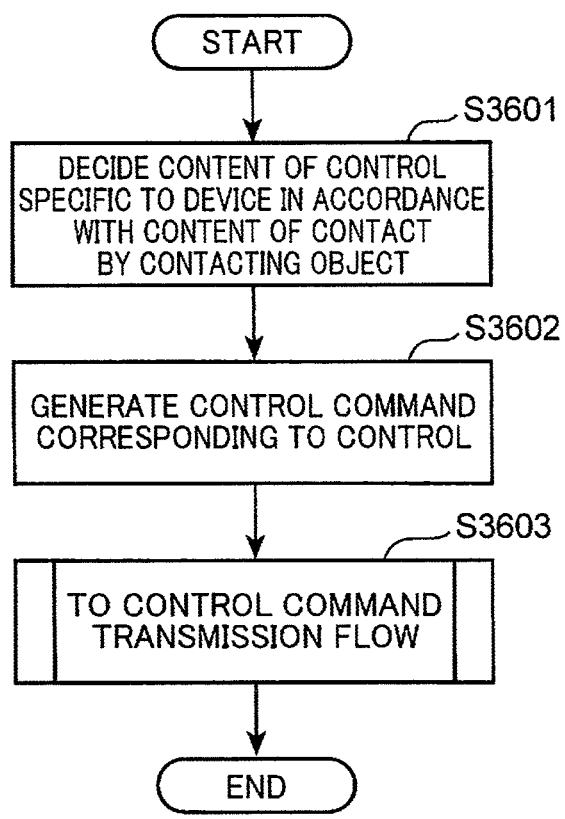
FIG. 40 is a flowchart showing the flow of a process for the home controller to generate a control command for a device in accordance with the content of a contact by a contacting object according to the present disclosure.

Next, the control flow that is specific to the device executed in S3513 will be described in detail using FIG. 40. First, the device control section 106 decides the content of control that is specific to the device in accordance with the content of a contact by the contacting object (S3601). Next, the device control section 106 generates a control command according to the content of control (S3602). It is assumed that the user taps on the button for raising the temperature with the device control screen 502 for the air conditioner displayed as shown in FIG. 11 and the touch panel control section 102 senses the tap. Then, the device control section 106 generates a control command for raising the temperature of the air conditioner. Next, the device control section 106 advances the process to S3603, where a control command transmission flow is executed.

Next, the control command transmission flow executed in S3603 will be described in detail using FIG. 41. First, the device control section 106 determines whether or not the home controller 100 is connected to the home network (S3701). If the home controller 100 is connected to the home controller (YES in S3701), the device control section 106 checks the transmission destination of a control command in accordance with the content of the control command transmission destination 3106 of the device list 3100 (S3702). Here, the home network is a network provided within the home of the user. Thus, the result of determination in S3701 is NO if the user operates the home controller 100 from a location away from the home, and the result of determination in S3701 is YES if the user operates the home controller 100 from a location within the home.

If the transmission destination of a control command is "DEVICE" in S3702, the device control section 106 transmits a control command to the relevant device 200 (S3703). If the transmission destination of a control command is "SERVER" in S3702, on the other hand, the device control section 106 transmits a control command to the server 300 (S3704).

For example, in the device list 3100, the control command transmission destination 3106 of the air conditioner is "DEVICE", and therefore the device control section 106 transmits a control command to the air conditioner. On the other hand, in the device list 3100, the control command transmission destination 3106 of the refrigerator is "SERVER", and therefore the device control section 106 transmits a control command to the server 300.

Meanwhile, in the case where it is judged in S3701 that the home controller 100 is not connected to the home network (NO in S3701), the process in S3704 is performed.

In S3705, the device control section 106 receives the control result from the device 200. Next, in the case where transmission of a control command to all the devices 200 that are operated at the same time is completed (YES in S3706), the device control section 106 advances the process to S3707. In the case where transmission of a control command to all the devices 200 that are operated at the same time is not completed (NO in S3706), on the other hand, the device control section 106 returns the process to S3702, and repeats the processes in and after S3702.

For example, in the case where two illumination devices are installed in the same room and the two illumination devices are set in advance to be operated at the same time, the device control section 106 transmits a control command to each of the two illumination devices. The result of determination in S3706 is NO for devices 200 that are not operated at the same time as other devices 200.

Next, the display control section 103 updates the screen displayed on the display 101 (S3707). For example, if the set temperature of the air conditioner is changed, the device control screen 502 is updated such that the temperature display is flashed on and off, for example, until the set temperature of the air conditioner is changed by a control command and the temperature display stops flashing when the set temperature of the air conditioner is changed by a control command. In the example of the illumination device, the screen is updated such that the region on the floor plan of a room in which the illumination device is installed becomes brighter than other regions in the case where the illumination device is turned on.

Figure 42:
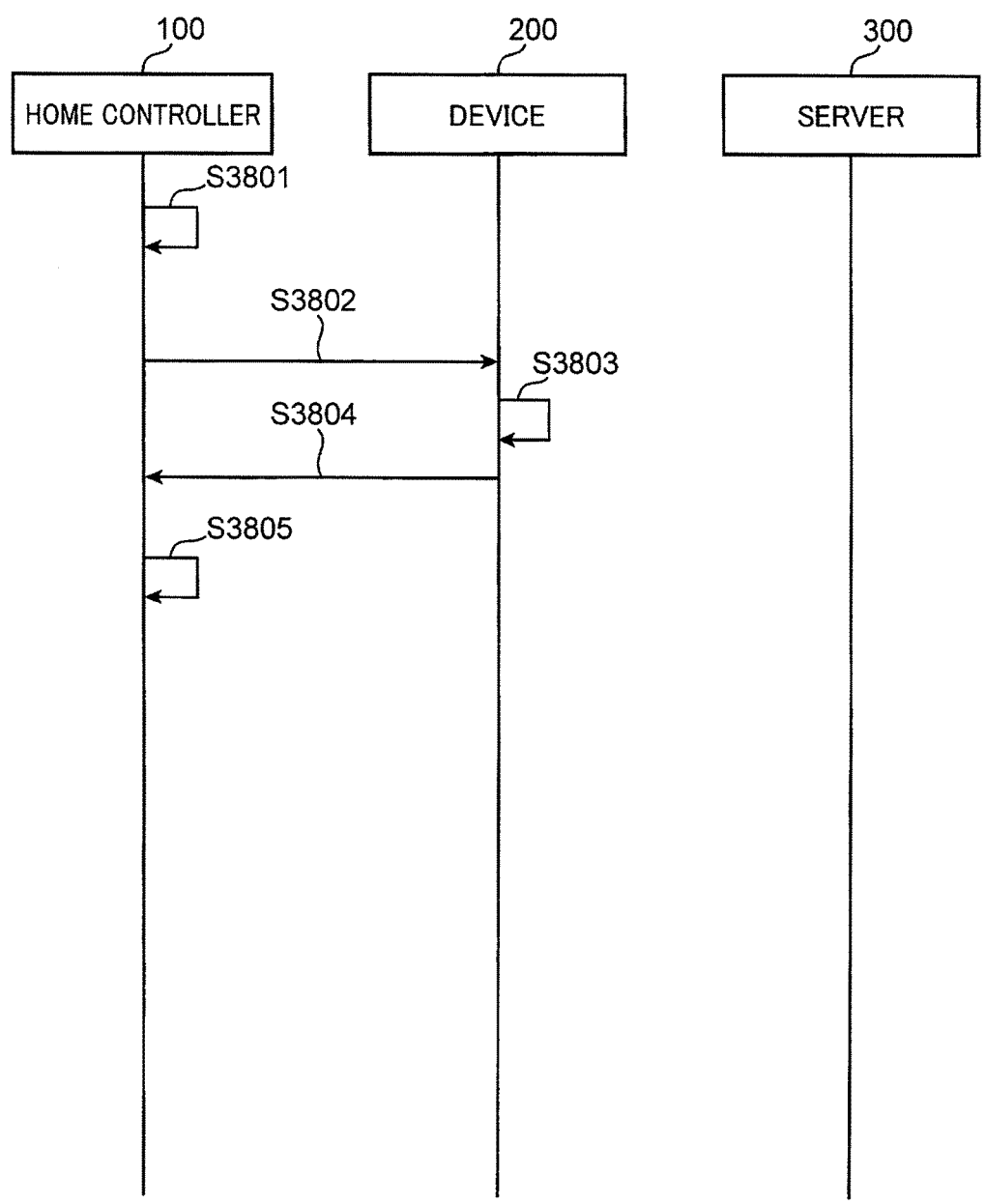
FIG. 42 is a sequence diagram showing the flow of a process for the home controller to directly control a device according to the present disclosure.

Next, the flow of a process for the home controller 100 to directly control the device 200 will be described using FIG. 42. First, the touch panel control section 102 of the home controller 100 senses a user operation on the device control screen 502 (S3801). Next, the device control section 106 of the home controller 100 generates a control command according to the user operation, and transmits the control command to the device 200 (S3802).

The device 200 which receives the control command executes the control command (S3803), and transmits the control result to the home controller 100 (S3804). The display control section 103 of the home controller 100 which receives the control result updates the display screen in accordance with the control result (S3805).

Figure 43:
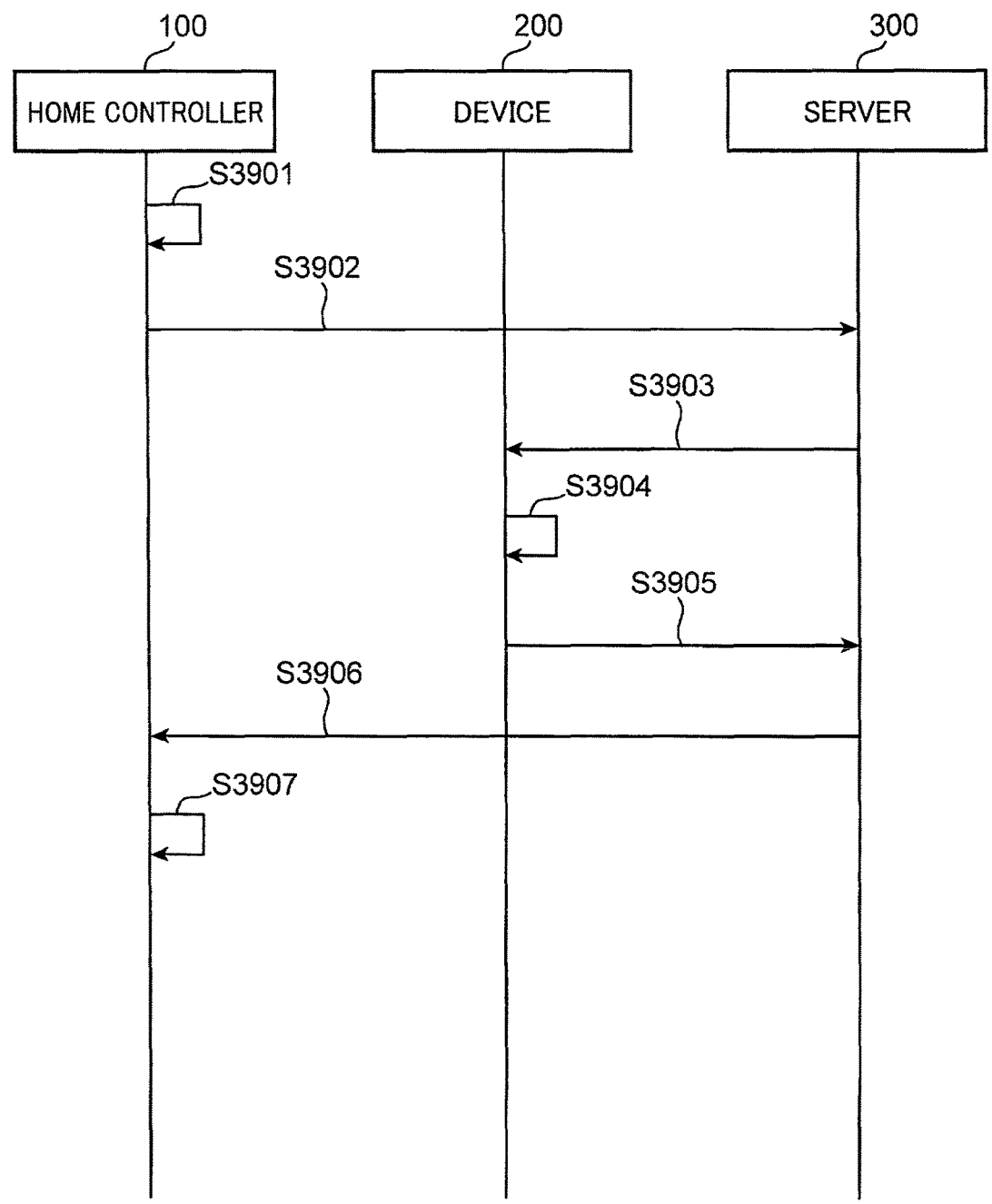
FIG. 43 is a sequence diagram showing the flow of a process for the home controller to control a device by way of the server according to the present disclosure.

Next, the flow of a process for the home controller 100 to control the device 200 by way of the server 300 will be described using FIG. 43. First, the touch panel control section 102 of the home controller 100 senses a user operation on the device control screen 502 (S3901). Next, the device control section 106 of the home controller 100 generates a control command according to the user operation, and transmits the control command to the server 300 (S3902).

The server 300 which receives the control command transmits the relevant control command to the device 200 (S3903). The device 200 which receives the control command executes the control command (S3904), and transmits the control result to the server 300 (S3905). The server 300 which receives the control result transmits the control result to the home controller 100 (S3906). The display control section 103 of the home controller 100 which receives the control result updates the display screen in accordance with the control result (S3907).

Figure 44:
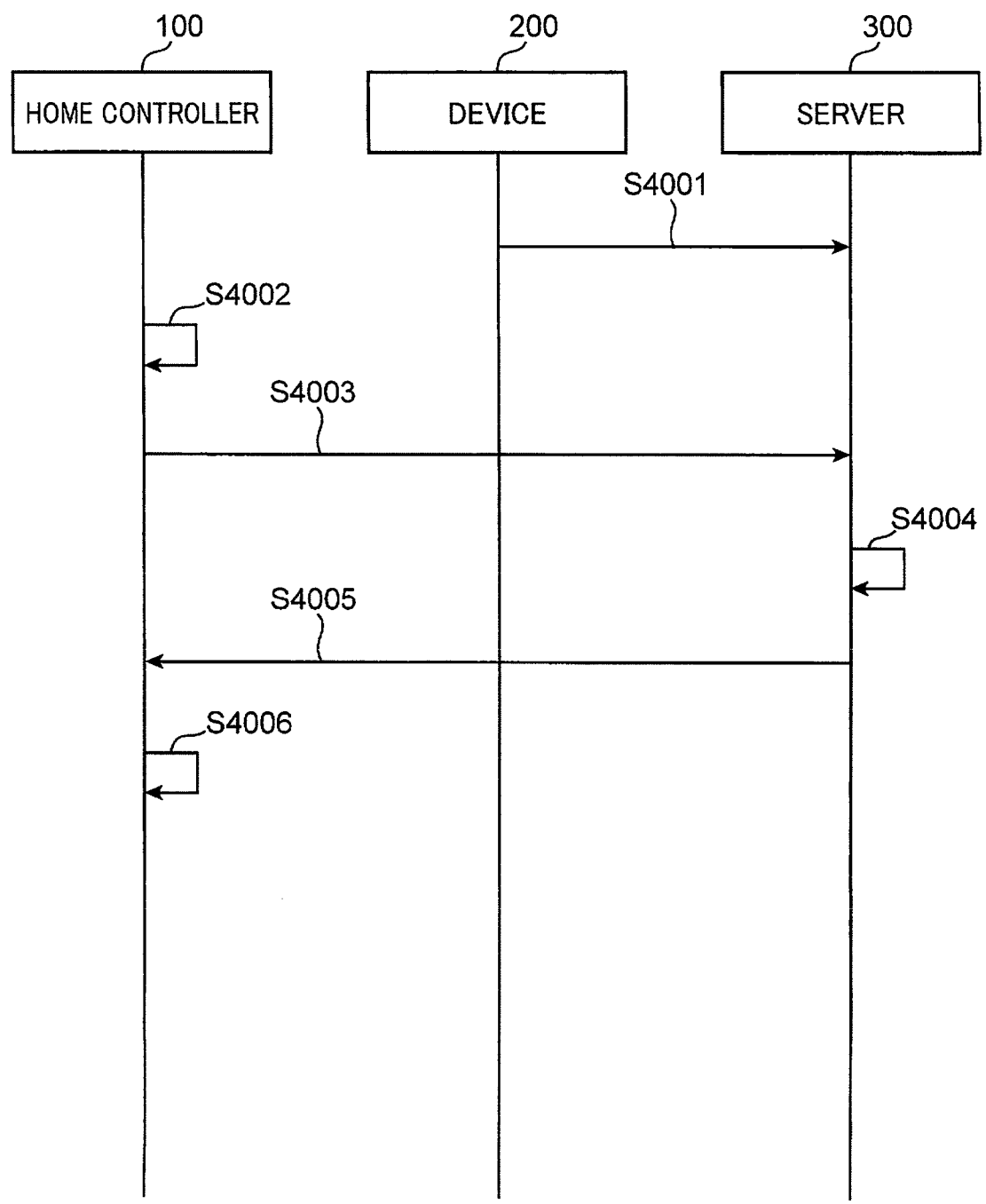
FIG. 44 is a sequence diagram showing the flow of a process for the home controller to acquire the state of a device from the server according to the present disclosure.

Next, the flow of a process for the home controller 100 to confirm the device state of the device 200 by way of the server 300 will be described using FIG. 44. First, the device 200 transmits the current device state to the server 300 (S4001). Here, the device 200 transmits the device state to the server 300 when the device 200 is turned on, when the device 200 is turned off, when the device state is changed, or regularly to cause the server 300 to store the device state. The process in S4001 may be executed asynchronously with the processes in S4002 to S4006.

Next, the touch panel control section 102 of the home controller 100 senses a user operation on the device control screen 502 (S4002). Next, the device control section 106 of the home controller 100 generates a control command according to the user operation, and transmits the control command to the server 300 (S4003). Here, a control command for confirming the device state of the device 200 is generated.

The server 300 which receives the control command searches for the current device state of the relevant device 200 (S4004), and transmits the device state of the relevant device 200 to the home controller 100 as the control result (S4005). The display control section 103 of the home controller 100 which receives the control result updates the display screen in accordance with the control result (S4006). For example, if the device control screen 502 for the device 200 is displayed on the display 101, the content of the device control screen 502 for the device 200 is updated in accordance with the control result.

Figure 45:
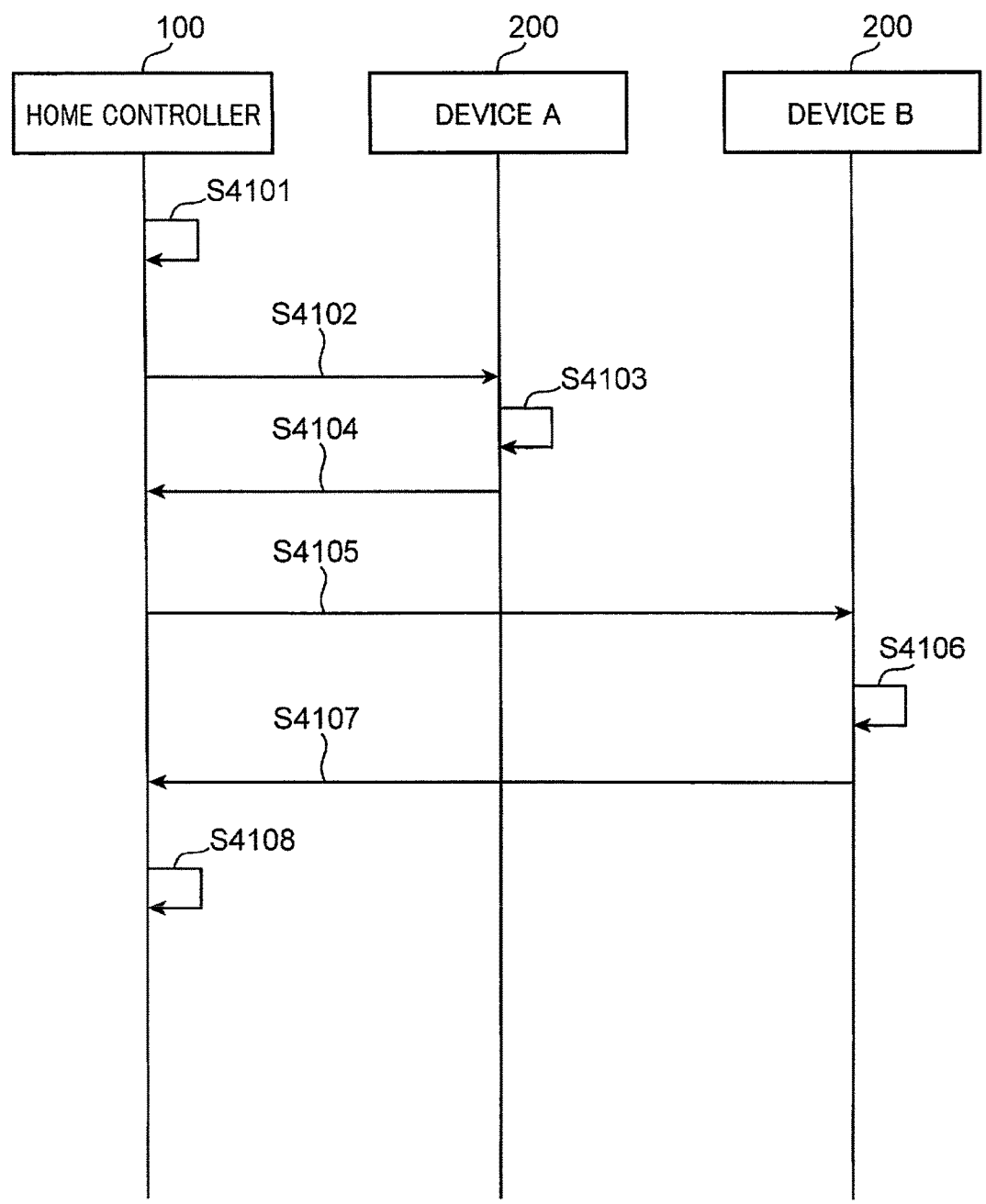
FIG. 45 is a sequence diagram showing the flow of a process for the home controller to directly control devices in the case where the home controller controls a plurality of devices with one operation according to the present disclosure.

Next, the flow of a process for the home controller 100 to directly control the devices 200 in the case where the home controller 100 controls a plurality of devices 200 with one operation will be described using FIG. 45. Here, a case where the home controller 100 controls the device A 200 and the device B 200 is described as an example.

First, the touch panel control section 102 of the home controller 100 senses a user operation on the device control screen 502 (S4101). Next, the device control section 106 of the home controller 100 generates a control command according to the user operation, and transmits the control command to the device A 200 (S4102).

The device A 200 which receives the control command executes the control command (S4103), and transmits the control result to the home controller 100 (S4104).

Next, the device control section 106 of the home controller 100 transmits to the device B 200 a control command that is the same as the control command transmitted to the device A 200 (S4105). The device B 200 which receives the control command executes the control command (S4106), and transmits the control result to the home controller 100 (S4107).

The display control section 103 of the home controller 100 which receives the control result updates the display screen in accordance with the control result (S4108). In this case, for example, if the device control screens 502 for the devices A 200 and B 200 are displayed on the display 101, the content of the device control screens 502 for the devices A 200 and B 200 is updated in accordance with the control result.

Figure 46:
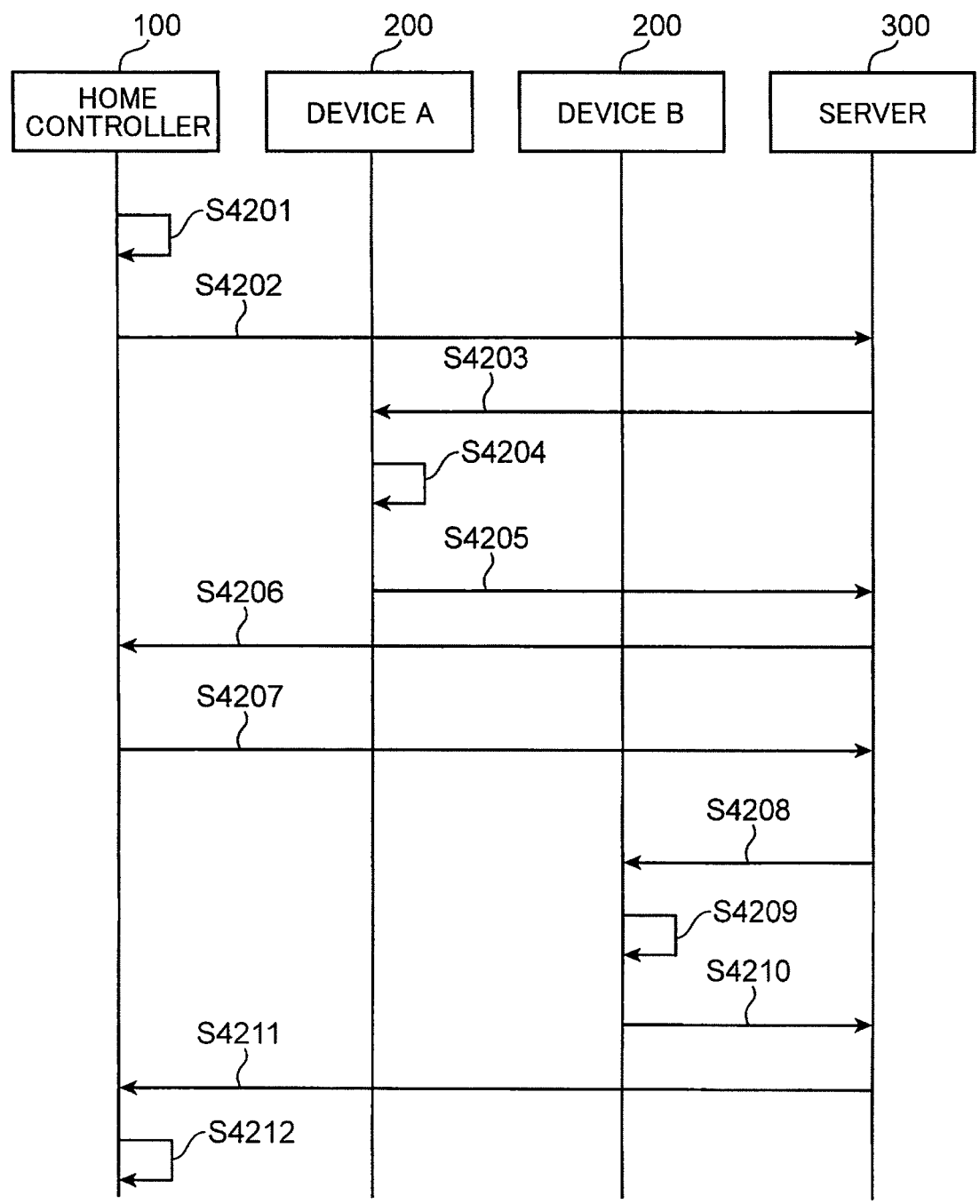
FIG. 46 is a sequence diagram showing the flow of a process for the home controller to control devices by way of the server in the case where the home controller controls a plurality of devices with one operation according to the present disclosure.

Next, the flow of a process for the home controller 100 to control the devices 200 by way of the server 300 in the case where the home controller 100 controls a plurality of devices 200 with one operation will be described using FIG. 46. Here, a case where the home controller 100 controls the device A 200 and the device B 200 is described as an example. In addition, it is assumed that the devices A 200 and B 200 are represented by one device icon 501, and controlled using one device control screen 502.

First, the touch panel control section 102 of the home controller 100 senses a user operation on the device control screen 502 (S4201).

Next, the device control section 106 of the home controller 100 generates a control command for the device A 200 according to the user operation, and transmits the control command to the server 300 (S4202).

The server 300 which receives the control command for the device A 200 transmits the control command to the device A 200 (S4203). The device A 200 which receives the control command executes the control command (S4204), and transmits the control result to the server 300 (S4205). The server 300 which receives the control result transmits the control result to the home controller 100 (S4206).

Similarly, the device control section 106 of the home controller 100 generates a control command for the device B 200 according to the user operation, and transmits the control command to the server 300 (S4207).

The server 300 which receives the control command transmits the control command to the device B 200 (S4208). The device B 200 which receives the control command executes the control command (S4209), and transmits the control result to the server 300 (S4210). The server 300 which receives the control result transmits the control result to the home controller 100 (S4211).

Then, the display control section 103 of the home controller 100 updates the display screen in accordance with the control result (S4212).

Figure 47:
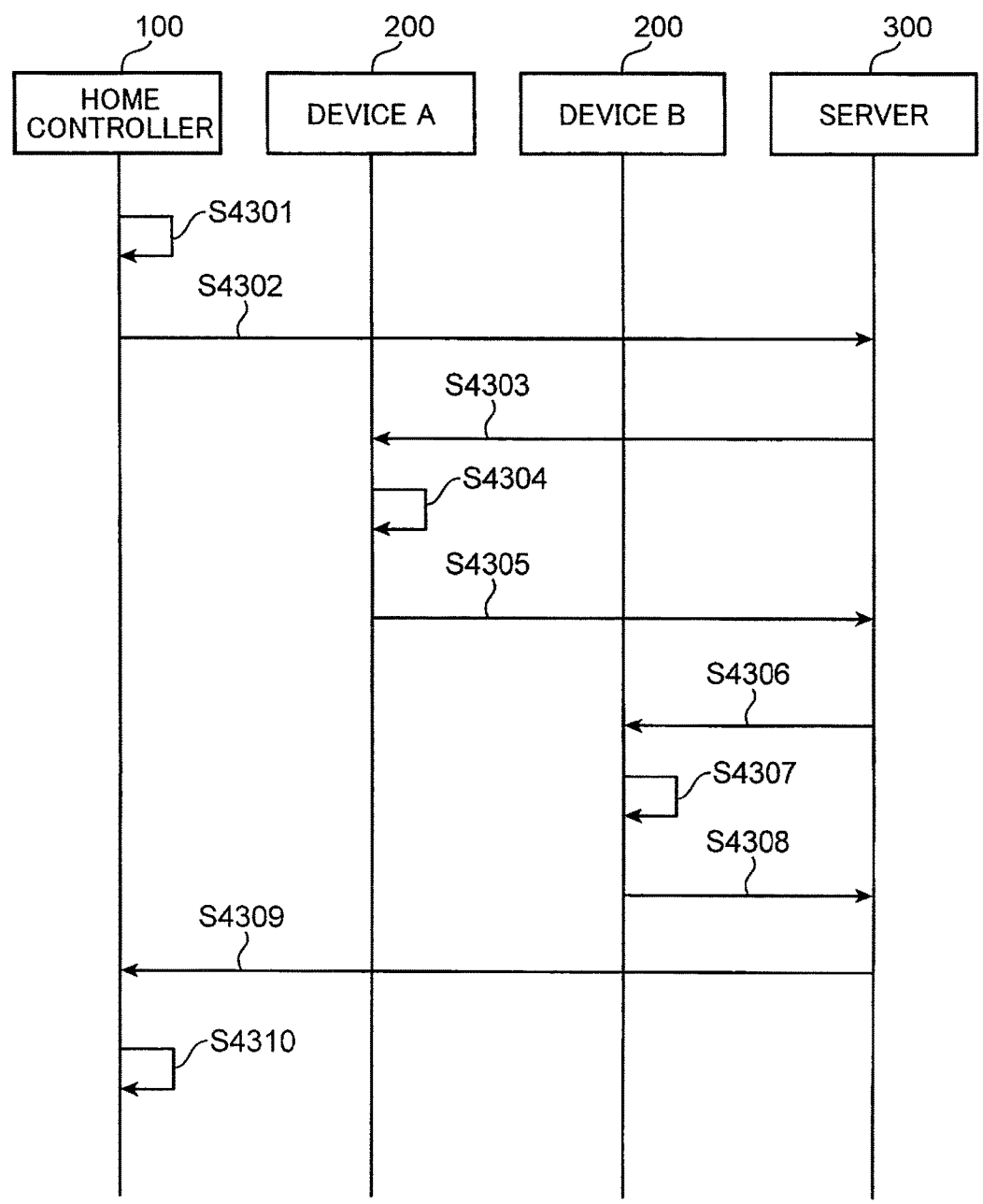
FIG. 47 is a sequence diagram showing the flow of a process for the home controller to control devices by way of the server in the case where the home controller controls a plurality of devices with one operation according to the present disclosure.

Next, the flow of a process for the home controller 100 to control the devices 200 by way of the server 300 in the case where the home controller 100 controls a plurality of devices 200 with one operation will be described using FIG. 47. Here, a case where the home controller 100 controls the device A 200 and the device B 200 is described as an example. In addition, it is assumed that the devices A 200 and B 200 are represented by one device icon 501, and controlled using one device control screen 502.

First, the touch panel control section 102 of the home controller 100 senses a user operation on the device control screen 502 (S4301).

Next, the device control section 106 of the home controller 100 generates a control command for the device A 200 and the device B 200 in accordance with the user operation, and transmits the control command to the server 300 (S4302).

The server 300 which receives the control command transmits the control command to the device A 200 (S4303). The device A 200 which receives the control command executes the control command (S4304), and transmits the control result to the server 300 (S4305).

Similarly, the server 300 transmits the control command to the device B 200 (S4306). The device B 200 which receives the control command executes the control command (S4307), and transmits the control result to the server 300 (S4308). The server 300 which receives the control result for the device A 200 and the device B 200 transmits the control result to the home controller 100 (S4309).

Then, the display control section 103 of the home controller 100 updates the display screen in accordance with the control result (S4310).

Figure 48:
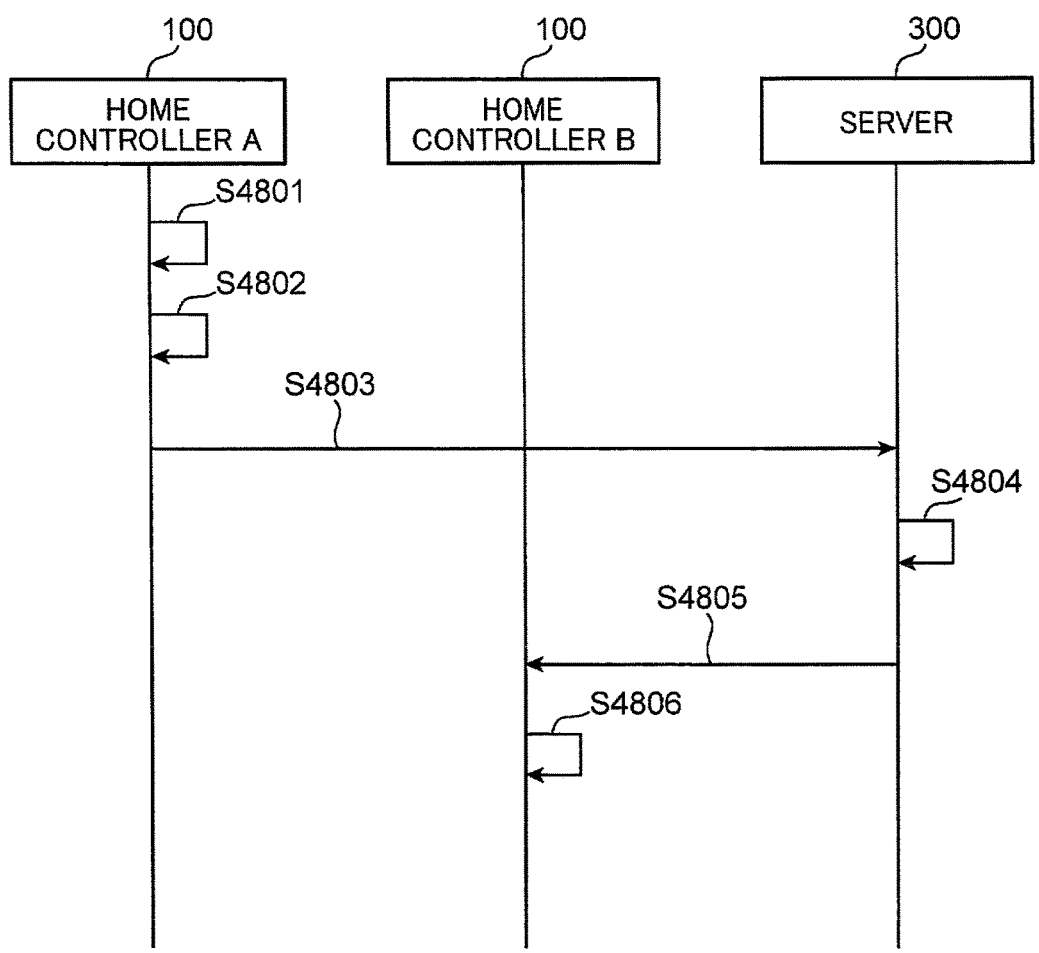
FIG. 48 is a sequence diagram showing the flow of a process for a case where a device icon is moved in the home controller according to the present disclosure.

Next, the flow of a process for a case where the device icon 501 is moved in the home controller 100 will be described using FIG. 48. Here, it is assumed that the user owns two home controllers A 100 and B 100.

When the touch panel control section 102 of the home controller A 100 senses movement of the device icon 501 (S4801), the display control section 103 updates the display screen (S4802). Here, the display control section 103 displays the device icon 501 moved in accordance with the amount of a drag performed on the device icon 501 by the user.

The device management section 105 of the home controller A 100 transmits to the server 300 a device list update notification including the coordinate on the floor plan 500 after the drag (S4803). Here, the device management section 105 of the home controller A 100 updates the content of the arrangement 3104 of the relevant device 200 in the device list 3100 managed by the device management section 105 itself with the coordinate after the drag.

The server 300 which receives the device list update notification updates the device list 4700 (S4804). In this case, the home information management section 301 of the server 300 updates the content of the arrangement 4704 of the relevant device 200 in the device list 4700 with the coordinate included in the device list update notification.

Subsequently, the server 300 transmits the device list update notification to the home controller B 100 (S4805). The home controller B 100 which receives the device list update notification updates the display screen (S4806). Here, the device management section 105 of the home controller B 100 updates the content of the arrangement 3104 of the relevant device 200 in the device list 3100 managed by the device management section 105 itself with the coordinate included in the device list update notification.

The device icon 501 is disposed at an appropriate position on the floor plan 500 through the process described above. Because the home controller B 100 is notified of the update of the arrangement position of the device icon 501 performed by the home controller A 100 by way of the server 300, the arrangement position of the device icon 501 after the update is shared among the home controllers A 100 and B 100 and the server 300. Therefore, it is possible to avoid trouble in which the arrangement position of the device icon 501 is different between the home controller A 100 and the home controller B 100.

Figure 49:
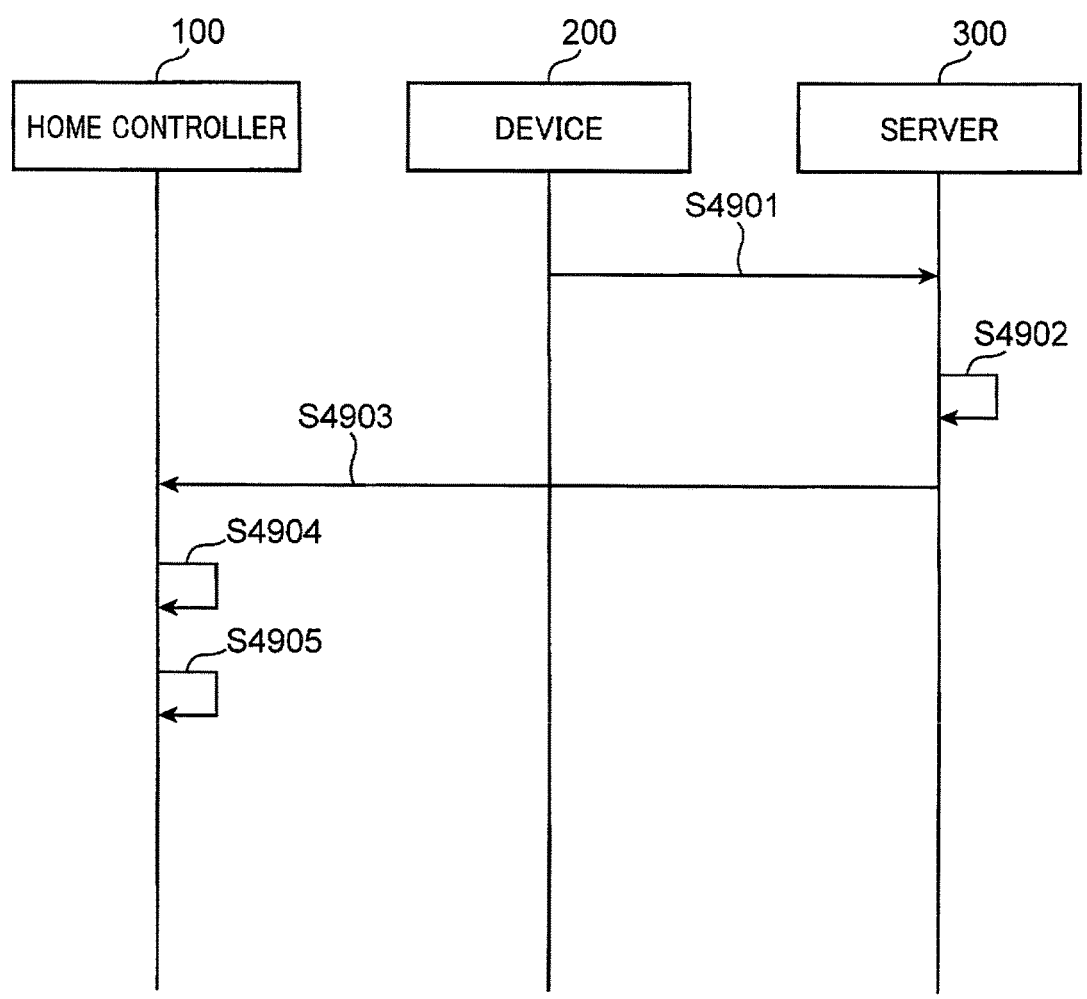
FIG. 49 is a sequence diagram showing the flow of a process for updating the device lists of the home controller and the server according to the present disclosure.

Next, an example of a process for updating the device lists of the home controller 100 and the server 300 will be described using FIG. 49. The device 200 transmits the device state indicating the current state of the device 200 itself to the server 300 (S4901). Here, the device 200 may regularly transmit the device state, or may transmit the device state when the state is varied. The server 300 updates the device list 4700 in accordance with the content of the received device state (S4902). Here, in the case where the device list 4700 does not contain information on the device 200, the server 300 adds information on the device 200 as a new device. Then, the server 300 transmits a device list update notification to the home controller 100 (S4903). The device management section 105 of the home controller 100 updates the device list 3100 in accordance with the content of the received device list update notification (S4904). Here, in the case where the device list 3100 does not contain information on the device 200, the device management section 105 adds information on the device 200 as a new device. Then, the display control section 103 of the home controller 100 updates the display screen (S4905).

Consequently, the server 300 is notified of variation in state of the device 200, which allows the server 300 to monitor variation in state of the device 200. The server 300 to which the device state is transmitted from the device 200 notifies the home controller 100 of variation in state of the device 200, which allows the home controller 100 to recognize the current state of the device 200. In the case where a new device 200 is connected to the home network, the server 300 and the home controller 100 can add the new device. Hence, it is possible to prevent occurrence of deviation between the actual state of the device 200 and the state of the device 200 recognized by the home controller 100.

Figure 50:
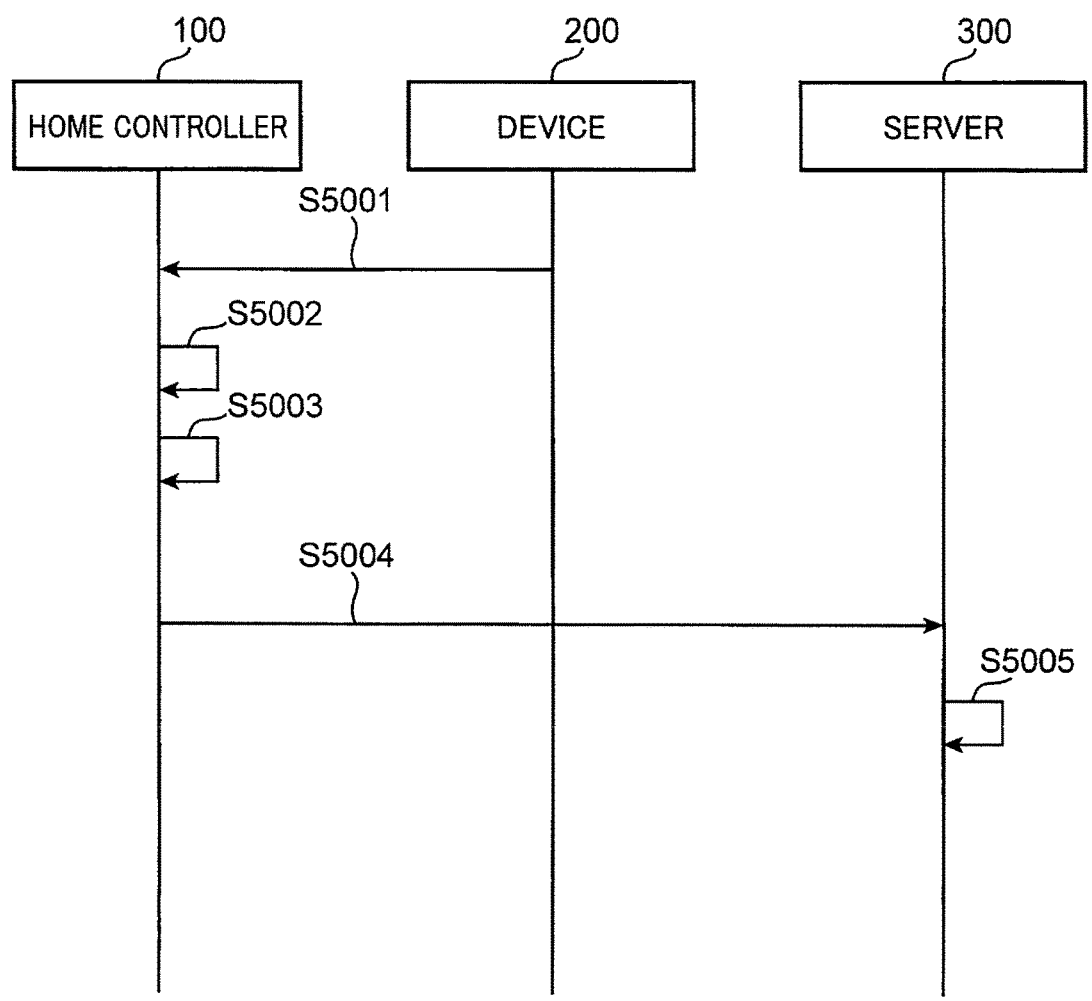
FIG. 50 is a sequence diagram showing the flow of a process for updating the device lists of the home controller and the server according to the present disclosure.

Next, another example of the process for updating the device lists of the home controller 100 and the server 300 will be described using FIG. 50. The device 200 transmits the device state to the home controller 100 (S5001). Here, the device 200 may regularly transmit the device state, or may transmit the device state when the state is varied.

The device management section 105 of the home controller 100 updates the device list 3100 in accordance with the content of the received device state (S5002). Here, in the case where the device list 3100 does not contain information on the device 200, the device management section 105 adds information on the device 200 as a new device. Then, the display control section 103 updates the display screen (S5003). Then, the device management section 105 of the home controller 100 transmits a device list update notification to the server 300 (S5004). The server 300 updates the device list 4700 in accordance with the received device list update notification (S5005). Here, in the case where the device list 4700 does not contain information on the device 200, the server 300 adds information on the device 200 as a new device.

Figure 51:
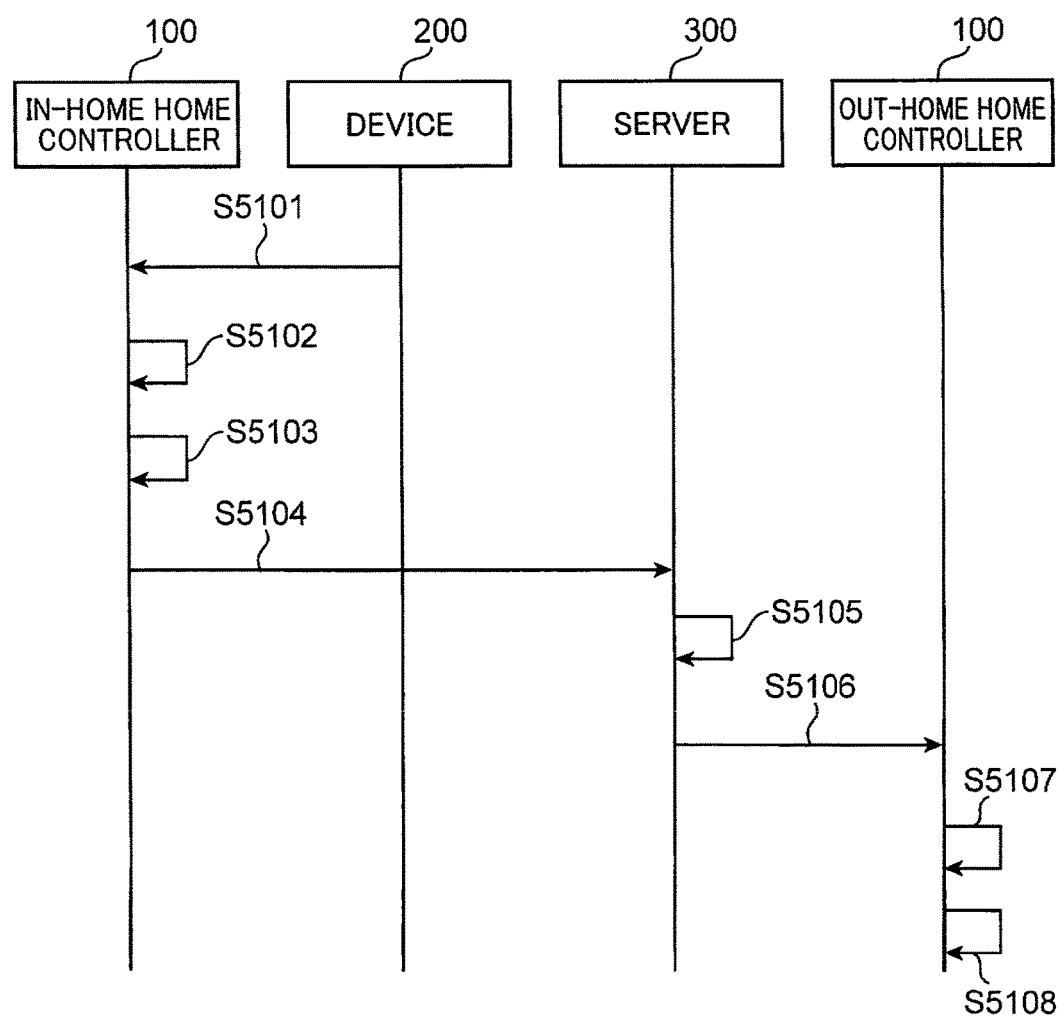
FIG. 51 is a sequence diagram showing the flow of a process for updating the device lists of the home controller and the server according to the present disclosure.

Next, still another example of a process in which the home controller 100 and the server 300 update the device list will be described using FIG. 51. In FIG. 51, a case where the user owns two home controllers 100, namely an in-home home controller 100 and an out-home home controller 100, is described as an example. Here, the out-home home controller 100 is a home controller 100 taken away from the home by the user, and the in-home home controller 100 is a home controller 100 kept at the home by the user.

The device 200 transmits the device state to the in-home home controller 100 (S5101). The in-home home controller 100 updates the device list 3100 in accordance with the content of the received device state (S5102). Here, in the case where the device list 3100 does not contain information on the device 200, the device management section 105 adds information on the device 200 as a new device. Then, the display screen is updated (S5103). Then, the in-home home controller 100 transmits a device list update notification to the server 300 (S5104).

The server 300 updates the device list 4700 in accordance with the content of the received device list update notification (S5105). Here, in the case where the device list 4700 does not contain information on the device 200, the server 300 adds information on the device 200 as a new device. Then, the server 300 transmits a device list update notification to the out-home home controller 100 (S5106). The out-home home controller 100 updates the device list 3100 in accordance with the content of the received device list update notification (S5107). Here, in the case where the device list 3100 does not contain information on the device 200, the device management section 105 of the out-home home controller 100 adds information on the device 200 as a new device. Then, the display screen is updated (S5108).

According to the example, even in the case where one home controller 100 is located away from the home and the other home controller 100 is located in the home, it is possible to prevent occurrence of deviation between the states of the device 200 recognized by the two home controllers 100.

The sequences and the process flows described above are merely exemplary, and the order of the steps may be changed and some of the steps may be omitted as long as the intended process may be embodied. For example, a control command may be transmitted to the device A 200 and the device B 200 asynchronously.

In the foregoing description, a plan view that planarly represents the position and the shape of rooms forming each floor is adopted as the floor plan 500. However, the present disclosure is not limited thereto, and a diagram that schematically shows how many rooms of what type are located on each floor may be adopted as the floor plan.

Figure 52:
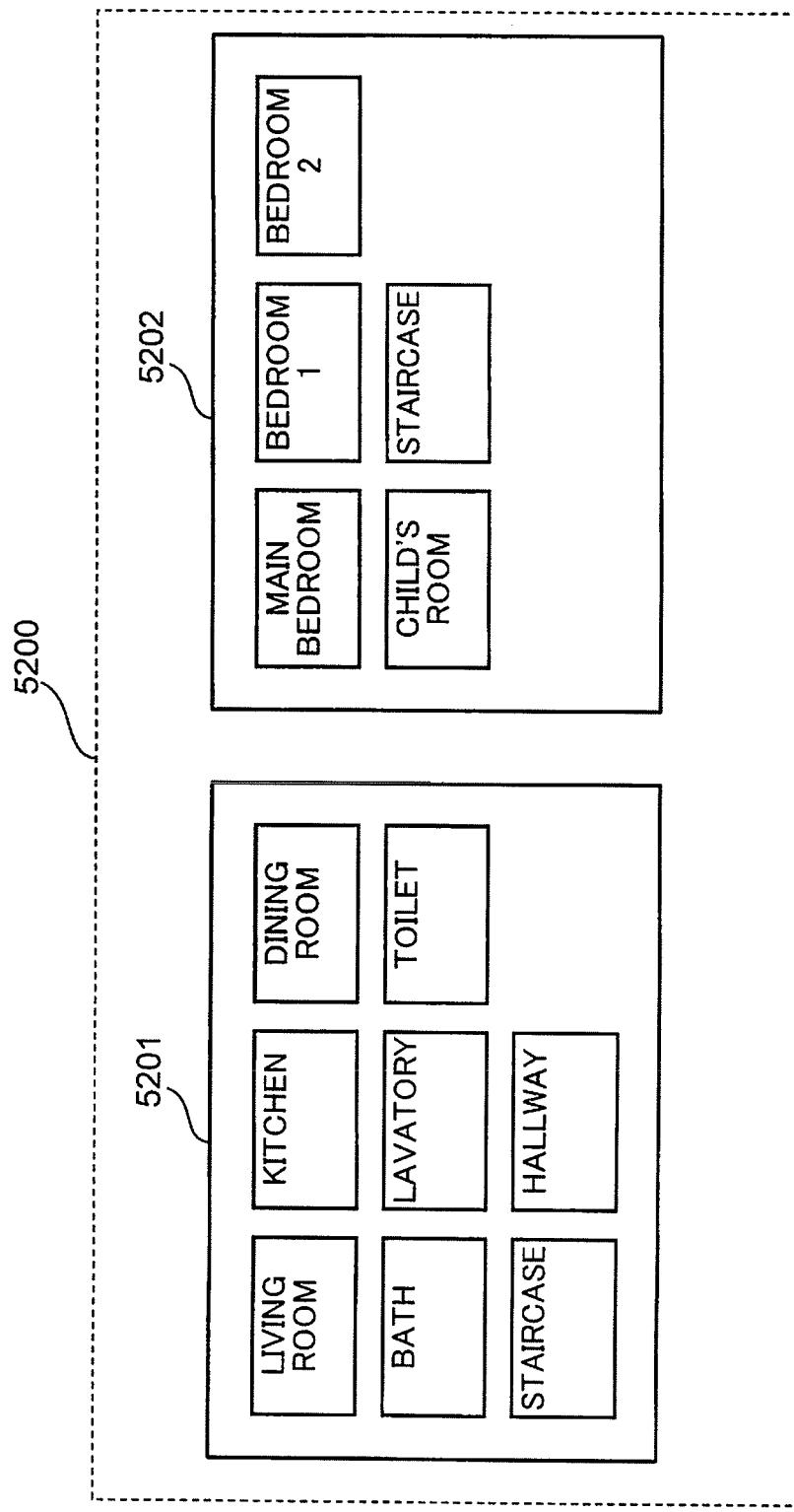
FIG. 52 is a diagram showing a floor plan in another pattern according to the present disclosure.

Floor plans in other patterns will be specifically described below. FIG. 52 is a diagram showing a floor plan 5200 in another pattern. In the floor plan 5200, rooms forming one floor are each represented by one rectangular block, and the rooms on the one floor are disposed in a matrix. The blocks have the same size, and are each provided with the name of the room.

In the floor plan 5200, the name and the number of the rooms forming each floor are indicated, but the relative size and the position in the floor of the rooms are not represented. In the present disclosure, such a diagram is treated as the floor plan 5200. That is, in the present disclosure, any diagram that represents at least what rooms are provided on each floor are treated as the floor plan.

For example, it is seen that a floor plan 5201 for the first floor includes rooms such as a living room, a kitchen, a dining room, a bath, a lavatory, a toilet, a staircase, and a hallway. Meanwhile, it is seen that a floor plan 5202 for the second floor includes rooms such as a main bedroom, a bedroom 1, a bedroom 2, a child's room, and a staircase.

The user can drag and move a desired room on the floor plan 5200 to change the position of the room on the floor plan 5200. In the case where a large number of devices 200 are disposed within a room and all the device icons 501 cannot be displayed within the room on the floor plan 5200 using a default room size, the display control section 103 may increase the size of the room such that all the device icons 501 can be accommodated within the room.

Figure 53:
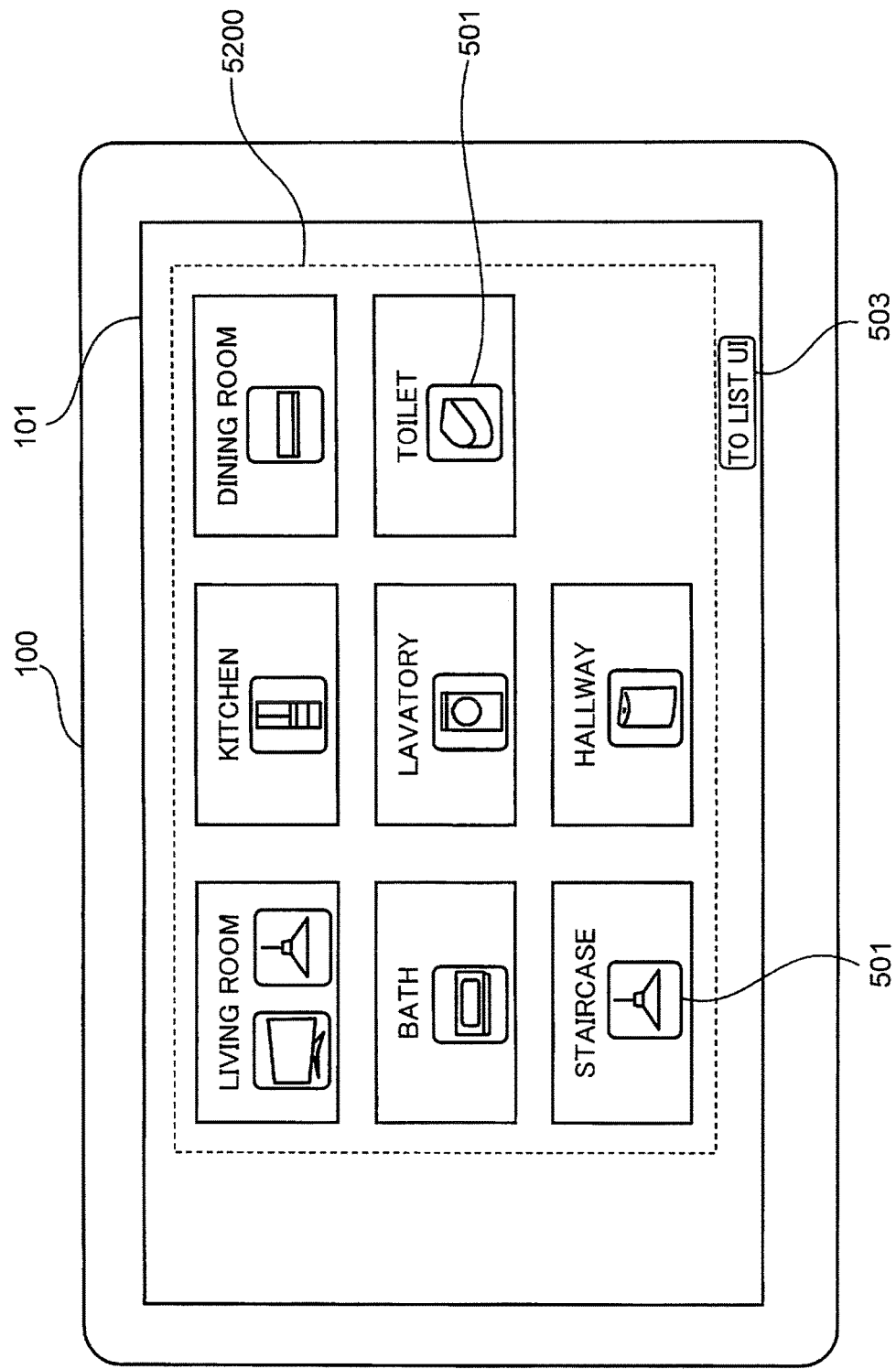
FIG. 53 is a diagram showing the configuration of a basic screen that adopts the floor plan shown in FIG. 52.

FIG. 53 is a diagram showing the configuration of a basic screen that adopts the floor plan 5200. The floor plan 5200 is displayed on the basic screen. In addition, the device icons 501 for the devices 200 actually disposed are displayed within each room.

For example, the device icons 501 for the television set and the illumination device are displayed in the living room, and therefore it is seen that the television set and the illumination device are installed in the living room.

The device list display change button 503 is a button for switching the screen display from the basic screen to the device list display screen discussed earlier (see FIG. 24).

Figure 54:
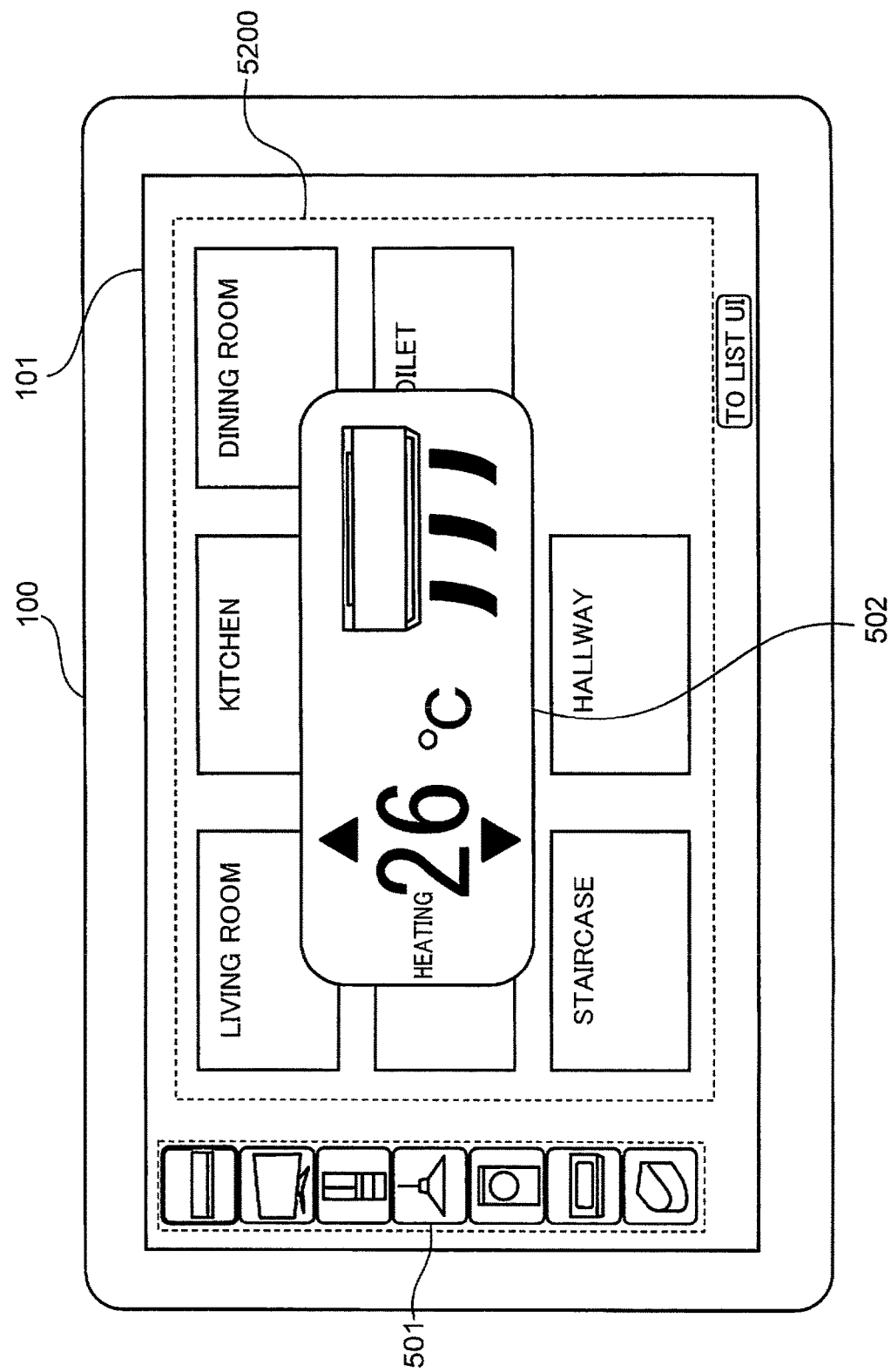
FIG. 54 is a diagram showing the display state of a device control screen for a case where the floor plan shown in FIG. 52 is adopted.

FIG. 54 is a diagram showing the display state of the device control screen 502 for a case where the floor plan 5200 shown in FIG. 52 is adopted. In the basic screen shown in FIG. 53, when the touch panel control section 102 senses that the user selects the device icon 501, the display control section 103 causes the display 101 to display the device control screen 502 corresponding to the selected device icon 501. In FIG. 54, the device icon 501 for the air conditioner is selected, and therefore the device control screen 502 for the air conditioner is displayed as overlapped on the floor plan 5200.

In displaying the device control screen 502, the display control section 103 disposes the device icons 501 displayed on the floor plan 5200 outside the display region of the device control screen 502. In the example of FIG. 54, all the device icons 501 are disposed in one vertical line on the left side of the floor plan 5200.

In disposing the device icons 501 in one vertical line on the left side of the floor plan 5200, the display control section 103 may group the device icons 501 under particular conditions. For example, the device icons 501 may be grouped in accordance with the room, may be grouped in accordance with the type of the device 200, or may be grouped in accordance with the category based on the type of the device 200.

In the example of FIG. 54, the device icons 501 are disposed on the left side of the floor plan 5200. However, the device icons 501 may be disposed in one vertical line on the right side of the floor plan 5200, or may be disposed in one horizontal line on the upper or lower side of the floor plan 5200.

In the case where all the device icons 501 cannot be displayed on the left side of the floor plan 5200, the display control section 103 may scroll the device icons 501 upward or downward in accordance with a swipe operation performed upward or downward on the device icons 501 disposed in one line on the left side to cause the device icons 501, which have been hidden, to be displayed within the display 101.

In disposing the device icons 501 in one vertical line on the left side of the floor plan 5200, the display control section 103 may display the device icon 501 selected by the user in a display mode that is different from that for the unselected device icons 501. For example, the selected device icon 501 may be displayed in a color that is different from that of the unselected device icons 501, may be displayed more brightly than the unselected device icons 501, may be displayed more densely than the unselected device icons 501, or may be flashed on and off at a constant cycle.

The display control section 103 may scroll an array of the device icons 501 such that the device icon 501 selected by the user is positioned at a conspicuous position (for example, the top, middle, or bottom position) in the line of icons.

In displaying the device control screen 502, the display control section 103 may dispose all the device icons 501 on the outer periphery of an ellipse as shown in FIG. 12.

Next, transition between the display state of the basic screen and the display state of the device control screen 502 will be described using FIG. 55.

Figure 55:
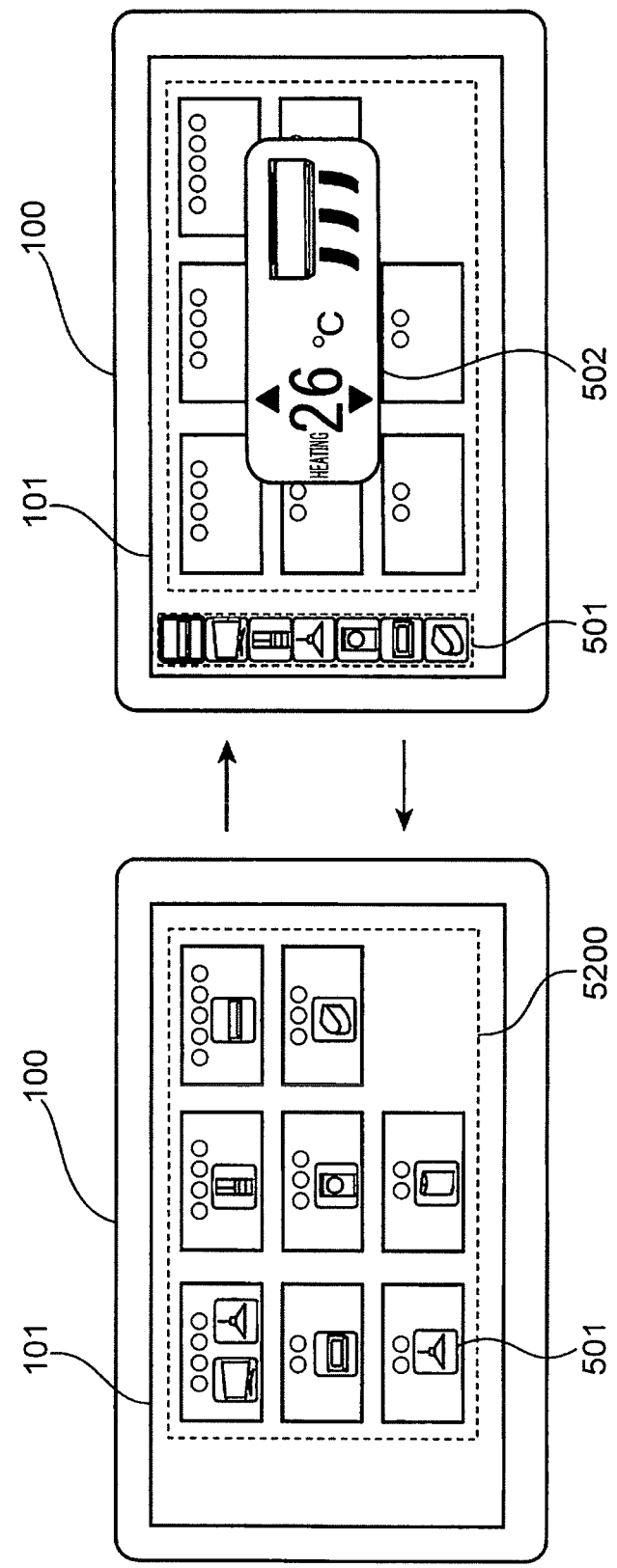
FIG. 55 is a diagram illustrating transition between the display state of the basic screen and the display state of the device control screen.

In the basic screen shown in the left diagram of FIG. 55, the user selects the device icon 501 for the device 200 (here, the air conditioner) that is desired to be controlled, and the touch panel control section 102 senses the selection. Then, as shown in the right diagram of FIG. 55, the display control section 103 displays the device control screen 502 corresponding to the selected device icon 501 as overlapped on the floor plan 5200. This results in transition from the display state of the basic screen to the display state of the device control screen 502.

On the other hand, as shown in the right diagram of FIG. 55, in the display state of the device control screen 502, the user selects the device icon 501 for the air conditioner corresponding to the device control screen 502 or a location outside the display region of the device control screen 502 (for example, the display region of the floor plan 5200 outside the display region of the device control screen 502), and the touch panel control section 102 senses the selection. Then, as shown in the left diagram of FIG. 55, the display control section 103 erases the device control screen 502, and returns from the display state of the device control screen 502 to the display state of the basic screen.

Figure 56:
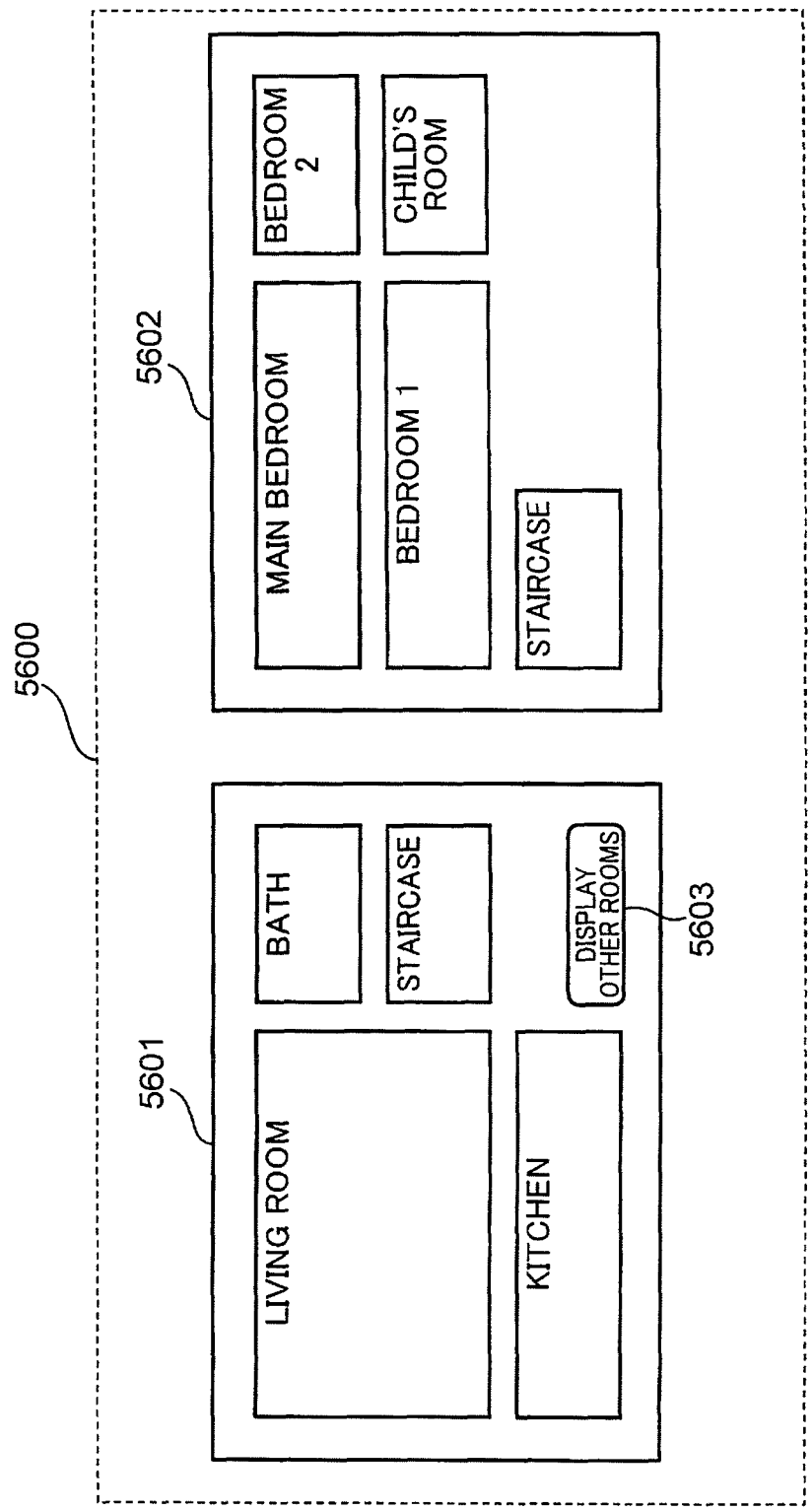
FIG. 56 is a diagram showing the configuration of a floor plan in which the size of each room is varied in accordance with the actual room size in the floor plan shown in FIG. 52.

FIG. 56 is a diagram showing the configuration of a floor plan 5600 for a case where the size of each block is varied in accordance with the actual room size in the floor plan 5200 shown in FIG. 52.

In the left diagram of FIG. 56, a floor plan 5601 for the first floor is shown. In the right diagram of FIG. 56, a floor plan 5602 for the second floor is shown.

In the floor plan 5601 for the first floor, the living room is the largest in terms of the room size, and is followed by the kitchen, the bath, and the staircase. Therefore, the sizes of the rooms are displayed in this order. Also in the floor plan 5602 for the second floor, the rooms are represented in accordance with the actual room size. In this case, information that indicates the actual room size may be registered in advance in room information 6800 to be discussed later, and the display control section 103 may decide the size of each room in accordance with the information.

Figure 57:
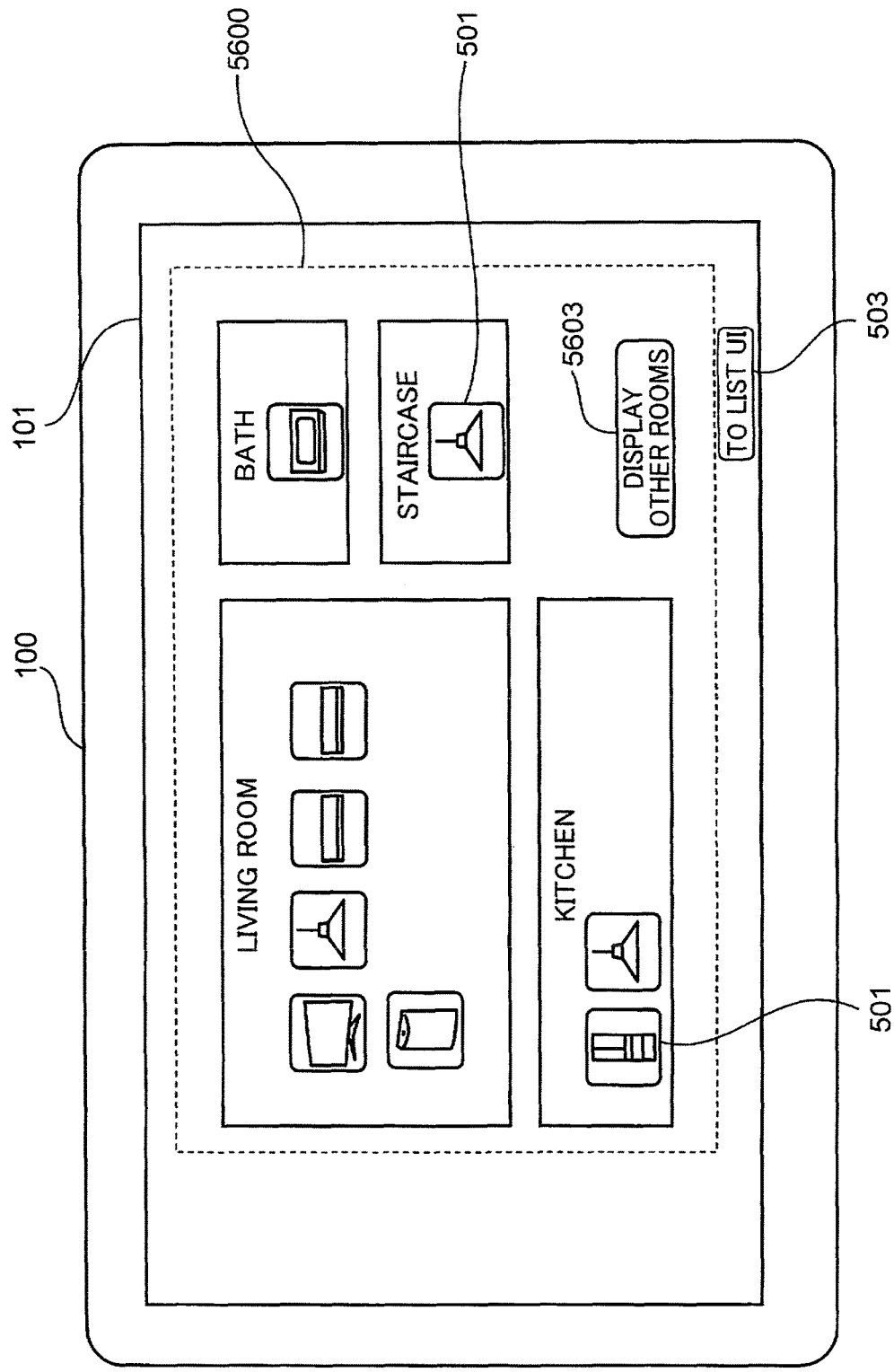
FIG. 57 is a diagram showing the configuration of a basic screen that adopts the floor plan shown in FIG. 56.

FIG. 57 is a diagram showing the configuration of a basic screen that adopts the floor plan 5600 shown in FIG. 56. In the floor plan 5600, each room is displayed with a size matching the actual size. In addition, the device icons 501 for the devices 200 actually disposed are displayed in each room.

In the case where the mode in which each room is represented with a size matching the actual room size on the floor plan 5600 is adopted, displaying all the rooms within the display 101 may result in small display of the rooms to make a user operation difficult. Thus, a room display button 5603 with a text "DISPLAY OTHER ROOMS" is provided in FIG. 57.

When the user selects the room display button and the touch panel control section 102 senses the selection, the display control section 103 switches the screen display to the floor plan 5600 which displays the remaining rooms.

In the example of FIG. 57, the floor plan 5600 is partitioned into the floor plan 5601 for the first floor and the floor plan 5602 for the second floor. Therefore, when the room display button 5603 is selected, the display control section 103 switches display on the display 101 to the floor plan 5602 for the second floor. In this case, the room display button 5603 is also provided on the floor plan 5602 for the second floor. Therefore, when the room display button 5603 is selected, the display control section 103 switches display on the display 101 to the floor plan 5601 for the first floor.

Although the floor plan is provided for each floor in the example of FIG. 57, the present disclosure is not limited thereto. For example, in the case where the floor plan 5601 for the first floor cannot be displayed on the display 101 at the same time, the display control section 103 may divide the floor plan 5601 for the first floor, and display a divided portion of the floor plan 5601 on the display 101. In this case, when the room display button 5603 is selected, a hidden portion of the floor plan 5601 for the first floor may be displayed.

In the case where the floor plan 5601 for the first floor and the floor plan 5602 for the second floor can be displayed on the display 101 at the same time, the display control section 103 may display the floor plan 5601 for the first floor and the floor plan 5602 for the second floor on the display 101 at the same time. In this case, the room display button 5603 is omitted from the floor plan 5600.

In the case where the staircase is tapped on the floor plan 5600, the display control section 103 may switch between the floor plan 5601 for the first floor and the floor plan 5602 for the second floor.

Figure 58:
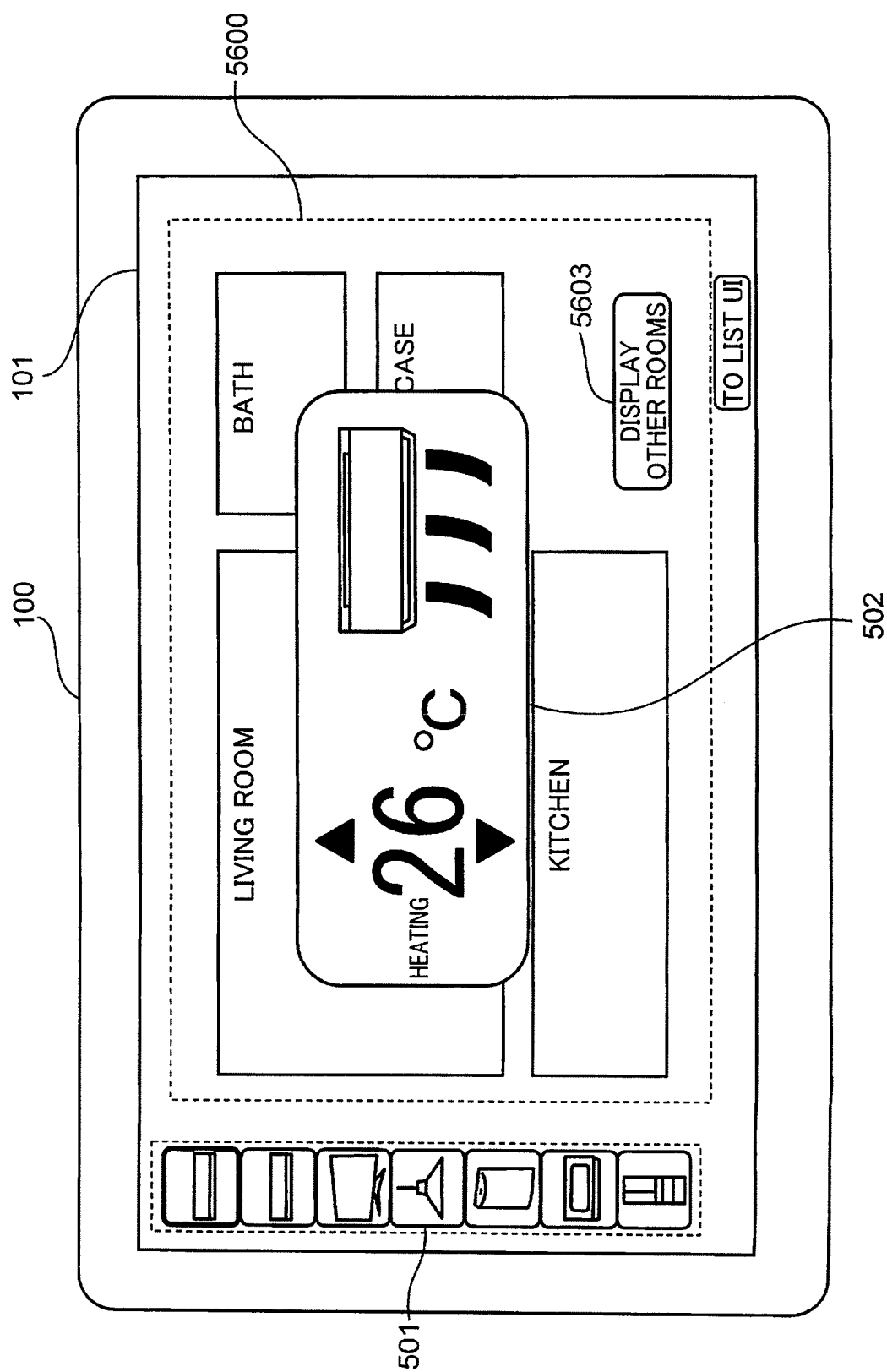
FIG. 58 is a diagram showing the display state of a device control screen for a case where the floor plan shown in FIG. 56 is adopted as the floor plan.

FIG. 58 is a diagram showing the display state of the device control screen 502 for a case where the floor plan 5600 shown in FIG. 56 is adopted as the floor plan. In FIG. 58, as in FIG. 54, the device control screen 502 for the air conditioner is displayed. FIG. 58 is otherwise the same as FIG. 54, and therefore is not described.

Figure 59:
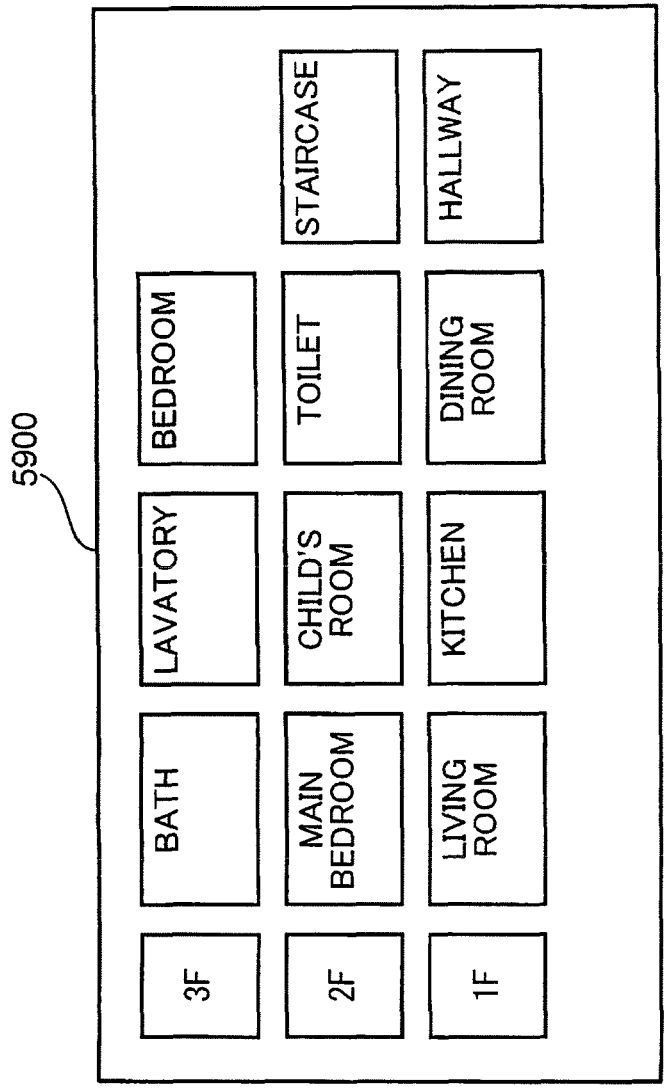
FIG. 59 is a diagram showing a floor plan in still another pattern according to the present disclosure.

FIG. 59 is a diagram showing a floor plan 5900 in still another pattern according to the present disclosure. The floor plan 5900 of FIG. 59 is the same as the floor plan 5200 in that rooms are represented by blocks of the same size, but is different from the floor plan 5200 in arrangement of the rooms. Specifically, in the floor plan 5900, the floor numbers are displayed in the vertical direction, and the rooms forming the same floor are arranged in one horizontal line. In the example of FIG. 59, the house has three floors, namely the first floor to the third floor, and therefore the rooms forming the third floor are disposed in the first line, the rooms forming the second floor are disposed in the second line, and the rooms forming the first floor are disposed in the third line. The floor number such as 1F, 2F, and 3F is indicated at the left end of each line. It is seen at a glance from the floor plan 5900 on which floor each room is disposed.

Also in the floor plan 5900, the size of each room may be varied in accordance with the actual room size. In the floor plan 5900, in addition, in the case where all the rooms cannot be displayed within the display region of the display 101, the floor plan 5900 may be scrolled in the horizontal direction so that a desired room can be displayed on the display 101.

For example, in the case where there are further rooms on the second floor, when the touch panel control section 102 senses that the user performs a swipe operation from the left to the right, the display control section 103 may scroll the rooms forming the second floor, or the rooms forming the first floor to the third floor, from the left to the right in accordance with the amount of the swipe operation.

Figure 60:
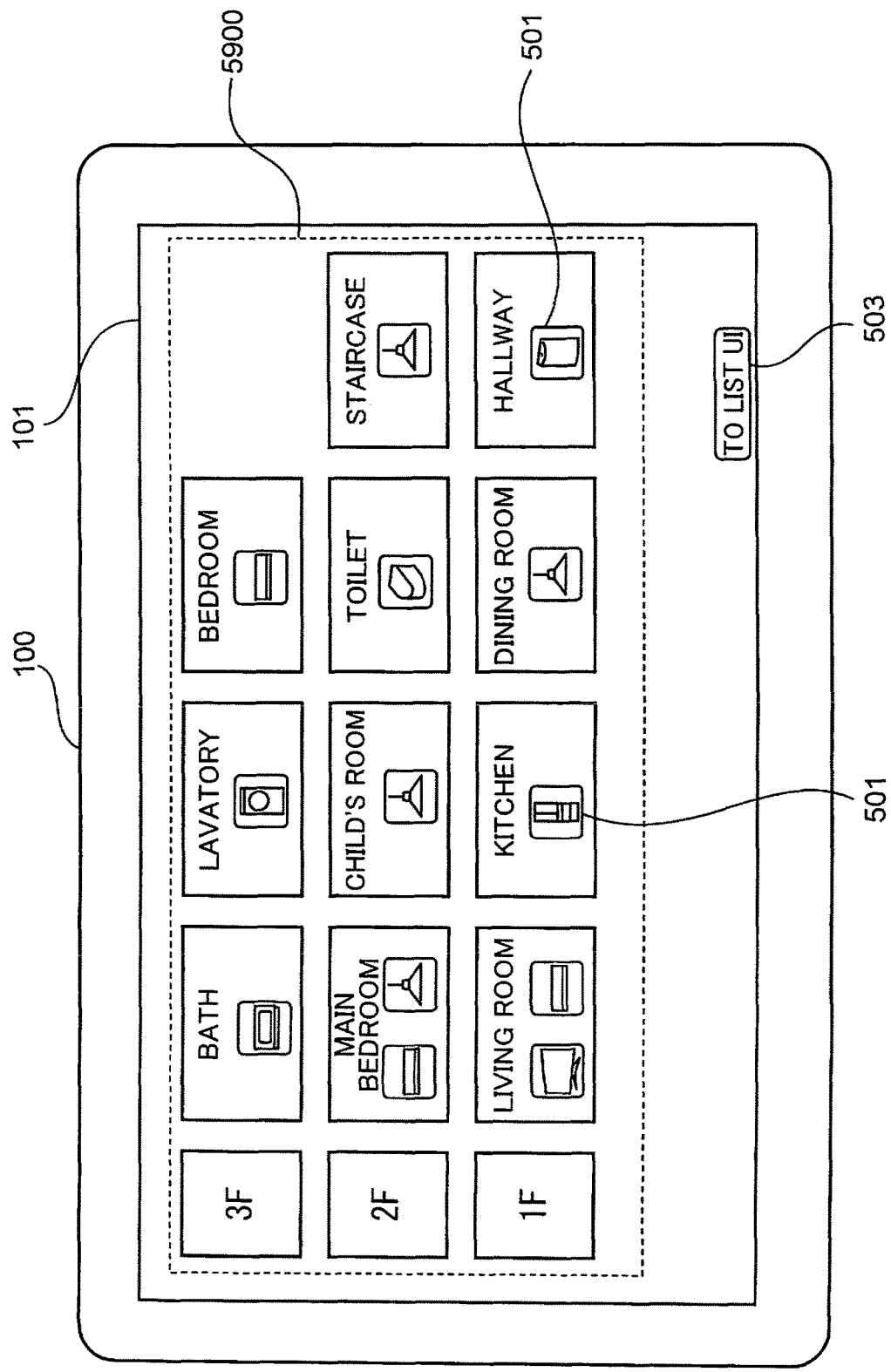
FIG. 60 is a diagram showing the configuration of a basic screen that adopts the floor plan shown in FIG. 59.

FIG. 60 is a diagram showing the configuration of a basic screen that adopts the floor plan 5900 shown in FIG. 59. The floor plan 5900 is displayed on the basic screen. In addition, the device icons 501 for the devices 200 actually disposed are displayed within each room. The device list display change button 503 is a button for switching the screen display from the basic screen to the device list display screen discussed earlier (see FIG. 24).

Figure 61:
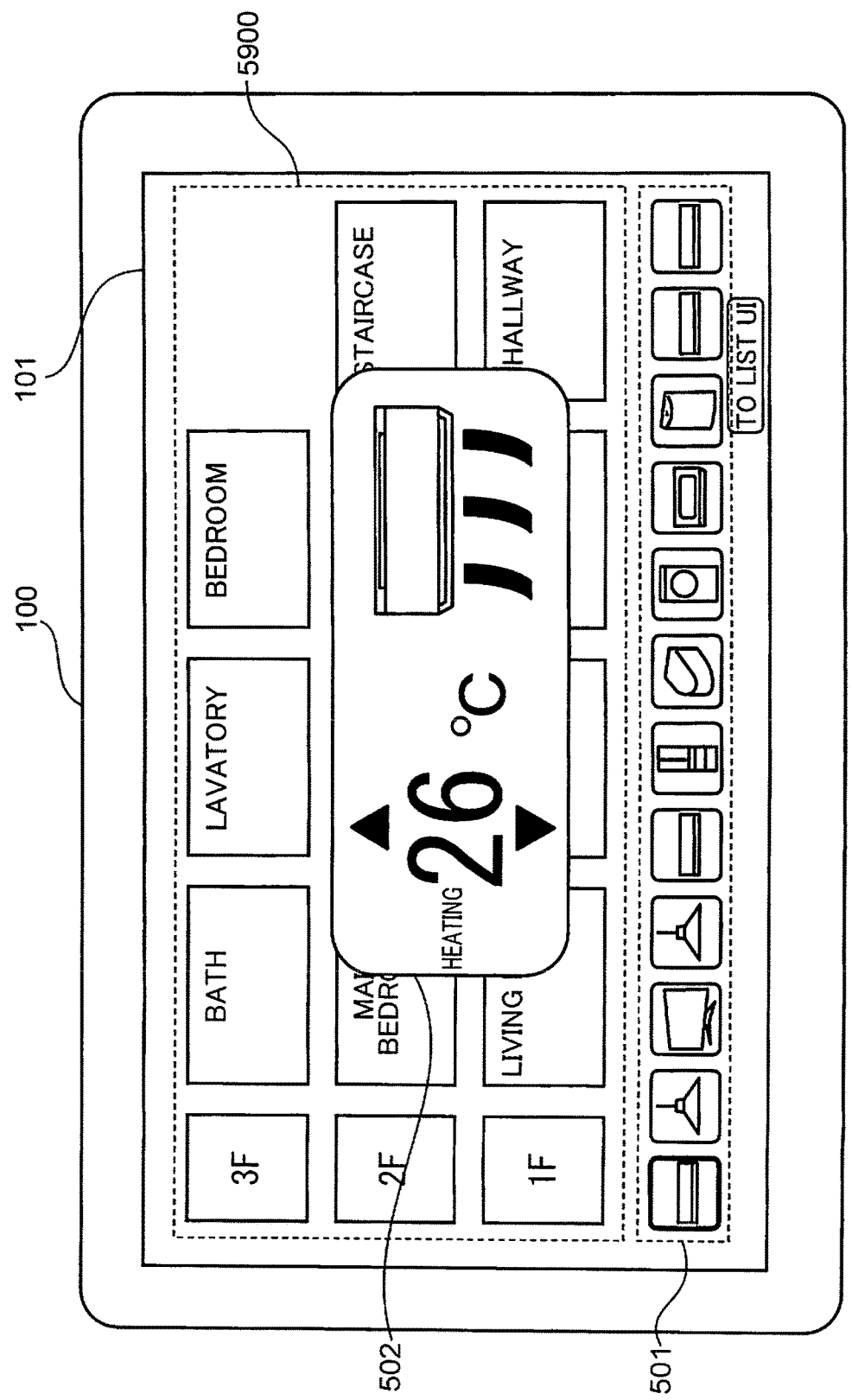
FIG. 61 is a diagram showing the display state of a device control screen for a case where the floor plan shown in FIG. 59 is adopted.

FIG. 61 is a diagram showing the display state of the device control screen 502 for a case where the floor plan 5900 shown in FIG. 59 is adopted. In the basic screen shown in FIG. 60, when the touch panel control section 102 senses that the user selects the device icon 501, the display control section 103 causes the display 101 to display the device control screen 502 corresponding to the selected device icon 501. In FIG. 61, the device icon 501 for the air conditioner is selected, and therefore the device control screen 502 for the air conditioner is displayed as overlapped on the floor plan 5900. In displaying the device control screen 502, the display control section 103 disposes the device icons 501 displayed on the floor plan 5900 outside the display region of the device control screen 502. In the example of FIG. 61, all the device icons 501 are disposed in one horizontal line on the lower side of the floor plan 5900.

In disposing the device icons 501 in one vertical line on the lower side of the floor plan 5900, the display control section 103 may group the device icons 501 under particular conditions. For example, the device icons 501 may be grouped in accordance with the room, may be grouped in accordance with the type of the device 200, or may be grouped in accordance with the category based on the type of the device 200.

In the example of FIG. 61, the device icons 501 are disposed on the lower side of the floor plan 5900. However, the device icons 501 may be disposed in one horizontal line on the upper side of the floor plan 5900, or may be disposed in one vertical line on the left or right side of the floor plan 5900.

In the case where all the device icons 501 cannot be disposed on the lower side of the floor plan 500, the display control section 103 may scroll the device icons 501 leftward or rightward in accordance with a swipe operation performed leftward or rightward on the device icons 501 disposed in one horizontal line on the lower side to cause the device icons 501, which have been hidden, to be displayed within the display 101.

In disposing the device icons 501 in one horizontal line on the lower side of the floor plan 5900, the display control section 103 may display the device icon 501 selected by the user in a display mode that is different from that for the unselected device icons 501. For example, the selected device icon 501 may be displayed in a color that is different from that of the unselected device icons 501, may be displayed more brightly than the unselected device icons 501, may be displayed more densely than the unselected device icons 501, or may be flashed on and off at a constant cycle.

The display control section 103 may scroll an array of the device icons 501 such that the device icon 501 selected by the user is positioned at a conspicuous position (for example, the leftmost, middle, or rightmost position) in the line of icons.

In displaying the device control screen 502, the display control section 103 may dispose all the device icons 501 on the outer periphery of an ellipse as shown in FIG. 12.

In the floor plan 5900, the rooms on all the floors are displayed on the display 101 at the same time, which may result in small display of the rooms to make a user operation difficult. Thus, the display control section 103 may display the floor plan 5900 as enlarged in accordance with the user operation. Specifically, when the user performs an operation of pinching out on a certain room in the floor plan 5900 and the touch panel control section 102 senses the operation, the display control section 103 may display the room on the display 101 as enlarged at an enlargement scale matching the amount of the pinch out.

Figure 62:
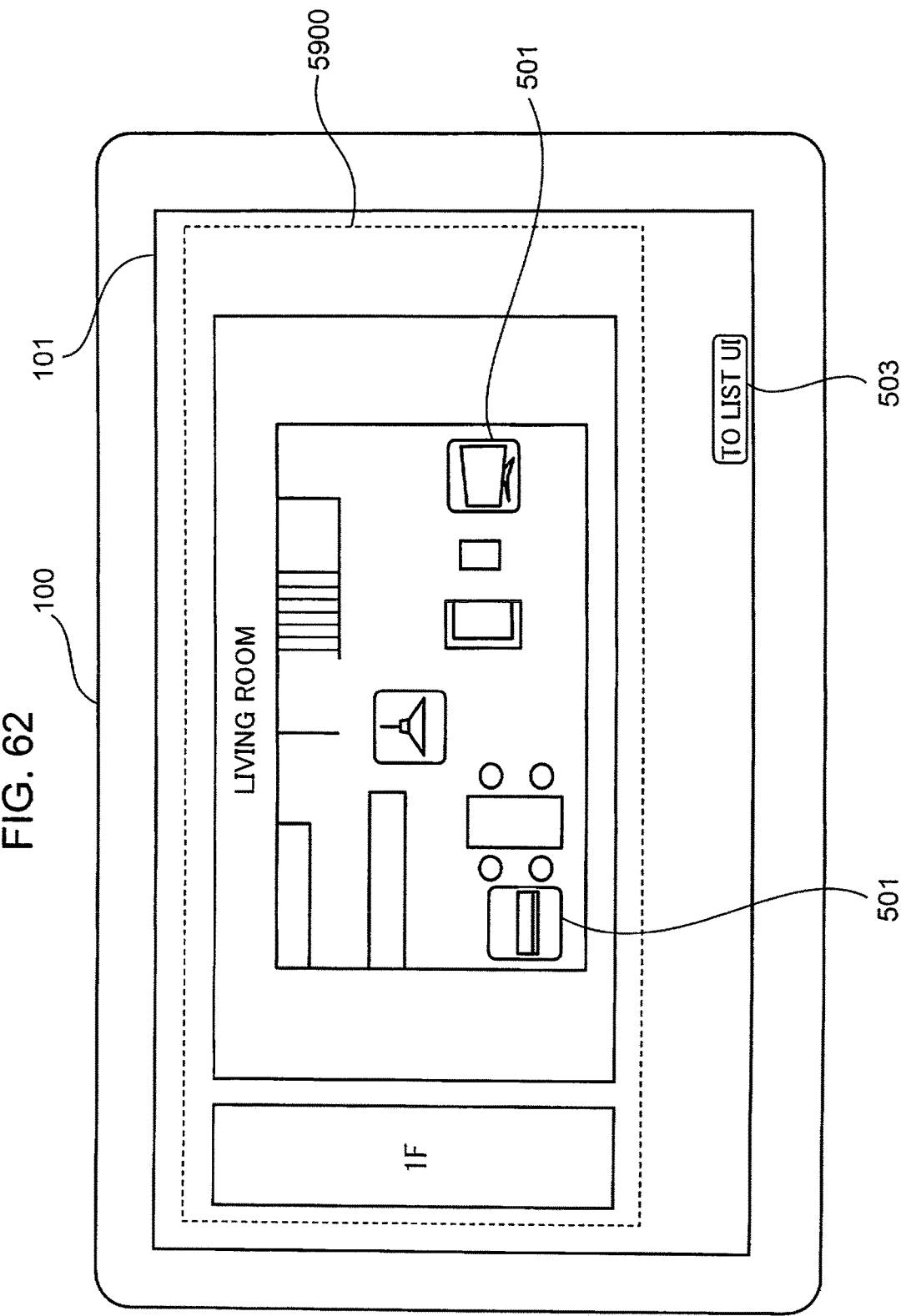
FIG. 62 is a diagram showing a floor plan displayed on a display in the case where a user performs a pinch-out operation on a room in the floor plan shown in FIG. 59.

FIG. 62 is a diagram showing a floor plan that displays a certain room in the floor plan 5900 as enlarged. As shown in FIG. 62, the display control section 103 may display a plan view that planarly represents the shape of the relevant room as overlapped on the floor plan 5900. Alternatively, the display control section 103 may switch to displaying the plan view. This allows the user to grasp the configuration of the rooms in the house and the devices 200 disposed in each room on the floor plan 5900 shown in FIG. 60, and to grasp the actual arrangement position of the devices 200 in the enlarged room on the floor plan 5900 shown in FIG. 62.

In the floor plan 5900 not displayed as enlarged shown in FIG. 60, it is not necessary for the display control section 103 to display the device icons 501 for all the devices 200 disposed within the rooms, and the display control section 103 may display only some of the device icons 501.

In this case, the display control section 103 may display one or a plurality of (for example, two) device icons 501 frequently used by the user on the floor plan 5900. Alternatively, the display control section 103 may not display the device icons 501 on the floor plan 5900 not displayed as enlarged. This prevents the viewability of the floor plan 5900 from being lowered because of an increased number of the device icons 501 displayed on the floor plan 5900 not displayed as enlarged.

Figure 63:
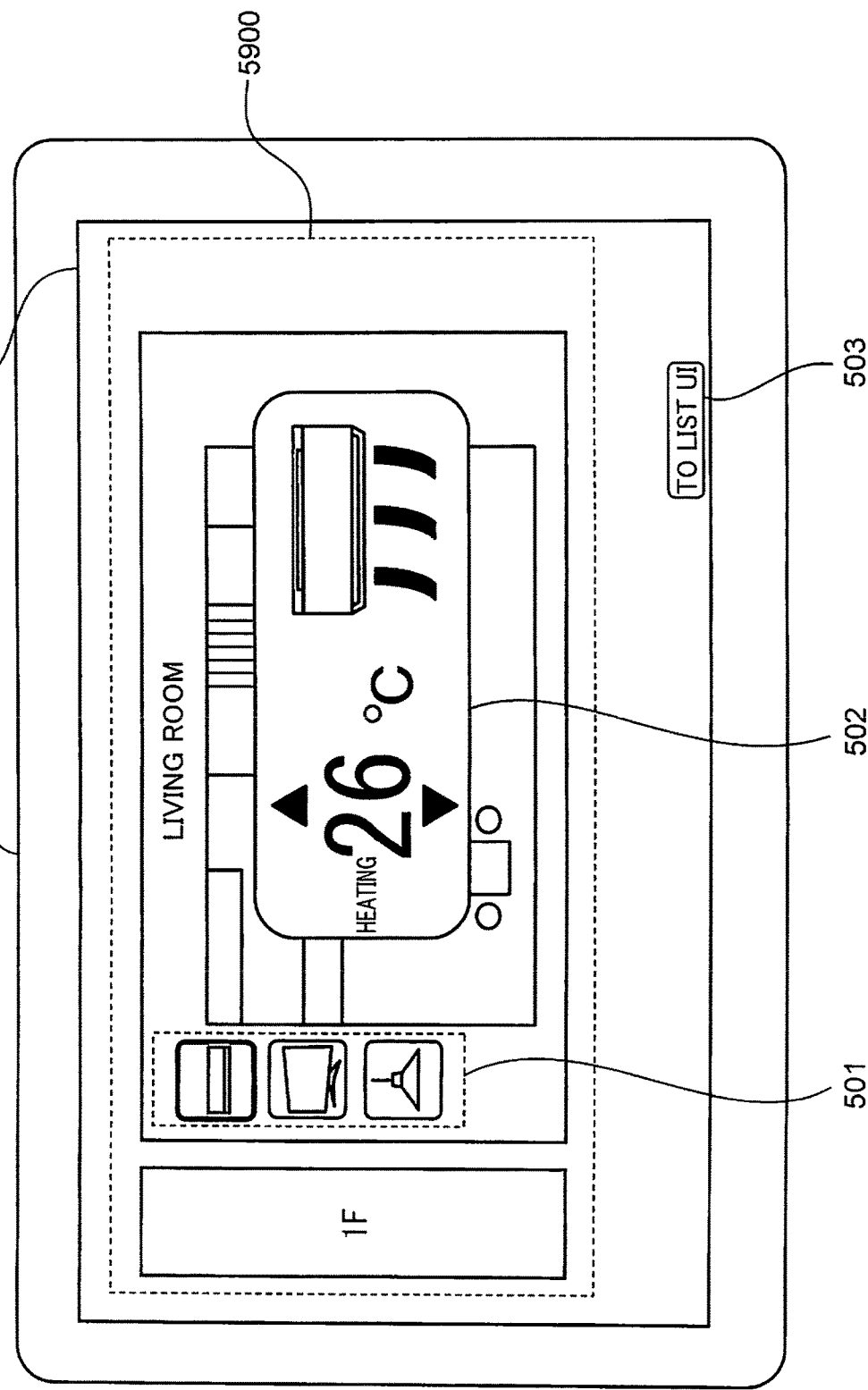
FIG. 63 is a diagram showing the display state of a device control screen in the floor plan displayed as enlarged shown in FIG. 62.

FIG. 63 is a diagram showing the display state of the device control screen 502 in the floor plan 5900 displayed as enlarged shown in FIG. 62. In FIG. 63, as in FIG. 54, the device control screen 502 for the air conditioner is displayed. In FIG. 63, only the device icons 501 disposed in the room (living room) displayed as enlarged are displayed on the left side of the plan view and in the block of the living room. In the example of FIG. 62, the device icons 501 for the air conditioner, the illumination device, and the television set are displayed in the living room within the plan view, and the device icon 501 for the air conditioner is selected by the user. Therefore, the device icons 501 are displayed in one vertical line on the left side of the plan view.

In the case where a certain room is displayed as enlarged, it is highly likely that the user operates the device 200 disposed within the room. In the case where a certain room is displayed as enlarged, in addition, the device icons 501 for devices in the other rooms are not displayed on the display 101. Therefore, if the device icons 501 for devices disposed in the other rooms are displayed on the left side of the plan view when the user selects a certain device icon 501, the user may be given a sense of wrongness.

Figure 64:
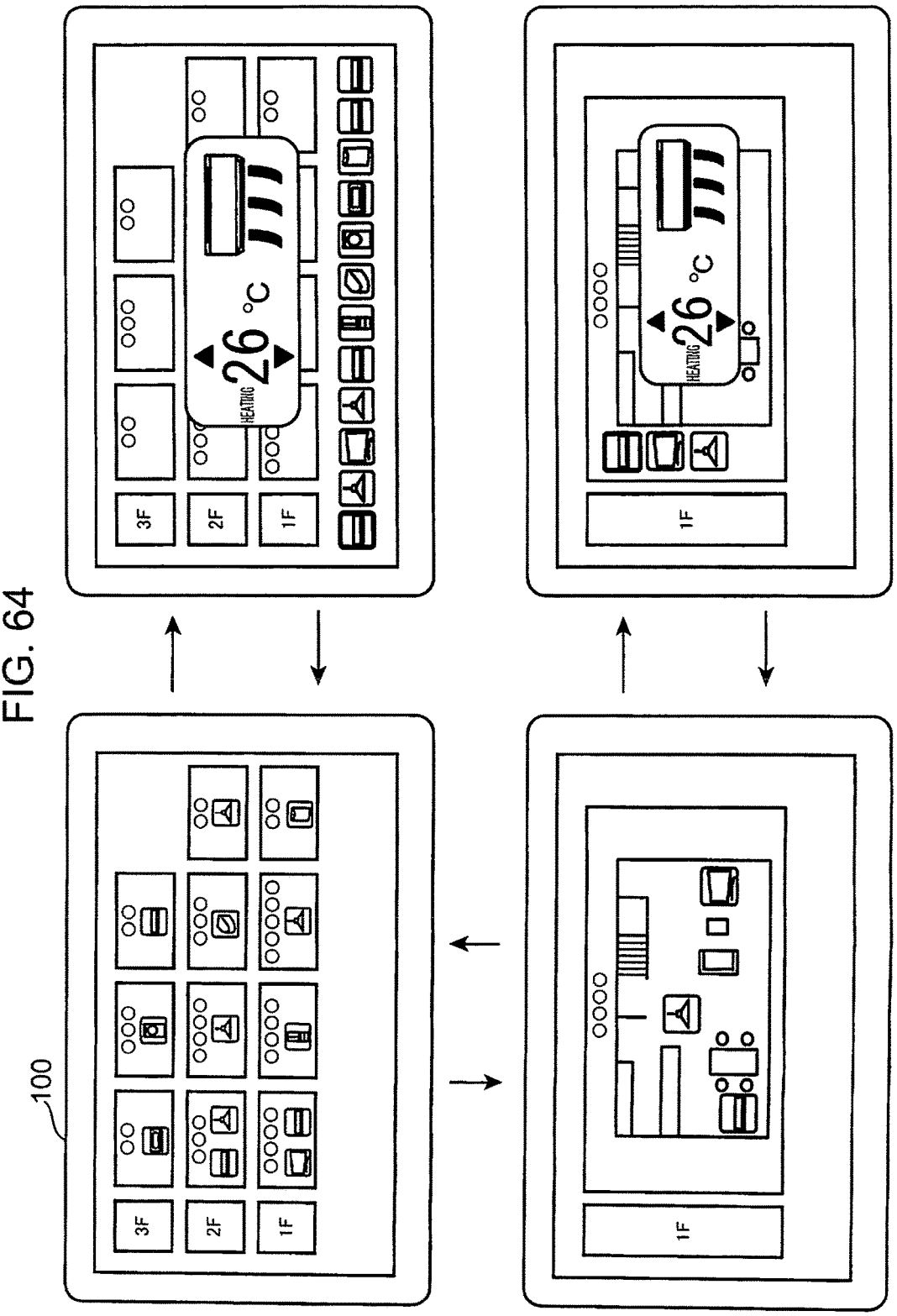
FIG. 64 is a diagram showing screen transition from the display state of the basic screen to the display state of the device control screen.

Thus, in the case where a certain room is displayed as enlarged, the display control section 103 causes only the device icons 501 for the devices 200 disposed in the room to be displayed in one vertical line on the left side of the plan view. In the example of FIG. 64, the device icons 501 are displayed on the left side of the plan view. However, the device icons 501 may be displayed in one vertical line on the right side of the plan view, or may be displayed in one horizontal line on the upper or lower side of the plan view.

FIG. 64 is a diagram showing screen transition from the display state of the basic screen to the display state of the device control screen 502. It is assumed that the user taps on the device icon 501 for the air conditioner, for example, in the basic screen which displays the floor plan 5900 not displayed as enlarged as shown in the upper left diagram of FIG. 64. Then, as shown in the upper right diagram of FIG. 64, the display control section 103 displays the device control screen 502 for the air conditioner as overlapped on the basic screen. In the screen shown in the upper right diagram of FIG. 64, on the other hand, when the user taps on a region on the floor plan 5900 other than the device control screen 502 or taps on the device icon 501 for the air conditioner, the display control section 103 returns the screen display to the basic screen shown in the upper left diagram of FIG. 64.

It is assumed that the user pinches out on the living room in the basic screen shown in the upper left diagram of FIG. 64. Then, as shown in the lower left diagram of FIG. 64, the display control section 103 enlarges the block of the living room, and at the same time displays the plan view of the living room having a size matching the size of the enlarged block as overlapped on the enlarged block. It is assumed that the user pinches in on the living room in the lower left diagram of FIG. 64. Then, the display control section 103 returns the screen display to the basic screen shown in the upper left diagram of FIG. 64.

When the device icon 501 for the air conditioner, for example, is selected in the basic screen shown in the lower left diagram of FIG. 64, the display control section 103 displays the device control screen 502 for the air conditioner as overlapped on the plan view as shown in the lower right diagram of FIG. 64. In the lower right diagram of FIG. 64, when the user taps on a region on the floor plan 5900 other than the device control screen 502 or on the device icon 501 for the air conditioner, the display control section 103 returns the screen display to the screen shown in the lower left diagram of FIG. 64.

Figure 65:
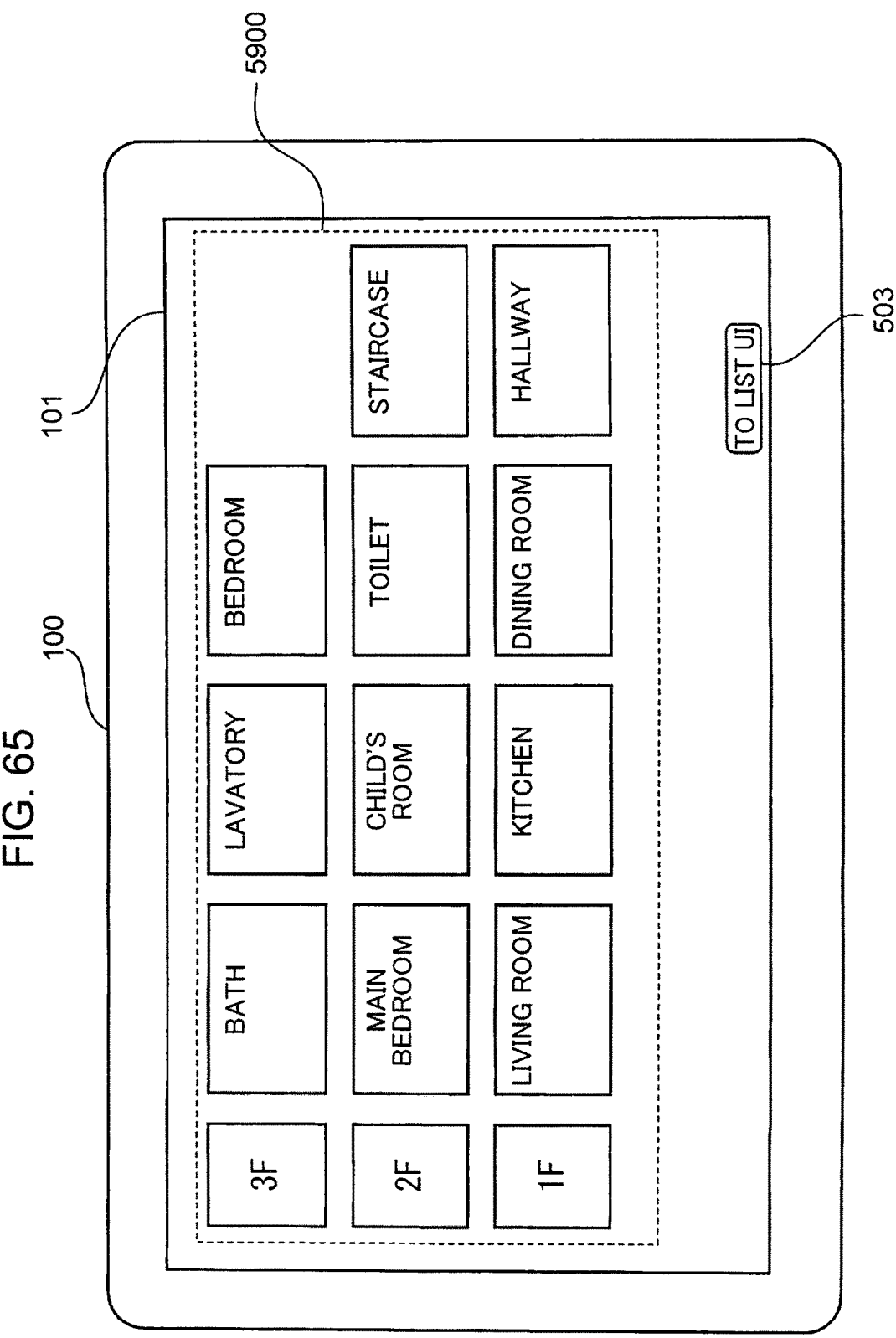
FIG. 65 is a diagram showing the configuration of a basic screen which adopts the floor plan shown in FIG. 59 and in which device icons are not displayed.

FIG. 65 is a diagram showing the configuration of a basic screen 5900 which adopts the floor plan shown in FIG. 59 and in which device icons 501 are not displayed. In the mode shown in FIG. 65, only rooms forming each floor are displayed, and the device icons 501 are not displayed.

Figure 66:
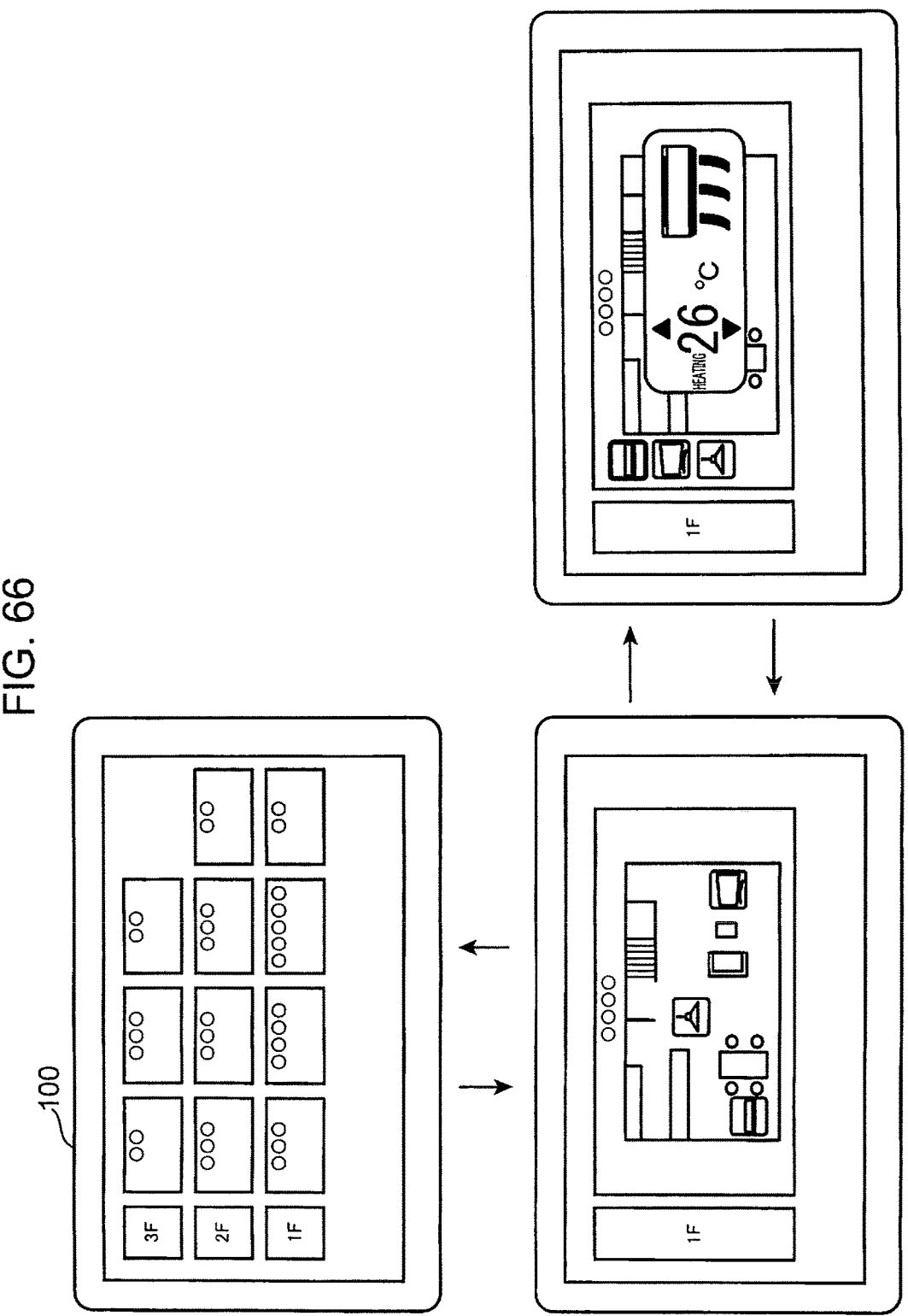
FIG. 66 is a diagram showing screen transition from the display state of the basic screen to the display state of the device control screen for a case where the basic screen in which device icons are not displayed is adopted.

FIG. 66 is a diagram showing screen transition from the display state of the basic screen to the display state of the device control screen 502 for a case where the basic screen in which device icons 501 are not displayed is adopted. It is assumed that the user pinches out on the living room, for example, in the basic screen shown in the upper left diagram of FIG. 66. Then, as shown in the lower left diagram of FIG. 66, the display control section 103 displays the block of the living room as enlarged, and displays the plan view of the living room as overlapped on the block displayed as enlarged. It is assumed that the user taps on the device icon 501 for the air conditioner, for example, in the screen shown in the lower left diagram of FIG. 66. Then, as shown in the lower right diagram of FIG. 66, the display control section 103 displays the device control screen 502 for the air conditioner as overlapped on the plan view of the living room, and disposes the device icons 501 for the living room in one vertical line on the left side of the plan view of the living room. In the lower right diagram of FIG. 66, when the user taps on a region on the floor plan 5900 and outside the display region of the device control screen 502, the display control section 103 returns the display screen to the screen shown in the lower left diagram of FIG. 66.

Figure 67:
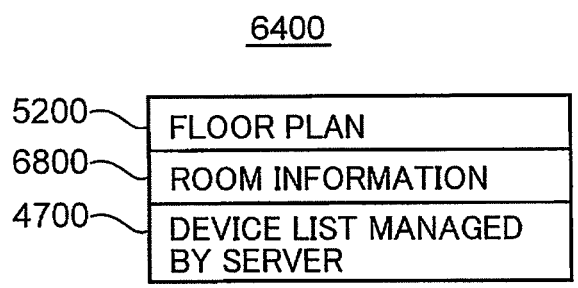
FIG. 67 is a diagram showing the configuration of the home information for a case where the floor plan shown in FIG. 52 is adopted.

FIG. 67 is a diagram showing the configuration of the home information 2700 for a case where the floor plan 5200 shown in FIG. 52 is adopted. As shown in FIG. 67, the home information 6400 includes the floor plan 5200, the room information 6800, and the device list 4700 managed by the server. In the floor plan 5200, the display positions of the rooms are determined in advance. Therefore, the vertex information 2800 included in the home information 2700 is omitted from the home information 6400.

The floor plan 5200 is image data obtained by representing the floor plan 5200 shown in FIG. 52 in a bitmap format, for example. Alternatively, the floor plan 5200 may be information that prescribes the color, the shape, the size, and so forth for displaying the floor plan 5200. The room information 6800 is information for deciding the regions of rooms from the floor plan 5200.

FIG. 68 is a diagram showing the configuration of room information 6800 shown in FIG. 67. As shown in FIG. 68, the room information 6800 includes a room ID 6801, a room type 6802, a floor level 6803, and a display position 6804. The room ID 6801 is an identifier that identifies a room on the floor plan 5200. The room type 6802 indicates the type of the room. The floor level 6803 indicates the floor level (floor) on which the room is disposed. The display position 6804 indicates the arrangement position of the room on the floor plan 5200.

Figure 69:
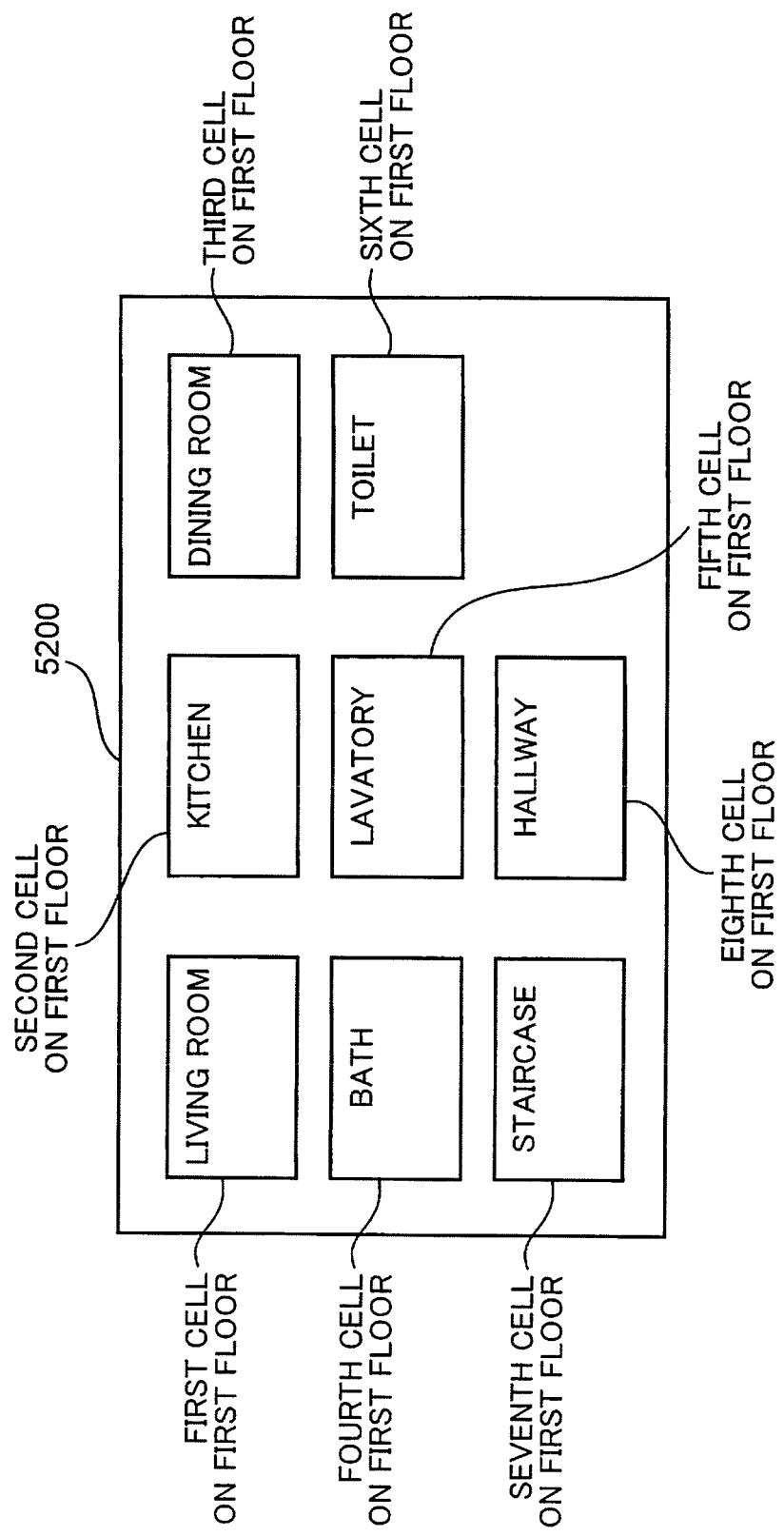
FIG. 69 is a diagram showing an example of the correspondence between the display position in the room information shown in FIG. 67 and the floor plan.

FIG. 69 is a diagram showing an example of the correspondence between the display position 6804 in the room information 6800 and the floor plan 5200. As shown in FIG. 69, the order of the blocks on the floor plan 5200 is prescribed such that the block in the first row and the first column corresponds to the first cell, the block in the first row and the second column corresponds to the second cell, the block in the first row and the third column corresponds to the third cell, the block in the second row and the first column corresponds to the fourth cell, and so forth.

For example, the room with a room ID 6801 of A has a display position 6804 of "FIRST CELL ON FIRST FLOOR". Therefore, as shown in FIG. 69, the display control section 103 interprets the block in the first cell (in the first row and the first column) on the floor plan 5201 for the first floor as the living room.

In the example of FIG. 69, the blocks are disposed in three horizontal lines, and therefore the cell in the second row and the first column corresponds to the fourth cell, and the cell in the third row and the first column corresponds to the seventh cell. It should be noted, however, that this is merely exemplary. For example, in the case where the cells are arranged in four columns in the horizontal direction, the correlation between the order of the cells and the arrangement positions of the blocks is changed as appropriate in accordance with the number of blocks in the horizontal direction, and the cell in the second row and the first column corresponds to the fifth cell, and the cell in the third row and the first column corresponds to the ninth cell.

FIG. 70 is a diagram showing the configuration of a device list 4700 managed by the server 300 for a case where the floor plan 5200 shown in FIG. 52 is adopted. It is not necessary for the floor plan 5200 to indicate the arrangement position of the device 200 in the room. Therefore, in the device list 4700 shown in FIG. 70, unlike FIG. 34, the room type 6802 is registered in the arrangement 4704. The device list 4700 shown in FIG. 70 is otherwise the same as the device list 4700 shown in FIG. 34. For example, the air conditioner with a device ID 4701 of A is disposed in the living room, and therefore "LIVING ROOM" is registered in the arrangement 4704. In the example of FIG. 70, the room type 6802 is adopted as the arrangement 4704. However, any other information that specifies a room may be registered. For example, the room ID 6801 may be adopted as the arrangement 4704.

FIG. 71 is a diagram showing the configuration of a device list 3100 managed by the home controller 100 for a case where the floor plan 5200 shown in FIG. 52 is adopted. Also in the device list 3100 of FIG. 71, for the same reason as that for the device list 4700 of FIG. 70, the room type 6802 is registered in the arrangement 3104. The device list 3100 of FIG. 71 is otherwise the same as the device list 3100 shown in FIG. 35. Also in FIG. 71, the room ID 6801 may be adopted as the arrangement 3104.

Next, the device list 3100 for a case where the plan view of a certain room is displayed in the case where a pinch-out operation is performed on the room on the basic screen of the floor plan 5900 as shown in FIG. 62 will be described. In this case, the room information 6800 shown in FIG. 68 may include an item of the plan view of the room. Then, image data for the plan view of the relevant room may be registered in the item of the plan view of the room. For the plan view of the room, as shown in FIG. 33, the origin may be set at the left end of the room, for example, the X axis and the Y axis may be set in the horizontal direction and the vertical direction, respectively, and the position of the room may be represented by the X and Y coordinates.

Meanwhile, not only the room type 6802 but also the coordinate in the room is registered in the arrangement 3104 of the device list 3100 shown in FIG. 71. This allows the display control section 103 to discriminate from the content of the arrangement 3104 at what position on the plan view representing the room the device icon 501 is to be disposed.

In the present disclosure, the server 300 is not an essential constituent element, and various types of information managed by the server 300 (such as the home information 2700 and the state of the devices 200) may be managed by the home controller 100. This allows the present disclosure described above to be embodied without the server 300. In this case, it is not necessary for the home controller 100 to manage information on the entire house, and it is only necessary to manage information related to the devices 200 controlled by the home controller 100 and the house in which the devices 200 are disposed.

(Control of Illumination Device)

An embodiment in which the type of the target device is not limited has been described above. An embodiment in which the target device is an illumination device will be described in detail below.

(Control Screen for Illumination Device)

Figure 72:
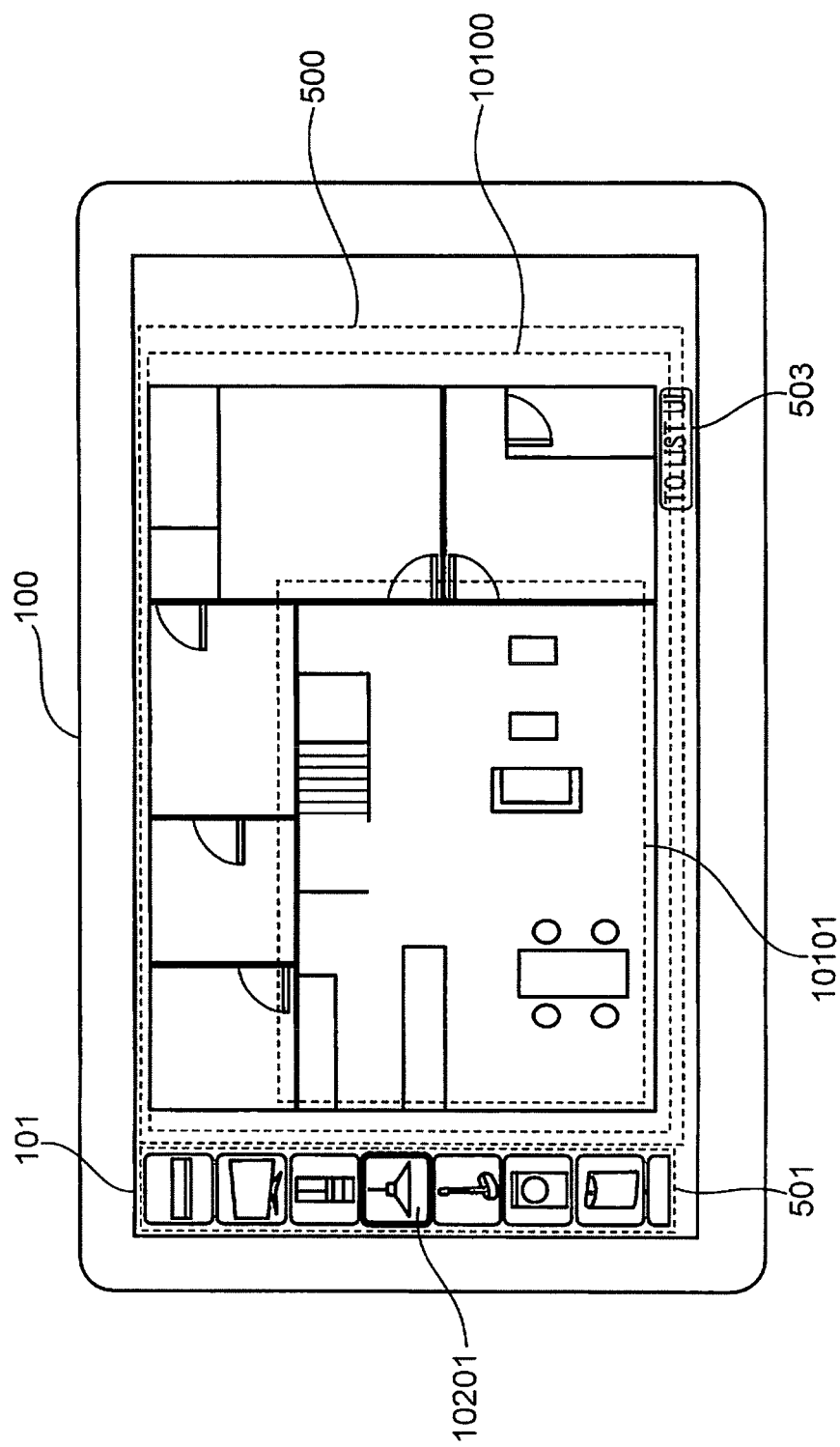
FIG. 72 is a diagram showing an example of a control screen for an illumination device displayed on the display of the home controller according to an embodiment of the present disclosure.
Figure 73:
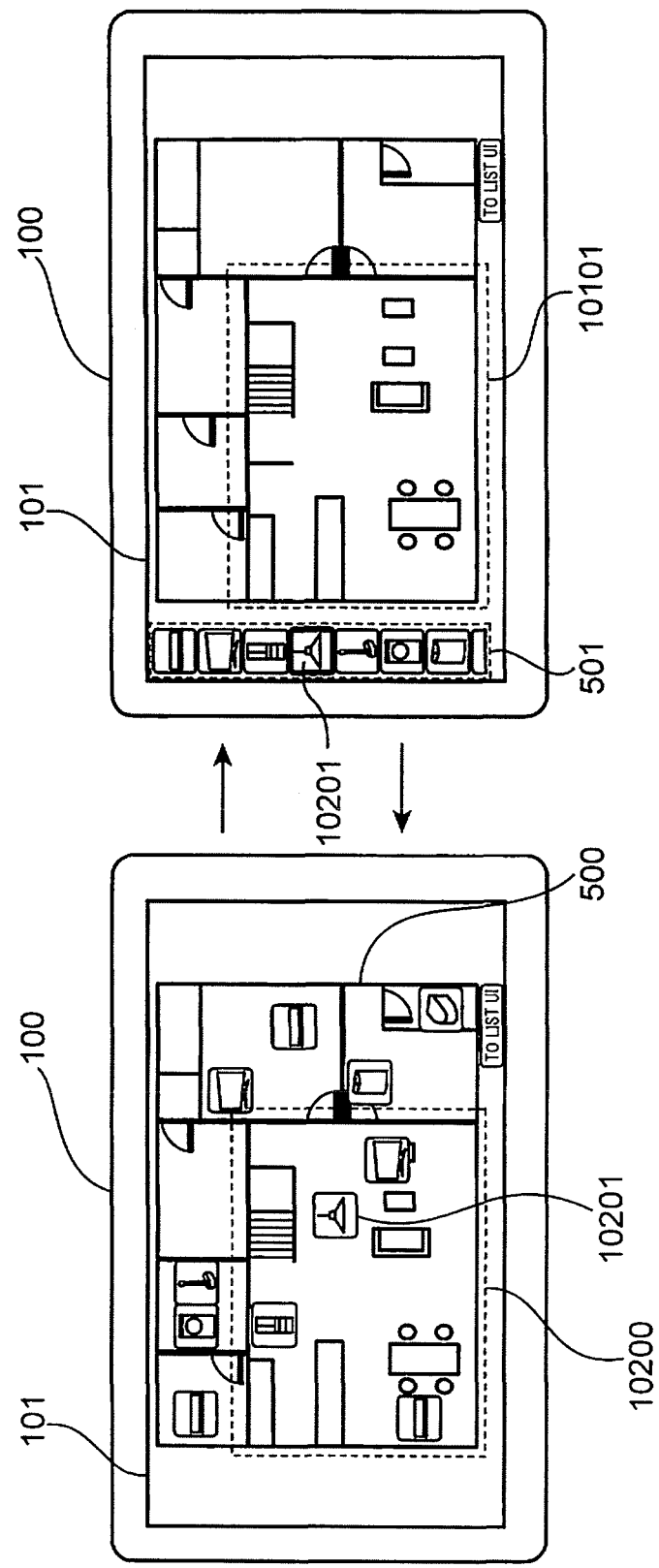
FIG. 73 is a diagram showing an example of transition of a display screen on the display of the home controller between the basic screen and the control screen for the illumination device according to the embodiment of the present disclosure.
Figure 74:
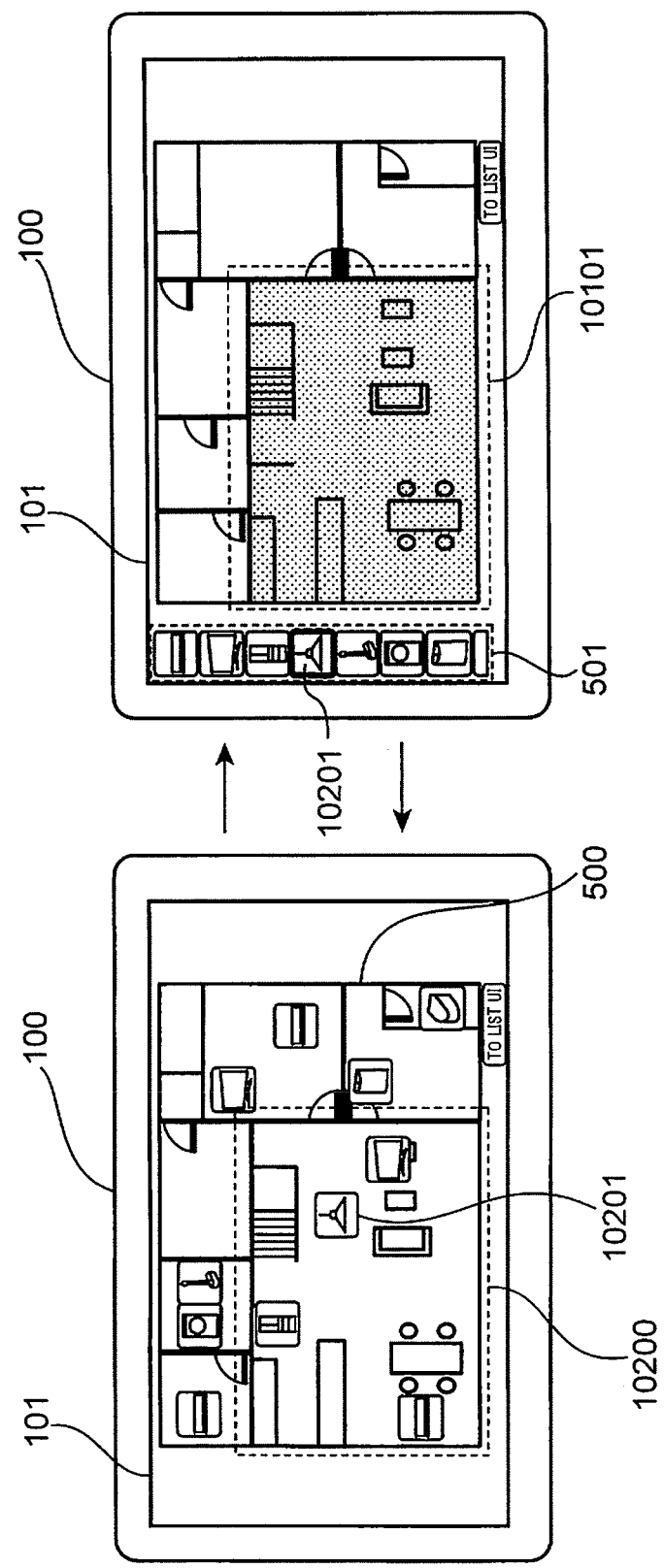
FIG. 74 is a diagram showing an example of transition of the display screen on the display of the home controller between the basic screen and the control screen for the illumination device according to the embodiment of the present disclosure.

FIG. 72 is a diagram showing an example of a control screen for an illumination device displayed on the display 101 of the home controller 100. FIGS. 73 and 74 are each a diagram showing an example of transition of the display screen on the display 101 of the home controller 100 between the basic screen and the control screen for the illumination device. FIG. 73 shows a case where the illumination device is turned on. FIG. 74 shows a case where the illumination device is turned off.

As shown in the left diagram of FIG. 73, for example, the display control section 103 displays the basic screen including the floor plan 500, the device icons 501, and so forth on the display 101 of the home controller 100. In this display state, the user taps on a device icon 10201 (corresponding to an example of the illumination icon according to an aspect of the present disclosure) for an illumination device disposed in a room 10200 in which the illumination device is installed to select the device icon 10201, and the touch panel control section 102 senses the tap (selection). Then, as shown in FIG. 72, the display control section 103 displays a control screen 10100 for the illumination device on the display 101.

In the control for the illumination device, as shown in FIG. 72, the floor plan 500 and the control screen 10100 for the illumination device have the same display content as each other. In other words, when the user selects the device icon 10201 for the illumination device, the floor plan 500 also functions as the control screen 10100 for the illumination device.

In FIGS. 72 to 74, the device icon 10201 for the illumination device disposed in the room 10200 in which the illumination device is installed is selected by the user, and the selection is sensed by the touch panel control section 102. As a result, the display control section 103 displays the control screen 10100 for the illumination device on the display 101. Therefore, as shown in FIGS. 72 to 74, a control target region 10101 for the illumination device included in the control screen 10100 for the illumination device is a region corresponding to the room 10200 in which the illumination device is installed.

In the display state of the basic screen (for example, the left diagram of FIG. 73), the user selects the device icon 10201 for the illumination device, and the touch panel control section 102 senses the selection. Then, as described above, the display control section 103 retracts the device icons 501 out of the display region of the control screen 10100 for the illumination device (the floor plan 500) as shown in the right diagram of FIG. 73 or FIG. 72. In the example of FIG. 72, the device icons 501 are arranged in one vertical line at the left end within the display screen on the display 101 so as to avoid the display region of the floor plan 500. In the example of FIG. 72, in addition, the device icon 10201 for the illumination device selected by the user is displayed at the middle of the line of the device icons 501.

In the example of FIG. 72, the selected device icon 10201 for the illumination device is displayed as distinguished from the unselected device icons by being surrounded with a thick frame, for example. The mode in which the selected device icon 10201 for the illumination device is displayed as distinguished from the unselected device icons is not limited to being surrounded by a thick frame. As described above, the display control section 103 may adopt a variety of modes such as a mode in which the selected device icon 10201 for the illumination device is displayed in a color that is different from that of the unselected device icons, more brightly than the unselected device icons, or the like.

Then, in the case where the illumination device in the room 10200 in which the illumination device is installed is turned on when the control screen 10100 for the illumination device is displayed, the display control section 103 displays the control target region 10101 for the illumination device brightly with brightness (in the case of 8 bits, for example, a signal level of 192) not less than specific brightness (in the case of 8 bits, for example, a signal level of 128) as shown in the right diagram of FIG. 73. In this display state, the user taps on the device icon 10201 for the illumination device or a location outside the control target region 10101 for the illumination device (for example, the display region of the floor plan 500 outside the display region of the control target region 10101 for the illumination device), and the touch panel control section 102 senses the tap (selection). Then, the display control section 103 returns the display screen on the display 101 to the display state of the basic screen (the left diagram of FIG. 73).

In the case where the illumination device in the room 10200 in which the illumination device is installed is turned off when the control screen 10100 for the illumination device is displayed, on the other hand, the display control section 103 displays the control target region 10101 for the illumination device darkly with brightness (in the case of 8 bits, for example, a signal level of 64) less than the specific brightness as shown in the right diagram of FIG. 74. In this display state, the user selects the device icon 10201 for the illumination device or a location outside the control target region 10101 for the illumination device (for example, the display region of the floor plan 500 outside the display region of the control target region 10101 for the illumination device), and the touch panel control section 102 senses the selection. Then, the display control section 103 returns the display screen on the display 101 to the display state of the basic screen (the left diagram of FIG. 74).

Figure 75:
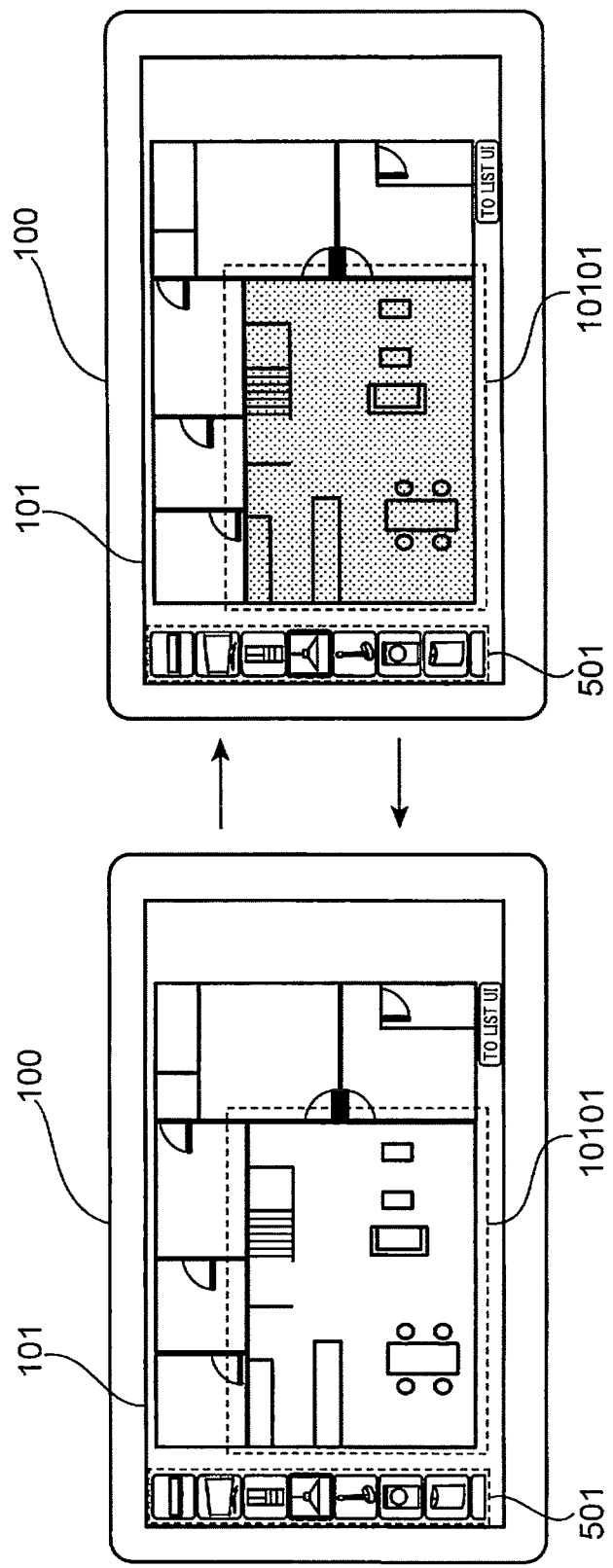
FIG. 75 is a diagram showing an example of transition of the display screen on the display of the home controller between the control screen for the illumination device for a case where the illumination device is turned on and the control screen for the illumination device for a case where the illumination device is turned off according to the embodiment of the present disclosure.

FIG. 75 is a diagram showing an example of transition of the display screen on the display 101 of the home controller 100 between the control screen for the illumination device for a case where the illumination device is turned on and the control screen for the illumination device for a case where the illumination device is turned off.

As described above, in the case where the illumination device in the room is turned on, the control screen for the illumination device is displayed on the display 101 with the control target region 10101 for the illumination device displayed brightly with brightness not less than the specific brightness as shown in the left diagram of FIG. 75. When the control target region 10101 for the illumination device is selected in this display state, the illumination device in the room is turned off, and the display screen on the display 101 transitions to a display state in which the control target region 10101 for the illumination device is displayed darkly with brightness less than the specific brightness as shown in the right diagram of FIG. 75.

When the control target region 10101 for the illumination device is selected with the display screen on the display 101 in the display state shown in the right diagram of FIG. 75, on the other hand, the illumination device in the room is turned on, and the display screen on the display 101 transitions to a display state in which the control target region 10101 for the illumination device is displayed brightly with brightness not less than the specific brightness as shown in the left diagram of FIG. 75.

Figure 76:
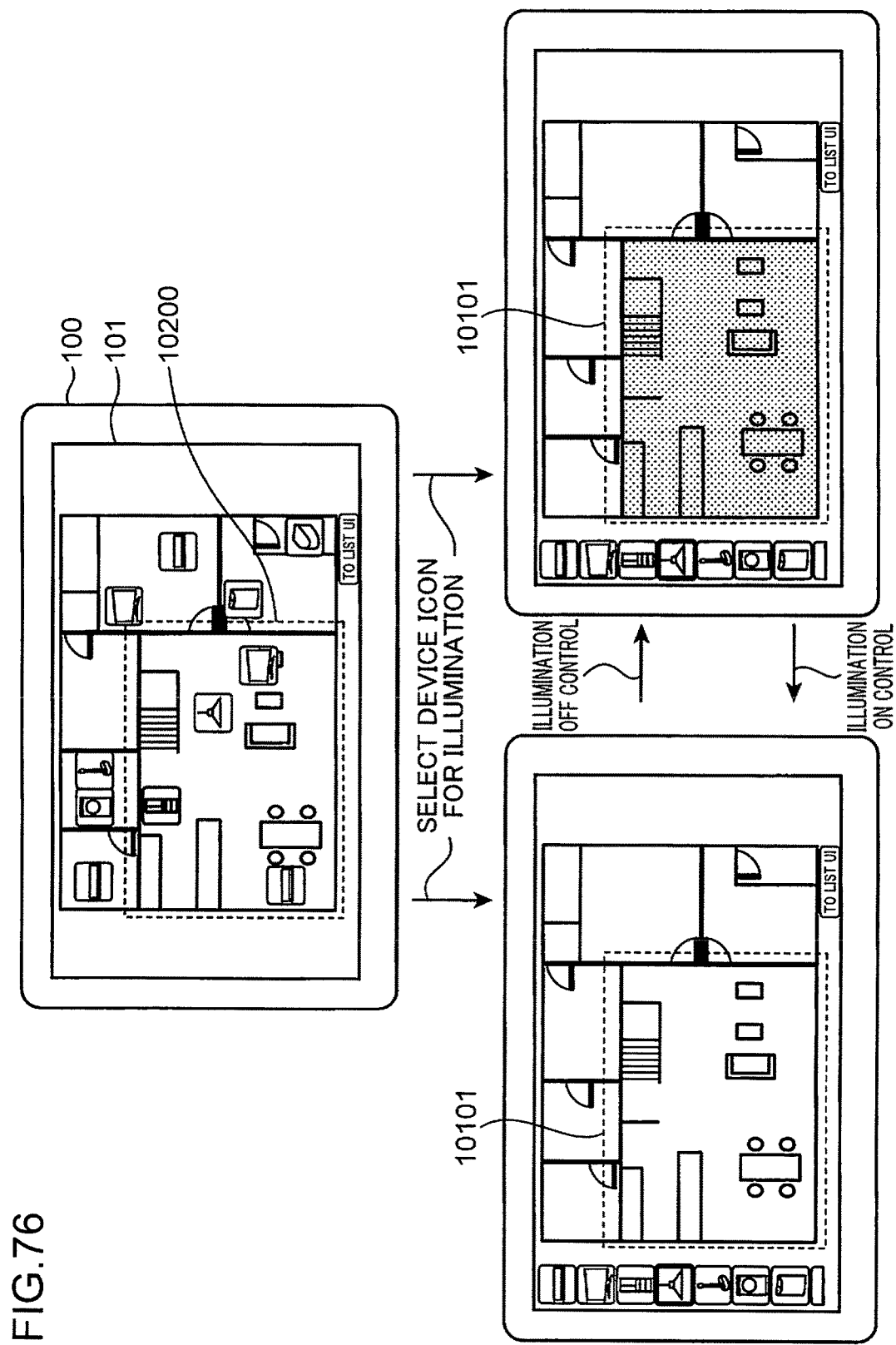
FIG. 76 is a diagram collectively showing an example of transition of the display screen on the display of the home controller among the basic screen, the control screen for the illumination device for a case where the illumination device is turned on, and the control screen for the illumination device for a case where the illumination device is turned off according to the embodiment of the present disclosure.

FIG. 76 is a diagram collectively showing an example of transition of the display screen on the display 101 of the home controller 100 among the basic screen, the control screen for the illumination device for a case where the illumination device is turned on, and the control screen for the illumination device for a case where the illumination device is turned off. In FIG. 76, the upper diagram shows the display state of the basic screen, the lower left diagram shows the display state of the control screen for the illumination device for a case where the illumination device is turned on, and the lower right diagram shows the display state of the control screen for the illumination device for a case where the illumination device is turned off.

With the basic screen (the upper diagram of FIG. 76) displayed on the display 101, the user selects the device icon for the illumination device in the room 10200 in which the illumination device is installed, and the touch panel control section 102 senses the selection. At this time, in the case where the illumination device in the room 10200 is turned on, the display control section 103 causes the display screen on the display 101 to transition to a display state of the control screen for the illumination device (the lower left diagram of FIG. 76) in which the control target region 10101 for the illumination device is displayed brightly with brightness not less than the specific brightness.

On the other hand, with the basic screen (the upper diagram of FIG. 76) displayed on the display 101, the user selects the device icon for the illumination device in the room 10200 in which the illumination device is installed, and the touch panel control section 102 senses the selection. In the case where the illumination device in the room 10200 is turned off at this time, the display control section 103 causes the display screen on the display 101 to transition to a display state of the control screen for the illumination device (the lower right diagram of FIG. 76) in which the control target region 10101 for the illumination device is displayed darkly with brightness less than the specific brightness.

Meanwhile, the control screen for the illumination device (the lower left diagram of FIG. 76), in which the control target region 10101 for the illumination device is displayed brightly with brightness not less than the specific brightness, is displayed on the display 101 by the display control section 103. In this display state, the user selects the control target region 10101 for the illumination device, and the touch panel control section 102 senses the selection. Then, the illumination device in the room 10200 is turned off, and the display control section 103 causes the display screen on the display 101 to transition to a display state of the control screen for the illumination device (the lower right diagram of FIG. 76), in which the control target region 10101 for the illumination device is displayed darkly with brightness less than the specific brightness.

On the other hand, the control screen for the illumination device (the right side in the lower row of FIG. 76), in which the control target region 10101 for the illumination device is displayed darkly with brightness less than the specific brightness, is displayed on the display 101 by the display control section 103. In this display state, the user selects the control target region 10101 for the illumination device, and the touch panel control section 102 senses the selection. Then, the illumination device in the room 10200 is turned on, and the display control section 103 causes the display screen on the display 101 to transition to a display state of the control screen for the illumination device (the left diagram in the lower row of FIG. 76), in which the control target region 10101 for the illumination device is displayed brightly with brightness not less than the specific brightness.

As described above with reference to FIGS. 72 to 76, when the user selects the device icon 10201 for the illumination device, the floor plan 500 functions as the control screen 10100 for the illumination device. This enables on/off control for the illumination device with an operation screen for operating the illumination device not displayed on the display 101. This eliminates the need for a step of the display control section 103 displaying an operation screen on the display 101 separately from the floor plan 500, which prevents an increase in number of process steps to be taken by the display control section 103 (the home controller 100).

(Light Quantity Control for Illumination Devices)

Figure 77:
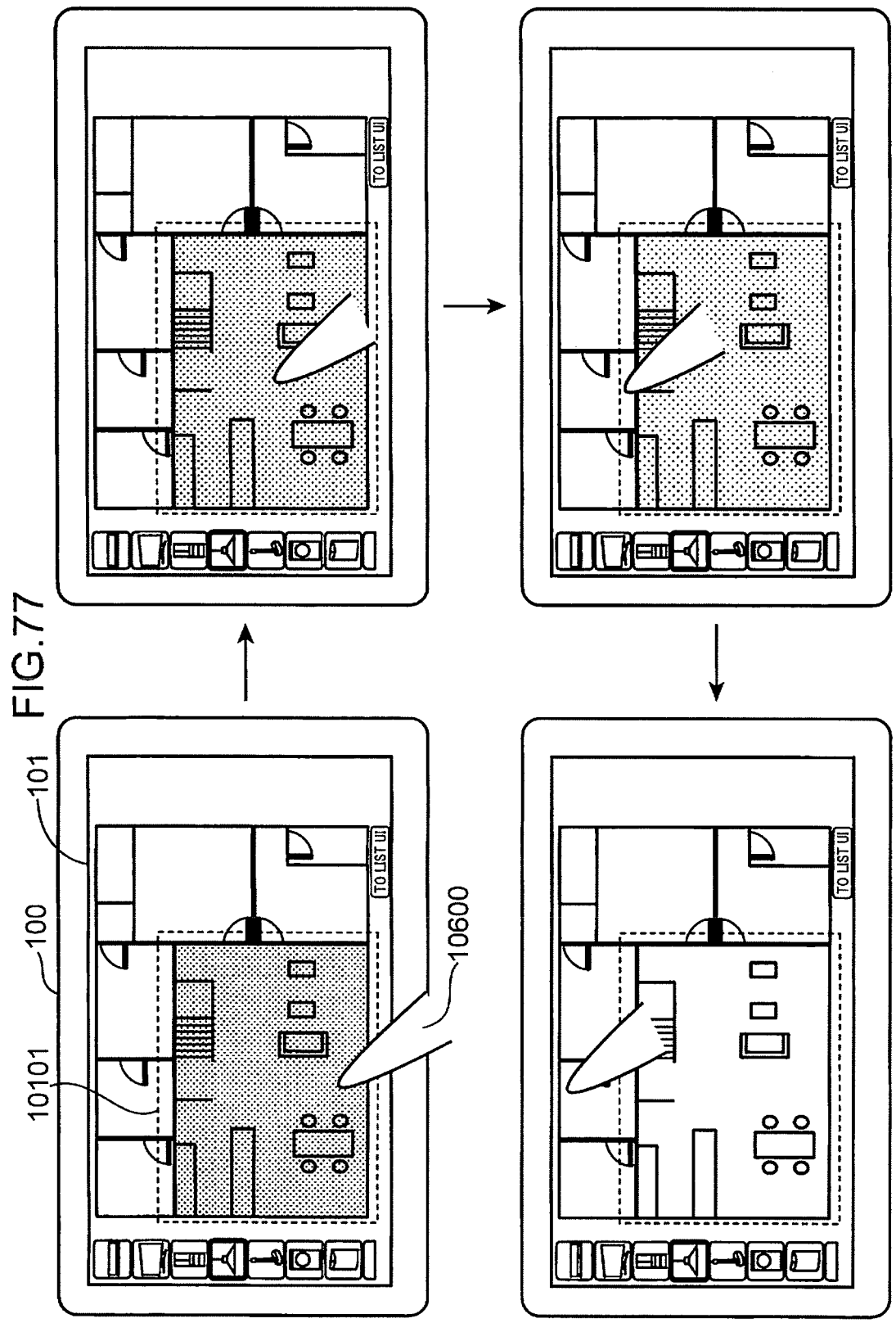
FIG. 77 is a diagram showing transition of the display screen on the display in an example of light quantity increase control for the illumination device according to the embodiment of the present disclosure.

FIG. 77 is a diagram showing transition of the display screen on the display 101 in an example of light quantity increase control for the illumination device.

First, the control screen for the illumination device, in which the control target region 10101 for the illumination device is displayed darkly with brightness less than the specific brightness, is displayed on the display 101 by the display control section 103 (the upper left diagram of FIG. 77). In this display state, the touch panel control section 102 senses that a contacting object 10600 contacts the control target region 10101 for the illumination device, and that the position of contact between the contacting object 10600 and the control target region 10101 for the illumination device moves upward (in the order of the upper left diagram, the upper right diagram, and the lower right diagram of FIG. 77) without the contacting object 10600 moving away from the control target region 10101 for the illumination device. At this time, the display control section 103 increases the brightness of the control target region 10101 for the illumination device displayed on the display 101 (in the order of the upper left diagram, the upper right diagram, and the lower right diagram of FIG. 77) as the amount of movement increases. The contacting object 10600 is a finger of the user, for example.

Even in the case where the touch panel control section 102 senses that the position of contact between the contacting object 10600 and the control target region 10101 for the illumination device moves out of the control target region 10101 for the illumination device (in the order of the lower right diagram and the lower left diagram of FIG. 77), the display control section 103 further increases the brightness of the control target region 10101 for the illumination device displayed on the display 101 (in the order of the lower right diagram and the lower left diagram of FIG. 77) as the amount of movement increases.

Then, as the position of contact between the contacting object 10600 and the control target region 10101 for the illumination device moves (the brightness of the control target region 10101 for the illumination device increases) (in the order of the upper left diagram, the upper right diagram, the lower right diagram, and the lower left diagram of FIG. 77), the illumination device installed in the room 10200 (in the upper row of FIG. 76) corresponding to the control target region 10101 for the illumination device is controlled such that its light quantity increases.

FIG. 78 is a diagram showing transition of the display screen on the display 101 in another example of light quantity increase control for the illumination device.

First, the control screen for the illumination device, in which the control target region 10101 for the illumination device is displayed darkly with brightness less than the specific brightness, is displayed on the display 101 by the display control section 103 (the upper left diagram of FIG. 78). In this display state, the touch panel control section 102 senses that a contacting object 10600 contacts the control target region 10101 for the illumination device, and that the position of contact between the contacting object 10600 and the control target region 10101 for the illumination device moves rightward (in the order of the upper left diagram, the upper right diagram, and the lower right diagram of FIG. 78) without the contacting object 10600 moving away from the control target region 10101 for the illumination device. At this time, the display control section 103 increases the brightness of the control target region 10101 for the illumination device displayed on the display 101 (in the order of the upper left diagram, the upper right diagram, and the lower right diagram of FIG. 78) as the amount of movement increases.

Even in the case where the touch panel control section 102 senses that the position of contact between the contacting object 10600 and the control target region 10101 for the illumination device moves out of the control target region 10101 for the illumination device (in the order of the lower right diagram and the lower left diagram of FIG. 78), the display control section 103 further increases the brightness of the control target region 10101 for the illumination device displayed on the display 101 (in the order of the lower right diagram and the lower left diagram of FIG. 78) as the amount of movement increases.

Then, as the position of contact between the contacting object 10600 and the control target region 10101 for the illumination device moves (the brightness of the control target region 10101 for the illumination device increases) (in the order of the upper left diagram, the upper right diagram, the lower right diagram, and the lower left diagram of FIG. 78), the illumination device in the room 10200 (in the upper row of FIG. 76) corresponding to the control target region 10101 for the illumination device is controlled such that its light quantity increases.

As described above with reference to FIGS. 77 and 78, even in the case where the touch panel control section 102 senses that the position of contact between the contacting object 10600 and the control target region 10101 for the illumination device moves out of the control target region 10101 for the illumination device, the display control section 103 increases the brightness of the control target region 10101 for the illumination device displayed on the display 101 as the amount of movement increases. Thus, a sufficient amount of movement can be secured even in the case where the display size of the control target region 10101 for the illumination device is small. As a result, the light quantity control for the illumination device can be performed suitably irrespective of the display size of the control target region 10101 for the illumination device.

Figure 79:
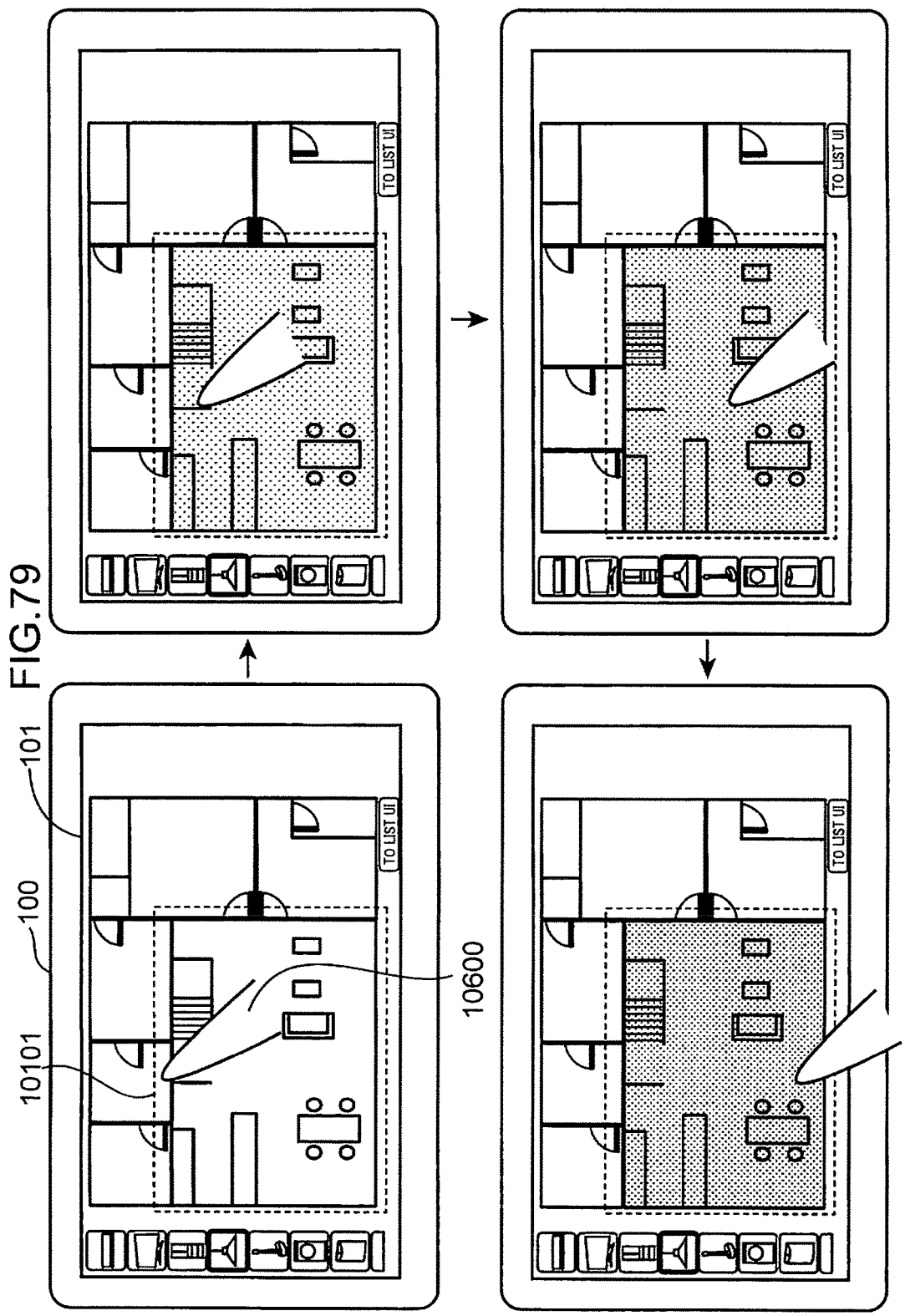
FIG. 79 is a diagram showing transition of the display screen on the display in an example of light quantity decrease control for the illumination device according to the embodiment of the present disclosure.

FIG. 79 is a diagram showing transition of the display screen on the display 101 in an example of light quantity decrease control for the illumination device.

First, the control screen for the illumination device, in which the control target region 10101 for the illumination device is displayed brightly with brightness not less than the specific brightness, is displayed on the display 101 by the display control section 103 (the upper left diagram of FIG. 79). In this display state, the touch panel control section 102 senses that a contacting object 10600 contacts the control target region 10101 for the illumination device, and that the position of contact between the contacting object 10600 and the control target region 10101 for the illumination device moves downward (in the order of the upper left diagram, the upper right diagram, the lower right diagram, and the lower left diagram of FIG. 79) without the contacting object 10600 moving away from the control target region 10101 for the illumination device. At this time, the display control section 103 decreases the brightness of the control target region 10101 for the illumination device displayed on the display 101 (in the order of the upper left diagram, the upper right diagram, the lower right diagram, and the lower left diagram of FIG. 79) as the amount of movement increases.

Then, as the position of contact between the contacting object 10600 and the control target region 10101 for the illumination device moves (the brightness of the control target region 10101 for the illumination device decreases) (in the order of the upper left diagram, the upper right diagram, the lower right diagram, and the lower left diagram of FIG. 79), the illumination device in the room 10200 (in the upper row of FIG. 76) corresponding to the control target region 10101 for the illumination device is controlled such that its light quantity decreases.

Figure 80:
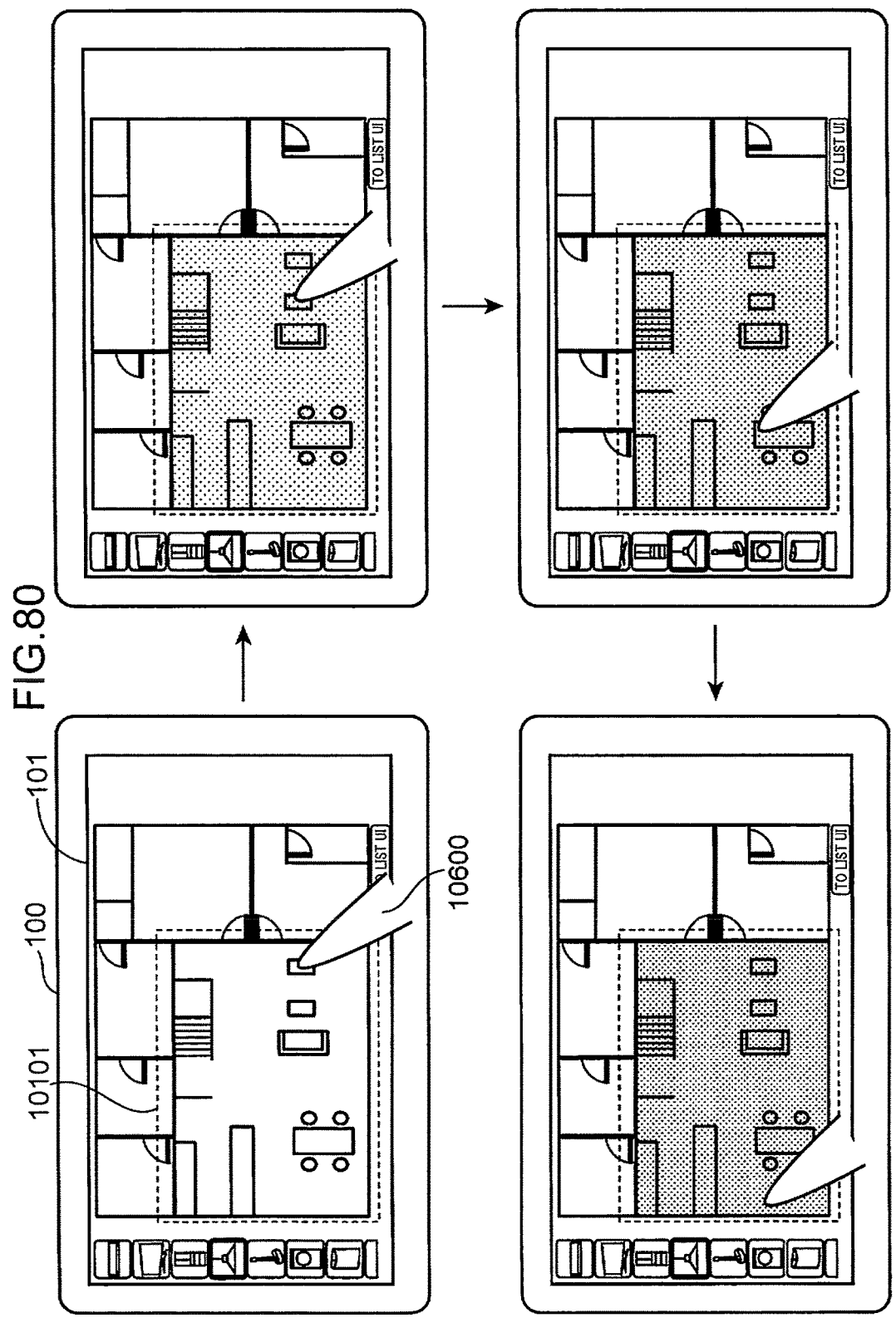
FIG. 80 is a diagram showing transition of the display screen on the display in another example of the light quantity decrease control for the illumination device according to the embodiment of the present disclosure.

FIG. 80 is a diagram showing transition of the display screen on the display 101 in another example of light quantity decrease control for the illumination device.

First, the control screen for the illumination device, in which the control target region 10101 for the illumination device is displayed brightly with brightness not less than the specific brightness, is displayed on the display 101 by the display control section 103 (the upper left diagram of FIG. 80). In this display state, the touch panel control section 102 senses that a contacting object 10600 contacts the control target region 10101 for the illumination device, and that the position of contact between the contacting object 10600 and the control target region 10101 for the illumination device moves leftward (in the order of the upper left diagram, the upper right diagram, the lower right diagram, and the lower left diagram of FIG. 80) without the contacting object 10600 moving away from the control target region 10101 for the illumination device. At this time, the display control section 103 decreases the brightness of the control target region 10101 for the illumination device displayed on the display 101 (in the order of the upper left diagram, the upper right diagram, the lower right diagram, and the lower left diagram of FIG. 80) as the amount of movement increases.

Then, as the position of contact between the contacting object 10600 and the control target region 10101 for the illumination device moves (the brightness of the control target region 10101 for the illumination device decreases) (in the order of the upper left diagram, the upper right diagram, the lower right diagram, and the lower left diagram of FIG. 80), the illumination device in the room 10200 (in the upper row of FIG. 76) corresponding to the control target region 10101 for the illumination device is controlled such that its light quantity decreases.

(Enlarged Control Screen)

Figure 81:
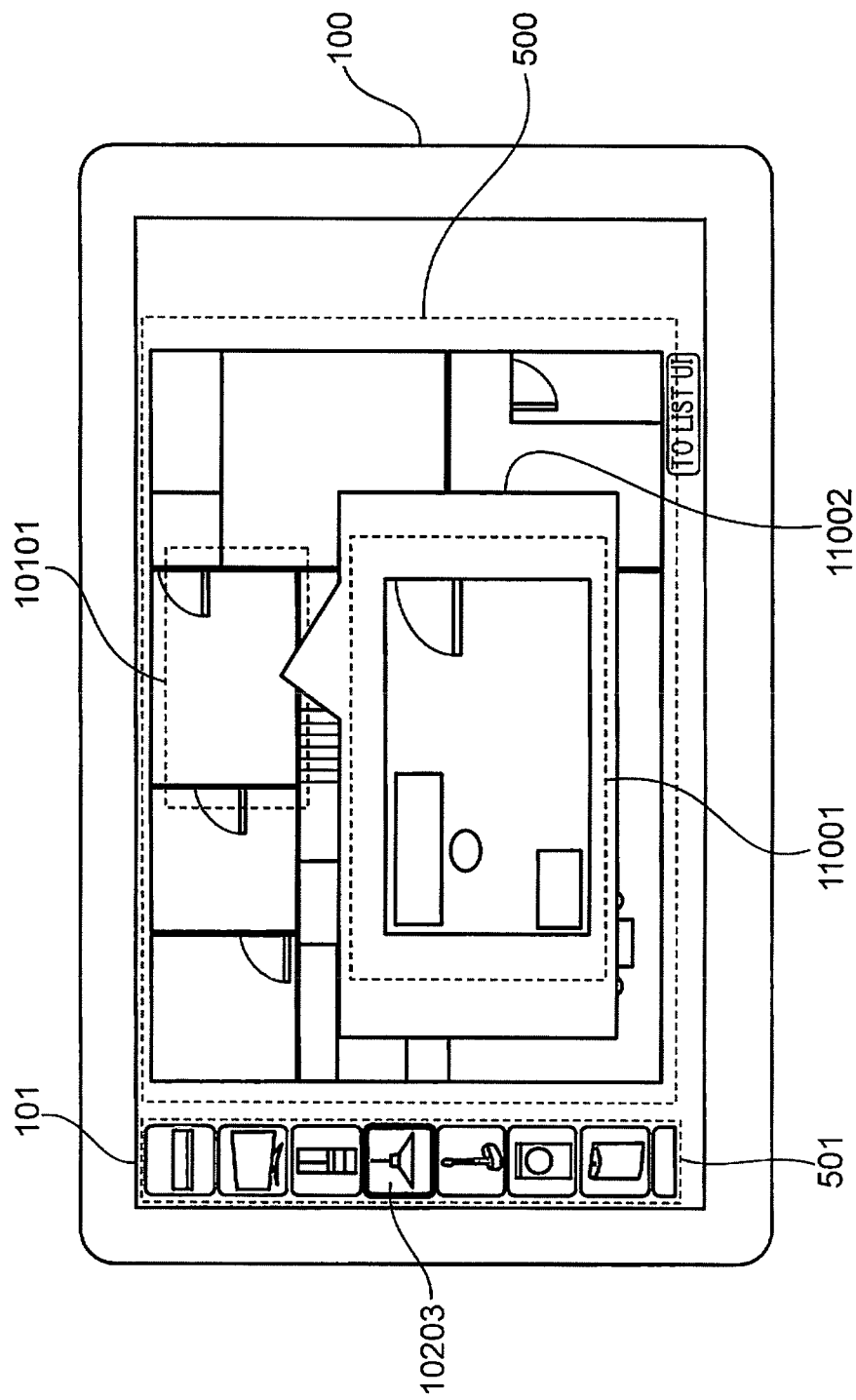
FIG. 81 is a diagram showing another example of the control screen for the illumination device displayed on the display of the home controller according to the embodiment of the present disclosure.
Figure 82:
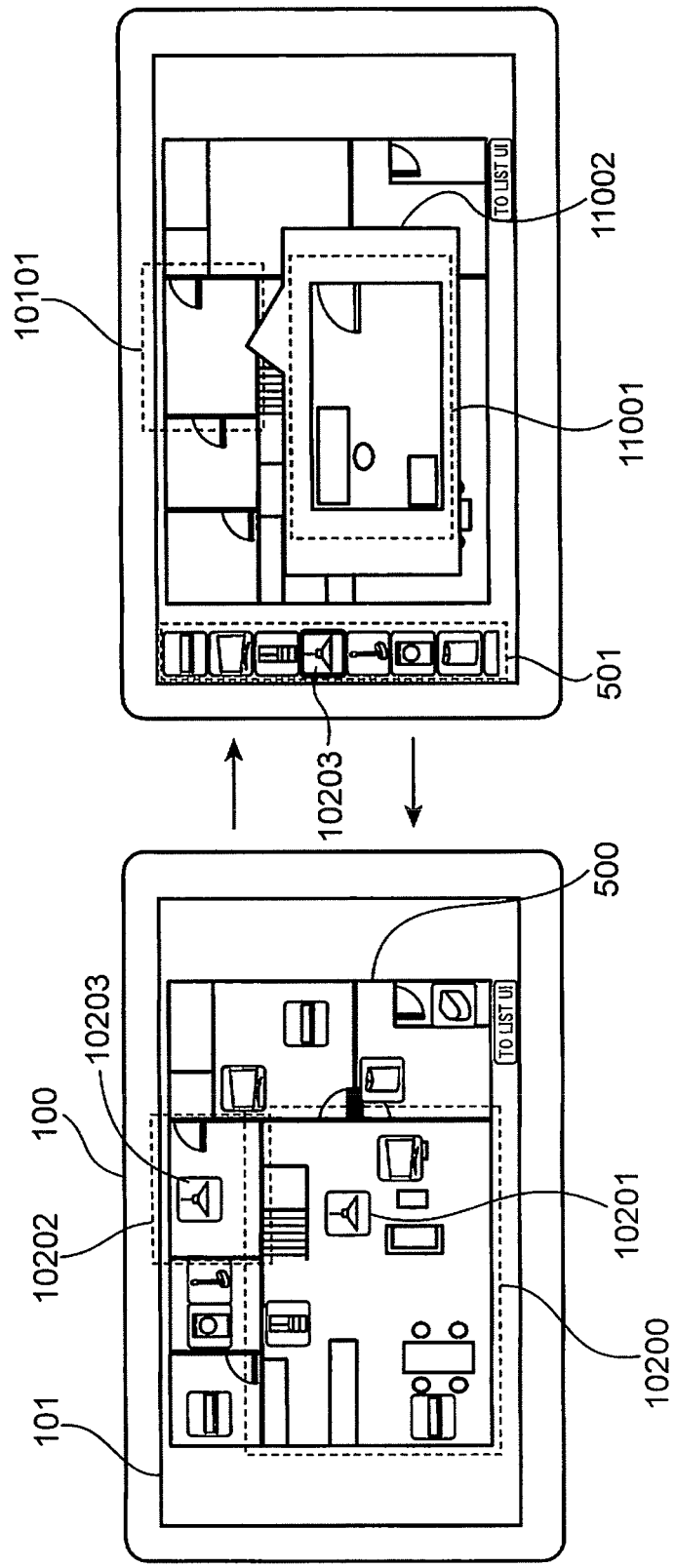
FIG. 82 is a diagram showing an example of transition of the display screen on the display of the home controller between the basic screen and the control screen for the illumination device according to the embodiment of the present disclosure.

FIG. 81 is a diagram showing another example of the control screen for the illumination device displayed on the display 101 of the home controller 100. FIG. 82 is a diagram showing an example of transition of the display screen on the display 101 of the home controller 100 between the basic screen and the control screen for the illumination device.

As shown in the left diagram of FIG. 82, the display control section 103 displays the basic screen on the display 101 of the home controller 100. In this display state, the user selects a device icon 10203 for the illumination device disposed in a room 10202 in which the illumination device is installed, and the touch panel control section 102 senses the selection. Then, as shown in the right diagram of FIG. 82 or FIG. 81, a region corresponding to the room 10202 is set as the control target region 10101 for the illumination device.

In addition, because the display size of the region corresponding to the room 10202 is smaller than a predetermined display size, the display control section 103 displays, on the display 101, a control screen 11002 for the illumination device (corresponding to an example of an adjustment screen according to an aspect of the present disclosure) including an enlarged screen 11001 for the room as superimposed on the floor plan 500. The predetermined display size is set in advance, and may be one-fourth the size of the display 101, for example.

Then, in the display state of the right diagram of FIG. 82 or FIG. 81, the user selects the device icon 10203 for the illumination device, or the user selects a region of the floor plan 500 other than the control screen 11002 for the illumination device, and the touch panel control section 102 senses the selection. Then, the display control section 103 returns the display screen on the display 101 to the display state of the basic screen shown in the left diagram of FIG. 82.

Figure 83:
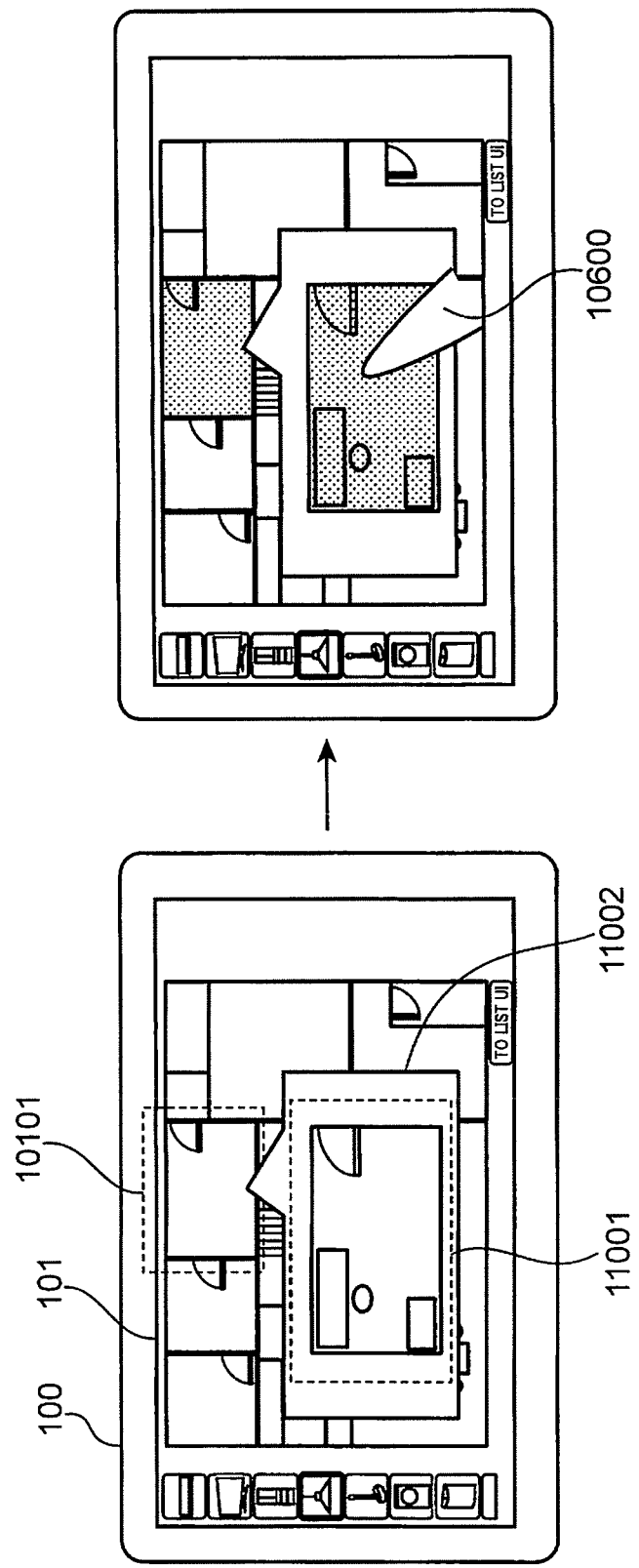
FIG. 83 is a diagram showing an example of transition of the display state of the control screen for the illumination device displayed on the display along with on/off control for the illumination device according to the embodiment of the present disclosure.

FIG. 83 is a diagram showing an example of transition of the display state of the control screen for the illumination device displayed on the display 101 along with on/off control for the illumination device.

In the left diagram of FIG. 83, the control screen 11002 for the illumination device including the enlarged screen 11001 for the room is displayed, in addition to the control target region 10101 for the illumination device, on the display 101 of the home controller 100 by the display control section 103. Here, the display control section 103 displays the control target region 10101 for the illumination device and the enlarged screen 11001 for the room brightly with brightness not less than the specific brightness. That is, it is indicated that the illumination device in the room of the control target region 10101 for the illumination device is turned on.

In the display state of the left diagram of FIG. 83, when contact of the contacting object 10600 with the control screen 11002 for the illumination device is detected by the touch panel control section 102, the display control section 103 causes the display screen on the display 101 to transition to the display state of the right diagram of FIG. 83. That is, the display control section 103 displays both the enlarged screen 11001 for the room and the control target region 10101 for the illumination device darkly with brightness less than the specific brightness. In addition, the illumination device installed in the room corresponding to the control target region 10101 for the illumination device is turned off.

As described above using FIGS. 81 to 83, in the case where the display size of the region corresponding to the room 10202 in which the illumination device is installed (or the control target region 10101 for the illumination device) is smaller than the predetermined display size, the display control section 103 displays the control screen 11002 for the illumination device including the enlarged screen 11001 for the room on the display 101 of the home controller 100. In the case where the display size of the region corresponding to the room 10202 is small, it is considered that it may be difficult for the user to cause the contacting object 10600 to adequately contact the region corresponding to the room 10202 (the control target region 10101 for the illumination device). According to the embodiment, in contrast, the display control section 103 displays the control screen 11002 for the illumination device including the enlarged screen 11001 for the room on the display 101. This allows the user to suitably control on and off of the illumination device irrespective of the display size of the region corresponding to the room.

(Device Icon for Illumination Device Used in Common)

Figure 84:
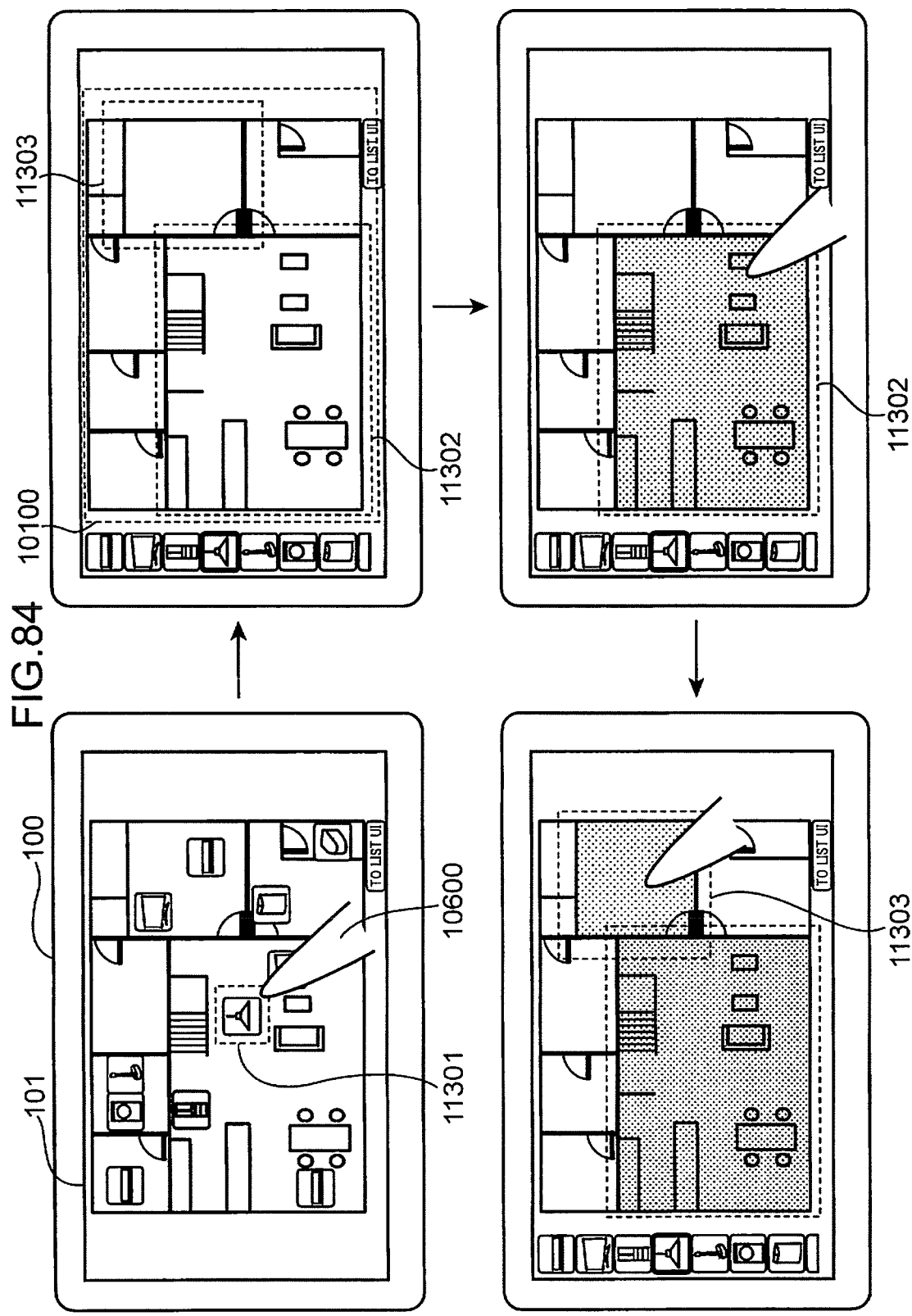
FIG. 84 is a diagram showing an example of transition of the display screen on the display of the home controller for a case where the device icon for one illumination device is commonly used to control illumination devices in plural rooms according to the embodiment of the present disclosure.
Figure 85:
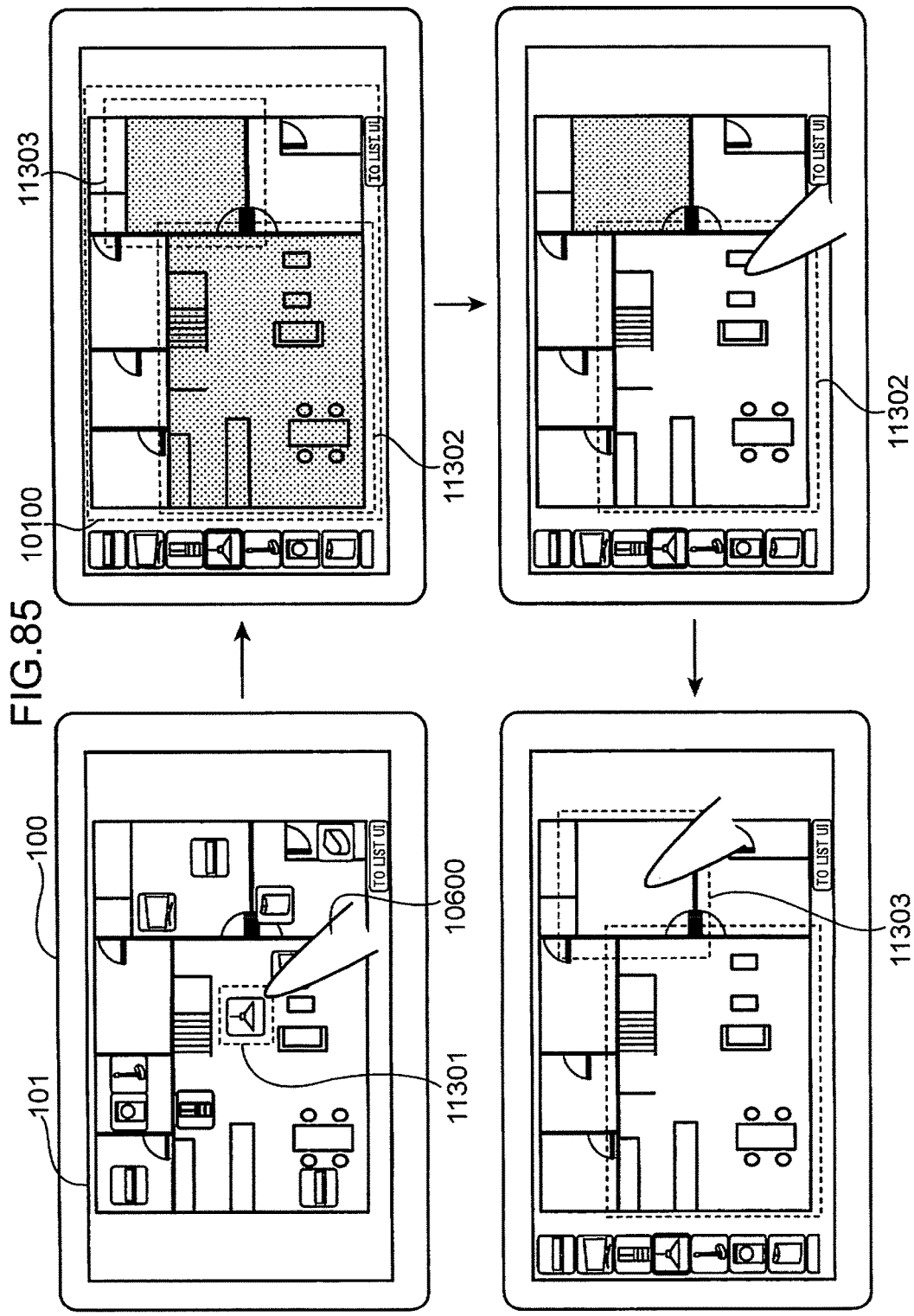
FIG. 85 is a diagram showing an example of transition of the display screen on the display of the home controller for a case where the device icon for the one illumination device is commonly used to control the illumination devices in the plurality of rooms according to the embodiment of the present disclosure.

FIGS. 84 and 85 are each a diagram showing an example of transition of the display screen on the display 101 of the home controller 100 for a case where one device icon for the illumination device is commonly used to control illumination devices in plural rooms. FIG. 84 shows an example of transition for a case where the illumination device is to be turned off. FIG. 85 shows an example of transition for a case where the illumination device is to be turned on.

In FIG. 84, the display control section 103 displays the basic screen on the display 101 of the home controller 100 (the upper left diagram of FIG. 84). In this display state, the user selects a device icon 11301 for the illumination device used in common using the contacting object 10600, and the touch panel control section 102 senses the selection. Then, the display control section 103 retracts the device icons, and displays the control screen 10100 for the illumination device on the display 101 (the upper right diagram of FIG. 84).

The control screen 10100 for the illumination device shown in the upper right diagram of FIG. 84 includes a first control target region 11302 for the illumination device and a second control target region 11303 for the illumination device. As described using FIG. 72, the control screen 10100 for the illumination device has the same display content as that of the floor plan 500 (FIG. 72). As shown in the upper right diagram of FIG. 84, the display control section 103 displays the first control target region 11302 for the illumination device and the second control target region 11303 for the illumination device brightly with brightness not less than the specific brightness. This indicates that the illumination devices in the respective corresponding rooms are turned on.

With the control screen 10100 for the illumination device displayed on the display 101 by the display control section 103, the user selects the first control target region 11302 for the illumination device using the contacting object 10600, and the touch panel control section 102 senses the selection. Then, the illumination device in the corresponding room is turned off, and the display control section 103 displays the first control target region 11302 for the illumination device darkly with brightness less than the specific brightness (the lower right diagram of FIG. 84).

Subsequently, the user selects the second control target region 11303 for the illumination devices using the contacting object 10600, and the touch panel control section 102 senses the selection. Then, the illumination device in the corresponding room is turned off, and the display control section 103 displays the second control target region 11303 for the illumination device darkly with brightness less than the specific brightness (the lower left diagram of FIG. 84).

In FIG. 85, the display control section 103 displays the basic screen on the display 101 of the home controller 100 (the upper left diagram of FIG. 85). In this display state, the user selects a device icon 11301 for the illumination device used in common using the contacting object 10600, and the touch panel control section 102 senses the selection. Then, the display control section 103 retracts the device icons, and displays the control screen 10100 for the illumination device on the display 101 (the upper right diagram of FIG. 85).

As shown in the upper right diagram of FIG. 85, unlike the case of FIG. 84, the display control section 103 displays the first control target region 11302 for the illumination device and the second control target region 11303 for the illumination device darkly with brightness less than the specific brightness. This indicates that the illumination devices in the respective corresponding rooms are turned off.

With the control screen 10100 for the illumination device displayed on the display 101 by the display control section 103, the user selects the first control target region 11302 for the illumination device using the contacting object 10600, and the touch panel control section 102 senses the selection. Then, the illumination device in the corresponding room is turned on, and the display control section 103 displays the first control target region 11302 for the illumination device brightly with brightness not less than the specific brightness (the lower right diagram of FIG. 85).

Subsequently, the user selects the second control target region 11303 for the illumination devices using the contacting object 10600, and the touch panel control section 102 senses the selection. Then, the illumination device in the corresponding room is turned on, and the display control section 103 displays the second control target region 11303 for the illumination device brightly with brightness not less than the specific brightness (the lower left diagram of FIG. 85).

As described above using FIGS. 84 and 85, the illumination devices in two control target regions, namely the first control target region 11302 for the illumination device and the second control target region 11303 for the illumination device, can be controlled using the device icon 11301 for the illumination device used in common. Thus, the number of device icons for the illumination devices in the basic screen displayed on the display 101 can be reduced. As a result, complication of the basic screen displayed on the display 101 due to a large number of device icons can be avoided.

Although the device icon 11301 for the illumination device used in common is commonly used to control illumination devices in two rooms in FIGS. 84 and 85, the home controller 100 according to the embodiment is not limited thereto. For example, the device icon 11301 for the illumination device used in common may be commonly used to control illumination devices in three or more rooms. In general, illumination devices are installed in all the rooms. Therefore, the device icon 11301 for the illumination device used in common may be commonly used to control the illumination devices in all the rooms.

Although the device icon 11301 for the illumination device used in common is disposed in one of the rooms of the control targets in FIGS. 84 and 85, the home controller 100 according to the embodiment is not limited thereto.

Figure 86:
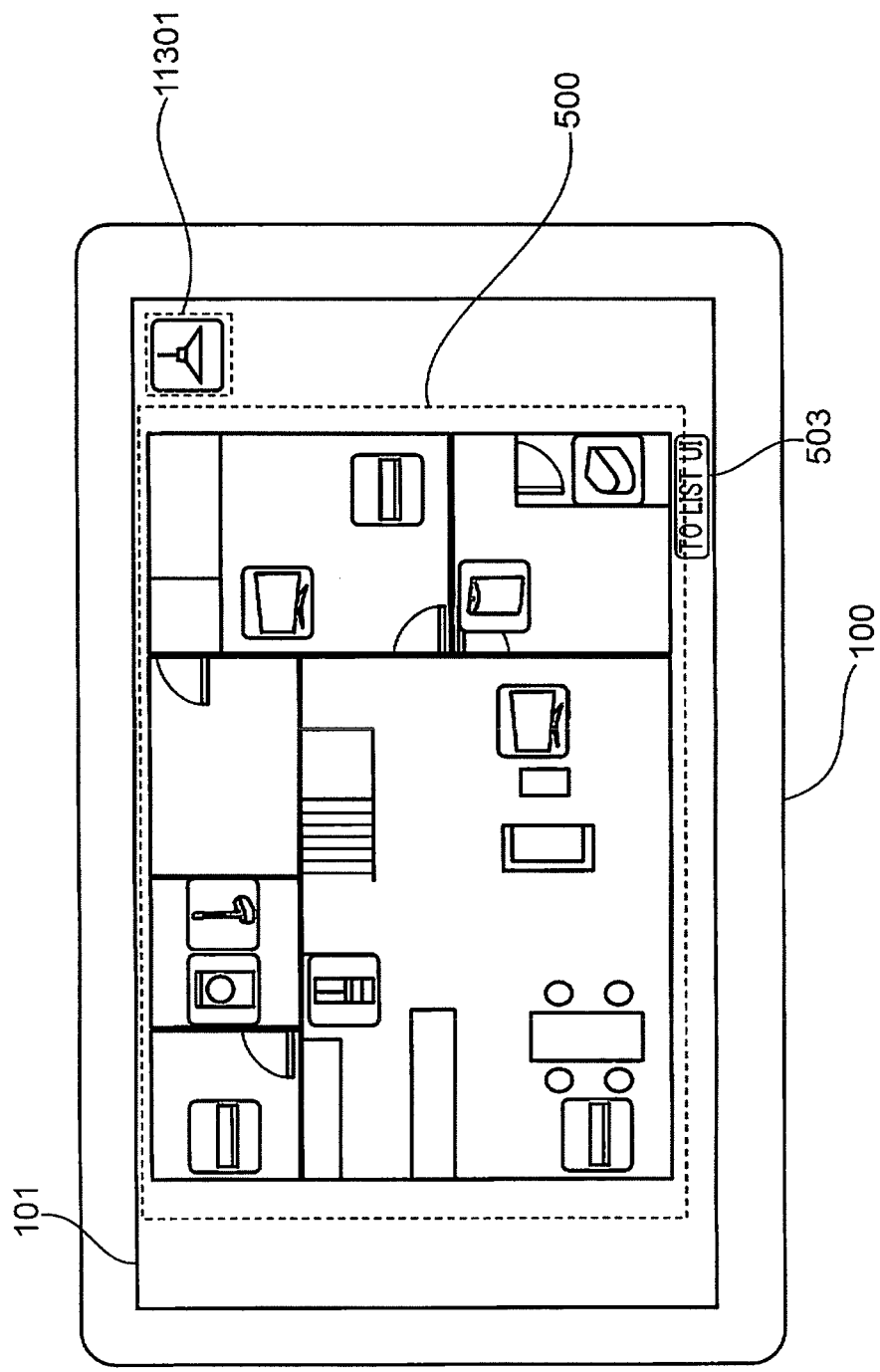
FIG. 86 is a diagram showing another example of the arrangement of the device icon for the illumination device used in common according to the embodiment of the present disclosure.

FIG. 86 is a diagram showing another example of the arrangement of the device icon 11301 for the illumination device used in common. In FIG. 86, the display control section 103 disposes the device icon 11301 for the illumination device used in common outside the display region of the floor plan 500. In particular, in the case where the device icon 11301 for the illumination device used in common is commonly used to control the illumination devices in all the rooms, the display control section 103 preferably disposes the device icon 11301 for the illumination device used in common outside the display region of the floor plan 500 as shown in FIG. 86. This arrangement indicates that the device icon 11301 for the illumination device used in common is commonly used to control the illumination devices in all the rooms rather than being limited to control for particular rooms.

Although the display control section 103 forms the device icon 11301 for the illumination device used in common using an image that resembles an illumination device in FIGS. 84 to 86, the display control section 103 may instead use an icon with a text "ILLUMINATION MODE", for example. Then, the icon with the text "ILLUMINATION MODE" may be commonly used to control the illumination devices in all the rooms. Use of the icon with the text "ILLUMINATION MODE" indicates that the illumination devices in all the rooms can be controlled in the illumination mode.

(Control of Illumination Device in Staircase Region)

Figure 87:
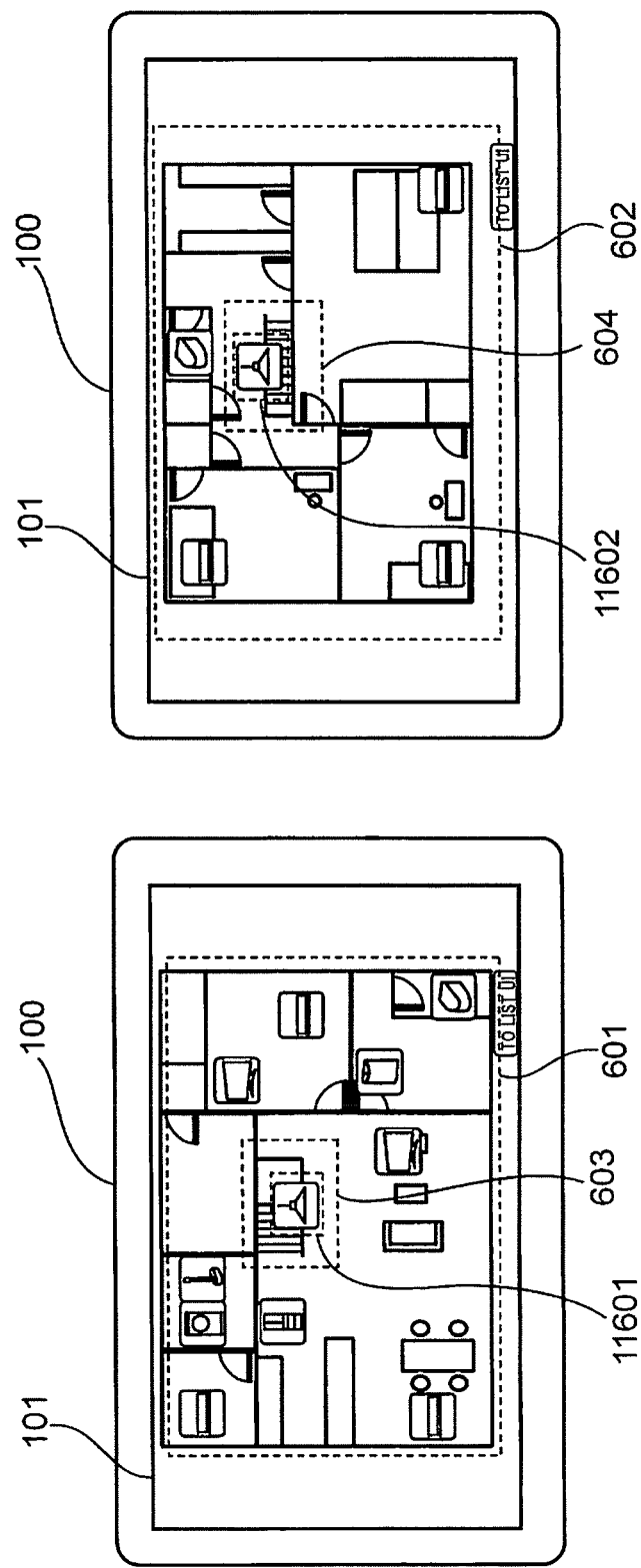
FIG. 87 is a diagram showing an example of the basic screen displayed on the display of the home controller according to the embodiment of the present disclosure.

FIG. 87 is a diagram showing an example of the basic screen displayed on the display 101 of the home controller 100. The left diagram of FIG. 87 shows a display state of the first floor of the basic screen. The right diagram of FIG. 87 shows a display state of the second floor of the basic screen.

In the display state of the first floor of the basic screen, the display control section 103 displays the floor plan 601 for the first floor on the display 101 as shown in the left diagram of FIG. 87. The floor plan 601 for the first floor includes the staircase region 603. A device icon 11601 for the illumination device in the staircase region on the first floor is disposed in the staircase region 603.

In the display state of the second floor of the basic screen, meanwhile, the display control section 103 displays the floor plan 602 for the second floor on the display 101 as shown in the right diagram of FIG. 87. The floor plan 602 for the second floor includes the staircase region 604. A device icon 11602 for the illumination device in the staircase region on the second floor is disposed in the staircase region 604.

Figure 88:
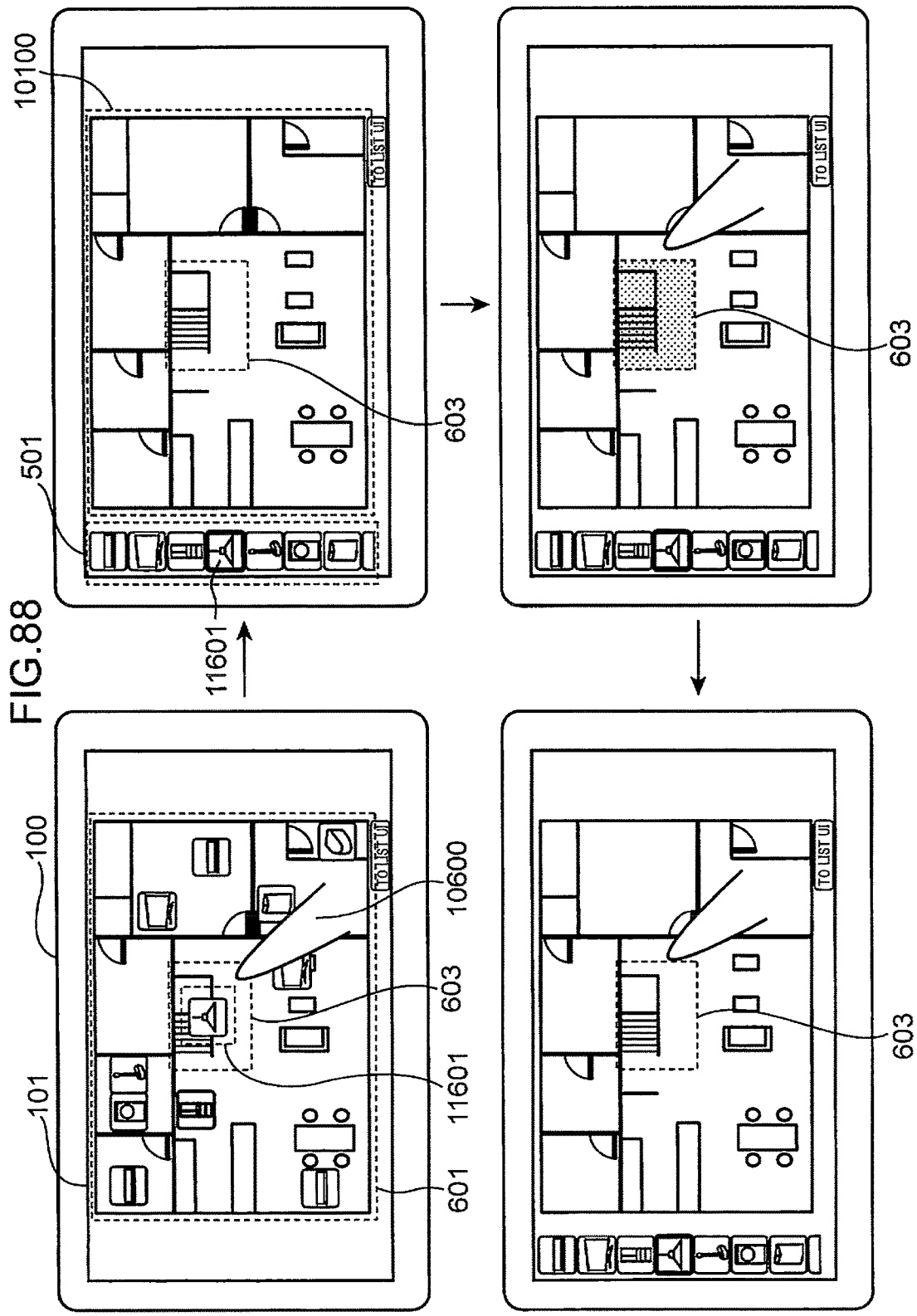
FIG. 88 is a diagram showing an example of transition of the display screen on the display of the home controller made through on/off control for the illumination device performed using the device icon for the illumination device in a staircase region on the first floor according to the embodiment of the present disclosure.

FIG. 88 is a diagram showing an example of transition of the display screen on the display 101 of the home controller 100, the transition being made through on/off control for the illumination device using the device icon for the illumination device in the staircase region on the first floor.

The floor plan 601 for the first floor is displayed as the basic screen on the display 101 of the home controller 100 by the display control section 103 (the upper left diagram of FIG. 88). In this display state, the user selects the device icon 11601 for the illumination device in the staircase region on the first floor using the contacting object 10600, and the touch panel control section 102 senses the selection. Then, the display control section 103 retracts the device icons 501, and displays the control screen 10100 for the illumination device on the display 101 (the upper right diagram of FIG. 88).

As described using FIG. 72 etc., the control screen 10100 for the illumination device has the same display content as that of the floor plan 601 for the first floor. As shown in the upper right diagram of FIG. 88, the display control section 103 displays the staircase region 603 brightly with brightness not less than the specific brightness. This indicates that the illumination device at the staircase is turned on.

With the control screen 10100 for the illumination device displayed on the display 101 by the display control section 103 (the upper right diagram of FIG. 88), the user selects the staircase region 603 using the contacting object 10600, and the touch panel control section 102 senses the selection. Then, the illumination device at the staircase is turned off, and the display control section 103 displays the staircase region 603 darkly with brightness less than the specific brightness (the lower right diagram of FIG. 88). Further, the user selects the staircase region 603 using the contacting object 10600, and the touch panel control section 102 senses the selection. Then, the illumination device at the staircase is turned on, and the display control section 103 displays the staircase region 603 brightly with brightness not less than the specific brightness (the lower left diagram of FIG. 88).

FIG. 89 is a diagram showing an example of transition of the display screen on the display 101 of the home controller 100, the transition being made through on/off control for the illumination device using the device icon for the illumination device in the staircase region on the second floor.

The floor plan 602 for the second floor is displayed as the basic screen on the display 101 of the home controller 100 by the display control section 103 (the upper left diagram of FIG. 89). In this display state, the user selects the device icon 11602 for the illumination device in the staircase region on the second floor using the contacting object 10600, and the touch panel control section 102 senses the selection. Then, the display control section 103 retracts the device icons 501, and displays the control screen 10100 for the illumination device on the display 101 (the upper right diagram of FIG. 89).

As described using FIG. 72 etc., the control screen 10100 for the illumination device has the same display content as that of the floor plan 602 for the second floor. As shown in the upper right diagram of FIG. 89, the display control section 103 displays the staircase region 604 brightly with brightness not less than the specific brightness. This indicates that the illumination device at the staircase is turned on.

With the control screen 10100 for the illumination device displayed on the display 101 by the display control section 103 (the upper right diagram of FIG. 89), the user selects the staircase region 604 using the contacting object 10600, and the touch panel control section 102 senses the selection. Then, the illumination device at the staircase is turned off, and the display control section 103 displays the staircase region 604 darkly with brightness less than the specific brightness (the lower right diagram of FIG. 89). Further, the user selects the staircase region 604 using the contacting object 10600, and the touch panel control section 102 senses the selection. Then, the illumination device at the staircase is turned on, and the display control section 103 displays the staircase region 604 brightly with brightness not less than the specific brightness (the lower left diagram of FIG. 89).

(Enlarged Control Screen for Staircase Region)

FIG. 90 is a diagram showing an example of transition of the display screen on the display 101 of the home controller 100 between the display state of the first floor of the basic screen and the display state of the control screen for the illumination device on the first floor. FIG. 90 shows an example of a control screen for an illumination device that is different from the control screen for the illumination device shown in FIGS. 88 and 89.

As shown in the left diagram of FIG. 90, the floor plan 601 for the first floor is displayed as the basic screen on the display 101 of the home controller 100 by the display control section 103. In this display state, the user selects the device icon 11601 for the illumination device in the staircase region on the first floor disposed in the staircase region 603, and the touch panel control section 102 senses the selection. Then, the display control section 103 causes the display screen on the display 101 to transition to the display state shown in the right diagram of FIG. 90. That is, the display control section 103 retracts the device icons 501 out of the floor plan 601 for the first floor. In addition, the display control section 103 displays, on the display 101, the control screen 11002 for the illumination device (corresponding to an example of the adjustment screen according to an aspect of the present disclosure) including an enlarged screen 11901 for the staircase as superimposed on the floor plan 601 for the first floor. The display size of the control screen 11002 for the illumination device is larger than the display size of the staircase region 603.

In the display state of the right diagram of FIG. 90, meanwhile, the user selects the device icon 11601 for the illumination device in the staircase region on the first floor, or the user selects a region of the floor plan 601 for the first floor other than the control screen 11002 for the illumination device, and the touch panel control section 102 senses the selection. Then, the display control section 103 causes the display screen on the display 101 to transition to the display state of the basic screen shown in the left diagram of FIG. 90.

FIG. 91 is a diagram showing an example of transition of the display screen on the display 101 of the home controller 100, the transition being made through light on/off control for the illumination device using the enlarged control screen for the illumination device.

The floor plan 601 for the first floor is displayed as the basic screen on the display 101 of the home controller 100 by the display control section 103 (the upper left diagram of FIG. 91). In this display state, the user selects the device icon 11601 for the illumination device in the staircase region on the first floor using the contacting object 10600, and the touch panel control section 102 senses the selection. Then, the display control section 103 retracts each device icon 501, and displays the control screen 11002 for the illumination device including the enlarged screen 11901 for the staircase on the display 101 (the upper right diagram of FIG. 91). As shown in the upper right diagram of FIG. 91, the display control section 103 displays the enlarged screen 11901 for the staircase and the staircase region 603 brightly with brightness not less than the specific brightness. This indicates that the illumination device at the staircase is turned on.

With the control screen 11002 for the illumination device displayed on the display 101 by the display control section 103 (the upper right diagram of FIG. 91), the user selects the control screen 11002 for the illumination device using the contacting object 10600, and the touch panel control section 102 senses the selection. Then, the illumination device at the staircase is turned off, and the display control section 103 displays the enlarged screen 11901 for the staircase and the staircase region 603 darkly with brightness less than the specific brightness (the lower right diagram of FIG. 91).

Further, the user selects the control screen 11002 for the illumination device using the contacting object 10600, and the touch panel control section 102 senses the selection. Then, the illumination device at the staircase is turned on, and the display control section 103 displays the enlarged screen 11901 for the staircase and the staircase region 603 brightly with brightness not less than the specific brightness (the lower left diagram of FIG. 91).

FIG. 92 is a diagram showing an example of transition of the display screen on the display 101 of the home controller 100, the transition being made through light quantity control for the illumination device using the enlarged control screen for the illumination device.

First, the control screen 11002 for the illumination device is displayed on the display 101 by the display control section 103 (the upper left diagram of FIG. 92) with the enlarged screen 11901 for the staircase and the staircase region 603 displayed darkly with brightness less than the specific brightness. In this display state, the touch panel control section 102 senses that a contacting object 10600 contacts the control screen 11002 for the illumination device, and that the position of contact between the contacting object 10600 and the control screen 11002 for the illumination device moves upward (in the order of the upper left diagram, the upper right diagram, and the lower right diagram of FIG. 92) without the contacting object 10600 moving away from the control target region 11002 for the illumination device. At this time, the display control section 103 increases the brightness of the enlarged screen 11901 for the staircase and the staircase region 603 displayed on the display 101 (in the order of the upper left diagram, the upper right diagram, and the lower right diagram of FIG. 92) as the amount of movement increases.

Even in the case where the touch panel control section 102 senses that the position of contact between the contacting object 10600 and the control screen 11002 for the illumination device moves out of the control screen 11002 for the illumination device (in the order of the lower right diagram and the lower left diagram of FIG. 92), the display control section 103 further increases the brightness of the enlarged screen 11901 for the staircase and the staircase region 603 displayed on the display 101 (in the order of the lower right diagram and the lower left diagram of FIG. 92) as the amount of movement increases.

As the position of contact between the contacting object 10600 and the control screen 11002 for the illumination device moves (the brightness of the control screen 11002 for the illumination device increases), the illumination device at the staircase 603 corresponding to the control screen 11002 for the illumination device is controlled such that its light quantity increases.

(Control Flow for Illumination Device)

Figure 93A:
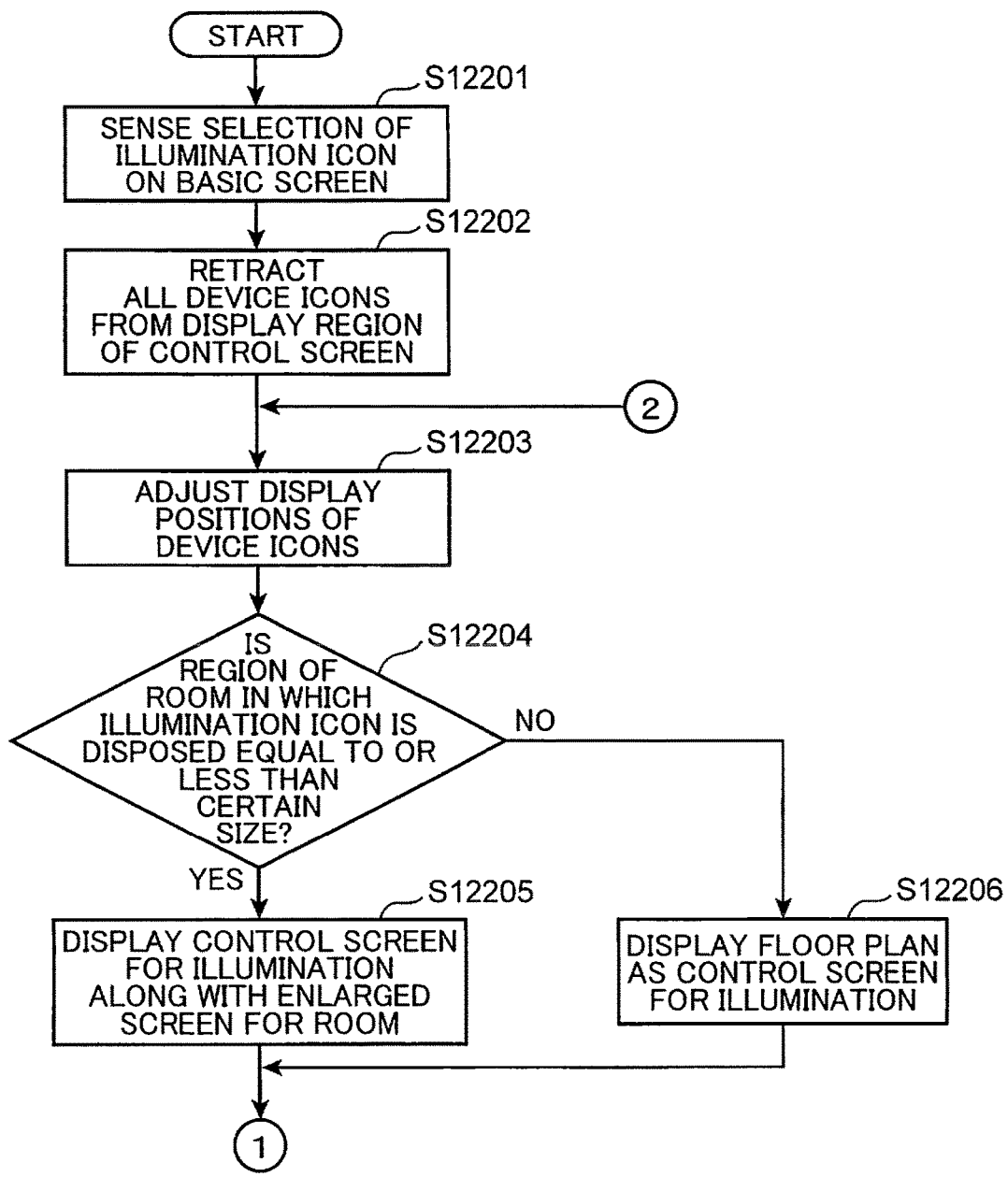
FIG. 93A is a flowchart showing the flow of a process for the home controller to control the illumination device according to the embodiment of the present disclosure.
Figure 93B:
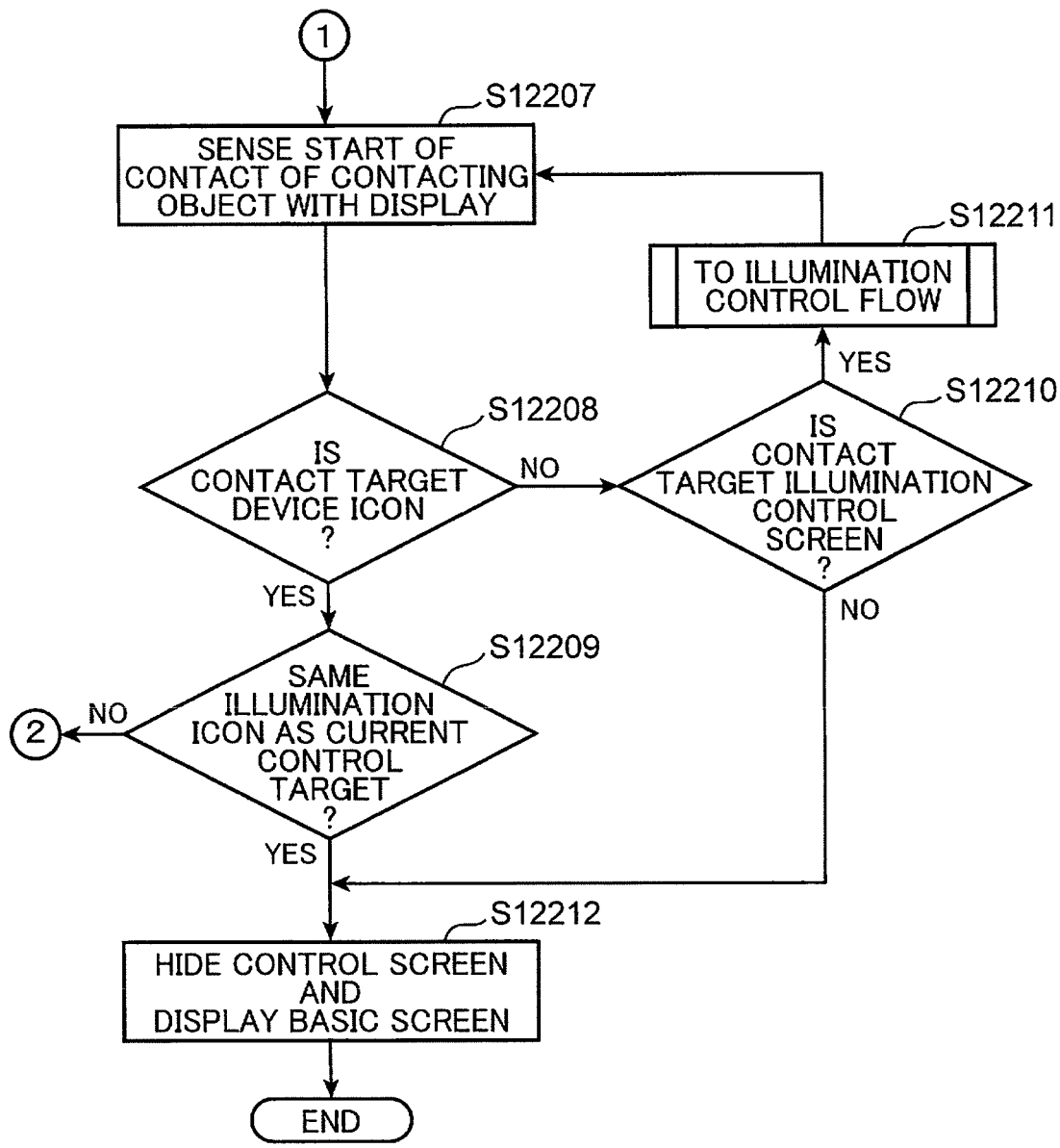
FIG. 93B is a flowchart showing the flow of a process for the home controller to control the illumination device according to the embodiment of the present disclosure.

FIGS. 93A and 93B are each a flowchart showing the flow of a process for the home controller 100 to control the illumination device.

S12201 to S12203 are substantially the same as S3501 to S3505 in FIG. 39A, respectively. That is, the touch panel control section 102 senses that the device icon for the illumination device is selected by the user on the basic screen (S12201). Next, the display control section 103 retracts all the device icons 501 out of the display region of the control screen (S12202). Next, the display control section 103 adjusts the display positions of the retracted device icons 501 (S12203).

Although S3504 following S3503 is executed in FIG. 39A, no step corresponding to S3504 is executed in FIG. 93A. This is because the device icon for the illumination device is selected in S12201 of FIG. 93A, and the control screen for the illumination device inevitably uses a floor plan rather than a dedicated screen, and therefore there is no need for a process corresponding to S3504 in which a discrimination is made as to whether the control screen is a dedicated screen or a floor plan.

Subsequently to S12203, it is discriminated whether or not the display size of the region corresponding to the room, in which the device icon for the illumination device selected in S12201 is disposed, is not more than a specific display size (S12204). If the display size of the region corresponding to the room is not more than the specific display size (YES in S12204), the display control section 103 displays the control screen 11002 for the illumination device along with the enlarged screen 11001 for the room on the display 101 (S12205), and the process is advanced to S12207. If the display size of the region corresponding to the room exceeds the specific display size (NO in S12204), on the other hand, the display control section 103 displays the floor plan 500 as the control screen 10100 for the illumination device (S12206), and the process is advanced to S12207.

If the touch panel control section 102 senses start of contact of the contacting object 10600 with the display 101 in S12207, the touch panel control section 102 determines whether or not the contact target is the device icon 501 (S12208).

If it is determined that the device icon 501 is contacted (YES in S12208), the touch panel control section 102 determines whether or not the contacting object 10600 contacts the same device icon as the device icon for the illumination device selected in S12201 (S12209). If the contacting object 10600 does not contact the same device icon (NO in S12209), the process returns to S12203. In the case where it is determined that the contacting object 10600 contacts the same device icon as the device icon for the illumination device selected in S12201 (YES in S12209), on the other hand, the display control section 103 hides the control screen for the illumination device and displays the basic screen on the display 101 (S12212). The flow is thus terminated.

In the case where the touch panel control section 102 determines in S12208 that the device icon 501 is not contacted (NO in S12208), meanwhile, the touch panel control section 102 further determines whether or not the contact target is the control screen for the illumination device (S12210). In the case where it is determined that the contact target is not the control screen for the illumination device (NO in S12210), the process is advanced to S12212.

If the touch panel control section 102 determines that the contacting object contacts a button or the like within the control screen for the illumination device (YES in S12210), on the other hand, the process is advanced to the control flow for the illumination device (FIG. 94) (S12211), and thereafter the process returns to S12207.

Figure 94:
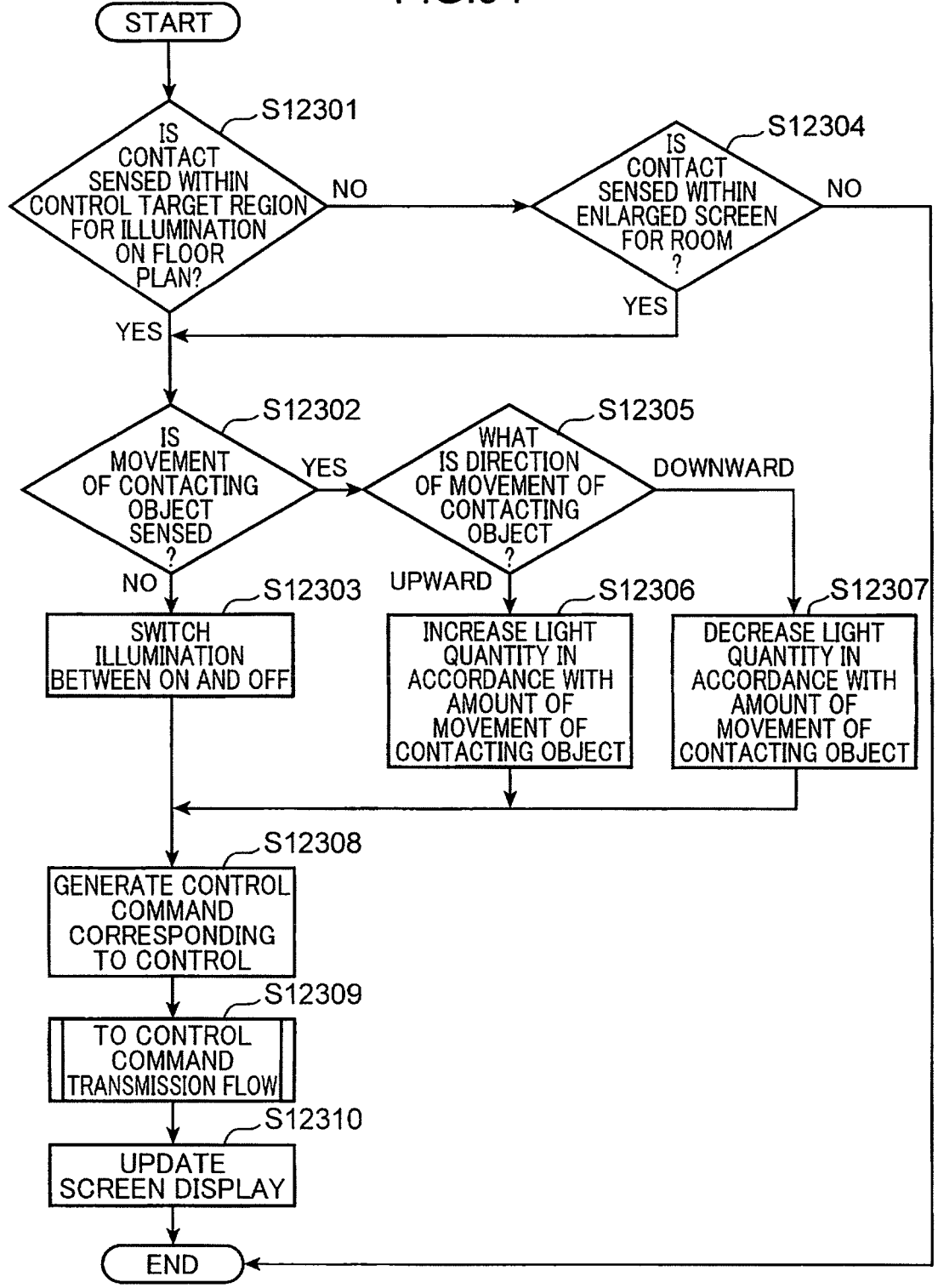
FIG. 94 is a flowchart showing the flow of a process for the home controller to generate a control command for the illumination device in accordance with the content of a contact of a contacting object according to the embodiment of the present disclosure.

FIG. 94 is a flowchart showing the flow of a process for the home controller 100 to generate a control command for the illumination device in accordance with the content of a contact of the contacting object 10600.

First, the touch panel control section 102 discriminates whether or not a contact of the contacting object 10600 is sensed within the control target region for the illumination device on the floor plan (that is, the control screen for the illumination device) (S12301). If a contact of the contacting object 10600 is not sensed within the control target region for the illumination device (NO in S12301), the touch panel control section 102 discriminates whether or not a contact of the contacting object 10600 is sensed within the enlarged screen for the room (S12304). If a contact of the contacting object 10600 is also not sensed within the enlarged screen for the room (NO in S12304), the flow is terminated.

If the touch panel control section 102 senses a contact of the contacting object 10600 within the control target region for the illumination device in S12301 on the other hand (YES in S12301), the process is advanced to S12302. If the touch panel control section 102 senses a contact of the contacting object 10600 within the enlarged screen for the room in S12304 (YES in S12304), meanwhile, the process is advanced to S12302.

In S12302, the touch panel control section 102 discriminates whether or not movement of the contacting object 10600 in the contacting state is sensed. If movement of the contacting object 10600 is not sensed (NO in S12302), the process is advanced to S12303. If movement of the contacting object 10600 is sensed (YES in S12302), the touch panel control section 102 discriminates the moving direction of the contacting object 10600 (S12305). If the moving direction of the contacting object 10600 is the upward direction, the process is advanced to S12306. If the moving direction of the contacting object 10600 is the downward direction, the process is advanced to S12307.

In S12303, the device control section 106 decides on control to switch between on and off of the illumination device, and the process is advanced to S12308. In S12306, the device control section 106 decides on control to increase the light quantity in accordance with the amount of movement of the contacting object 10600, and the process is advanced to S12308. In S12307, the device control section 106 decides on control to decrease the light quantity in accordance with the amount of movement of the contacting object 10600, and the process is advanced to S12308.

In S12308, the device control section 106 generates a control command corresponding to the decided control. In the embodiment, a control command corresponding to control to switch between on and off of the illumination device decided in S12303 corresponds to an example of the first control command and the on/off control command according to an aspect of the present disclosure, a control command corresponding to control to switch the illumination device from off to on decided in S12303 corresponds to an example of the on control command according to an aspect of the present disclosure, and a control command corresponding to control to switch the illumination device from on to off decided in S12303 corresponds to an example of the off control command according to an aspect of the present disclosure. In addition, a control command corresponding to control to increase the light quantity in accordance with the amount of movement of the contacting object 10600 decided in S12306 and a control command corresponding to control to decrease the light quantity in accordance with the amount of movement of the contacting object 10600 decided in S12307 correspond to an example of the second control command according to an aspect of the present disclosure.

Then, the process is advanced to a control command transmission flow (S12309). Subsequently, the display control section 103 updates the screen display on the display 101 in accordance with the control command generated in S12308 (S12310). The flow is thus terminated.

Figure 41:
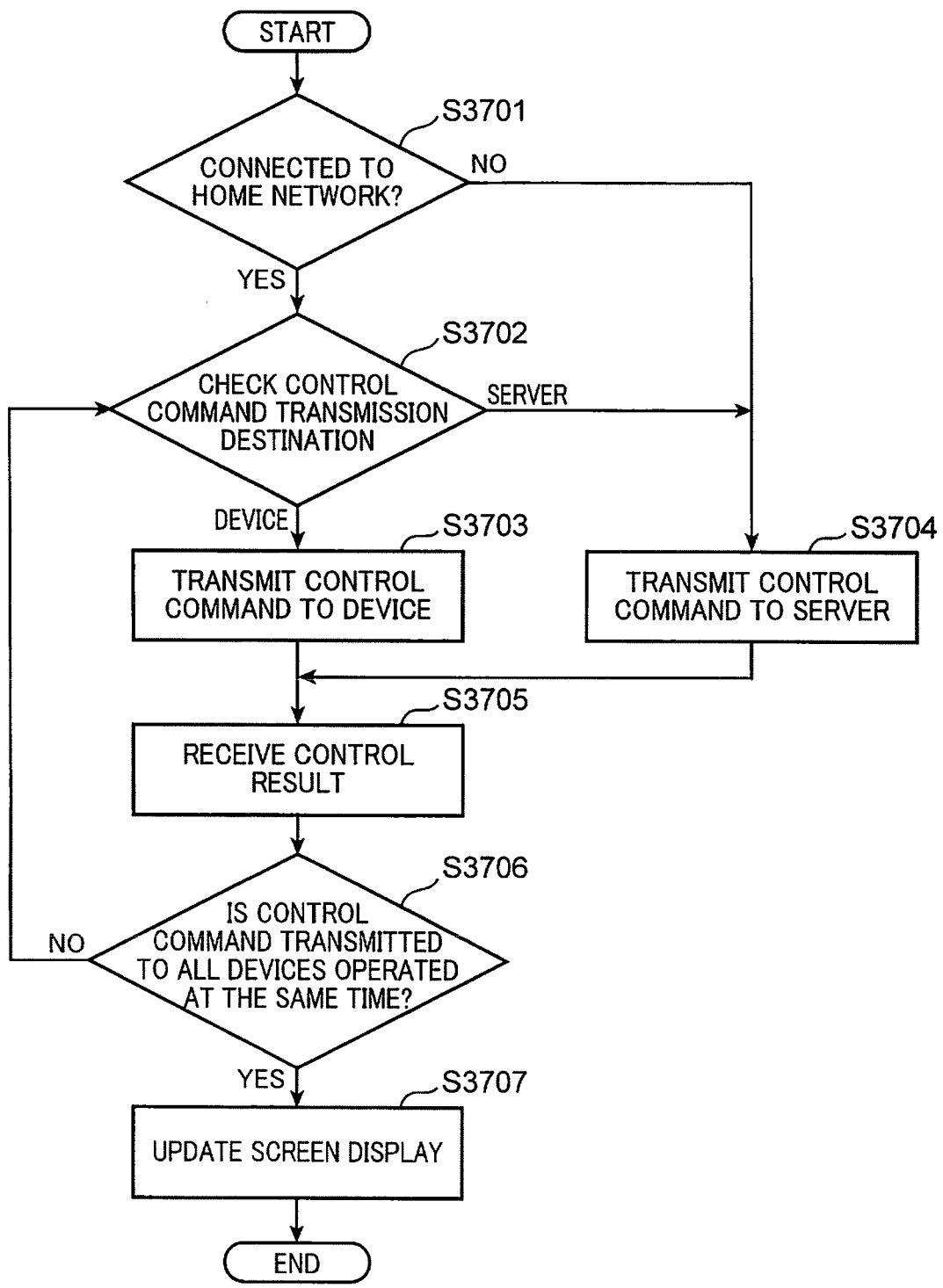
FIG. 41 is a flowchart showing the flow of a process for the home controller to transmit a control command according to the present disclosure.

The control command transmission flow in S12309 is executed with a process flow that is similar to the flowchart of FIG. 41, for example. The device serving as the control command transmission destination in S3702 and S3703 of FIG. 41 corresponds to the illumination device corresponding to the selected device icon for the illumination device in the control for the illumination device. The devices to be operated concurrently in S3706 of FIG. 41 correspond to illumination devices in plural rooms corresponding to the device icon for the illumination device used in common, for example, in the control for the illumination device.

Figure 95:
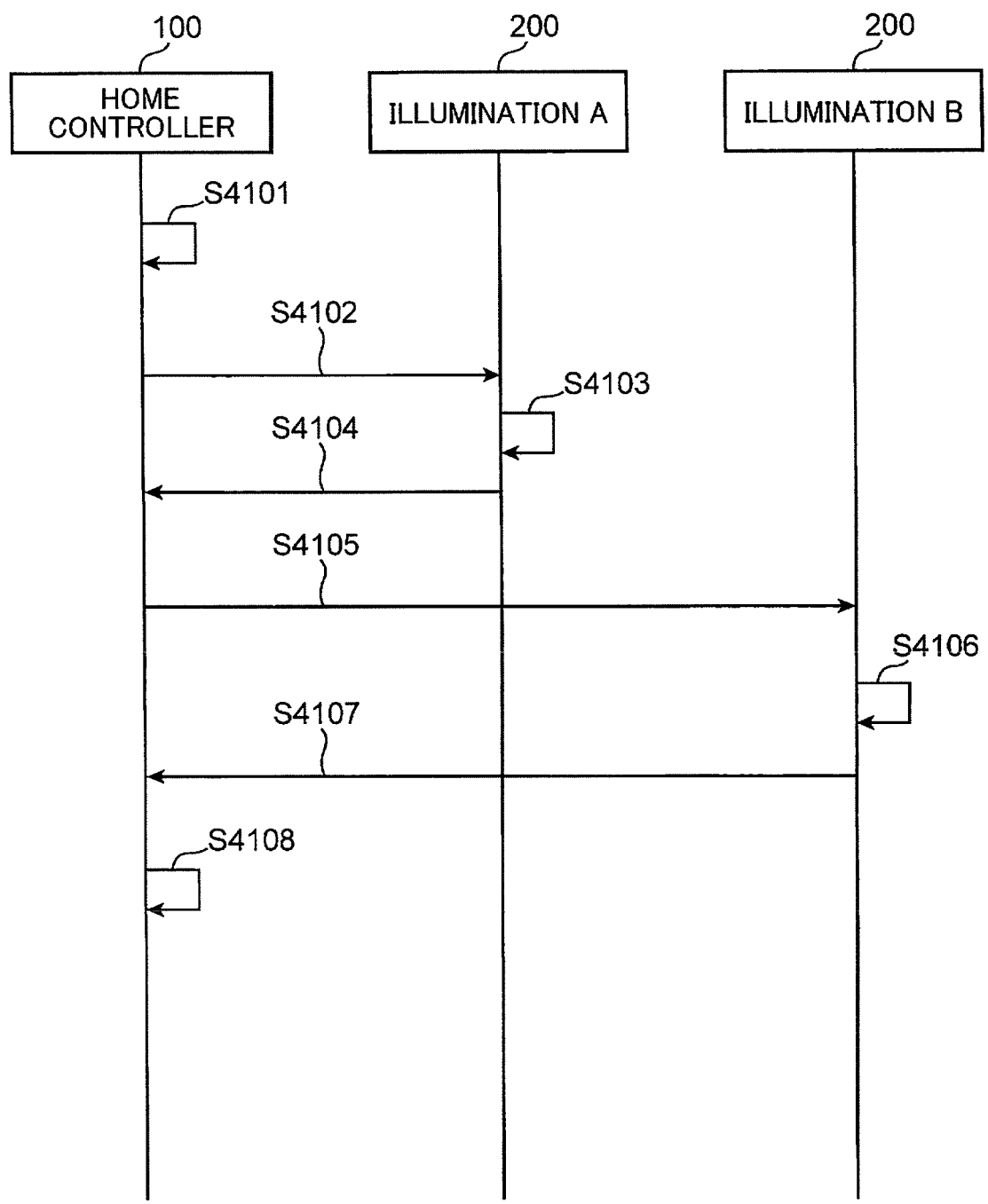
FIG. 95 is a sequence diagram showing the flow of a process for the home controller to directly control illumination devices in the case where the home controller controls plural illumination devices with one operation according to the embodiment of the present disclosure.

FIG. 95 is a sequence diagram showing the flow of a process for the home controller 100 to directly control the illumination device in the case where the home controller 100 controls plural illumination devices with one operation.

Here, a case where the home controller 100 controls the illumination device A 200 and the illumination device B 200 is described as an example.

First, the touch panel control section 102 of the home controller 100 senses a user operation on the control screen 10100 for the illumination device (S4101). Next, the device control section 106 of the home controller 100 generates a control command according to the user operation, and transmits the control command to the illumination device A 200 (S4102).

The illumination device A 200 which has received the control command executes the control command (S4103), and transmits the control result to the home controller 100 (S4104).

Next, the device control section 106 of the home controller 100 transmits to the illumination device B 200 a control command that is the same as the control command transmitted to the illumination device A 200 (S4105). The illumination device B 200 which has received the control command executes the control command (S4106), and transmits the control result to the home controller 100 (S4107).

The display control section 103 of the home controller 100 which has received the control result updates the display screen in accordance with the control result (S4108). In this case, for example, if the control screens 10100 for the illumination devices A 200 and B 200 are displayed on the display 101, the content of the control screens 10100 for the illumination devices A 200 and B 200 is updated in accordance with the control result.

Figure 96:
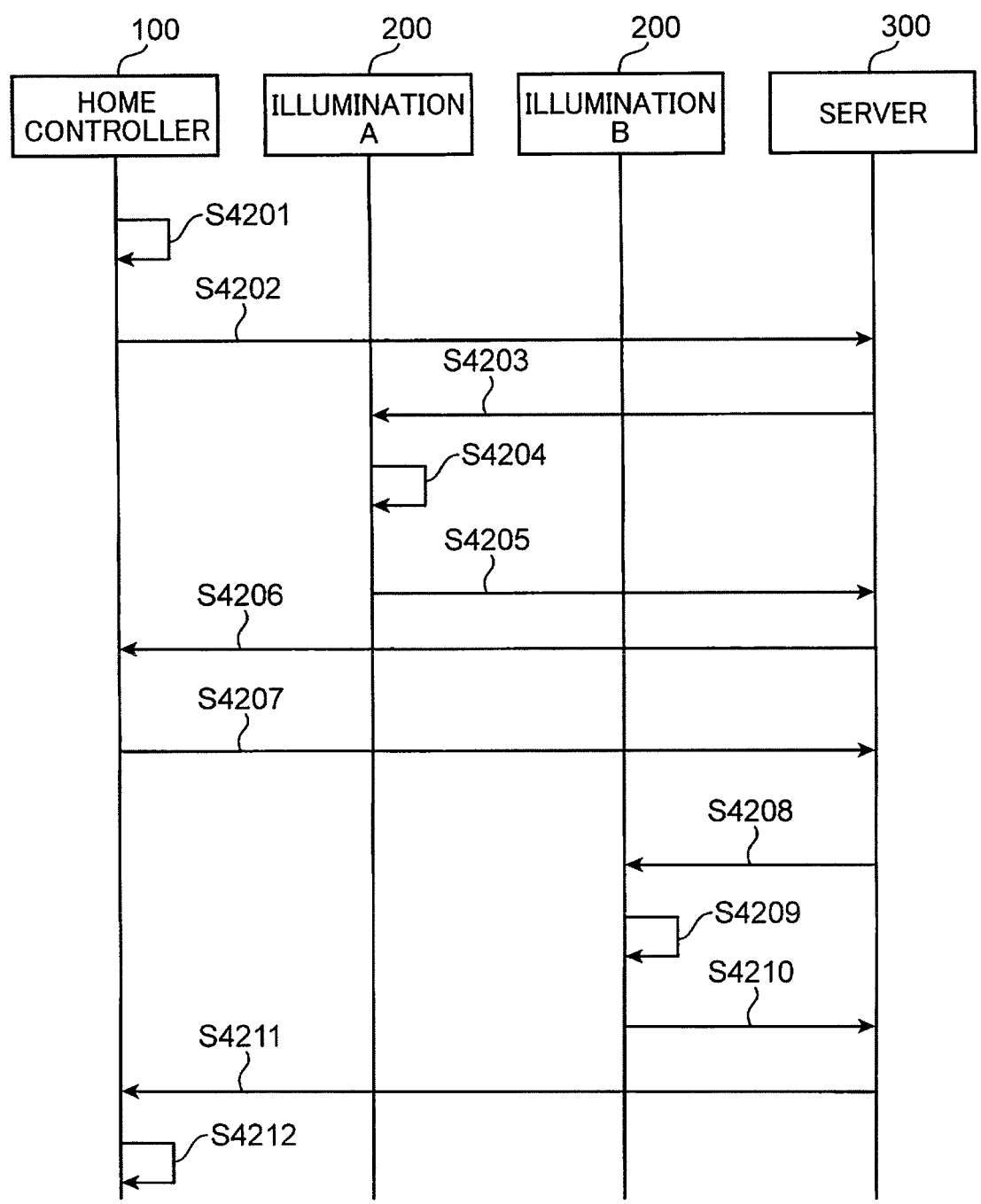
FIG. 96 is a sequence diagram showing the flow of a process for the home controller to control illumination devices by way of the server in the case where the home controller controls plural illumination devices with one operation according to the embodiment of the present disclosure.

FIG. 96 is a sequence diagram showing the flow of a process for the home controller 100 to control illumination devices by way of the server 300 in the case where the home controller 100 controls plural illumination devices with one operation. Here, a case where the home controller 100 controls the illumination device A 200 and the illumination device B 200 is described as an example. In addition, it is assumed that the illumination devices A 200 and B 200 are represented by one device icon 10201 for the illumination device, and are controlled using one control screen 10100 for the illumination device.

First, the touch panel control section 102 of the home controller 100 senses a user operation on the control screen 10100 for the illumination device (S4201).

Next, the device control section 106 of the home controller 100 generates a control command for the illumination device A 200 according to the user operation, and transmits the control command to the server 300 (S4202).

The server 300 which has received the control command for the illumination device A 200 transmits the control command to the illumination device A 200 (S4203). The illumination device A 200 which has received the control command executes the control command (S4204), and transmits the control result to the server 300 (S4205). The server 300 which has received the control result transmits the control result to the home controller 100 (S4206).

Similarly, the device control section 106 of the home controller 100 generates a control command for the illumination device B 200 according to the user operation, and transmits the control command to the server 300 (S4207).

The server 300 which has received the control command transmits the control command to the illumination device B 200 (S4208). The illumination device B 200 which has received the control command executes the control command (S4209), and transmits the control result to the server 300 (S4210). The server 300 which has received the control result transmits the control result to the home controller 100 (S4211).

Then, the display control section 103 of the home controller 100 updates the display screen in accordance with the control result (S4212).

Figure 97:
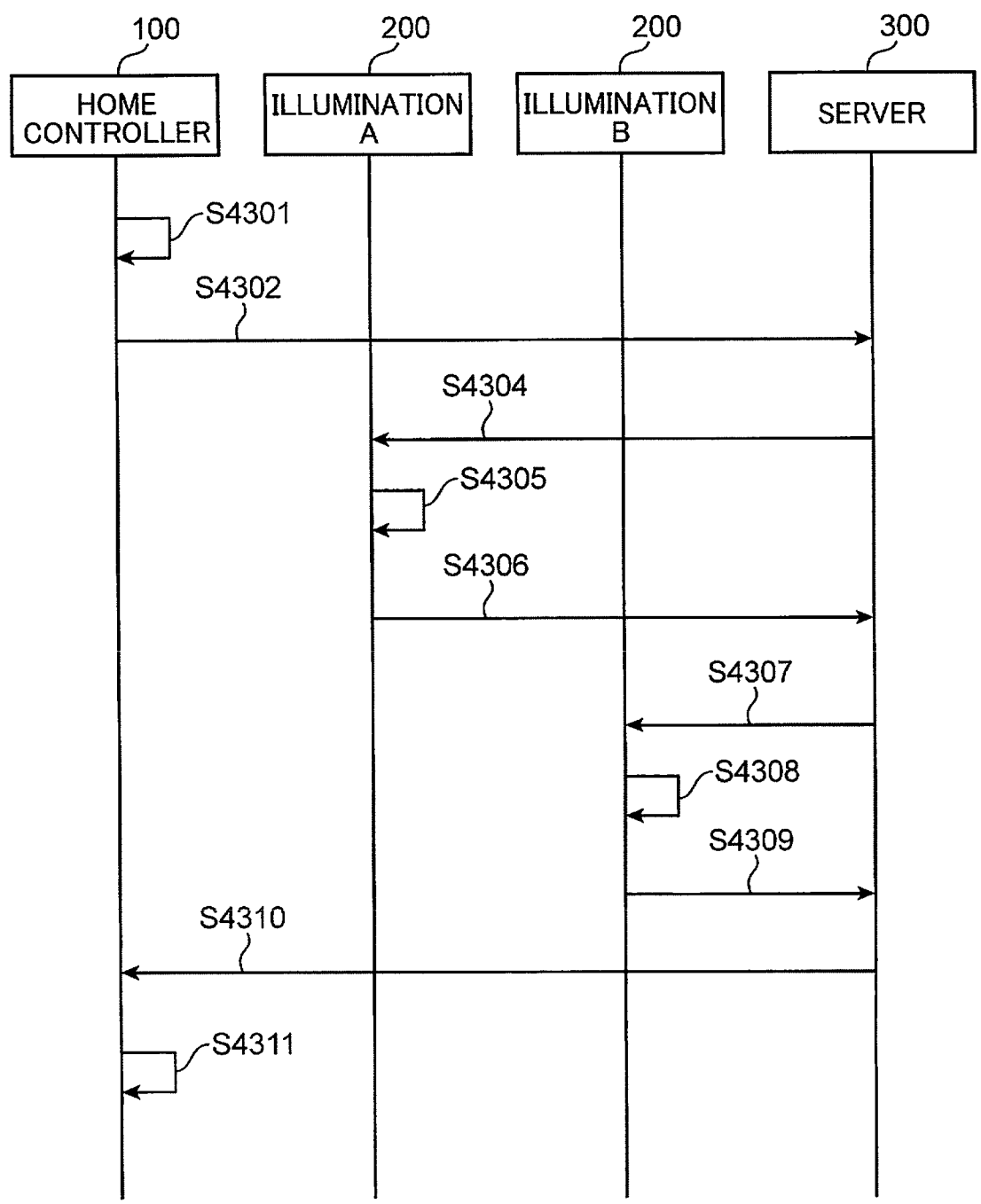
FIG. 97 is a sequence diagram showing the flow of a process for the home controller to control illumination devices by way of the server in the case where the home controller controls plural illumination devices with one operation according to the embodiment of the present disclosure.

FIG. 97 is a sequence diagram showing the flow of a process for the home controller 100 to control illumination devices by way of the server 300 in the case where the home controller 100 controls plural illumination devices with one operation. Here, a case where the home controller 100 controls the illumination device A 200 and the illumination device B 200 is described as an example. In addition, it is assumed that the illumination devices A 200 and B 200 are represented by one device icon 10201 for the illumination device, and are controlled using one control screen 10100 for the illumination device.

First, the touch panel control section 102 of the home controller 100 senses a user operation on the control screen 10100 for the illumination device (S4301).

Next, the device control section 106 of the home controller 100 generates a control command for the illumination device A 200 and the illumination device B 200 in accordance with the user operation, and transmits the control command to the server 300 (S4302).

The server 300 which has received the control command transmits the control command to the illumination device A 200 (S4303). The illumination device A 200 which has received the control command executes the control command (S4304), and transmits the control result to the server 300 (S4305).

Similarly, the server 300 transmits the control command to the illumination device B 200 (S4306). The illumination device B 200 which has received the control command executes the control command (S4307), and transmits the control result to the server 300 (S4308). The server 300 which has received the control result for the illumination device A 200 and the illumination device B 200 transmits the control result to the home controller 100 (S4309).

Then, the display control section 103 of the home controller 100 updates the display screen in accordance with the control result (S4310).

(Control for Illumination Device for Case where Floor Plan in Other Patterns is Used)

Figure 98:
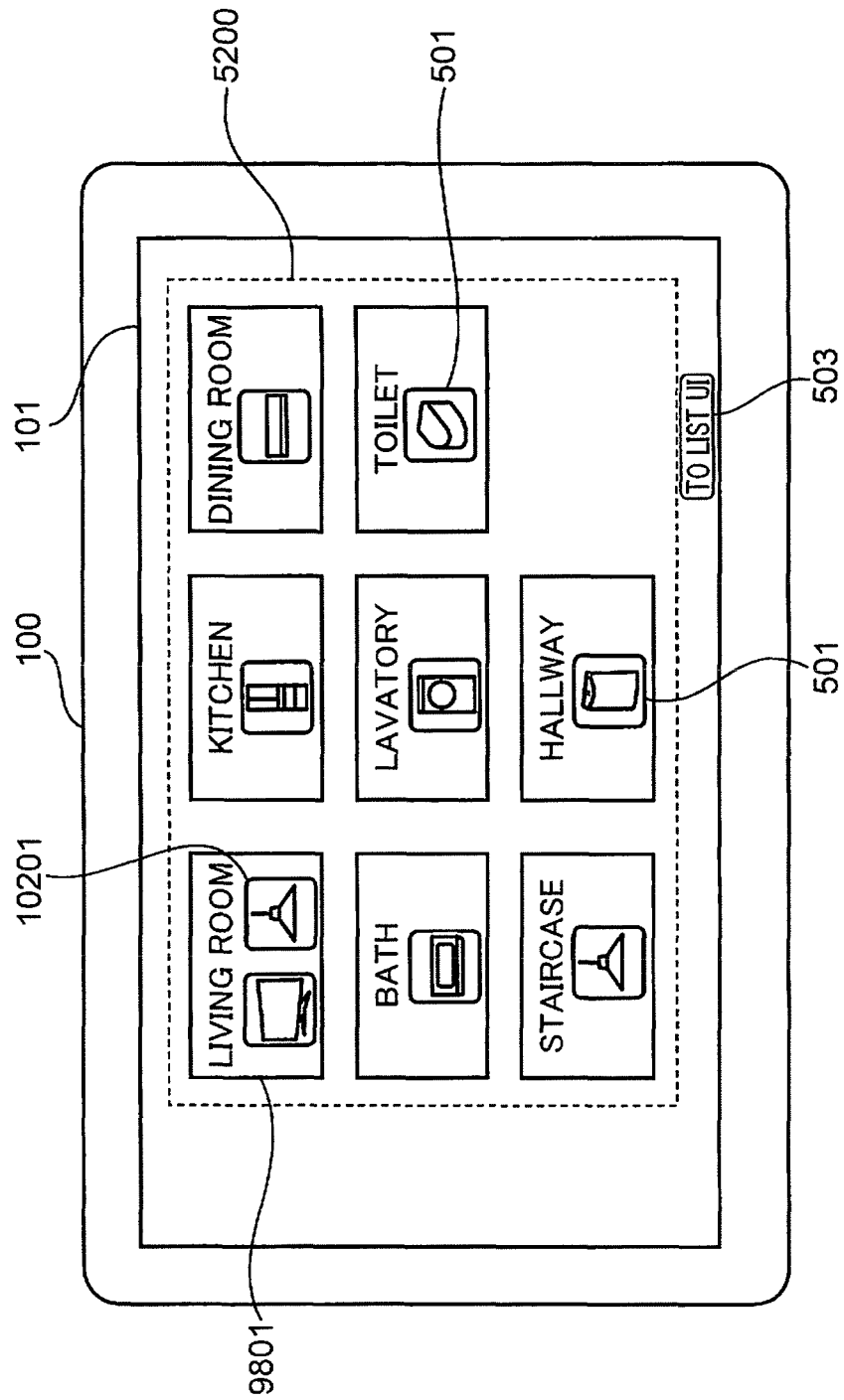
FIG. 98 is a diagram showing an example of the basic screen displayed on the display of the home controller in the case where the floor plan described with reference to FIG. 52 is used according to the embodiment of the present disclosure.
Figure 99:
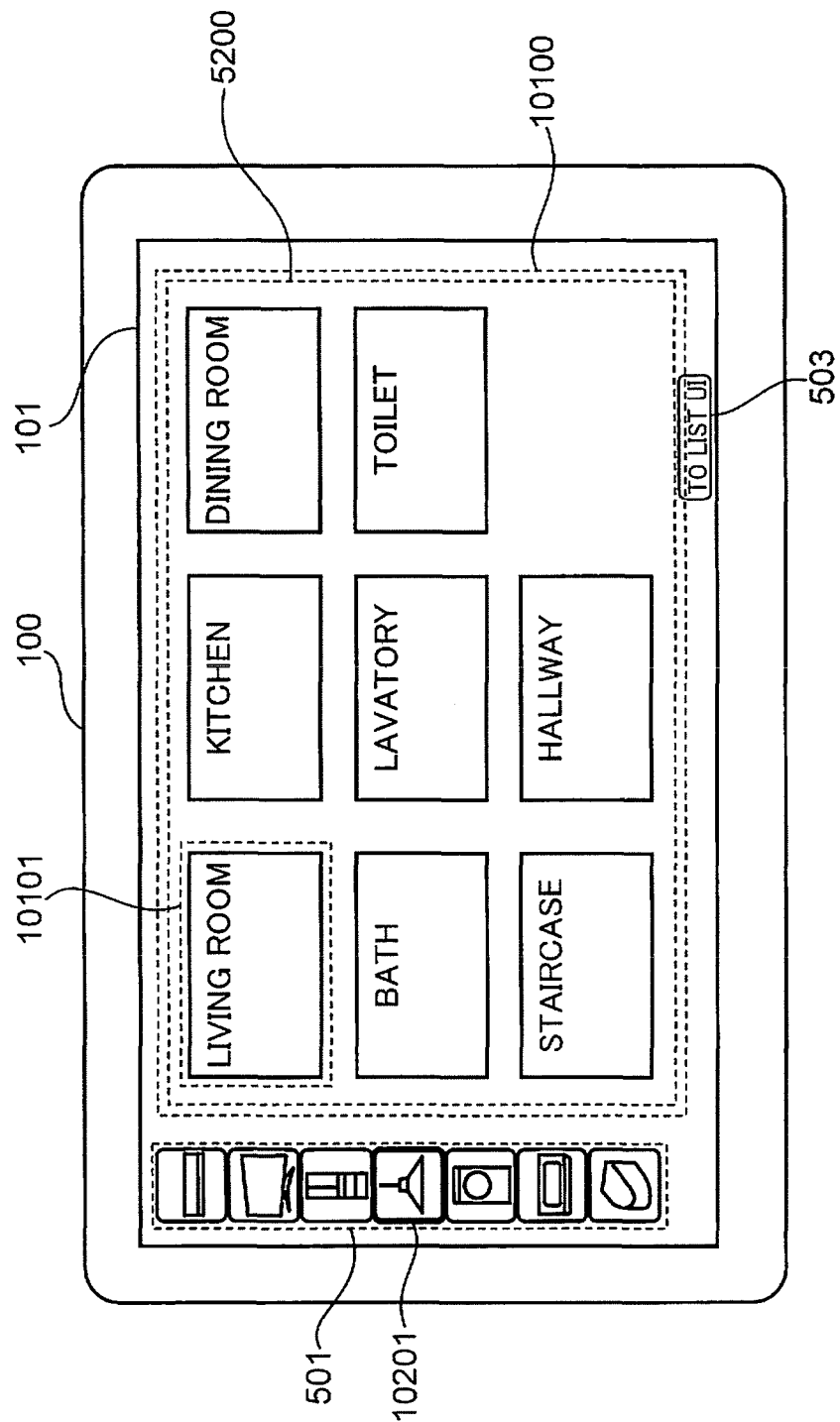
FIG. 99 is a diagram showing an example of the control screen for the illumination device displayed on the display in the case where the device icon for the illumination device is selected on the basic screen shown in FIG. 98 according to the embodiment of the present disclosure.

FIG. 98 is a diagram showing an example of the basic screen displayed on the display 101 of the home controller 100 in the case where the floor plan described with reference to FIG. 52 is used. FIG. 99 is a diagram showing an example of the control screen for the illumination device displayed on the display 101 in the case where the device icon for the illumination device is selected on the basic screen shown in FIG. 98.

As shown in FIG. 98, the display control section 103 displays the basic screen including the floor plan 5200, the device icons 501, and so forth on the display 101 of the home controller 100. In this display state, the user selects a device icon 10201 for the illumination device disposed in a living room 9801 in which the illumination device is installed, and the touch panel control section 102 senses the selection. At this time, as shown in FIG. 99, the display control section 103 retracts all the device icons 501 including the device icon 10201 for the illumination device out of the display region of the floor plan 5200, and displays the control screen 10100 for the illumination device including the control target region 10101 for the illumination device on the display 101.

As shown in FIG. 99, the floor plan 5200 and the control screen 10100 for the illumination device have the same display content as each other as in the case of the floor plan 500 described with reference to FIGS. 72 to 74. In other words, when the user selects the device icon 10201 for the illumination device, the floor plan 5200 also functions as the control screen 10100 for the illumination device.

Figure 100:
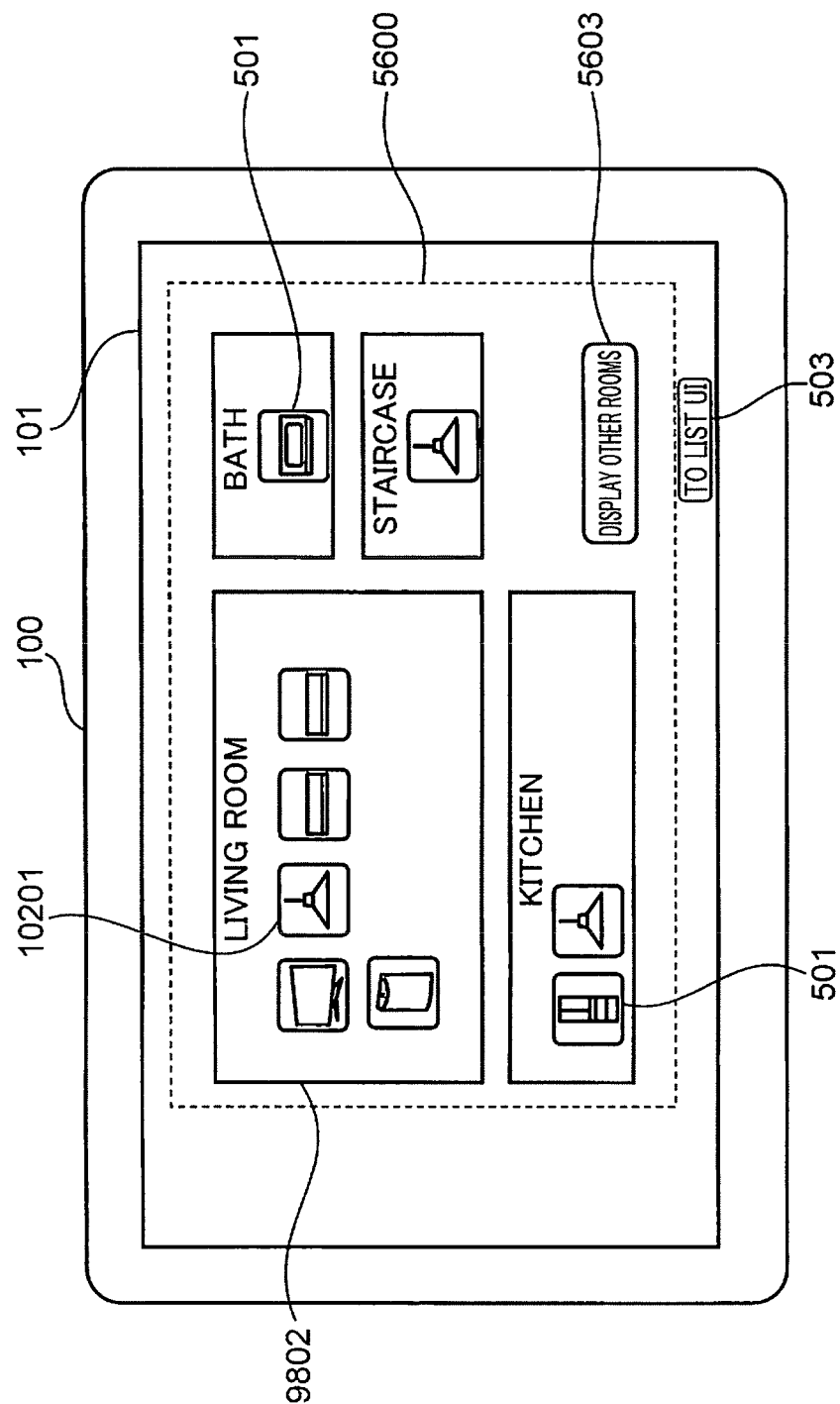
FIG. 100 is a diagram showing an example of the basic screen displayed on the display of the home controller in the case where the floor plan described with reference to FIG. 56 is used according to the embodiment of the present disclosure.
Figure 101:
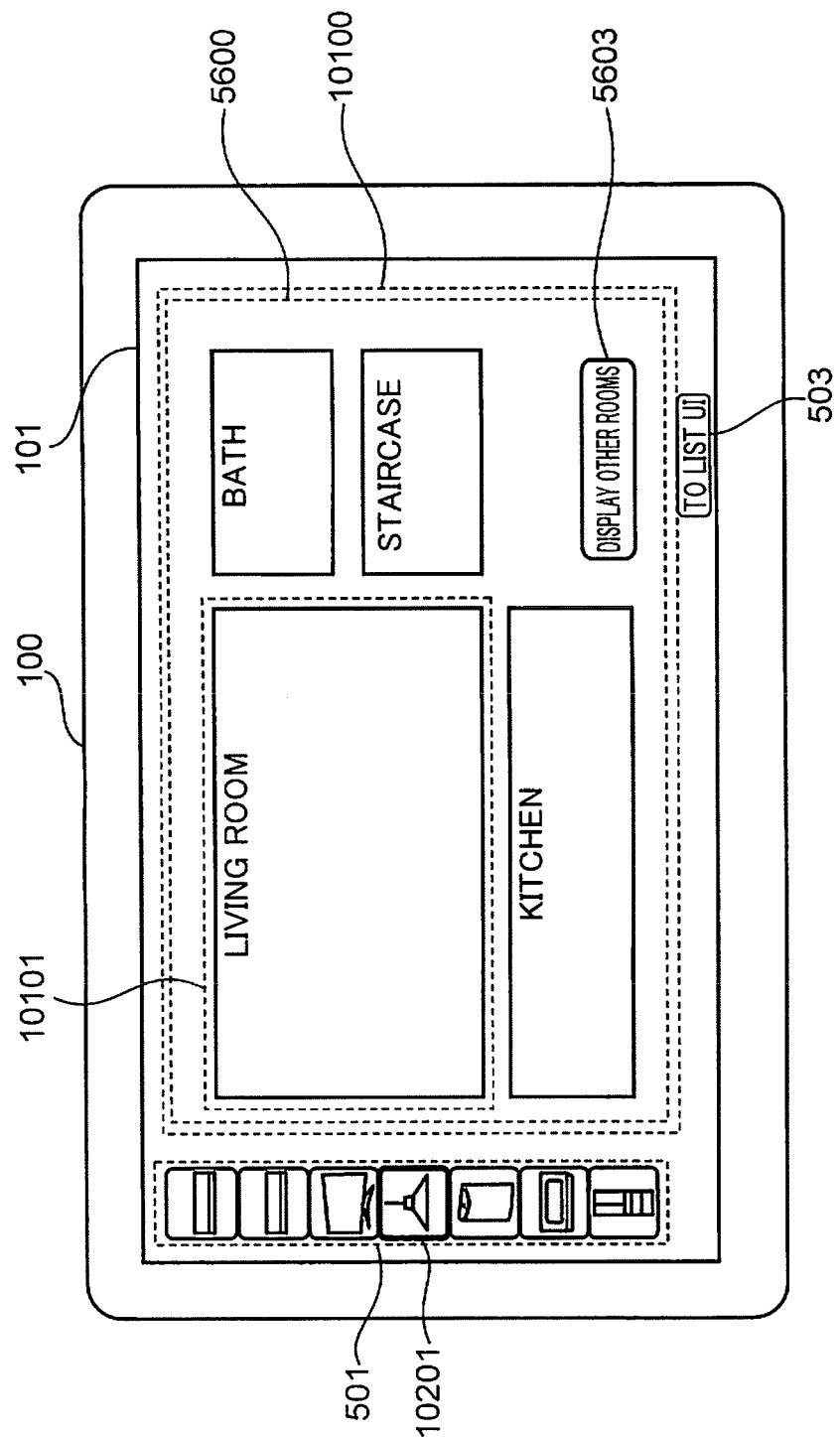
FIG. 101 is a diagram showing an example of the control screen for the illumination device displayed on the display in the case where the device icon for the illumination device is selected on the basic screen shown in FIG. 100 according to the embodiment of the present disclosure.

FIG. 100 is a diagram showing an example of the basic screen displayed on the display 101 of the home controller 100 in the case where the floor plan described with reference to FIG. 56 is used. FIG. 101 is a diagram showing an example of the control screen for the illumination device displayed on the display 101 in the case where the device icon for the illumination device is selected on the basic screen shown in FIG. 100.

As shown in FIG. 100, the display control section 103 displays the basic screen including the floor plan 5600, the device icons 501, and so forth on the display 101 of the home controller 100. In this display state, the user selects a device icon 10201 for the illumination device disposed in a living room 9802 in which the illumination device is installed, and the touch panel control section 102 senses the selection. At this time, as shown in FIG. 101, the display control section 103 retracts all the device icons 501 including the device icon 10201 for the illumination device out of the display region of the floor plan 5600, and displays the control screen 10100 for the illumination device including the control target region 10101 for the illumination device on the display 101.

As shown in FIG. 101, the floor plan 5600 and the control screen 10100 for the illumination device have the same display content as each other as in the case of the floor plan 500 described with reference to FIGS. 72 to 74. In other words, when the user selects the device icon 10201 for the illumination device, the floor plan 5600 also functions as the control screen 10100 for the illumination device.

Figure 102:
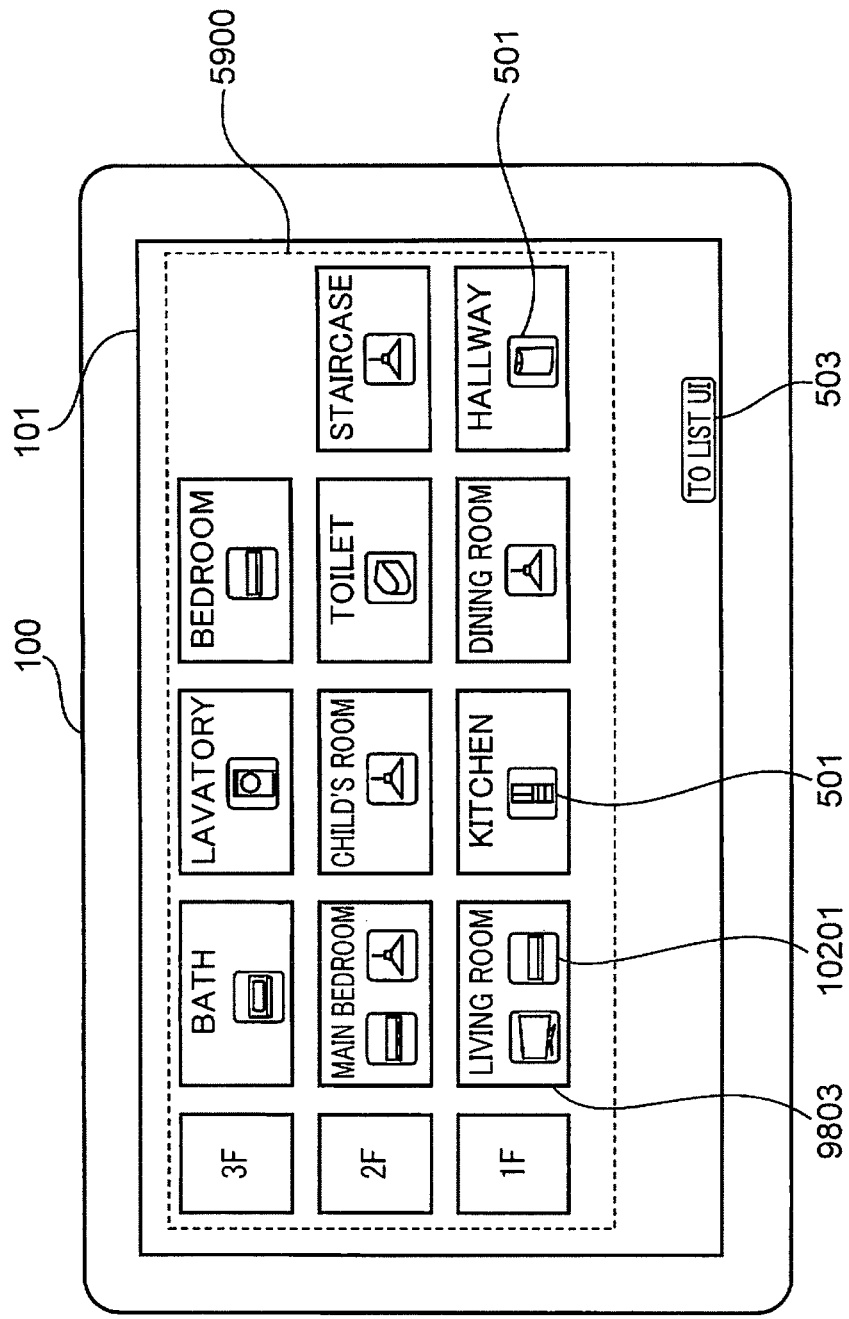
FIG. 102 is a diagram showing an example of the basic screen displayed on the display of the home controller in the case where the floor plan described with reference to FIG. 59 is used according to the embodiment of the present disclosure.
Figure 103:
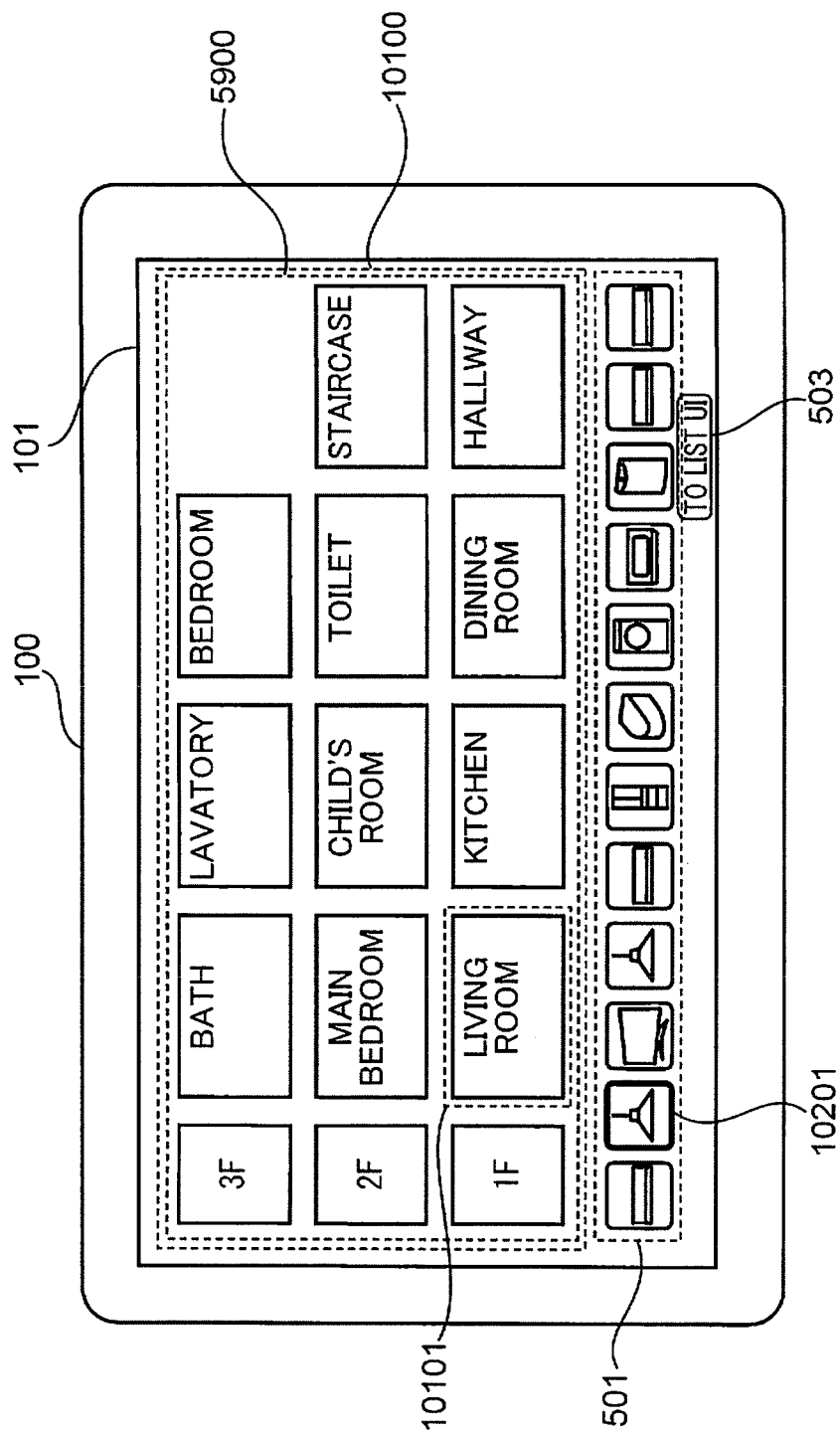
FIG. 103 is a diagram showing an example of the control screen for the illumination device displayed on the display in the case where the device icon for the illumination device is selected on the basic screen shown in FIG. 102 according to the embodiment of the present disclosure.

FIG. 102 is a diagram showing an example of the basic screen displayed on the display 101 of the home controller 100 in the case where the floor plan described with reference to FIG. 59 is used. FIG. 103 is a diagram showing an example of the control screen for the illumination device displayed on the display 101 in the case where the device icon for the illumination device is selected on the basic screen shown in FIG. 102.

As shown in FIG. 102, the display control section 103 displays the basic screen including the floor plan 5900, the device icons 501, and so forth on the display 101 of the home controller 100. In this display state, the user selects a device icon 10201 for the illumination device disposed in a living room 9803 in which the illumination device is installed, and the touch panel control section 102 senses the selection. At this time, as shown in FIG. 103, the display control section 103 retracts all the device icons 501 including the device icon 10201 for the illumination device out of the display region of the floor plan 5900, and displays the control screen 10100 for the illumination device including the control target region 10101 for the illumination device on the display 101.

As shown in FIG. 103, the floor plan 5900 and the control screen 10100 for the illumination device have the same display content as each other as in the case of the floor plan 500 described with reference to FIGS. 72 to 74. In other words, when the user selects the device icon 10201 for the illumination device, the floor plan 5900 also functions as the control screen 10100 for the illumination device.

Then, also in the case of the floor plans 5200, 5600, and 5900 with patterns that are different from that of the floor plan 500, with the control screen 10100 for the illumination device shown in FIGS. 99, 101, and 103, respectively, displayed, the illumination device is controlled as in the case of the floor plan 500. For example, as described with reference to FIGS. 84 to 86, the device icon 10201 for the illumination device may be used in common to plural rooms.

Figure 104:
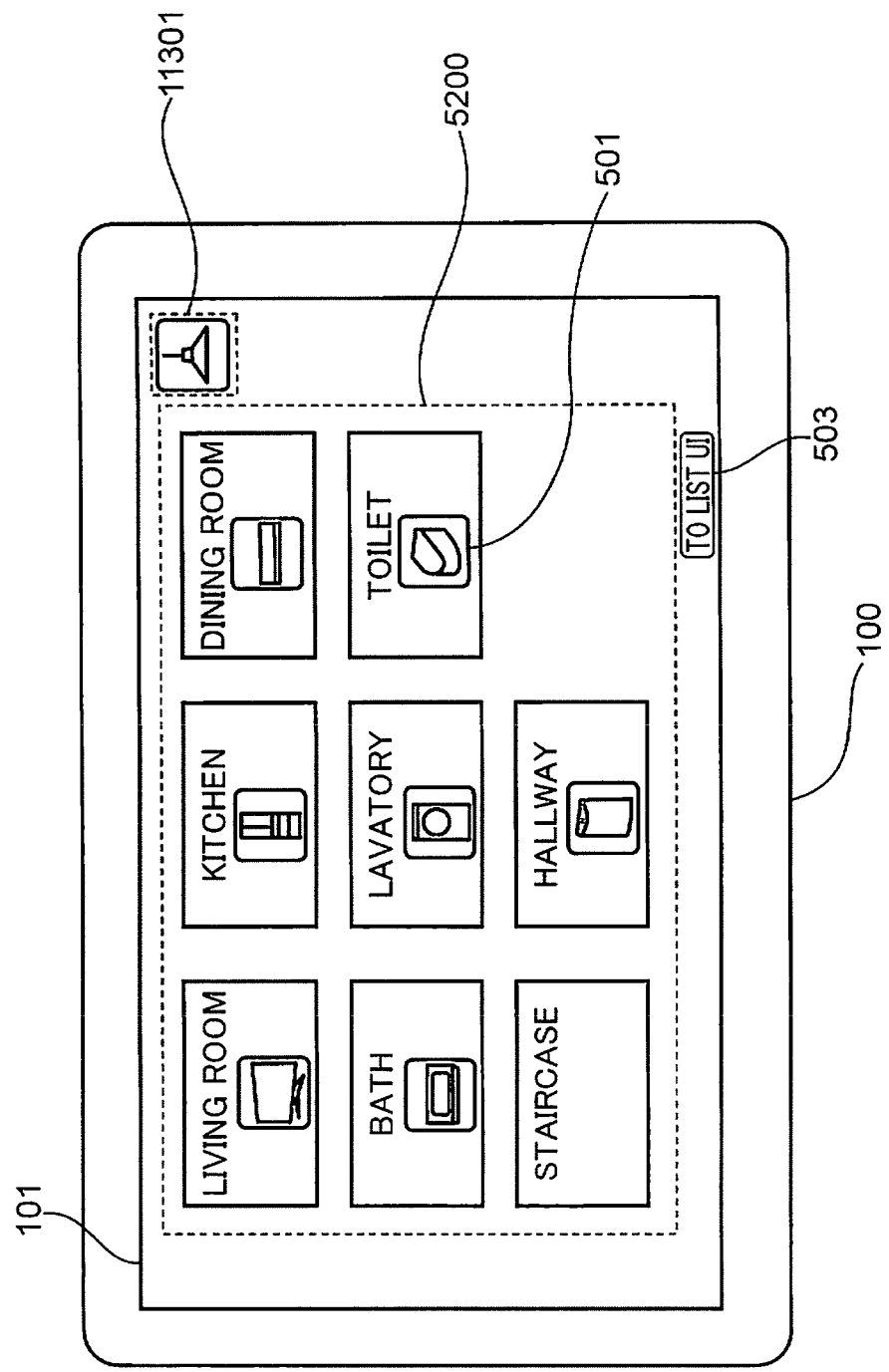
FIG. 104 is a diagram showing an example in which the device icon for the illumination device used in common is disposed outside the display region of the floor plan according to the embodiment of the present disclosure.

FIG. 104 is a diagram showing an example in which the device icon 11301 for the illumination device used in common is disposed outside the display region of the floor plan 5200. In general, illumination devices are installed in all the rooms. Thus, as shown in FIG. 104, the home controller 100 may dispose the device icon 11301 for the illumination device used in common outside the display region of the floor plan 5200, and may use the device icon 11301 for the illumination device used in common to all the rooms in common.

In the case where there is a room in which plural illumination devices are installed, only one device icon 501 for the illumination device may be disposed in the basic screen in the left diagram of FIG. 73, for example, rather than disposing the device icons 501 for plural illumination devices. In this case, the one device icon 501 for the illumination device represents plural illumination devices. Then, the plural illumination devices can be controlled at the same time in accordance with the process of FIG. 95, 96, or 97, for example, by selecting the device icon 501 for the illumination device which represents the plural illumination devices. That is, one or more illumination devices can be controlled through one operation.

INDUSTRIAL APPLICABILITY

The present disclosure provides a useful control method of suitably controlling one or more illumination devices connected to a network.

What is claimed is:

1. A control method for an information apparatus having a display and being connected to a network, at least one target device being controlled over the network, the control method causing a computer of the information apparatus to:
    display a first display screen representing a first floor plan for a first floor of a building on the display, when the first display screen is selected, wherein at least one device icon displayed on the first display screen represents the at least one target device, and the first floor plan includes a first section of a staircase;
    display a second display screen representing a second floor plan for a second floor of the building, different from the first floor, on the display, when the second display screen is selected, wherein at least one device icon on the second display screen represents the at least one target device, and the second floor plan includes a second section of the staircase;
    determine whether or not a display region corresponding to the staircase included in the first floor plan or in the second floor plan is selected;
    switch between display of the first display screen and display of the second display screen displayed on the display, when the display region corresponding to the staircase included in the first floor plan or included in the second floor plan is selected;
    determine whether or not the display region corresponding to the staircase included in the first floor plan or in the second floor plan is selected after an illumination icon, representing an illumination device of the at least one target device and displayed in the display region corresponding to the staircase, is selected from the at least one device icon displayed on the first display screen or on the second display screen;
    output, to the network, a first control command, without performing switching between the first display screen and the second display screen, when the display region corresponding to the staircase is selected after the illumination icon displayed in the display region corresponding to the staircase included in the first floor plan is selected, the first control command controlling ON/OFF of power for the illumination device that is associated with the staircase; and
    output, to the network, the first control command, without performing switching between the first display screen and the second display screen, when the display region corresponding to the staircase is selected after the illumination icon displayed in the display region corresponding to the staircase included in the second floor plan is selected,
    wherein, when the illumination icon displayed in the display region corresponding to the staircase is selected, the first control command is not output to the network until the display region corresponding to the staircase is selected.

2. The control method according to claim 1, wherein
when power for the illumination device is turned on, the display region corresponding to the staircase is displayed brightly with not less than specific brightness, and
when power for the illumination device is turned off, the display region corresponding to the staircase is displayed darkly with less than the specific brightness.

3. The control method according to claim 2, wherein
an ON control command is output to the network, when the display region corresponding to the staircase displayed darkly with less than the specific brightness, is selected, the ON control command turning on power for the illumination device associated with the staircase.

4. The control method according to claim 2, wherein
an OFF control command is output to the network, when the display region corresponding to the staircase displayed brightly with not less than the specific brightness, is selected, the OFF control command turning off power for the illumination device associated with the staircase.

5. The control method according to claim 1, wherein
when the illumination icon is selected, the at least one device icon, including the illumination icon, is moved outside a display region of the first display screen representing the first floor plan or a display region of the second display screen representing the second floor plan.

6. The control method according to claim 1, wherein
the display is a touch panel display, and
determining of the selection of the illumination icon, and determining of the selection of the display region corresponding to the staircase are performed by sensing a contact with the touch panel display.

7. The control method according to claim 1, wherein
determining of the selection of the illumination icon, and determining of the selection of the display region corresponding to the staircase are performed by sensing a click with a mouse pointer.

8. The control method according to claim 1, wherein
the display is a touch panel display,
when an adjustment screen for adjusting a light quantity of the illumination device associated with the staircase is displayed, and when movement of a contact with the touch panel display on the adjustment screen is sensed, a second control command is output to the network, the second control command varying the light quantity of the illumination device in accordance with an amount of the movement.

9. The control method according to claim 8, wherein the second control command increases the light quantity of the illumination device, as the amount of the movement increases.

10. The control method according to claim 8, wherein the display region corresponding to the staircase is displayed brightly or darkly in accordance with a variation in the light quantity of the illumination device.

11. The control method according to claim 8, wherein the adjustment screen has a display size larger than a display size of the display region corresponding to the staircase.

12. The control method according to claim 1, wherein the display is a touch panel display,
when an adjustment screen for adjusting a light quantity of the illumination device associated with the staircase is displayed, and when movement of a contact with the touch panel display on the adjustment screen is sensed, a second control command is output to the network, the second control command varying the light quantity of the illumination device in accordance with a direction of the movement.

13. The control method according to claim 12, wherein the second control command increases the light quantity of the illumination device, when the direction of the movement is upward on the touch panel display.

14. The control method according to claim 13, wherein the second control command decreases the light quantity of the illumination device, when the direction of the movement is downward on the touch panel display.

15. The control method according to claim 12, wherein the display region corresponding to the staircase is displayed brightly or darkly in accordance with a variation in the light quantity of the illumination device.

16. The control method according to claim 12, wherein the adjustment screen has a display size larger than a display size of the display region corresponding to the staircase.

17. The control method according to claim 1, wherein a control screen is displayed on the first display screen or the second display screen, when a device icon representing a target device other than the illumination device is selected, the control screen being for operating, or confirming a state of, the target device corresponding to the selected device icon.

18. A non-transitory computer-readable recording medium which stores a program to be executed by an information apparatus having a display and being connected to a network, at least one target device being controlled over the network, the program causing a computer of the information apparatus to:
display a first display screen representing a first floor plan for a first floor of a building on the display, when the first display screen is selected, wherein at least one device icon displayed on the first display screen represents the at least one target device, and the first floor plan includes a first section of a staircase;
display a second display screen representing a second floor plan for a second floor of the building, different from the first floor, on the display, when the second display screen is selected, wherein at least one device icon on the second display screen represents the at least one target device, and the second floor plan includes a second section of the staircase;
determine whether or not a display region corresponding to the staircase included in the first floor plan or in the second floor plan is selected;
switch between display of the first display screen and display of the second display screen displayed on the display, when the display region corresponding to the staircase included in the first floor plan or included in the second floor plan is selected;
determine whether or not the display region corresponding to the staircase included in the first floor plan or in the second floor plan is selected after an illumination icon, representing an illumination device of the at least one target device and displayed in the display region corresponding to the staircase, is selected from the at least one device icon displayed on the first display screen or on the second display screen;
output, to the network, a first control command, without performing switching between the first display screen and the second display screen, when the display region corresponding to the staircase is selected after the illumination icon displayed in the display region corresponding to the staircase included in the first floor plan is selected, the first control command controlling ON/OFF of power for the illumination device that is associated with the staircase; and
output, to the network, the first control command, without performing switching between the first display screen and the second display screen, when the display region corresponding to the staircase is selected after the illumination icon displayed in the display region corresponding to the staircase included in the second floor plan is selected,
wherein, when the illumination icon displayed in the display region corresponding to the staircase is selected, the first control command is not output to the network until the display region corresponding to the staircase is selected.

19. A control method for an information apparatus having a display and being connected to a network, at least one target device being controlled over the network, the control method causing a computer of the information apparatus to:
display a first display screen and at least one device icon on the first display screen, when a first staircase region displayed on a second display screen is selected, the first display screen representing a floor plan for a first floor of a building, the second display screen representing a floor plan for a second floor of the building, the second floor being connected to the first floor by a staircase, the at least one device icon representing the at least one target device, the first staircase region corresponding to the staircase included in the floor plan for the second floor;
display the second display screen and at least one device icon on the second display screen, when a second staircase region displayed on the first display screen is selected, the second staircase region corresponding to the staircase included in the floor plan for the first floor;
output, to the network, a first control command, when an illumination icon displayed in the first staircase region is selected and the first staircase region is selected subsequent to the selection of the illumination icon, the illumination icon representing an illumination device of at least one of the target device, the first control command controlling ON/OFF of power for the illumination device that is associated with the first staircase region and the second staircase region; and output, to the network, the first control command, when an illumination icon displayed in the second staircase region is selected and the second staircase region is selected subsequent to the selection of the illumination icon, wherein, when the illumination icon displayed in the first staircase region is selected, the first control command is not output until the first staircase region is selected subsequently, and when the illumination icon displayed in the second staircase region is selected, the first control command is not output until the second staircase region is selected subsequently.

20. A non-transitory computer-readable recording medium which stores a program to be executed by an information apparatus having a display and being connected to a network, at least one target device being controlled over the network, the program causing a computer of the information apparatus to:

display a first display screen and at least one device icon on the first display screen, when a first staircase region displayed on a second display screen is selected, the first display screen representing a floor plan for a first floor of a building, the second display screen representing a floor plan for a second floor of the building, the second floor being connected to the first floor by a staircase, the at least one device icon representing the at least one target device, the first staircase region corresponding to the staircase included in the floor plan for the second floor;

display the second display screen and at least one device icon on the second display screen, when a second staircase region displayed on the first display screen is selected, the second staircase region corresponding to the staircase included in the floor plan for the first floor;

output, to the network, a first control command, when an illumination icon displayed in the first staircase region is selected and the first staircase region is selected subsequent to the selection of the illumination icon, the illumination icon representing an illumination device of at least one of the target device, the first control command controlling ON/OFF of power for the illumination device that is associated with the first staircase region and the second staircase region; and output, to the network, the first control command, when an illumination icon displayed in the second staircase region is selected and the second staircase region is selected subsequent to the selection of the illumination icon, wherein, when the illumination icon displayed in the first staircase region is selected, the first control command is not output until the first staircase region is selected subsequently, and when the illumination icon displayed in the second staircase region is selected, the first control command is not output until the second staircase region is selected subsequently.

* * * * *